US009547951B2

(12) United States Patent
Fujimoto

(10) Patent No.: US 9,547,951 B2
(45) Date of Patent: Jan. 17, 2017

(54) CURRENCY VALUE CHANGING APPARATUS ENABLING PLAYER TO PLAY GAME USING VARIOUS CURRENCIES, GAMING SYSTEM WHERE PLAYER CAN PLAY GAME USING VARIOUS CURRENCIES, INDIVIDUAL TRACKING APPARATUS, AND INDIVIDUAL TRACKING SYSTEM

(75) Inventor: Jun Fujimoto, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1354 days.

(21) Appl. No.: 12/511,224

(22) Filed: Jul. 29, 2009

(65) Prior Publication Data

US 2010/0056260 A1    Mar. 4, 2010

Related U.S. Application Data

(60) Provisional application No. 61/093,120, filed on Aug. 29, 2008, provisional application No. 61/093,098, filed on Aug. 29, 2008, provisional application No. 61/093,096, filed on Aug. 29, 2008, provisional application No. 61/093,091, filed on Aug. 29, 2008.

(51) Int. Cl.
*A63F 9/24* (2006.01)
*G07F 17/32* (2006.01)
*G06Q 20/38* (2012.01)

(52) U.S. Cl.
CPC ......... *G07F 17/3211* (2013.01); *G06Q 20/381* (2013.01); *G07F 17/32* (2013.01); *G07F 17/3244* (2013.01); *G07F 17/3258* (2013.01)

(58) Field of Classification Search
CPC ...... G07F 17/34; G07F 17/32; G07F 17/3244; G07F 17/3246; G07F 17/3258
USPC ..... 463/16, 20, 25, 27, 42, 1, 26; 273/138.1, 273/139
See application file for complete search history.

(56) References Cited

U.S. PATENT DOCUMENTS

| | | | |
|---|---|---|---|
| 5,496,032 A * | 3/1996 | Okada | ............................. 463/25 |
| 5,577,959 A | 11/1996 | Takemoto et al. | |
| 5,628,685 A | 5/1997 | Takemoto et al. | |
| 6,846,238 B2 | 1/2005 | Wells | |
| 6,852,029 B2 | 2/2005 | Baltz et al. | |
| 6,944,319 B1 | 9/2005 | Huang et al. | |
| 6,975,750 B2 | 12/2005 | Yan et al. | |
| 7,094,149 B2 | 8/2006 | Walker et al. | |
| 7,095,879 B2 | 8/2006 | Yan et al. | |
| 7,127,087 B2 | 10/2006 | Huang et al. | |

(Continued)

*Primary Examiner* — William H McCulloch, Jr.
*Assistant Examiner* — Chase Leichliter
(74) *Attorney, Agent, or Firm* — KMF Patent Services, PLLC; S. Peter Konzel; Kenneth M. Fagin

(57) ABSTRACT

The currency-value converter according to the present invention transmits amount-of-converted-currency data indicating the amount of basic currency identified based on the type of this currency, the amount of the currency and the exchange rate, to a controller installed in a gaming machine, when the type of currency accepted through a currency validator is not the basic currency. The exchange rate is a rate in which a correspondence relationship between an amount of the basic currency and an amount of another type of currency other than the basic currency is set for each type of currency other than the basic currency. Then, a game is played at the gaming machine based on the transmitted amount-of-converted currency.

16 Claims, 87 Drawing Sheets

(56) References Cited

U.S. PATENT DOCUMENTS

| | | | |
|---|---|---|---|
| 7,142,697 B2 | 11/2006 | Huang et al. | |
| 7,406,184 B2 | 7/2008 | Wolff et al. | |
| 7,428,985 B1 * | 9/2008 | Moreland | E05G 7/001 |
| | | | 194/206 |
| 7,887,411 B2 * | 2/2011 | Raniere | 463/25 |
| 7,892,089 B2 * | 2/2011 | Raniere | 463/25 |
| 2002/0041069 A1 * | 4/2002 | Steelman | G07F 17/32 |
| | | | 273/138.1 |
| 2003/0022719 A1 * | 1/2003 | Donald et al. | 463/42 |
| 2004/0009811 A1 * | 1/2004 | Torango | 463/25 |
| 2004/0152511 A1 * | 8/2004 | Nicely et al. | 463/27 |
| 2006/0149561 A1 * | 7/2006 | Govender | 705/1 |
| 2006/0205481 A1 * | 9/2006 | Dominelli | G06Q 20/06 |
| | | | 463/25 |
| 2008/0167117 A1 * | 7/2008 | Moshal | G07F 17/3276 |
| | | | 463/25 |
| 2008/0242391 A1 * | 10/2008 | Nilsson et al. | 463/16 |
| 2009/0054149 A1 * | 2/2009 | Brosnan et al. | 463/42 |
| 2009/0192938 A1 * | 7/2009 | Amos | G06Q 10/087 |
| | | | 705/43 |

\* cited by examiner

FIG. 14A

| List of payout when number of bet is 1 | |
|---|---|
| Combination of symbols | Number of payouts |
| 3bar-3bar-3bar | 60 |
| 2bar-2bar-2bar | 40 |
| 1bar-1bar-1bar | 20 |
| anybar-anybar-anybar | 10 |

FIG. 14B

| List of payout when number of bet is 2 | |
|---|---|
| Combination of symbols | Number of payouts |
| 3bar-3bar-3bar | 120 |
| 2bar-2bar-2bar | 80 |
| 1bar-1bar-1bar | 40 |
| anybar-anybar-anybar | 20 |

FIG. 14C

| List of payout when number of bet is 3 | |
|---|---|
| Combination of symbols | Number of payouts |
| blue 7-blue 7-blue 7 | 1800 |
| red 7-red 7-red 7 | 100 |
| white 7-white 7-white 7 | 100 |

FIG. 21

| Symbol | Number of points |
|---|---|
| blue 7 – blue 7 – blue 7 | 7000 |
| blue 7 | 300 |
| red 7 | 150 |
| 3bar | 30 |
| 2bar | 20 |
| 1bar | 10 |

FIG. 22A

| Number-of-lighting determination table for bent portions | | | | | | | |
|---|---|---|---|---|---|---|---|
| Number of points | Slot machine | | | | | | |
| | A | B | C | · | · | I | J |
| 1~5 | 5 | 8 | 10 | · | · | 8 | 5 |
| 6~10 | 10 | 16 | 20 | · | · | 16 | 10 |
| 11~15 | 15 | 24 | 30 | · | · | 24 | 15 |
| 16~20 | 20 | 32 | 40 | · | · | 32 | 20 |
| 21~25 | 25 | 40 | 50 | · | · | 40 | 25 |
| 30~ | 50 | 80 | 100 | · | · | 80 | 50 |

FIG. 22B

| Number of lighting determination table for straight portions | | | | | | | |
|---|---|---|---|---|---|---|---|
| Number of points | Slot machine | | | | | | |
| | A | B | C | · | · | I | J |
| 1~5 | 5 | 5 | 5 | · | · | 5 | 5 |
| 6~10 | 10 | 10 | 10 | · | · | 10 | 10 |
| 11~15 | 15 | 15 | 15 | · | · | 15 | 15 |
| 16~20 | 20 | 20 | 20 | · | · | 20 | 20 |
| 21~25 | 25 | 25 | 25 | · | · | 25 | 25 |
| 30~ | 50 | 50 | 50 | · | · | 50 | 50 |

FIG. 29

| Staff ID | Face image data | Telephone number to call mobile terminal |
|---|---|---|
| 001 | Face image data A | Telephone number A |
| 002 | Face image data B | Telephone number B |
| 003 | Face image data C | Telephone number C |
| 004 | Face image data D | Telephone number D |
| . | . | . |
| . | . | . |
| . | . | . |
| . | . | . |

FIG. 45A

| List of payout when number of bet is 1 ||
|---|---|
| Combination of symbols | Number of payouts |
| 3bar-3bar-3bar | 60 |
| 2bar-2bar-2bar | 40 |
| 1bar-1bar-1bar | 20 |
| anybar-anybar-anybar | 10 |

FIG. 45B

| List of payout when number of bet is 2 ||
|---|---|
| Combination of symbols | Number of payouts |
| 3bar-3bar-3bar | 120 |
| 2bar-2bar-2bar | 80 |
| 1bar-1bar-1bar | 40 |
| anybar-anybar-anybar | 20 |

FIG. 45C

| List of payout when number of bet is 3 ||
|---|---|
| Combination of symbols | Number of payouts |
| blue 7-blue 7-blue 7 | 1800 |
| red 7-red 7-red 7 | 100 |
| white 7-white 7-white 7 | 100 |

FIG. 52

| Symbol | Number of points |
|---|---|
| blue 7 –blue 7 –blue 7 | 7000 |
| blue 7 | 300 |
| red 7 | 150 |
| 3bar | 30 |
| 2bar | 20 |
| 1bar | 10 |

FIG. 53A

| Number-of-lighting determination table for bent portions | | | | | | |
|---|---|---|---|---|---|---|
| Number of points | Slot machine | | | | | |
| | A | B | C | · | · | I | J |
| 1～5 | 5 | 8 | 10 | · | · | 8 | 5 |
| 6～10 | 10 | 16 | 20 | · | · | 16 | 10 |
| 11～15 | 15 | 24 | 30 | · | · | 24 | 15 |
| 16～20 | 20 | 32 | 40 | · | · | 32 | 20 |
| 21～25 | 25 | 40 | 50 | · | · | 40 | 25 |
| 30～ | 50 | 80 | 100 | · | · | 80 | 50 |

FIG. 53B

| Number of lighting determination table for straight portions | | | | | | |
|---|---|---|---|---|---|---|
| Number of points | Slot machine | | | | | |
| | A | B | C | · | · | I | J |
| 1～5 | 5 | 5 | 5 | · | · | 5 | 5 |
| 6～10 | 10 | 10 | 10 | · | · | 10 | 10 |
| 11～15 | 15 | 15 | 15 | · | · | 15 | 15 |
| 16～20 | 20 | 20 | 20 | · | · | 20 | 20 |
| 21～25 | 25 | 25 | 25 | · | · | 25 | 25 |
| 30～ | 50 | 50 | 50 | · | · | 50 | 50 |

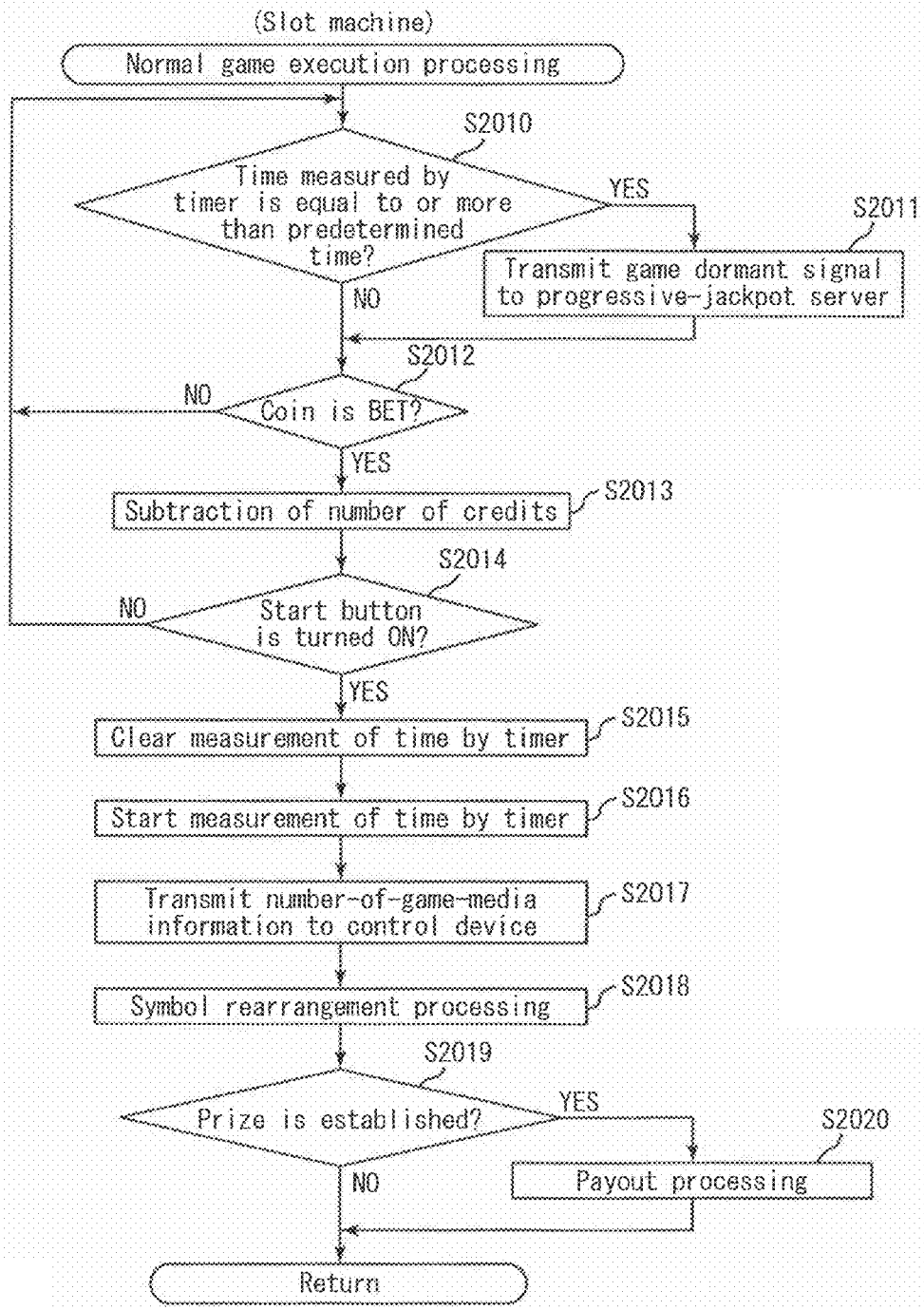

FIG. 71A

| List of payout when number of bet is 1 ||
|---|---|
| Combination of symbols | Number of payouts |
| 3bar-3bar-3bar | 60 |
| 2bar-2bar-2bar | 40 |
| 1bar-1bar-1bar | 20 |
| anybar-anybar-anybar | 10 |

FIG. 71B

| List of payout when number of bet is 2 ||
|---|---|
| Combination of symbols | Number of payouts |
| 3bar-3bar-3bar | 120 |
| 2bar-2bar-2bar | 80 |
| 1bar-1bar-1bar | 40 |
| anybar-anybar-anybar | 20 |

FIG. 71C

| List of payout when number of bet is 3 ||
|---|---|
| Combination of symbols | Number of payouts |
| blue 7-blue 7-blue 7 | 1800 |
| red 7-red 7-red 7 | 100 |
| white 7-white 7-white 7 | 100 |

FIG. 78

| Symbol | Number of points |
|---|---|
| blue 7 – blue 7 – blue 7 | 7000 |
| blue 7 | 300 |
| red 7 | 150 |
| 3bar | 30 |
| 2bar | 20 |
| 1bar | 10 |

FIG. 79A

| Number-of-lighting determination table for bent portions | | | | | | | |
|---|---|---|---|---|---|---|---|
| Number of points | Slot machine | | | | | | |
| | A | B | C | · | · | I | J |
| 1～5 | 5 | 8 | 10 | · | · | 8 | 5 |
| 6～10 | 10 | 16 | 20 | · | · | 16 | 10 |
| 11～15 | 15 | 24 | 30 | · | · | 24 | 15 |
| 16～20 | 20 | 32 | 40 | · | · | 32 | 20 |
| 21～25 | 25 | 40 | 50 | · | · | 40 | 25 |
| 30～ | 50 | 80 | 100 | · | · | 80 | 50 |

FIG. 79B

| Number of lighting determination table for straight portions | | | | | | | |
|---|---|---|---|---|---|---|---|
| Number of points | Slot machine | | | | | | |
| | A | B | C | · | · | I | J |
| 1～5 | 5 | 5 | 5 | · | · | 5 | 5 |
| 6～10 | 10 | 10 | 10 | · | · | 10 | 10 |
| 11～15 | 15 | 15 | 15 | · | · | 15 | 15 |
| 16～20 | 20 | 20 | 20 | · | · | 20 | 20 |
| 21～25 | 25 | 25 | 25 | · | · | 25 | 25 |
| 30～ | 50 | 50 | 50 | · | · | 50 | 50 |

FIG. 83

| Staff ID | Face image data | Telephone number to call mobile terminal |
|---|---|---|
| 001 | Face image data A | Telephone number A |
| 002 | Face image data B | Telephone number B |
| 003 | Face image data C | Telephone number C |
| 004 | Face image data D | Telephone number D |
| . | . | . |
| . | . | . |
| . | . | . |
| . | . | . |

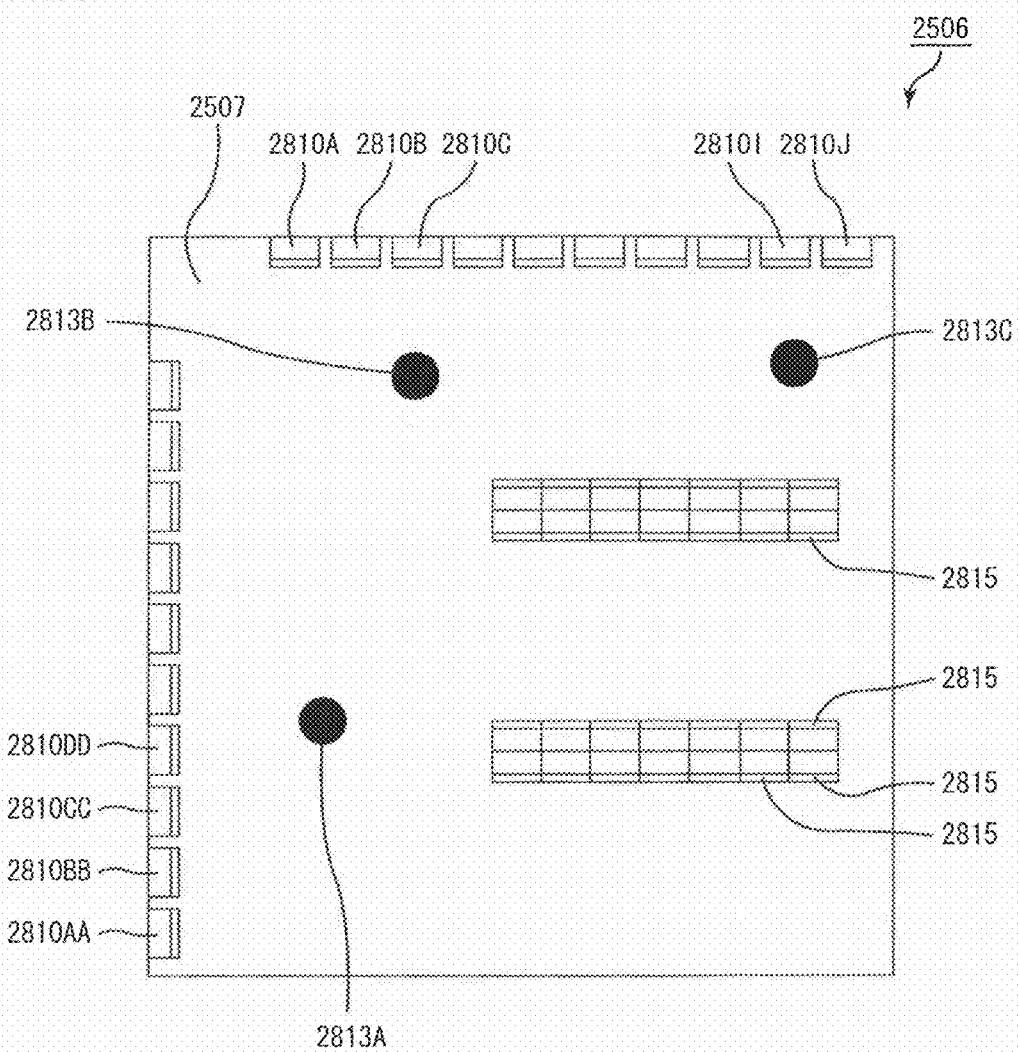

CURRENCY VALUE CHANGING APPARATUS ENABLING PLAYER TO PLAY GAME USING VARIOUS CURRENCIES, GAMING SYSTEM WHERE PLAYER CAN PLAY GAME USING VARIOUS CURRENCIES, INDIVIDUAL TRACKING APPARATUS, AND INDIVIDUAL TRACKING SYSTEM

CROSS-REFERENCE TO RELATED APPLICATIONS

This application claims benefit of priority based on U.S. Provisional Patent Application No. 61/093,091 filed on Aug. 29, 2008, U.S. Provisional Patent Application No. 61/093,098 filed on Aug. 29, 2008, U.S. Provisional Patent Application No. 61/093,096 filed on Aug. 29, 2008, and U.S. Provisional Patent Application No. 61/093,120 filed on Aug. 29, 2008. The contents of this application are incorporated herein by reference in their entirety.

BACKGROUND OF THE INVENTION

Field of the Invention

The present invention relates to a currency-value converter which allows a player to play a game using various currencies, a gaming system where a player can play a game using various currencies, an individual tracking apparatus, and an individual tracking system.

Discussion of the Background

Conventionally, there exists a gaming machine where a player can play a game by inserting money. A money validator such as a bill validator (i.e. BV) identifies the money inserted by the player, and the game progresses based on information indicating the identified amount of money and the like. As those money validators, a money validator provided in a gaming machine itself, and a one installed separately from the gaming machine are known, as disclosed for example in U.S. Pat. No. 5,577,959, U.S. Pat. No. 5,628,685, U.S. Pat. No. 6,852,029, and U.S. Pat. No. 6,846,238.

The conventional money validators described above are typically capable of identifying only one type of currency. One of the reasons thereof is that, since the money paid out for winning of the game is a single currency, it has been convenient in that the paid out money can directly be the source of money if the money that can be inserted is the same currency as the single currency.

However, in the recent years, there have been new gaming machines that, when the game is won, pay out something other than money, such as a ticket on which a barcode as coded data of the number of credits and the like is printed, and a card storing the number of credits information. Therefore, the reason described above has become no longer appropriate as the reason for identifying only one type of currency.

Rather, there has been a problem in that, when the money that can be inserted by the player is set to a single currency (basic currency), the player feels extremely inconvenienced since the player needs to exchange another currency into the basic currency in a case of having exhausted the money in hand. Particularly when there exists no exchange machine used for exchanging money nearby, the player often quits the game in a case of having exhausted the basic currency in hand. Setting the money that can be inserted by the player to the single currency has thus been a factor preventing the player from playing the game for a long time.

On the other hand, another reason of setting the money that can be inserted by the player to the single currency is that it has been considered preferable in providing a gaming system that is capable of conducting a payout according to a progressive jackpot. In such a gaming system, a plurality of gaming machines are linked by a network. A part of an amount corresponding to the money inserted into each gaming machine is then pooled and the money corresponding to the pooled amount is paid out to the gaming machine having won a progressive jackpot. A player playing a game in the aforementioned gaming system is playing the game with a big purpose of acquiring the profit according to the progressive jackpot, and this kind of games are popular among the players in recent years.

In a case that the player can insert money corresponding to the several currencies in this kind of gaming system, it has been believed that a harmful effect is generated in pooling the amount because of the use of several currencies.

The present invention was made in view of the aforementioned problems and an object thereof is to provide a currency-value converter, use of which can prevent generation of a harmful effect in providing a gaming system capable of letting the player continue to play the game without feeling any inconvenience even in a case of exhausting his or her basic currency in hand and capable of conducting a payout according to a progressive jackpot.

The present invention was made in view of the aforementioned problems and an object thereof is to provide a gaming system capable of letting the player continue to play the game without feeling inconvenienced even in a case of exhausting his or her basic currency in hand, and capable of preventing generation of a harmful effect in conducting a payout according to a progressive jackpot.

In recent years, a face identification technology which identifies individuals by taking an image of the face of a person and comparing the image with an image for comparison preliminarily stored in a database has been increasingly used in various fields. This kind of technologies are disclosed in, for example, U.S. Pat. No. 6,944,319, U.S. Pat. No. 6,975,750, U.S. Pat. No. 7,095,879, U.S. Pat. No. 7,127,087, U.S. Pat. No. 7,142,697, U.S. Pat. No. 7,406,184. Moreover, an application of the face identification technology in the game field is disclosed in U.S. Pat. No. 7,094,149.

On the other hand, in casino operations, management of staff members in a casino may become an important factor. For example, in a casino where staff members are not thoroughly managed and the staff members habitually fail to put on the nameplates, there may be a problem that some people disguise themselves as a staff member in order to illegally cheat money. Moreover, if the staff members fail to put on the nameplates, guests cannot recognize the staff members, and thus sufficient services may not be provided to the guests.

Further, the inventor of the present invention have thought of the idea that, not only in casinos but in general, application of a system capable of detecting people who do not possess items that should be possessed in a facility could establish a highly convenient system in various fields.

The present invention has been devised to solve the aforementioned problems, and a purpose of the present invention is to provide an individual tracking system capable of identifying people who do not possess the items which should be possessed in the facility.

In recent years, a face identification technology which identifies individuals by taking an image of the face of a person and comparing the image with an image for comparison preliminarily stored in a database has been increasingly used in various fields. This kind of technologies are disclosed in, for example, U.S. Pat. No. 6,944,319, U.S. Pat. No. 6,975,750, U.S. Pat. No. 7,095,879, U.S. Pat. No. 7,127,087, U.S. Pat. No. 7,142,697, U.S. Pat. No. 7,406,184. Moreover, an application of the face identification technology in the game field is disclosed in U.S. Pat. No. 7,094,149.

Meanwhile, since people can get money when they win a casino game, the number of people who try to fraudulently earn money never seems to decline. Therefore, in order to easily identify a person who committed fraud, recently there are some casino parlors which have introduced an ID card to identify each player. However, in the case where the ID card is introduced, some players forget to collect the ID card after they finish playing games. Further, there are some cases where the uncollected ID card is misused. Further, since people receive money in a casino game, it is required that the player who has got a predetermined amount or more of money should be specified so that the player assuredly pays taxes.

Therefore, there have been attempts to solve the aforementioned problems by applying the aforementioned face identification technology to casino games. However, mere application of the aforementioned face identification technology to a gaming machine could cause the following problems.

Namely, there is a problem of timing when the image of the face is captured. For example, in the case where the image capturing starts after an uncollected card is detected based on the game not being played for a specific period of time, the player has already gone.

Moreover, in the case where the image of the face of a player who has obtained a fixed amount of money (player who has received a prize in the game) is captured at a timing when the prize is offered, the player may already be changed with other player.

As a method capable of solving the aforementioned problems, a method of always recording the image may be conceivable, instead of starting the image capturing by a camera at a certain timing. However, if the always-recording method is applied, the amount of image data to be stored in a memory is so large that maintenance, such as periodically taking out the image data and storing the data in another medium, is required. As a result, the convenience is deteriorated.

The present invention is devised in light of the aforementioned problems, and the purpose of the present invention is to provide an individual tracking apparatus and an individual tracking system, which enable an application of the technology for tracking individuals by use of face images to the game field without reducing the convenience.

The contents of U.S. Pat. No. 5,577,959, U.S. Pat. No. 5,628,685, U.S. Pat. No. 6,852,029, U.S. Pat. No. 6,846,238, U.S. Pat. No. 6,944,319, U.S. Pat. No. 6,975,750, U.S. Pat. No. 7,095,879, U.S. Pat. No. 7,127,087, U.S. Pat. No. 7,142,697, U.S. Pat. No. 7,406,184, and U.S. Pat. No. 7,094,149 are incorporated herein by reference in their entirety.

SUMMARY OF THE INVENTION

The present invention provides a currency-value converter having the following configuration.

Namely, the currency-value converter is connected to a controller installed in a gaming machine and a currency validator capable of accepting various currencies and identifying a type and an amount of accepted currency through respective communication lines. Moreover, the above-mentioned currency-value converter includes a memory capable of storing exchange rate data indicating an exchange rate in which a correspondence relationship between an amount of basic currency and an amount of another type of currency other than the basic currency is set for each type of currency other than the basic currency. Further, the above-mentioned currency-value converter includes a processor programmed to execute the processing of: (A) receiving type-of-currency data indicating a type of currency identified by the currency validator and amount-of-currency data indicating an amount of this currency, from the currency validator through the communication line; and (B) transmitting, when the type of currency indicated by the type-of-currency data received in the processing (A) is not the basic currency, amount-of-converted-currency data indicating an amount of basic currency that is specified based on the type of this currency, the amount of currency indicated by the amount-of-currency data received in the processing (A) and the exchange rate data stored in the memory, to the controller through the communication line.

According to the currency-value converter, when the type of currency accepted through the currency validator is not the basic currency (e.g. U.S. currency), the amount-of-converted-currency data indicating the amount of basic currency (e.g. 1 dollar) identified based on the type of this currency (e.g. Japanese currency), the amount of the currency (e.g. 100 yen), and the exchange rate, is transmitted to the controller included in the gaming machine. The exchange rate is a rate in which the correspondence relationship between the amount of the basic currency and the amount of a currency other than the basic currency (e.g. the correspondence relationship such as 1 dollar=100 yen) is set for each type other than the basic currency. Based on the transmitted amount-of-converted-currency data, the game is played in the gaming machine.

Accordingly, the player can play the game using several currencies different from each other, such as U.S. currency and Japanese currency. Hence, even in a case of having exhausted the basic currency (e.g. U.S. currency) in hand, the player can continue the game using a currency (e.g. Japanese currency) owned separately. Therefore, it is possible to make it less likely for the player to feel inconvenienced. Further, it is possible to reduce the possibility of the player's quitting the game in a case of having exhausted the basic currency in hand, and to create a better environment where the player enjoys playing the game for a long time.

Moreover, according to the currency-value converter, when the type of currency accepted through the currency validator is not the basic currency (e.g. U.S. currency), the amount of this currency (e.g. 100 yen) is converted into the amount of basic currency (e.g. 1 dollar), based on the type of this currency (e.g. Japanese currency), the amount of the currency, and the exchange rate.

Accordingly, even in a case of building a gaming system capable of conducting a payout according to the progressive jackpot, the amount can be pooled based on the amount of basic currency converted in the above way; thus, any serious harmful effect will not be generated.

The present invention further provides a currency-value converter having the following configuration.

Namely, the currency-value converter is connected to a controller installed in a gaming machine, a currency validator capable of accepting various currencies and identifying a type and an amount of accepted currency, and an exchange server repeatedly acquiring exchange information indicating a correspondence relationship between an amount of basic currency and an amount of another type of currency other than the basic currency at a predetermined timing, through respective communication lines. Moreover, the above-mentioned currency-value converter includes a memory capable of storing exchange rate data indicating an exchange rate in which the correspondence relationship between an amount of basic currency and an amount of another type of currency other than the basic currency is set for each type of currency other than the basic currency. Furthermore, the above-mentioned currency-value converter includes a processor programmed to execute the processing of: (A) receiving information specified based on the exchange information from the exchange server through the communication line, each time the exchange server acquires the exchange information; (B) updating the exchange rate data stored in the memory based on the information received in the processing (A); (C) receiving type-of-currency data indicating a type of currency identified by the currency validator and amount-of-currency data indicating an amount of this currency, from the currency validator through the communication line; and (D) transmitting, when the type of currency indicated by the type-of-currency data received in the processing (C) is not the basic currency, amount-of-converted-currency data indicating an amount of basic currency that is specified based on the type of this currency, the amount of currency indicated by the amount-of-currency data received in the processing (C) and the exchange rate data stored in the memory, to the controller through the communication line.

According to the currency-value converter, when the type of currency accepted through the currency validator is not the basic currency (e.g. U.S. currency), the amount-of-converted-currency data indicating the amount of basic currency (e.g. 1 dollar) identified based on the type of this currency (e.g. Japanese currency), the amount of the currency (e.g. 100 yen), and the exchange rate, is transmitted to the controller included in the gaming machine. The exchange rate is a rate in which the correspondence relationship between the amount of the basic currency and the amount of a currency other than the basic currency (e.g. the correspondence relationship such as 1 dollar=100 yen) is set for each type other than the basic currency. Based on the transmitted amount-of-converted-currency data, the game is played in the gaming machine.

Accordingly, the player can play the game using several currencies different from each other, such as U.S. currency and Japanese currency. Hence, even in a case of having exhausted the basic currency (e.g. U.S. currency) in hand, the player can continue the game using a currency (e.g. Japanese currency) owned separately. Therefore, it is possible to make it less likely for the player to feel inconvenienced. Further, it is possible to reduce the possibility of the player's quitting the game in a case of having exhausted the basic currency in hand, and to create a better environment where the player enjoys playing the game for a long time.

Moreover, according to the currency-value converter, when the type of currency accepted through the currency validator is not the basic currency (e.g. U.S. currency), the amount of this currency (e.g. 100 yen) is converted into the amount of basic currency (e.g. 1 dollar), based on the type of this currency (e.g. Japanese currency), the amount of the currency, and the exchange rate.

Accordingly, even in a case of building a gaming system capable of conducting a payout according to the progressive jackpot, the amount can be pooled based on the amount of basic currency converted in the above way; thus, any serious harmful effect will not be generated.

Further, according to the currency-value converter, exchange information indicating the correspondence relationship between the amount of the basic currency and the amount of a currency other than the basic currency (e.g. the correspondence relationship such as 1 dollar=100 yen) is acquired by an exchange server. Then, each time the exchange server acquires the exchange information, the currency-value converter receives information specified based on the exchange information from the exchange server, and then the exchange rate data is updated based on the exchange information.

Accordingly, each time the exchange server acquires the exchange information, the latest exchange rate can be shown by the exchange rate data. As a result, upon exchanging an amount of a currency other than the basic currency into the amount of the basic currency, it is possible to reflect the actual currency value of each country at the time.

The present invention further provides a control method of a currency-value converter having the following configuration.

Namely, the currency-value converter is connected to a controller installed in a gaming machine and a currency validator capable of accepting various currencies and identifying a type and an amount of accepted currency through respective communication lines. Also, the above-mentioned currency-value converter includes a memory capable of storing exchange rate data indicating an exchange rate in which a correspondence relationship between an amount of basic currency and an amount of another type of currency other than the basic currency is set for each type of currency other than the basic currency. Further, the control method includes the steps of: (A) receiving type-of-currency data indicating a type of currency identified by the currency validator and amount-of-currency data indicating an amount of this currency, from the currency validator through the communication line; and (B) transmitting, when the type of currency indicated by the type-of-currency data received in the step (A) is not the basic currency, amount-of-converted-currency data indicating an amount of basic currency that is specified based on the type of this currency, the amount of currency indicated by the amount-of-currency data received in the step (A) and the exchange rate data stored in the memory, to the controller through the communication line.

According to the control method of a currency-value converter, when the type of currency accepted through the currency validator is not the basic currency (e.g. U.S. currency), the amount-of-converted-currency data indicating the amount of basic currency (e.g. 1 dollar) identified based on the type of this currency (e.g. Japanese currency), the amount of the currency (e.g. 100 yen), and the exchange rate, is transmitted to the controller included in the gaming machine. The exchange rate is a rate in which the correspondence relationship between the amount of the basic currency and the amount of a currency other than the basic currency (e.g. the correspondence relationship such as 1 dollar=100 yen) is set for each type other than the basic currency. Based on the transmitted amount-of-converted-currency data, the game is played in the gaming machine.

Accordingly, the player can play the game using several currencies different from each other, such as U.S. currency and Japanese currency. Hence, even in a case of having exhausted the basic currency (e.g. U.S. currency) in hand, the player can continue the game using a currency (e.g. Japanese currency) owned separately. Therefore, it is possible to make it less likely for the player to feel inconvenienced. Further, it is possible to reduce the possibility of the player's quitting the game in a case of having exhausted the basic currency in hand, and to create a better environment where the player enjoys playing the game for a long time.

Moreover, according to the control method of a currency-value converter, when the type of currency accepted through the currency validator is not the basic currency (e.g. U.S. currency), the amount of this currency (e.g. 100 yen) is converted into the amount of basic currency (e.g. 1 dollar), based on the type of this currency (e.g. Japanese currency), the amount of the currency, and the exchange rate.

Accordingly, even in a case of building a gaming system capable of conducting a payout according to the progressive jackpot, the amount can be pooled based on the amount of basic currency converted in the above way; thus, any serious harmful effect will not be generated.

Moreover, the present invention further provides a control method of a currency-value converter having the following configuration.

Namely, the currency-value converter is connected to a controller installed in a gaming machine, a currency validator capable of accepting various currencies and identifying a type and an amount of accepted currency, and an exchange server repeatedly acquiring exchange information indicating a correspondence relationship between an amount of basic currency and an amount of another type of currency other than the basic currency at a predetermined timing, through respective communication lines, The currency-value converter includes a memory capable of storing exchange rate data indicating an exchange rate in which the correspondence relationship between an amount of basic currency and an amount of another type of currency other than the basic currency is set for each type of currency other than the basic currency. Further, the control method includes the steps of: (A) receiving information specified based on the exchange information from the exchange server through the communication line, each time the exchange server acquires the exchange information;

(B) updating the exchange rate data stored in the memory based on the information received in the step (A), (C) receiving type-of-currency data indicating a type of currency identified by the currency validator and amount-of-currency data indicating an amount of this currency, from the currency validator through the communication line; and (D) transmitting, when the type of currency indicated by the type-of-currency data received in the step (C) is not the basic currency, amount-of-converted-currency data indicating an amount of basic currency that is specified based on the type of this currency, the amount of currency indicated by the amount-of-currency data received in the step (C), and the exchange rate data stored in the memory, to the controller through the communication line.

According to the control method of a currency-value converter, when the type of currency accepted through the currency validator is not the basic currency (e.g. U.S. currency), the amount-of-converted-currency data indicating the amount of basic currency (e.g. 1 dollar) identified based on the type of this currency (e.g. Japanese currency), the amount of the currency (e.g. 100 yen), and the exchange rate, is transmitted to the controller included in the gaming machine. The exchange rate is a rate in which the correspondence relationship between the amount of the basic currency and the amount of a currency other than the basic currency (e.g. the correspondence relationship such as 1 dollar=100 yen) is set for each type other than the basic currency. Based on the transmitted amount-of-converted-currency data, the game is played in the gaming machine.

Accordingly, the player can play the game using several currencies different from each other, such as U.S. currency and Japanese currency. Hence, even in a case of having exhausted the basic currency (e.g. U.S. currency) in hand, the player can continue the game using a currency (e.g. Japanese currency) owned separately. Therefore, it is possible to make it less likely for the player to feel inconvenienced. Further, it is possible to reduce the possibility of the player's quitting the game in a case of having exhausted the basic currency in hand, and to create a better environment where the player enjoys playing the game for a long time.

Moreover, according to the control method of a currency-value converter, when the type of currency accepted through the currency validator is not the basic currency (e.g. U.S. currency), the amount of this currency (e.g. 100 yen) is converted into the amount of basic currency (e.g. 1 dollar), based on the type of this currency (e.g. Japanese currency), the amount of the currency, and the exchange rate.

Accordingly, even in a case of building a gaming system capable of conducting a payout according to the progressive jackpot, the amount can be pooled based on the amount of basic currency converted in the above way; thus, any serious harmful effect will not be generated.

Further, according to the control method of a currency-value converter, exchange information indicating the correspondence relationship between the amount of the basic currency and the amount of a currency other than the basic currency (e.g. the correspondence relationship such as 1 dollar=100 yen) is acquired by an exchange server. Then, each time the exchange server acquires the exchange information, information specified based on the exchange information is received from the exchange server, and then the exchange rate data is updated based on the exchange information.

Accordingly, each time the exchange server acquires the exchange information, the exchange rate data can shown the latest exchange rate. As a result, upon exchanging the amount of the currency other than the basic currency into the amount of the basic currency, it is possible to reflect the actual currency value of each country at the time.

The present invention provides a gaming system having the following configuration.

Namely, the gaming system comprises: a gaming machine which includes a currency validator capable of accepting various currencies and identifying a type and an amount of accepted currency, and a controller; and a currency-value converter which is connected to each of the currency validator and the controller through a communication line, and includes a memory capable of storing exchange rate data indicating an exchange rate in which a correspondence relationship between an amount of basic currency and an amount of another type of currency other than the basic currency is set for each type of currency other than the basic currency, and a processor, wherein the processor executes the processing of: (A) receiving type-of-currency data indicating a type of currency identified by the currency validator and amount-of-currency data indicating an amount of this currency, from the currency validator through the communication line; and (B) transmitting, when the type of currency indicated by the type-of-currency data received in the processing (A) is not the basic currency, amount-of-converted-currency data indicating an amount of basic currency that is specified based on the type of this currency, the amount of currency indicated by the amount-of-currency data received in the processing (A), and the exchange rate data stored in the memory, to the controller through the communication line, and the controller executes the processing of: (a) receiving the amount-of-converted-currency data transmitted in the processing (B); (b) cumulatively counting, as a cumulative value, all or part of an amount of basic currency corresponding to a predetermined fee, when the type of currency indicated by the type-of-currency data received by the processor in the processing (A) is not the basic currency; (c) executing a game based on a BET value, the BET value being an amount of currency obtained by subtracting an amount of basic currency corresponding to the predetermined fee from an amount of basic currency equivalent to the amount of currency indicated by the amount-of-currency data received by the processor in the processing (A); and (d) paying out game media to the gaming machine, based on the cumulative value, when a predetermined progressive-jackpot payout condition has been established.

According to the currency-value converter included in the above gaming system, when the type of currency accepted through the currency validator is not the basic currency (e.g. U.S. currency), the amount-of-converted-currency data indicating the amount of basic currency (e.g. 1 dollar) identified based on the type of this currency (e.g. Japanese currency), the amount of the currency (e.g. 100 yen), and the exchange rate, is transmitted to the controller included in the gaming machine. The exchange rate is a rate in which the correspondence relationship between the amount of the basic currency and the amount of a currency other than the basic currency (e.g. the correspondence relationship such as 1 dollar=100 yen) is set for each type other than the basic currency. Based on the transmitted amount-of-converted-currency data, the game is played in the gaming machine.

Accordingly, the player can play the game using several currencies different from each other, such as U.S. currency and Japanese currency. Hence, even in a case of having exhausted the basic currency (e.g. U.S. currency) in hand, the player can continue the game using a currency (e.g. Japanese currency) owned separately. Therefore, it is possible to make it less likely for the player to feel inconvenienced. Further, it is possible to reduce the possibility of the player's quitting the game in a case of having exhausted the basic currency in hand, and to create a better environment where the player enjoys playing the game for a long time.

Moreover, according to the currency-value converter included in the gaming system, when the type of currency accepted through the currency validator is not the basic currency (e.g. U.S. currency), the amount of this currency (e.g. 100 yen) is converted into the amount of basic currency (e.g. 1 dollar), based on the type of this currency (e.g. Japanese currency), the amount of the currency, and the exchange rate.

Accordingly, even in a case of building a gaming system capable of conducting a payout according to the progressive jackpot, the amount can be pooled based on the amount of basic currency converted in the above way; thus, any serious harmful effect will not be generated.

Further, according to the gaming system, when the type of currency indicated by the type-of-currency data is not the basic currency, the game is executed with the amount of BET being the amount of currency obtained by subtracting the amount of basic currency corresponding to the predetermined fee from the amount of basic currency indicated by the amount-of-converted-currency data. Furthermore, all or part of the amount of basic currency corresponding to the predetermined fee is cumulatively counted as the cumulative value. When the predetermined progressive-jackpot payout condition has been established, game media are paid out to the gaming machine, based on the cumulative value.

That is, according to the gaming system, the use of currencies of the types other than the basic currency causes all or part of the amount of basic currency corresponding to the predetermined fee to be pooled as the cumulative value in the gaming machine. When the predetermined progressive-jackpot payout condition has been established, a bonus with its source of money being the predetermined fee for using various currencies other than the basic currency is offered. Since a bonus with a source of money different from the conventional one exists, it is possible to improve interesting aspects of the game.

It is desirable that the gaming system further has the following configuration.

The processing (b) is the processing of cumulatively counting as the cumulative value a fractional amount obtained by dividing an amount of basic currency corresponding to a predetermined ratio by a predetermined unit-amount of basic currency, provided that an amount of basic currency corresponding to the predetermined ratio, out of the amount of basic currency equivalent to the amount of currency indicated by the amount-of-currency data received by the processor in the processing (A), does not become a natural-number multiple of the predetermined unit-amount of basic currency.

According to the above gaming system, provided that the amount of basic currency corresponding to the predetermined ratio does not become a natural-number multiple of the predetermined unit-amount of basic currency (e.g. 1 dollar), a fractional amount obtained by dividing the amount of basic currency corresponding to the predetermined ratio by the unit-amount of basic currency is cumulatively counted as the cumulative value. For example, when the amount of basic currency corresponding to the predetermined ratio is 2.75 dollars, 0.75 dollar (a fractional amount) obtained by dividing 2.75 dollars by 1 dollar (the unit-amount of basic currency) is cumulatively counted as the cumulative value. When the amount of basic currency corresponding to the predetermined ratio is 2.0 dollars, counting of the cumulative value for bonus is not conducted. As just described, since the amount of basic currency to be accumulated at once is less than 1 dollar, it is possible to minimize a decrease in the sales of the casino parlor, as compared to a case of counting all of the amount of basic currency corresponding to the predetermined ratio, as the cumulative value.

The present invention provides a gaming system having the following configuration.

Namely, the gaming system comprises: a plurality of gaming machines, each of which includes a currency validator capable of accepting various currencies and identifying a type and an amount of accepted currency, and a controller; a progressive-jackpot server including a control portion; and a currency-value converter which is connected to each of the currency validator, the controller and the control portion through a communication line, and includes a memory capable of storing exchange rate data indicating an exchange rate in which a correspondence relationship between an amount of basic currency and an amount of another type of currency other than the basic currency is set for each type of currency other than the basic currency, and a processor, wherein the processor executes the processing of: (A) receiving type-of-currency data indicating a type of currency identified by the currency validator and amount-of-currency data indicating an amount of this currency, from the currency validator through the communication line; and (B) transmitting, when the type of currency indicated by the type-of-currency data received in the processing (A) is not the basic currency, amount-of-converted-currency data indicating an amount of basic currency that is identified based on the type of this currency, the amount of currency indicated by the amount-of-currency data received in the processing (A), and the exchange rate data stored in the memory, to the controller through the communication line, the controller executes the processing of: (a) receiving the amount-of-converted-currency data transmitted in the processing (B); and (b) executing a game based on a BET value, the BET value being an amount of basic currency obtained by subtracting an amount of basic currency corresponding to a predetermined fee from an amount of basic currency equivalent to the amount of currency indicated by the amount-of-currency data received by the processor in the processing (A), and the control portion executes the processing of: (I) cumulatively counting as a cumulative value the amount of basic currency corresponding to the predetermined fee, when the type of currency indicated by the type-of-currency data received by the processor in the processing (A) is not the basic currency; and (II) paying out game media to any of the gaming machines out of the plurality of gaming machines, based on the cumulative value, when a predetermined progressive-jackpot payout condition has been established.

According to the currency-value converter included in the above gaming system, when the type of currency accepted through the currency validator is not the basic currency (e.g. U.S. currency), the amount-of-converted-currency data indicating the amount of basic currency (e.g. 1 dollar) identified based on the type of this currency (e.g. Japanese currency), the amount of the currency (e.g. 100 yen), and the exchange rate, is transmitted to the controller included in the gaming machine. The exchange rate is a rate in which the correspondence relationship between the amount of the basic currency and the amount of a currency other than the basic currency (e.g. the correspondence relationship such as 1 dollar=100 yen) is set for each type other than the basic currency. Based on the transmitted amount-of-converted-currency data, the game is played in the gaming machine.

Accordingly, the player can play the game using several currencies different from each other, such as U.S. currency and Japanese currency. Hence, even in a case of having exhausted the basic currency (e.g. U.S. currency) in hand, the player can continue the game using a currency (e.g. Japanese currency) owned separately. Therefore, it is possible to make it less likely for the player to feel inconvenienced. Further, it is possible to reduce the possibility of the player's quitting the game in a case of having exhausted the basic currency in hand, and to create a better environment where the player enjoys playing the game for a long time.

Moreover, according to the currency-value converter included in the gaming system, when the type of currency accepted through the currency validator is not the basic currency (e.g. U.S. currency), the amount of this currency (e.g. 100 yen) is converted into the amount of basic currency (e.g. 1 dollar), based on the type of this currency (e.g. Japanese currency), the amount of the currency, and the exchange rate.

Accordingly, even in a case of building a gaming system capable of conducting a payout according to the progressive jackpot, the amount can be pooled based on the amount of basic currency converted in the above way; thus, any serious harmful effect will not be generated.

Further, according to the gaming system, when the type of currency indicated by the type-of-currency data is not the basic currency, the game is executed with the amount of BET being the amount of currency obtained by subtracting the amount of basic currency corresponding to the predetermined fee from the amount of basic currency indicated by the amount-of-converted-currency data. Furthermore, the amount of basic currency corresponding to the predetermined fee is cumulatively counted as the cumulative value by the control portion included in the progressive-jackpot server. When the predetermined progressive-jackpot payout condition has been established, game media are paid out to any of the gaming machines out of the plurality of gaming machines, based on the cumulative value.

That is, according to the gaming system, the use of currencies of the types other than the basic currency causes the amount of basic currency corresponding to the predetermined fee to be pooled as the cumulative value. When the predetermined progressive-jackpot payout condition has been established, a bonus with its source of money being the predetermined fee for using various currencies other than the basic currency is offered to any if the gaming machines out of the plurality of gaming machines. Since a bonus with a source of money different from the conventional one exists, it is possible to improve interesting aspects of the game.

It is desirable that the gaming system further has the following configuration.

The processing (II) is the processing of paying out game media, based on the cumulative value, to a gaming machine having the currency validator through which the type of currency other than the basic currency has been accepted, out of the plurality of gaming machines, when the predetermined progressive-jackpot payout condition has been established.

According to the gaming system, a bonus with its source of money being the predetermined fee for using various currencies other than the basic currency is offered only to the player who has used a currency other than the basic currency. That is, to the player who has used only the basic currency, having not contributed to accumulation of the cumulative value at all, the bonus with its source of money being the predetermined fee for using various currencies other than the basic currency is not offered. Therefore, it is possible to prevent generation of a sense of unfairness among the players.

The present invention further provides a game control method having the following configuration.

Namely, the game control method comprises the steps of: (A) a currency-value converter receiving type-of-currency data indicating a type of currency identified by a currency validator and amount-of-currency data indicating an amount of this currency, from the currency validator through a communication line, the currency-value converter including a memory capable of storing exchange rate data indicating an exchange rate in which a correspondence relationship between an amount of basic currency and an amount of another type of currency other than the basic currency is set for each type of currency other than the basic currency; (B) the currency-value converter transmitting, when the type of currency indicated by the type-of-currency data received in the step (A) is not the basic currency, amount-of-converted-currency data indicating an amount of basic currency that is identified based on the type of this currency, the amount of currency indicated by the amount-of-currency data received in the step (A), and the exchange rate data stored in the memory, to a controller included in a gaming machine through the communication line; (a) the gaming machine receiving the amount-of-converted-currency data transmitted in the step (B); (b) the gaming machine cumulatively counting, as a cumulative value, all or part of an amount of basic currency corresponding to a predetermined fee, when the type of currency indicated by the type-of-currency data received by the currency-value converter in the step (A) is not the basic currency; (c) the gaming machine executing a game based on a BET value, the BET value being an amount of currency obtained by subtracting an amount of basic currency corresponding to the predetermined fee from an amount of basic currency equivalent to the amount of currency indicated by the amount-of-currency data received by the currency-value converter in the step (A); and (d) the gaming machine paying out game media to the gaming machine, based on the cumulative value, when a predetermined progressive-jackpot payout condition has been established.

According to the currency-value converter relating to the game control method, when the type of currency accepted through the currency validator is not the basic currency (e.g. U.S. currency), the amount-of-converted-currency data indicating the amount of basic currency (e.g. 1 dollar) identified based on the type of this currency (e.g. Japanese currency), the amount of the currency (e.g. 100 yen), and the exchange rate, is transmitted to the controller included in the gaming machine. The exchange rate is a rate in which the correspondence relationship between the amount of the basic currency and the amount of a currency other than the basic currency (e.g. the correspondence relationship such as 1 dollar=100 yen) is set for each type other than the basic currency. Based on the transmitted amount-of-converted-currency data, the game is played in the gaming machine.

Accordingly, the player can play the game using several currencies different from each other, such as U.S. currency and Japanese currency. Hence, even in a case of having exhausted the basic currency (e.g. U.S. currency) in hand, the player can continue the game using a currency (e.g. Japanese currency) owned separately. Therefore, it is possible to make it less likely for the player to feel inconvenienced. Further, it is possible to reduce the possibility of the player's quitting the game in a case of having exhausted the basic currency in hand, and to create a better environment where the player enjoys playing the game for a long time.

Moreover, according to the currency-value converter relating to the game control method, when the type of currency accepted through the currency validator is not the basic currency (e.g. U.S. currency), the amount of this currency (e.g. 100 yen) is converted into the amount of basic currency (e.g. 1 dollar), based on the type of this currency (e.g. Japanese currency), the amount of the currency, and the exchange rate.

Accordingly, even in a case of building a gaming system capable of conducting a payout according to the progressive jackpot, the amount can be pooled based on the amount of basic currency converted in the above way; thus, any serious harmful effect will not be generated.

Further, according to the game control method, when the type of currency indicated by the type-of-currency data is not the basic currency, the game is executed with the amount of BET being the amount of currency obtained by subtracting the amount of basic currency corresponding to the predetermined fee from the amount of basic currency indicated by the amount-of-converted-currency data. Furthermore, all or part of the amount of basic currency corresponding to the predetermined fee is cumulatively counted as the cumulative value. When the predetermined progressive-jackpot payout condition has been established, game media are paid out to the gaming machine, based on the cumulative value.

That is, according to the game control method, the use of currencies of the types other than the basic currency causes all or part of the amount of basic currency corresponding to the predetermined fee to be pooled as the cumulative value in the gaming machine. When the predetermined progressive-jackpot payout condition has been established, a bonus with its source of money being the predetermined fee for using various currencies other than the basic currency is offered. Since a bonus with a source of money different from the conventional one exists, it is possible to improve interesting aspects of the game.

The present invention further provides a game control method having the following configuration.

Namely, the game control method comprises the steps of: (A) a currency-value converter receiving type-of-currency data indicating a type of currency identified by a currency validator and amount-of-currency data indicating an amount of this currency, from the currency validator through a communication line, the currency-value converter including a memory capable of storing exchange rate data indicating an exchange rate in which a correspondence relationship between an amount of basic currency and an amount of another type of currency other than the basic currency is set for each type of currency other than the basic currency; (B) the currency-value converter transmitting, when the type of currency indicated by the type-of-currency data received in the step (A) is not the basic currency, amount-of-converted-currency data indicating an amount of basic currency that is identified based on the type of this currency, the amount of currency indicated by the amount-of-currency data received in the step (A), and the exchange rate data stored in the memory, to a controller included in a gaming machine through the communication line; (a) the gaming machine receiving the amount-of-converted-currency data transmitted in the step (B); (b) the gaming machine executing a game based on a BET value, the BET value being an amount of basic currency obtained by subtracting an amount of basic currency corresponding to a predetermined fee from an amount of basic currency equivalent to the amount of currency indicated by the amount-of-currency data received by the currency-value converter in the step (A); (I) a progressive-jackpot server cumulatively counting as a cumulative value the amount of basic currency corresponding to the predetermined fee, when the type of currency indicated by the type-of-currency data received by the currency-value converter in the step (A) is not the basic currency; and (II) the progressive-jackpot server paying out game media to any of the gaming machines out of the plurality of gaming machines, based on the cumulative value, when a predetermined progressive-jackpot payout condition has been established.

According to the currency-value converter relating to the game control method, when the type of currency accepted through the currency validator is not the basic currency (e.g. U.S. currency), the amount-of-converted-currency data indicating the amount of basic currency (e.g. 1 dollar) identified based on the type of this currency (e.g. Japanese currency), the amount of the currency (e.g. 100 yen), and the exchange rate, is transmitted to the controller included in the gaming machine. The exchange rate is a rate in which the correspondence relationship between the amount of the basic currency and the amount of a currency other than the basic currency (e.g. the correspondence relationship such as 1 dollar=100 yen) is set for each type other than the basic currency. Based on the transmitted amount-of-converted-currency data, the game is played in the gaming machine.

Accordingly, the player can play the game using several currencies different from each other, such as U.S. currency and Japanese currency. Hence, even in a case of having exhausted the basic currency (e.g. U.S. currency) in hand, the player can continue the game using a currency (e.g.

Japanese currency) owned separately. Therefore, it is possible to make it less likely for the player to feel inconvenienced. Further, it is possible to reduce the possibility of the player's quitting the game in a case of having exhausted the basic currency in hand, and to create a better environment where the player enjoys playing the game for a long time.

Moreover, according to the currency-value converter relating to the game control method, when the type of currency accepted through the currency validator is not the basic currency (e.g. U.S. currency), the amount of this currency (e.g. 100 yen) is converted into the amount of basic currency (e.g. 1 dollar), based on the type of this currency (e.g. Japanese currency), the amount of the currency, and the exchange rate.

Accordingly, even in a case of building a gaming system capable of conducting a payout according to the progressive jackpot, the amount can be pooled based on the amount of basic currency converted in the above way; thus, any serious harmful effect will not be generated.

Further, according to the game control method, when the type of currency indicated by the type-of-currency data is not the basic currency, the game is executed with the amount of BET being the amount of currency obtained by subtracting the amount of basic currency corresponding to the predetermined fee from the amount of basic currency indicated by the amount-of-converted-currency data. Furthermore, the amount of basic currency corresponding to the predetermined fee is cumulatively counted as the cumulative value by the control portion included in the progressive-jackpot server. When the predetermined progressive-jackpot payout condition has been established, game media are paid out to any of the gaming machines out of the plurality of gaming machines, based on the cumulative value.

That is, according to the game control method, the use of currencies of the types other than the basic currency causes the amount of basic currency corresponding to the predetermined fee to be pooled as the cumulative value. When the predetermined progressive-jackpot payout condition has been established, a bonus with its source of money being the predetermined fee for using various currencies other than the basic currency is offered to any if the gaming machines out of the plurality of gaming machines. Since a bonus with a source of money different from the conventional one exists, it is possible to improve interesting aspects of the game.

The present invention provides an individual tracking system having the following configuration.

Namely, the individual tracking system includes: a server; an entrance card reader set at an entrance gate of a facility; and a camera disposed so as to be able to capture an image of the inside the facility. The server includes: a memory in which staff identification data to identify a staff member and face image data showing a face image of the staff member are stored in association with each other; an output device; and a processor. The processor is programmed to execute processing of (A) storing the staff identification data read out by the entrance card reader, (B) continuously storing image data showing an image captured by the camera, (C) comparing each of the image data stored in the processing (B) with each of the face image data associated with the staff identification data stored in the processing (A) so as to determine whether or not a specific condition is satisfied, and (D) outputting, from the output device, the face image data when the specific condition is determined not to have been satisfied and/or the staff identification data associated with the face image data when the specific condition is determined not to have been satisfied.

The aforementioned individual tracking system is provided with a server, an entrance card reader set at an entrance gate of a facility, and a camera disposed so as to be able to capture an image inside of the inside the facility. The server includes a memory in which staff identification data to identify a staff member and face image data showing a face image of the staff member are stored in association with each other, an output device (e.g. image display or sound outputting device), and a processor. The processor stores the staff identification data read out by the entrance card reader at the entrance gate of the facility. Also, the processor continuously stores image data showing an image captured by the camera. Moreover, the processor reads respective face image data associated with staff identification data read out by the entrance card reader, and then compares the face image data with the respective image data obtained by capturing by the camera so as to determine whether or not a predetermined condition (e.g. satisfaction of criteria for determining that a person shown by the face image data is identical to the person shown by the image data) is satisfied.

It is to be noted that the aforementioned individual tracking system is a system used in the case where only staff members are present in the facility.

When the aforementioned specific condition is not satisfied, the person of the face shown by the face image data when the aforementioned specific condition is not satisfied is considered not to have had the staff identification data read out by the entrance card reader. The processor then outputs from the output device the face image data when the specific condition is determined not to have been satisfied and/or the staff identification data associated with the face image data when the specific condition is determined not to have been satisfied. In other words, face image data of a person who has not had the staff identification data read out, namely the person who does not have a card for staff member (e.g. ID card) storing the staff identification data and/or the staff identification data of the person are outputted from the output device. As a result, it is possible to identify a person who has not had the staff identification card read out (person who does not possess the card for staff member storing the staff identification data).

The present invention further provides an individual tracking system having the following configuration.

Namely, the individual tracking system includes a server; an entrance card reader set at an entrance gate of a facility; and a camera disposed so as to be able to capture an image of the inside the facility. The server includes a memory in which staff identification data to identify a staff member and face image data showing a face image of the staff member are stored in association with each other; an output device; and a processor. The processor is programmed to execute processing of A) storing the staff identification data read out by the entrance card reader, (B) continuously storing image data showing an image captured by the camera, (C) comparing each of the image data stored in the processing (B) with each of the face image data associated with the staff identification data stored in the processing (A) so as to determine whether or not a specific condition is satisfied, (D) comparing the image data determined not to satisfy the specific condition in the processing (C) with each of the face image data stored in the memory so as to determine whether or not the specific condition is satisfied, (E) storing, or deleting, the image data determined not to satisfy the specific condition in the processing (D) as guest image data in the memory, and (F) outputting, from the output device, the face image data when the specific condition is determined to have been satisfied in the processing (D) and/or the staff identification data associated with the face image data when the specific condition is determined to have been satisfied in the processing (D).

The aforementioned individual tracking system is provided with a server, an entrance card reader set at an entrance gate of a facility, and a camera disposed so as to be able to capture an image inside of the inside the facility. The server includes a memory in which staff identification data to identify a staff member and face image data showing a face image of the staff member are stored in association with each other, an output device (e.g. image display or sound outputting device), and a processor. The processor stores the staff identification data read out by the entrance card reader at the entrance gate of the facility. The processor continuously stores image data showing an image captured by the camera. Moreover, the processor reads respective face image data associated with staff identification data read out by the entrance card reader, and then compares the face image data with the respective image data obtained by capturing by the camera so as to determine whether or not a predetermined condition (e.g. satisfaction of criteria for determining that a person shown by the face image data is identical to the person shown by the image data) is satisfied.

It is to be noted that the aforementioned individual tracking system is a system used in the case where staff members and a guest are present in the facility.

When the above specific condition is not satisfied at this stage, the person of the face shown by the face image data when the aforementioned specific condition is not satisfied is considered not to have had the staff identification data read out by the entrance card reader. In other words, this person is considered to be a staff member who has not had the staff identification data read out, or a guest.

Next, the processor compares the face image data determined not to have satisfied the specific condition with the respective face image data stored in the memory, and then determines whether or not the specific condition is satisfied.

When the above specific condition is not satisfied at this stage, the person of the face shown by the face image data determined not to have satisfied the specific condition is considered to be a guest. The processor stores in the memory, or deletes, the face image data determined not to have satisfied the specific condition as guest image data. By storing the memory, it becomes possible to check the guests who were present in the facility. By deleting the data, free space can be secured in the memory.

On the other hand, when the above specific condition is satisfied at this stage, the person of the face shown by the face image data when the aforementioned specific condition is satisfied is considered to be a staff member who has not had the staff identification data read out by the entrance card reader. The processor outputs from the output device the face image data when the specific condition is determined to have been satisfied and/or the staff identification data associate with the face image data when the specific condition is determined to have been satisfied. In other words, face image data of the staff member who has not had the staff identification data read out and/or the staff identification data of the staff member is outputted from the output device. As a result, it is possible to identify the staff member who has not had the staff identification card read out.

The present invention further provides a control method of an individual tracking system having the following configuration.

Namely, the individual tracking system controlled in the control method of an individual tracking system includes: a server; an entrance card reader set at an entrance gate of a facility; and a camera disposed so as to be able to capture an image of the inside the facility. The server includes: a memory in which staff identification data to identify a staff member and face image data showing a face image of the staff member are stored in association with each other; an output device; and a processor. The control method includes a step of (A) storing the staff identification data read out by the entrance card reader. The control method also includes a step of (B) continuously storing image data showing an image captured by the camera. The control method further includes a step of (C) comparing each of the image data stored in the step (B) with each of the face image data associated with the staff identification data stored in the step (A) so as to determine whether or not a specific condition is satisfied. Furthermore, the control method includes a step of (D) outputting, from the output device, the face image data when the specific condition is determined not to have been satisfied and/or the staff identification data associated with the face image data when the specific condition is determined not to have been satisfied.

According to the control method of an individual tracking system, the individual tracking system controlled in the control method of an individual tracking system is provided with a server, an entrance card reader set at an entrance gate of a facility, and a camera disposed so as to be able to capture an image inside of the inside the facility. The server includes a memory in which staff identification data to identify a staff member and face image data showing a face image of the staff member are stored in association with each other, an output device (e.g. image display or sound outputting device), and a processor. The processor stores the staff identification data read out by the entrance card reader at the entrance gate of the facility. The processor continuously stores image data showing an image captured by the camera. Moreover, the processor reads respective face image data associated with staff identification data read out by the entrance card reader, and then compares the face image data with the respective image data obtained by capturing by the camera so as to determine whether or not a predetermined condition (e.g. satisfaction of criteria for determining that a person shown by the face image data is identical to the person shown by the image data) is satisfied.

It is to be noted that the individual tracking system is a system used in the case where only staff members are present in the facility.

When the aforementioned specific condition is not satisfied, the person of the face shown by the face image data when the aforementioned specific condition is not satisfied is considered not to have had the staff identification data read out by the entrance card reader. The processor then outputs from the output device the face image data when the specific condition is not satisfied, and/or the staff identification data associated with the face image data in the case where it is determined that the specific condition is not satisfied. In other words, face image data of a person who has not had the staff identification data read out, namely the person who does not have a card for staff member (e.g. ID card) storing the staff identification data and/or the staff identification data of the person are outputted from the output device. As a result, it is possible to identify the person who has not had the staff identification card read out (person who does not possess the card for staff member storing the staff identification data).

The present invention further provides a control method of an individual tracking system having the following configuration.

Namely, the individual tracking system controlled in the control method of an individual tracking system includes: a server; an entrance card reader set at an entrance gate of a facility; and a camera disposed so as to be able to capture an image of the inside the facility. The server includes: a memory in which staff identification data to identify a staff member and face image data showing a face image of the staff member are stored in association with each other; an output device; and a processor. The control method includes a step of (A) the processor storing the staff identification data read out by the entrance card reader. Also, the control method includes a step of (B) the processor continuously storing image data showing an image captured by the camera. Further, the control method includes a step of (C) the processor comparing each of the image data stored in the step (B) with each of the face image data associated with the staff identification data stored in the step (A) so as to determine whether or not a specific condition is satisfied. Moreover, the control method includes a step of (D) the processor comparing the image data determined not to satisfy the specific condition in the step (C) with each of the face image data stored in the memory so as to determine whether or not the specific condition is satisfied. Furthermore, the control method includes a step of (E) the processor storing, or deleting, the image data determined not to satisfy the specific condition in the step (D) as guest image data in the memory. Still furthermore, the control method includes a step of (F) the processor outputting, from the output device, the face image data when the specific condition is determined to have been satisfied in the processing (D) and/or the staff identification data associated with the face image data when the specific condition is determined to have been satisfied in the processing (D).

According to the control method of an individual tracking system, the individual tracking system controlled in the control method of an individual tracking system is provided with a server, an entrance card reader set at an entrance gate of a facility, and a camera disposed so as to be able to capture an image inside of the inside the facility. The server includes a memory in which staff identification data to identify a staff member and face image data showing a face image of the staff member are stored in association with each other, an output device (e.g. image display or sound outputting device), and a processor. The processor stores the staff identification data read out by the entrance card reader at the entrance gate of the facility. The processor continuously stores image data showing an image captured by the camera. Moreover, the processor reads respective face image data associated with staff identification data read out by the entrance card reader, and then compares the face image data with the respective image data obtained by capturing by the camera so as to determine whether or not a predetermined condition (e.g. satisfaction of criteria for determining that a person shown by the face image data is identical to the person shown by the image data) is satisfied.

It is to be noted that the individual tracking system is a system used in the case where staff members and a guest are present in the facility.

When the above specific condition is not satisfied at this stage, the person of the face shown by the face image data when the aforementioned specific condition is not satisfied is considered not to have had the staff identification data read out by the entrance card reader. In other words, this person is considered to be a staff member who has not had the staff identification data read out, or a guest.

Next, the processor compares the face image data determined not to have satisfied the specific condition with the respective face image data stored in the memory, and then determines whether or not the specific condition is satisfied.

Further, when the above specific condition is not satisfied at this stage, the person of the face shown by the face image data that is determined not to have satisfied the specific condition is considered to be a guest. The processor stores in the memory, or deletes, the face image data determined not to have satisfied the specific condition as guest image data. By storing the memory, it becomes possible to check the guests who were present in the facility. By deleting the data, free space can be secured in the memory.

On the other hand, when the above specific condition is satisfied at this stage, the person of the face shown by the face image data when the aforementioned specific condition is satisfied is considered to be a staff member who has not had the staff identification data read out by the entrance card reader. The processor outputs from the output device the face image data when the specific condition is determined to have been satisfied and/or the staff identification data associate with the face image data when the specific condition is determined to have been satisfied. In other words, face image data of the staff member who has not had the staff identification data read out and/or the staff identification data of the staff member is outputted from the output device. As a result, it is possible to identify the staff member who has not had the staff identification card read out.

The present invention provides an individual tracking apparatus having the following configuration.

Namely, the individual tracking apparatus comprises:

a camera disposed so as to be able to capture an image of a face of a player playing games at a gaming machine;

a memory; and a controller, the controller programmed to execute processing of (A) constantly storing image data showing the image captured by the camera in the memory, (B) setting the image data not satisfying a predetermined condition among the image data stored in the memory to a deletable state, and (C) deleting the image data set to the deletable state among the image data stored in the memory, when a storable domain of the memory becomes less than a predetermined amount.

According to the aforementioned individual tracking apparatus, a camera is disposed so as to be able to capture an image of a face of a player playing at a gaming machine. Then, image data showing the image captured by the camera is constantly stored in the memory regardless of whether or not the player is playing the game. The image data that does not satisfy a predetermined condition (for example, establishment of a prize that requires tax payment) among the image data stored in the memory is set to a deletable state. Thereafter, when a storable domain of the memory becomes less than a predetermined amount, the image data set to the deletable state among the image data stored in the memory is deleted. As a result, the amount of the image data stored in the memory may be relatively reduced.

Further, since the image data that satisfies the predetermined condition is not deleted, by using the image of the face shown by the image data that satisfy the predetermined condition, a player having the face can be identified.

As mentioned above, the amount of the image data stored in the memory is reduced as much as possible so that need of maintenance is reduced to a minimum level. Moreover, it becomes possible to assuredly obtain the image data for tracking individuals. Therefore, the technology for tracking individuals by use of face images can be applied to the game field without reducing the convenience.

The present invention further provides an individual tracking apparatus having the following configuration.

Namely, the individual tracking apparatus comprises: a card reader; a camera disposed so as to be able to capture an image of a face of a player playing games at a gaming machine; a memory; and a controller, the controller programmed to execute processing of (A) constantly storing image data showing the image captured by the camera in the memory, (B) receiving from the card reader a detection signal indicating that identification data for distinguishing a card from other cards has been read, (C) receiving from the card reader a non-detection signal indicating that the identification data is no more detected, (D) setting the image data stored in the memory in a period from receipt of the detection signal to receipt of the non-detection signal to a deletable state, and (E) deleting the image data set to the deletable state among the image data stored in the memory, when a storable domain of the memory becomes less than a predetermined amount.

According to the aforementioned individual tracking apparatus, a camera is disposed so as to be able to capture an image of a face of a player playing at a gaming machine. Then, image data showing the image captured by the camera is constantly stored in the memory regardless of whether or not the player is playing the game. The image data stored in a period from the receipt of the detection signal to the receipt of the non-detection signal is set to a deletable state among the image data stored in the memory. The identification data is for distinguishing a card from other cards. The detection signal is a signal indicating that the identification data is read by the card reader, and the non-detection signal is a signal indication that the identification data can be no more detected by the card reader.

Thereafter, when a storable domain of the memory becomes less than a predetermined amount, the image data set to the deletable state among the image data stored in the memory is deleted. As a result, the amount of the image data stored in the memory may be relatively reduced. When the memory has received the detection signal and then received the signal from the card reader, which means that no card is left behind. Therefore, deletion of the image data stored in the aforementioned period causes very little problem. On the other hand, when the memory has received the detection signal but then the non-detection signal is not received, which means that there is an uncollected card left behind. In this case, however, the image data is not deleted. Accordingly, by using an image of the face shown by the image data, the player of the face can be specified. As mentioned above, the amount of the image data stored in the memory is reduced as much as possible so that need of maintenance is reduced to a minimum level. Moreover, it becomes possible to assuredly obtain the image data for tracking individuals. Therefore, the technology for tracking individuals by use of face images can be applied to the game field without reducing the convenience.

The present invention further provides an individual tracking apparatus having the following configuration.

Namely, the individual tracking apparatus comprises: a connecting portion enabling communication with a gaming machine; a camera disposed so as to be able to capture an image of a face of a player playing games at the gaming machine; a memory; and a controller. The controller is programmed to execute processing of (A) constantly storing image data showing the image captured by the camera in the memory, (B) receiving from the gaming machine via the connection portion, an abnormality detection signal indicating detection of abnormality, (C) state when a predetermined period of time or more elapses without receiving the abnormality detection signal after the image data was stored in the memory, and (D) deleting the image data set to the deletable state among the image data stored in the memory, when a storable domain of the memory becomes less than a predetermined amount.

According to the aforementioned individual tracking apparatus, a camera is disposed so as to be able to capture an image of a face of a player playing at a gaming machine. Then, image data showing the image captured by the camera is constantly stored in the memory regardless of whether or not the player is playing the game. When a predetermined period (for example, five minutes) elapses without receiving the abnormality detection signal after storing a certain image data, the image data out of the image data stored in the memory is set to a deletable state. The abnormality detection signal is a signal indicating detection of abnormality.

Thereafter, when a storable domain of the memory becomes less than a predetermined amount, the image data set to the deletable state among the image data stored in the memory is deleted. As a result, the amount of the image data stored in the memory may be relatively reduced. On the other hand, even if a predetermined time has elapsed since storage of a certain image data in the memory, when the abnormality detection signal during the predetermined period, the image data will not be deleted. In other words, the image data of an image captured during a period from a predetermined time prior to detection of the abnormality to detection of the abnormality will not be deleted. During this period, it is highly likely that an image of a player performing such an action to be detected as abnormal (for example, giving a shock to the gaming machine or applying an abnormal voltage to the gaming machine) and the like is captured. For this reason, the image data of this kind is not set to be deleted, and therefore by using the image of the face shown by the image data, it is possible to specify the player with the face of the image. Accordingly, the player having performed the abnormal action can be specified.

As mentioned above, the amount of the image data stored in the memory is reduced as much as possible so that need of maintenance is reduced to a minimum level. Moreover, it becomes possible to assuredly obtain the image data for tracking individuals. Therefore, the technology for tracking individuals by use of face images can be applied to the game field without reducing the convenience.

The present invention further provides an individual tracking system having the following configuration.

Namely, the individual tracking system comprises: a plurality of individual tracking apparatuses disposed at a facility; a server provided with a processor; and a plurality of card readers installed in the facility, each of the individual tracking apparatuses comprising a connecting portion enabling communication with a gaming machine, a camera disposed so as to be able to capture an image of a face of a staff member performing an operation on the gaming machine, a memory, and a controller, wherein the controller is programmed to execute processing of (A) receiving from the gaming machine via the connection portion, an abnormality detection signal indicating detection of abnormality, and (B) transmitting an abnormal signal to the server upon receipt of the abnormality detection signal, the processor is programmed to execute processing of (a) obtaining identification data having been read by any of the card readers from one or more cards respectively owned by one or more staff members in the facility, (b) specifying the card reader that is closest to the individual tracking apparatus having transmitted the abnormal signal, (c) specifying identification data obtained by the card reader specified in the processing (b), and (d) starting communication with a terminal for a staff member corresponding to the identification data specified in the processing (c), and the controller is further programmed to execute processing of (C) constantly storing image data showing the image captured by the camera in the memory at least after receiving the abnormality detection signal, (D) measuring a time period from receipt of the abnormality detection signal to receipt of a recovery-completion signal indicating completion of recovery of the gaming machine from the gaming machine, and (E) transmitting to the server the image data stored in the memory during a time period from receipt of the abnormality detection signal to receipt of the recovery-completion signal and period data indicating the time period measured in the processing (D).

According to the aforementioned individual tracking system, a plurality of individual tracking apparatuses and a plurality of car readers are disposed at a facility (for example, casino). Further, the individual tracking system includes a server. The controller installed in the individual tracking apparatus transmits an abnormal signal to the server when it receives the abnormality detection signal from the gaming machine. The processor provided in the server obtains identification data from a card owned by one or a plurality of staff members in the facility that is read by any of the card readers. Next, the processor specifies the card reader that is closest to the individual tracking apparatus having transmitted the abnormal signal. Also, the processor specifies the identification data obtained from the specified card reader. Then, the processor executes processing of starting communication with a terminal for a staff member (for example, a mobile phone) corresponding to the specified identification data.

Namely, the server starts communication with the terminal for a staff member owned by the staff member closest to the gaming machine that transmitted the abnormality detection signal. As a result, it is possible for the server to give a command to the staff member closest to the gaming machine that transmitted the abnormality detection signal to immediately head for the gaming machine.

Moreover, each of the individual tracking apparatuses has a camera disposed so as to be able to capture an image of the face of a staff member performing an operation on the gaming machine, and a memory. The controller installed in the individual tracking apparatus constantly stores in the memory the image data showing the image captured by the camera at least after receiving the abnormality detection signal. Also, the controller measures a time period from receipt of the abnormality detection signal to receipt of the recovery-completion signal indicating completion of recovery of the gaming machine from the gaming machine. Next, the controller transmits the image data stored in the memory during a time period from receipt of the abnormality detection signal to receipt of the recovery-completion signal and the period data indicating the measured time period to the server.

Namely, the time period from detection of abnormality of the gaming machine to completion of recovery (time period from receipt of the abnormality detection signal to receipt of recovery-completion signal) and the image data showing the image of the face of a staff member who performed operations during the time period are transmitted to the server. As a result, it is possible to check if someone who disguised himself or herself as a staff member performed the operations. Furthermore, it is possible to evaluate which one of the staff members can restore the gaming machine faster.

Furthermore, the present invention provides a control method of the individual tracking apparatus having the following configuration.

Namely, the individual tracking apparatus which is controlled by the control method of the aforementioned individual tracking apparatus comprises a camera disposed so as to be able to capture an image of a face of a player playing games at a gaming machine, a memory, and a controller. The control method includes a step (A) in which the controller constantly stores image data showing the image captured by the camera in the memory. The control method also includes a step (B) in which the controller sets the image data not satisfying a predetermined condition among the image data stored in the memory to a deletable state. Further, the control method includes a step (C) in which the controller deletes the image data set to the deletable state among the image data stored in the memory, when a storable domain of the memory becomes less than a predetermined amount.

According to the control method of an individual tracking apparatus, the individual tracking apparatus controlled in the control method of an individual tracking apparatus is provided with a camera which is disposed so as to be able to capture an image of the face of a player playing games at a gaming machine. Then, image data showing the image captured by the camera is constantly stored in the memory regardless of whether or not the player is playing the game. The image data that does not satisfy a predetermined condition (for example, establishment of a prize that requires tax payment) among the image data stored in the memory is set to a deletable state. Thereafter, when a storable domain of the memory becomes less than a predetermined amount, the image data set to the deletable state among the image data stored in the memory is deleted. As a result, the amount of the image data stored in the memory may be relatively reduced.

Further, since the image data that satisfies the predetermined condition is not deleted, by using the image of the face shown by the image data that satisfy the predetermined condition, a player having the face can be identified.

As mentioned above, the amount of the image data stored in the memory is reduced as much as possible so that need of maintenance is reduced to a minimum level. Moreover, it becomes possible to assuredly obtain the image data for tracking individuals. Therefore, the technology for tracking individuals by use of face images can be applied to the game field without reducing the convenience.

The present invention further provides a control method of the individual tracking apparatus having the following configuration.

Namely, the individual tracking apparatus which is controlled by the control method of the individual tracking apparatus comprises a connecting portion enabling communication with a gaming machine provided with a card reader, a camera disposed so as to be able to capture an image of a face of a player playing games at a gaming machine, a memory, and a controller. The control method includes a step (A) in which the controller constantly stores image data showing the image captured by the camera in the memory. The control method also includes a step (B) in which the controller receives from the card reader a detection signal indicating that identification data for distinguishing a card from other cards has been read. Further, the control method includes a step (C) in which the controller receives from the card reader a non-detection signal indicating that the identification data is no more detected. Moreover, the control method includes a step (D) in which the controller sets the image data stored in the memory in a period from receipt of the detection signal to receipt of the non-detection signal to a deletable state. Furthermore, the control method includes a step (E) in which the controller deletes the image data set to the deletable state among the image data stored in the memory, when a storable domain of the memory becomes less than a predetermined amount.

According to the control method of an individual tracking apparatus, the individual tracking apparatus controlled in the control method of an individual tracking apparatus is provided with a camera which is disposed so as to be able to capture an image of the face of a player playing games at a gaming machine. Then, image data showing the image captured by the camera is constantly stored in the memory regardless of whether or not the player is playing the game. The image data stored in a period from the receipt of the detection signal to the receipt of the non-detection signal is set to a deletable state among the image data stored in the memory. The identification data is for distinguishing a card from other cards. The detection signal is a signal indicating that the identification data is read by the card reader, and the non-detection signal is a signal indication that the identification data can be no more detected by the card reader.

Thereafter, when a storable domain of the memory becomes less than a predetermined amount, the image data set to the deletable state among the image data stored in the memory is deleted. As a result, the amount of the image data stored in the memory may be relatively reduced. When the memory has received the detection signal and then received the non-detection signal from the card reader, no card is left behind. Therefore, deletion of the image data stored in the aforementioned period causes very little problem. On the other hand, when the memory has received the detection signal but then have not received the non-detection signal, there is an uncollected card left behind. In this case, however, the image data is not deleted. Accordingly, by using an image of the face shown by the image data, the player of the face can be specified. As mentioned above, the amount of the image data stored in the memory is reduced as much as possible so that need of maintenance is reduced to a minimum level. Moreover, it becomes possible to assuredly obtain the image data for tracking individuals. Therefore, the technology for tracking individuals by use of face images can be applied to the game field without reducing the convenience.

The present invention further provides a control method of the individual tracking apparatus having the following configuration.

Namely, the individual tracking apparatus which is controlled by the control method of the individual tracking apparatus comprises a connecting portion enabling communication with a gaming machine, a camera disposed so as to be able to capture an image of a face of a player playing games at the gaming machine, a memory, and a controller. The control method includes a step (A) in which the controller constantly stores image data showing the image capture by the camera in the memory. The control method also includes a step (B) in which the controller receives from the gaming machine via the connection portion an abnormality detection signal indicating detection of abnormality. Further, the control method includes a step (C) in which the controller sets image data to a deletable state when a predetermined period of time or more elapses without receiving the abnormality detection signal after the image data was stored in the memory. Moreover, the control method includes a step (D) in which the controller deletes the image data set to the deletable state among the image data stored in the memory, when a storable domain of the memory becomes less than a predetermined amount.

According to the control method of an individual tracking apparatus, the individual tracking apparatus controlled in the control method of an individual tracking apparatus is provided with a camera which is disposed so as to be able to capture an image of the face of a player playing games at a gaming machine. Then, image data showing the image captured by the camera is constantly stored in the memory regardless of whether or not the player is playing the game. When a predetermined period (for example, five minutes) elapses without receiving abnormality detection signal after storing a certain image data, the image data out of the image data stored in the memory is set to a deletable state. The abnormality detection signal is a signal indicating detection of abnormality.

Thereafter, when a storable domain of the memory becomes less than a predetermined amount, the image data set to the deletable state among the image data stored in the memory is deleted. As a result, the amount of the image data stored in the memory may be relatively reduced. On the other hand, even if a predetermined time has elapsed since storage of a certain image data in the memory, when the abnormality detection signal has been received during the predetermined period, the image data will not be deleted. In other words, the image data of an image captured during a period from a predetermined time prior to detection of the abnormality to detection of the abnormality will not be deleted. During this period, it is highly likely that an image of a player performing such an action to be detected as abnormal (for example, giving a shock to the gaming machine or applying an abnormal voltage to the gaming machine) and the like is captured. 3

The present invention further provides a control method of the individual tracking system having the following configuration.

Namely, the individual tracking system controlled in the controlling method of the individual tracking system comprises a plurality of individual tracking apparatuses disposed at a facility, a server provided with a processor, and a plurality of card readers installed in the facility. Each of the individual tracking apparatuses comprises a connecting portion enabling communication with a gaming machine, a camera disposed so as to be able to capture an image of a face of a staff member performing an operation on the gaming machine, a memory, and a controller. The control method includes a step (A) in which the controller receives from the gaming machine, via the connection portion, an abnormality detection signal indicating detection of abnormality. The control method also includes a step (B) in which the controller transmits an abnormal signal to the server upon receipt of the abnormality detection signal. Further, the control method includes a step (a) in which the processor obtains identification data having been read by any of the card readers from one or more cards respectively owned by one or more staff members in the facility. Moreover, the control method includes a step (b) in which the processor specifies the card reader that is closest to the individual tracking apparatus having transmitted the abnormal signal. The control method includes a step (c) in which the processor specifies identification data obtained by the card reader specified in the step (b). The control method includes a step (d) in which the processor starts communication with a terminal for a staff member corresponding to the identification data specified in the step (c). Moreover, the control method includes a step (C) in which the controller constantly stores image data showing the image captured by the camera in the memory at least after receiving the abnormality detection signal. The control method includes a step (D) in which the controller measures a time period from receipt of the abnormality detection signal to receipt of a recovery-completion signal indicating completion of recovery of the gaming machine from the gaming machine. Furthermore the control method includes a step (E) in which the controller transmits to the server the image data stored in the memory during a time period from receipt of the abnormality detection signal to receipt of the recovery-completion signal and period data indicating the time period measured in the step (D).

In the individual tracking system controlled in the control method of the individual tracking system, a plurality of individual tracking apparatuses and a plurality of car readers are disposed at the facility (for example, casino). Further, the individual tracking system includes a server. The controller installed in the individual tracking apparatus transmits an abnormal signal to the server when it receives the abnormality detection signal from the gaming machine. The processor provided in the processor obtains identification data from a card owned by one or a plurality of staff members in the facility that is read by any of the card readers. Next, the processor specifies the card reader that is closest to the individual tracking apparatus having transmitted the abnormal signal. Also, the processor specifies the identification data obtained from the specified card reader. Then, the processor executes processing of starting communication with a terminal for a staff member (for example, a mobile phone) corresponding to the specified identification data.

Namely, the server starts communication with the terminal for a staff member owned by the staff member closest to the gaming machine that transmitted the abnormality detection signal. As a result, it is possible for the server to give a command to the staff member closest to the gaming machine that transmitted the abnormality detection signal to immediately head for the gaming machine.

Moreover, each of the individual tracking apparatuses has a camera disposed so as to be able to capture an image of the face of a staff member performing an operation on the gaming machine, and a memory. The controller installed in the individual tracking apparatus constantly stores in the memory the image data showing the image captured by the camera at least after receiving the abnormality detection signal. Also, the controller measures a time period from receipt of the abnormality detection signal to receipt of the recovery-completion signal indicating completion of recovery of the gaming machine from the gaming machine. Next, the controller transmits the image data stored in the memory during a time period from receipt of the abnormality detection signal to receipt of the recovery-completion signal and the period data indicating the measured time period to the server.

Namely, the time period from detection of abnormality of the gaming machine to completion of recovery (time period from receipt of the abnormality detection signal to receipt of recovery-completion signal) and the image data showing the image of the face of a staff member who performed operations during the time period are transmitted to the server. As a result, it is possible to check if someone who disguised himself or herself as a staff member performed the operations. Furthermore, it is possible to evaluate which one of the staff members can restore the gaming machine faster.

BRIEF DESCRIPTION OF THE DRAWINGS

FIG. 14A is a view illustrating correspondence relationships between combinations of symbols rearranged along a winning line and the numbers of payouts.

FIG. 14B is another view illustrating correspondence relationships between combinations of symbols rearranged along the winning line and the numbers of payouts.

FIG. 14C is another view illustrating correspondence relationships between combinations of symbols rearranged along the winning line and the numbers of payouts.

FIG. 21 is a view illustrating a number-of-points determination table.

FIG. 22A is a view illustrating a number-of-lighting determination table.

FIG. 22B is a view illustrating a number-of-lighting determination table.

FIG. 29 is a staff management table stored in said staff management server shown in FIG. 28.

FIG. 45A is a view illustrating correspondence relationships between combinations of symbols rearranged along a winning line and the numbers of payouts.

FIG. 45B is another view illustrating correspondence relationships between combinations of symbols rearranged along the winning line and the numbers of payouts.

FIG. 45C is another view illustrating correspondence relationships between combinations of symbols rearranged along the winning line and the numbers of payouts.

FIG. 52 is a view illustrating a number-of-points determination table.

FIG. 53A is a view illustrating a number-of-lighting determination table

FIG. 53B is a view illustrating a number-of-lighting determination table.

FIG. 70 is a flowchart illustrating a subroutine of normal game execution processing.

FIG. 71A is a view illustrating correspondence relationships between combinations of symbols rearranged along a winning line and the numbers of payouts.

FIG. 71B is another view illustrating correspondence relationships between combinations of symbols rearranged along the winning line and the numbers of payouts.

FIG. 71C is another view illustrating correspondence relationships between combinations of symbols rearranged along the winning line and the numbers of payouts.

FIG. 78 is a view illustrating a number-of-points determination table.

FIG. 79A is a view illustrating a number-of-lighting determination table.

FIG. 79B is a view illustrating a number-of-lighting determination table.

FIG. 83 is a view illustrating a staff control table stored in the staff management server illustrated in FIG. 82.

FIG. 87 is a view illustrating one example of images displayed on a display provided in the staff management server illustrated in FIG. 82.

DESCRIPTION OF THE EMBODIMENTS

First Embodiment

An embodiment of the present invention is described based on the drawings.

First, with reference to FIG. 1, there will be given a general description of the present embodiment.

Figure 1:
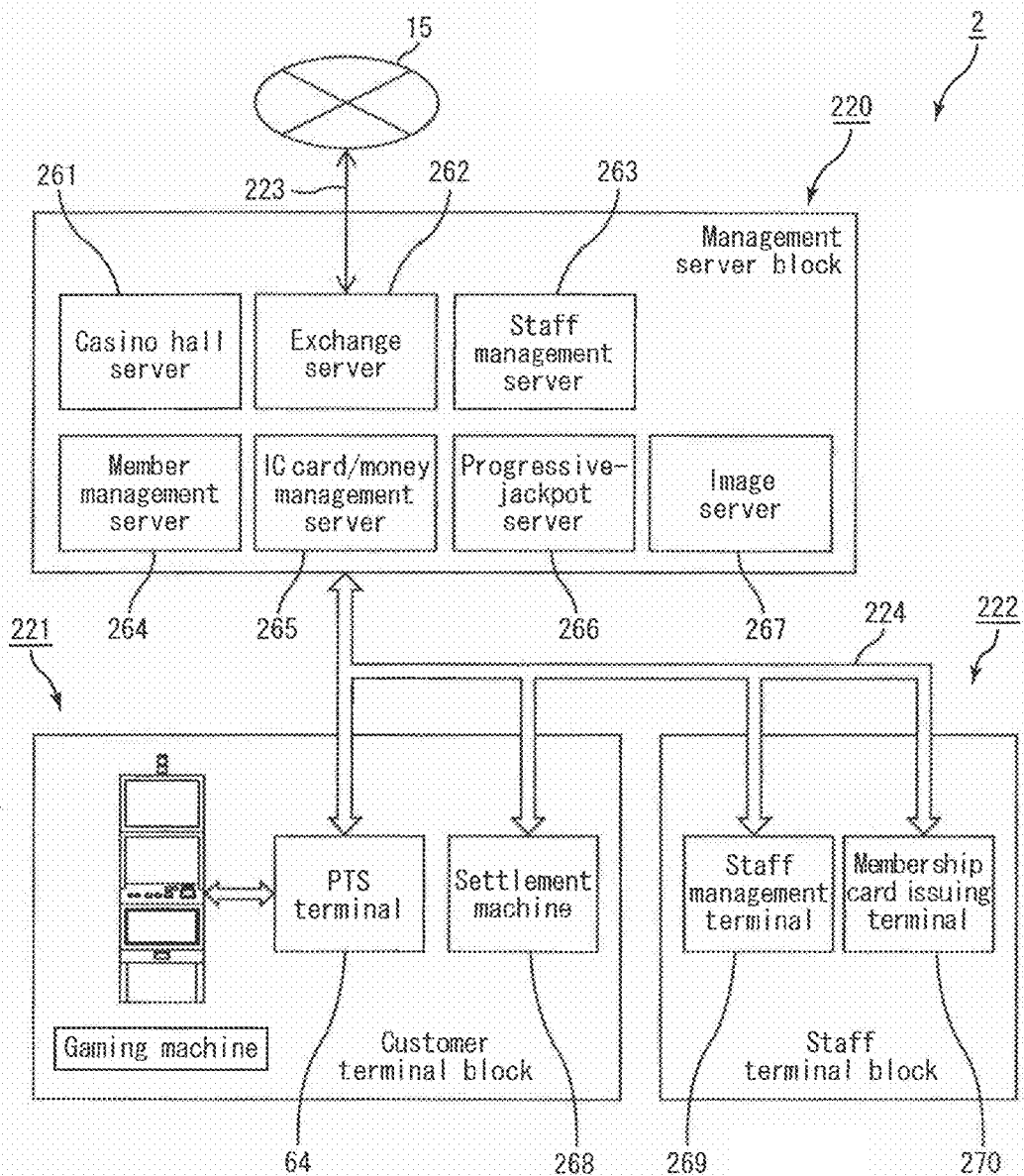
FIG. 1 is a diagrammatic view schematically illustrating an overall picture of a casino system according to one embodiment of the present invention.

FIG. 1 is a front view schematically illustrating an overall picture of a casino system according to one embodiment of the present invention.

A casino system 2 includes a management server block 220, a customer terminal block 221, and a staff terminal block 222.

The management server block 220 includes a casino hall server 261, an exchange server 262, a staff management server 263, a member management server 264, an IC card/money management server 265, a progressive-jackpot server 266, and an image server 267.

The casino hall server 261 collects money flow inside a casino and makes a balance sheet and the like, and is a server for managing each server within the management server block 220. The exchange server 262 is a server for acquiring exchange information from an external source (Internet 15) through a communication line 223. The staff management server 263 is a server for managing attendance of staff members who work at the casino, recognizing the current locations of the staff members within the casino, and the like. The member management server 264 is a server for managing member information, such as members' personal information and their past game results. The IC card/money management server 265 is a server for collecting cashless sales with IC cards. The progressive-jackpot server 266 is a server for conducting management of a cumulative value for a progressive-jackpot offer, and determination of the progressive-jackpot offer. The image server 267 is a server for storing images of the faces of staff members and players, which are captured by a camera installed inside the casino, and managing those images.

The customer terminal block 221 includes player tracking system (PTS) terminals 64, gaming machines, and a settlement machine 268. The gaming machines are connected to the management server block 220 through the respective PTS terminals 64, by network.

In the present embodiment, a single PTS terminal 64 is provided for a single gaming machine.

The PTS terminal 64 corresponds to the currency-value converter in the present invention.

The staff terminal block 222 includes a staff management terminal 269 and a membership card issuing terminal 270. The staff management terminal 269 is controlled by the staff management server 263. The staff management terminal 269 transmits information to mobile information terminals (not illustrated) carried by the staff members, and the like, based on a signal received from the staff management server 263.

The membership card issuing terminal 270 includes a camera which, when a membership card (IC card) is issued, captures a facial image of the player to whom the IC card is issued. The captured image is stored into the image server 267, in association with a customer ID. Further, member's personal information inputted at the time of IC card issuance is stored into the member management server 264, in association with the customer ID.

Figure 6:
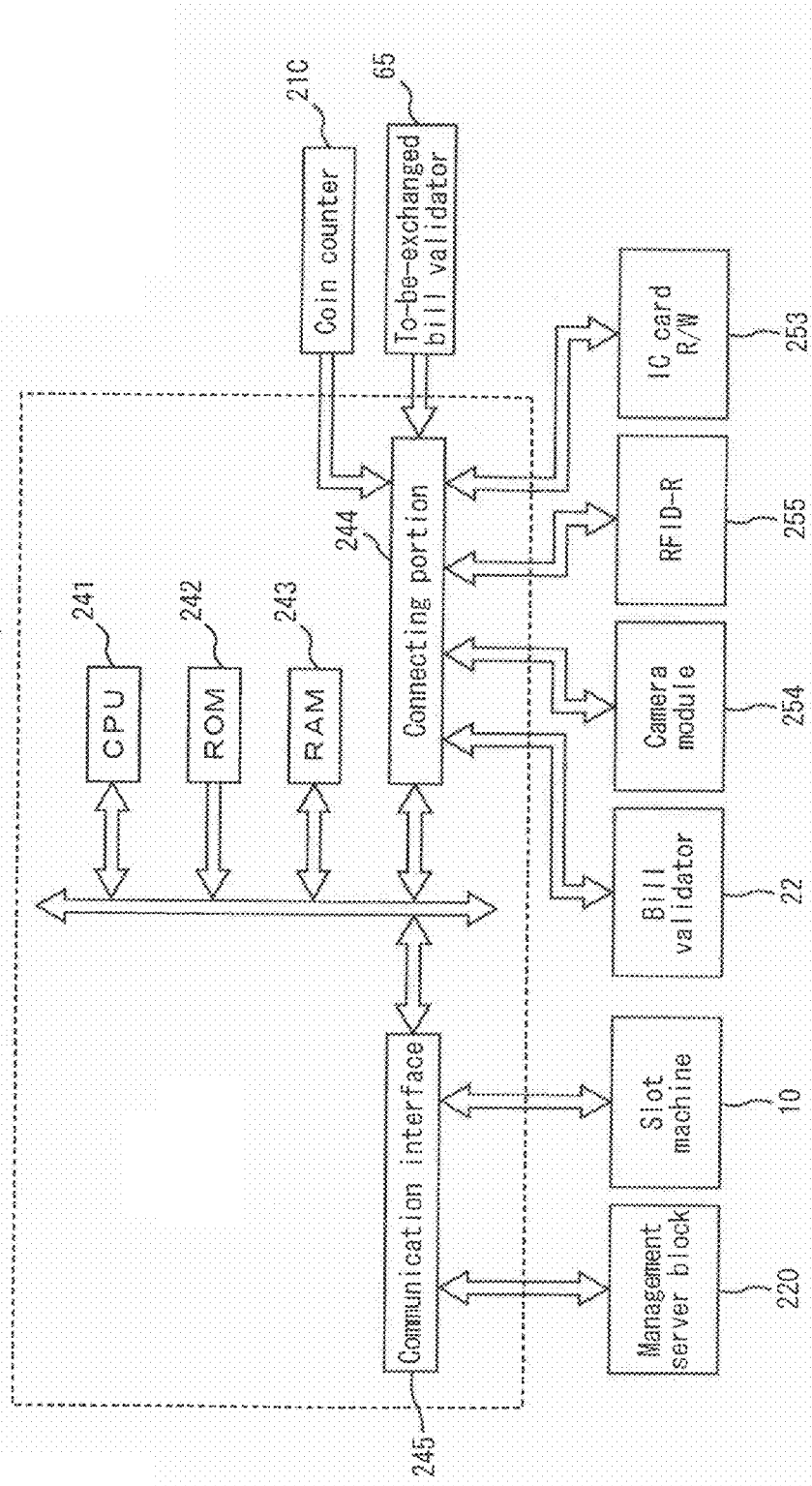
FIG. 6 is a block diagram illustrating an internal configuration of a PTS terminal forming the gaming system according to one embodiment of the present invention.

In the present embodiment, the PTS terminal 64 is connected to a to-be-exchanged bill validator 65 through a communication line (see FIG. 6).

The to-be-exchanged bill validator 65 is capable of accepting bills of a plurality of countries. For example, when a Japanese bill is inserted into the to-be-exchanged bill validator 65, the PTS terminal 64 converts (exchanges) the bill into U.S. currency, based on the exchange rate. Amount-of-converted-currency data, indicating the amount of currency after the conversion (exchange), is then transmitted from the PTS terminal 64 to the gaming machine. Thus, the player can play the game on the gaming machine using currencies other than the U.S. currency. It is to be noted that the amount of currency after the conversion (exchange) is equivalent to the amount of currency obtained by subtracting the amount of currency corresponding to a predetermined fee (hereinafter, also referred to as "exchange fee") from the amount of currency before the conversion (exchange).

Also, exchange-fee data indicating the amount of currency corresponding to the exchange fee is transmitted from the PTS terminal 64 to the progressive-jackpot server 266. The progressive-jackpot server 266 updates the cumulative value for bonus, based on the amount of currency indicated by the received exchange-fee data. When the cumulative value for bonus has reached a specific value, coins are paid out as a jackpot to any of the gaming machines. As thus described, in the present embodiment, a bonus with its source of money being the exchange fee is offered.

The U.S. currency corresponds to the basic currency in the present invention.

The to-be-exchanged bill validator 65 corresponds to the currency validator in the present invention.

The cumulative value for bonus corresponds to the cumulative value in the present invention.

Hereinafter, a case will be described where the gaming machine is a slot machine 10.

Figure 2:
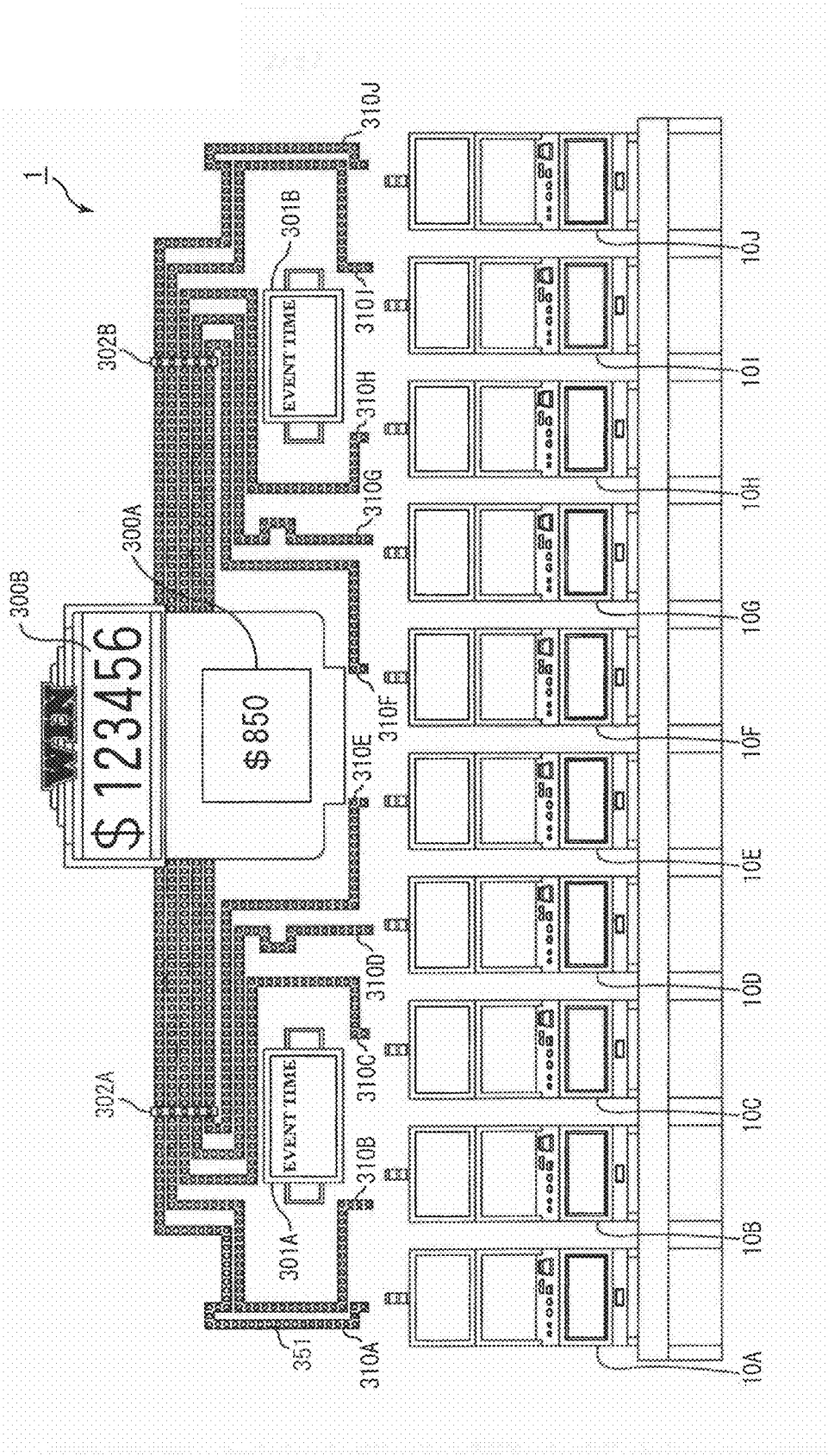
FIG. 2 is a front view schematically illustrating a gaming system according to one embodiment of the present invention.

FIG. 2 is a front view schematically illustrating a gaming system according to one embodiment of the present invention.

Figure 3A:
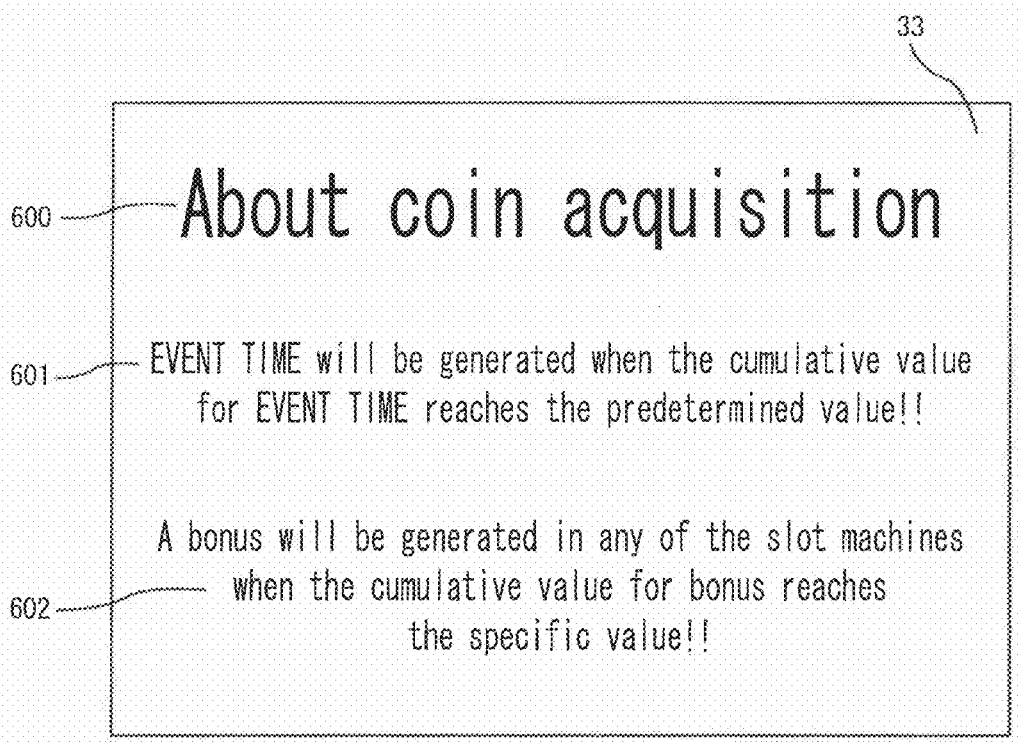
FIG. 3A is a view illustrating an exemplary image displayed to an upper image display panel included in a slot machine forming a gaming system according to one embodiment of the present invention.
Figure 3B:
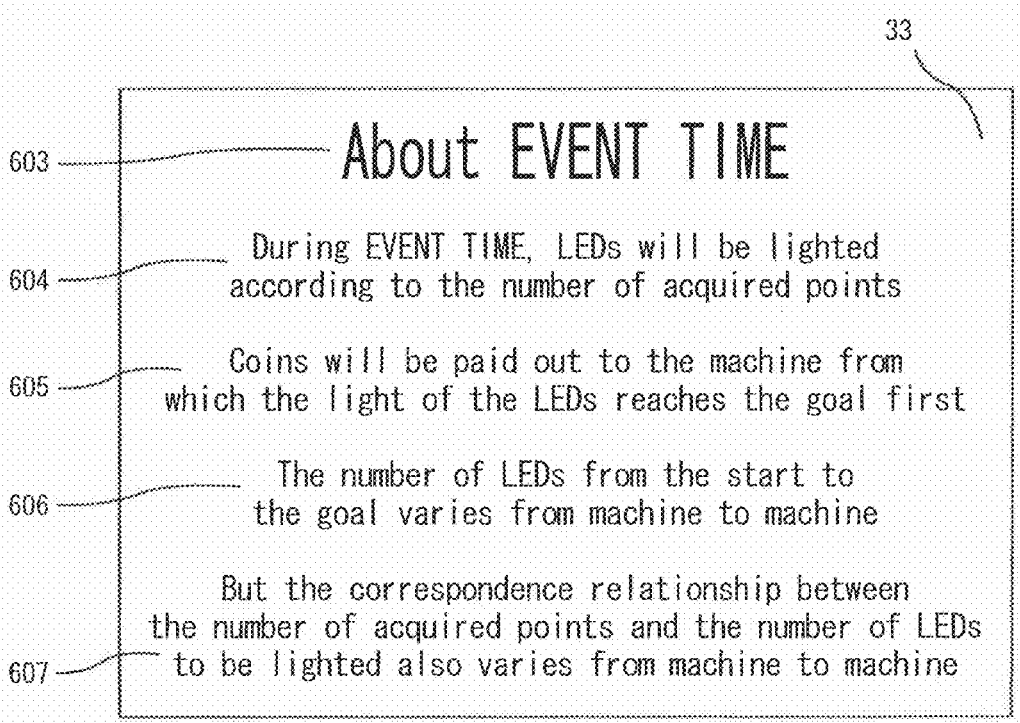
FIG. 3B is a view illustrating another exemplary image displayed to the upper image display panel included in the slot machine forming the gaming system according to one embodiment of the present invention.

FIGS. 3A to 3B are views each illustrating an exemplary image displayed to an upper image display panel included in a slot machine forming a gaming system according to one embodiment of the present invention.

As illustrated in FIG. 2, a gaming system 1 includes a plurality of (ten, in the present embodiment) slot machines 10 (a slot machine 10A, a slot machine 10B, a slot machine 10C, a slot machine 10D, a slot machine 10E, a slot machine 10F, a slot machine 10G, a slot machine 10H, a slot machine 10I, and a slot machine 10J), the PTS terminal 64, the exchange server 262, the progressive-jackpot server 266, a plurality of common large displays 300 (a common large display 300A and a common large display 300B), and a plurality of common compact displays 301 (a common compact display 301A and a common compact display 301B), which are interconnected through network.

Further, for the respective slot machines 10, there are provided coupling illumination lines 310 (a coupling illumination line 310A, a coupling illumination line 310B, a coupling illumination line 310C, a coupling illumination line 310D, a coupling illumination line 310E, a coupling illumination line 310F, a coupling illumination line 310G, a coupling illumination line 310H, a coupling illumination line 310I, and a coupling illumination line 310J) which include a plurality of LEDs 351 arranged from the common large displays 300 to the respective slot machines 10. The coupling illumination lines 310 are each formed by a straight portion extending from the common large displays 300 to one of boundary plates 302 (a boundary plate 302A and a boundary plate 302B), and a bent portion extending from one of the boundary plates 302 to one of the slot machines 10.

The slot machines 10 correspond to the gaming machines of the present invention.

In the gaming system 1 according to the present embodiment, a part of coins betted in each slot machine 10 are cumulatively counted as a cumulative value for EVENT TIME. Further, an image indicative of the counted cumulative value for EVENT TIME is displayed to the common large display 300B. In FIG. 2, "123456" is displayed to the common large display 300B, indicating that the cumulative value for EVENT TIME is 123456. When the cumulative value for EVENT TIME reaches a predetermined value, EVENT TIME (common game) is conducted.

Further, in the gaming system 1 according to the present embodiment, when a bill of a currency other than the basic currency is inserted into the to-be-exchanged bill validator 65, the exchange fee related to exchange of this bill is cumulatively counted as the cumulative value for bonus. Then, an image indicative of the counted cumulative value for bonus is displayed to the common large display 300A. In FIG. 2, "850" is displayed to the common large display 300A, indicating that the cumulative value for bonus is 850. When the cumulative value for bonus reaches a specific value, coins are paid out as a jackpot to any of the slot machines 10.

With reference to FIG. 3A to FIG. 3B, the coin acquisition according to the jackpot will be described.

As illustrated in FIG. 3A, text images indicative of precautions for the acquisition of the jackpot are displayed to an upper image display panel 33.

A text image 601 indicates that EVENT TIME (common game) is generated to any of the slot machines 10 when the cumulative value for EVENT TIME has reached the predetermined value.

A text image 602 indicates that a bonus is generated when the cumulative value for bonus has reached the specific value.

In FIG. 3B, EVENT TIME (common game) is further described.

In the present embodiment, a configuration is adopted where the displayed text image is switched from the text image illustrated in FIG. 3A to the text image illustrated in FIG. 3B, when there has been a touch on a predetermined place in a touch panel (not shown) provided on the upper image display panel.

A text image 604 indicates that the LEDs 351 will be lighted according to the number of points acquired in each slot machine 10 during EVENT TIME (common game).

During EVENT TIME (common game), the number of points is determined based on the type and the number of the rearranged game symbols.

A text image 605 indicates that coins in number corresponding to the cumulative value for EVENT TIME will be paid out as the jackpot to the slot machine 10 provided with the coupling illumination line 310 with all the LEDs 351 having been lighted.

In the present embodiment, the LEDs 351 are lighted according to the number of acquired points, in an order starting from the LED 351 closest to the slot machines 10. Accordingly, the lines of the lighted LEDs 351 appear to gradually extend toward the common large displays 300.

A text image 606 indicates that the number of LEDs 351 included in the coupling illumination line 310 may be different among the coupling illumination lines 310.

In the present embodiment, the same number of LEDs 351 are included in two coupling illumination lines 310 listed in each of the following groups (I) to (V):

(I) the coupling illumination line 310A and the coupling illumination line 310J;

(II) the coupling illumination line 310B and the coupling illumination line 310I;

(III) the coupling illumination line 310C and the coupling illumination line 310H;

(IV) the coupling illumination line 310D and the coupling illumination line 310G; and (V) the coupling illumination line 310E and the coupling illumination line 310F.

However, the numbers of LEDs 351 for the respective groups (I) to (V) are different from each other.

This difference is caused by the difference in the numbers of LEDs 351 in the bent portions.

The numbers of LEDs 351 in the straight portions are same in all the coupling illumination lines 310.

It is to be noted that FIG. 2 is a view schematically illustrating the gaming system 1 according to the present embodiment, and the number of LEDs 351 illustrated in FIG. 2 is not related to the number of LEDs 351 according to the present embodiment.

A text image 607 indicates that the correspondence relationship between the number of acquired points and the number of LEDs 351 to be lighted may be different among the coupling illumination lines 310. More specifically, the correspondence relationships between the number of acquired points and the number of LEDs 351 to be lighted are different among the respective groups (I) to (V) (see FIG. 22A).

As above, there has been given the general description of the present embodiment.

Hereinafter, the present embodiment is described in more detail.

Next, a configuration of the slot machine 10 is described.

Figure 4:
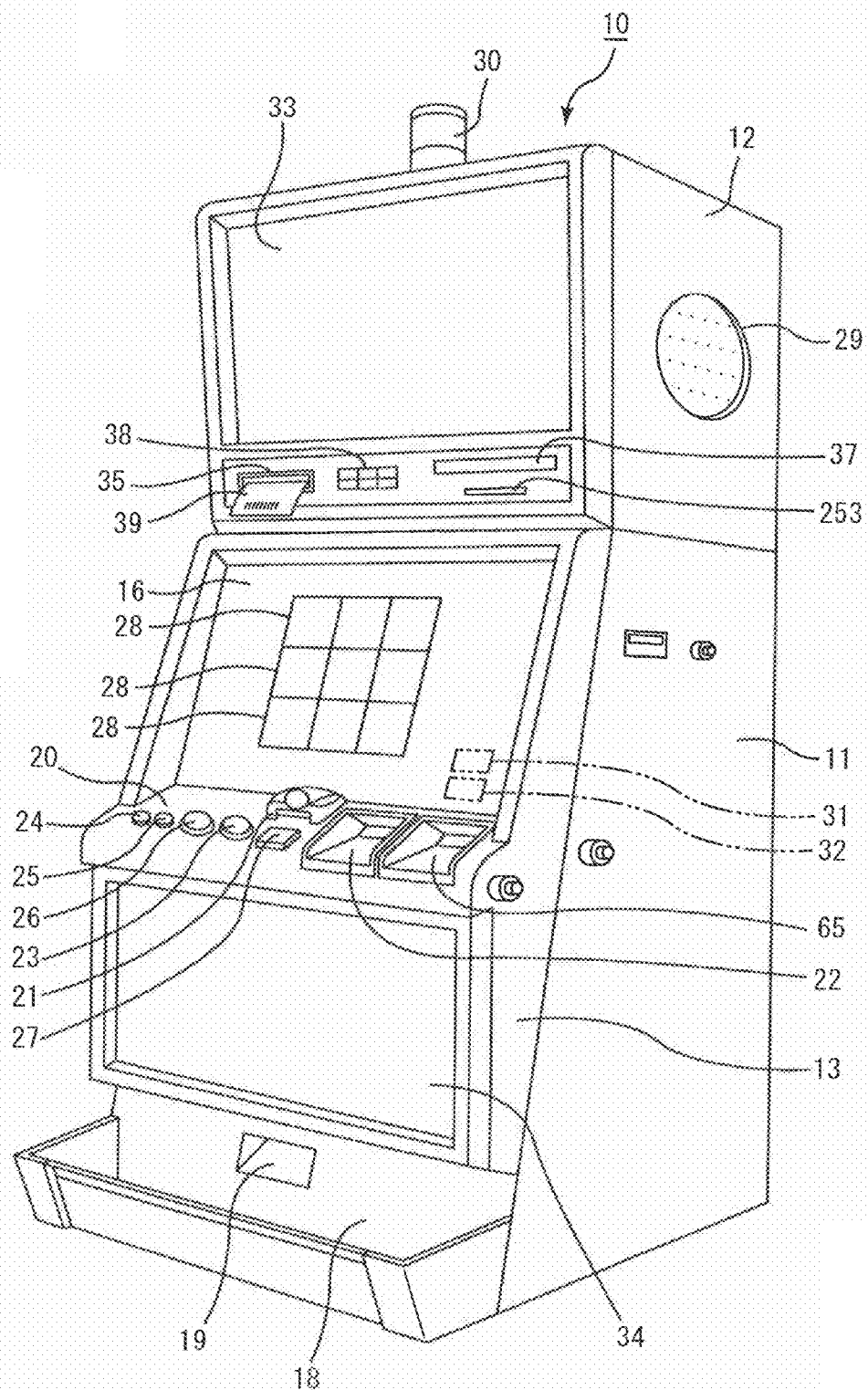
FIG. 4 is a perspective view illustrating an external view of a slot machine forming the gaming system according to the present embodiment.

FIG. 4 is a perspective view illustrating an external view of a slot machine forming a gaming system according to the present embodiment.

In the slot machine 10, a coin, a bill (basic currency and currencies other than the basic currency), or electronic valuable information corresponding to those is used as a game medium. However, in the present invention, the game medium is not particularly limited. Examples of the game medium may include a medal, a token, electronic money and a ticket. It is to be noted that the ticket is not particularly limited, and examples thereof may include a ticket with a barcode as described later.

The slot machine 10 comprises a cabinet 11, a top box 12 installed on the upper side of the cabinet 11, and a main door 13 provided at the front face of the cabinet 11.

On the main door 13, there is provided a lower image display panel 16 as a display. The lower image display panel 16 includes a transparent liquid crystal panel which displays nine display blocks 28 along three columns and three rows. A single symbol is displayed in each display block 28.

Further, although not illustrated, various types of images relating to an effect, as well as the aforementioned images, are displayed to the lower image display panel 16.

Further, a number-of-credits display portion 31 and a number-of-payouts display portion 32 are provided on the lower image display panel 16. The number-of-credits display portion 31 displays an image indicative of the number of credited coins. The number-of-payouts display portion 32 displays an image indicative of the number of coins to be paid out.

Moreover, although not shown, a touch panel 69 is provided at the front face of the lower image display panel 16. The player can operate the touch panel 69 to input a variety of commands.

Below the lower image display panel 16, there are provided a control panel 20 including a plurality of buttons 23 to 27 with each of which a command according to game progress is inputted by the player, a coin receiving slot 21 through which a coin is accepted into the cabinet 11, a bill validator 22, and the to-be-exchanged bill validator 65.

The control panel 20 is provided with a start button 23, a change button 24, a CASHOUT button 25, a 1-BET button 26 and a maximum BET button 27. The start button 23 is used for inputting a command to start scrolling of symbols. The change button 24 is used for making a request of staff in the recreation facility for exchange. The CASHOUT button 25 is used for inputting a command to pay out credited coins to a coin tray 18.

The 1-BET button 26 is used for inputting a command to bet one coin on a game out of credited coins. The maximum BET button 27 is used for inputting a command to bet the maximum number of coins that can be bet on one game (three coins in the present embodiment) out of credited coins.

The bill validator 22 not only discriminates a regular bill (basic currency) from a false bill, but also accepts the regular bill into the cabinet 11. It is to be noted that the bill validator 22 may be configured so as to be capable of reading a later-described ticket 39 with a barcode. At the lower front of the main door 13, namely, below the control panel 20, there is provided a belly glass 34 on which a character or the like of the slot machine 10 is drawn.

The to-be-exchanged bill validator 65 accepts bills of a plurality of countries which are currencies other than the basic currency, and is capable of verifying the adequacy of the accepted bill and reading the type and the number of the bills.

On the front surface of the top box 12, there is provided the upper image display panel 33. The upper image display panel 33 includes a liquid crystal panel, which displays, for example, images indicative of introductions of the contents of games and explanations about the rules of games as illustrated in FIG. 3A.

Further, a speaker 29 is provided in the top box 12. Under the upper image display panel 33, there are provided a ticket printer 35, an IC card R/W 253, a data display 37, and a key pad 38. The ticket printer 35 prints on a ticket a barcode as coded data of the number of credits, a date, an identification number of the slot machine 10, and the like, and outputs the ticket as the ticket 39 with a barcode. The player can make another slot machine read the ticket 39 with a barcode to play a game thereon, or exchange the ticket 39 with a barcode with a bill or the like at a predetermined place in the recreation facility (e.g. a cashier in a casino).

The IC card R/W 253 reads data from an IC card and writes data into the IC card. The IC card is a card owned by the player, and for example, data for identifying the player and data concerning a history of games played by the player are stored therein. Data corresponding to a coin, a bill or a credit may be stored in the IC card. The data display 37 includes a fluorescent display and the like, and displays, for example, data read by the IC card R/W 253 or data inputted by the player via the key pad 38. The key pad 38 is used for inputting a command and data concerning issuing of a ticket, and the like.

Figure 5:
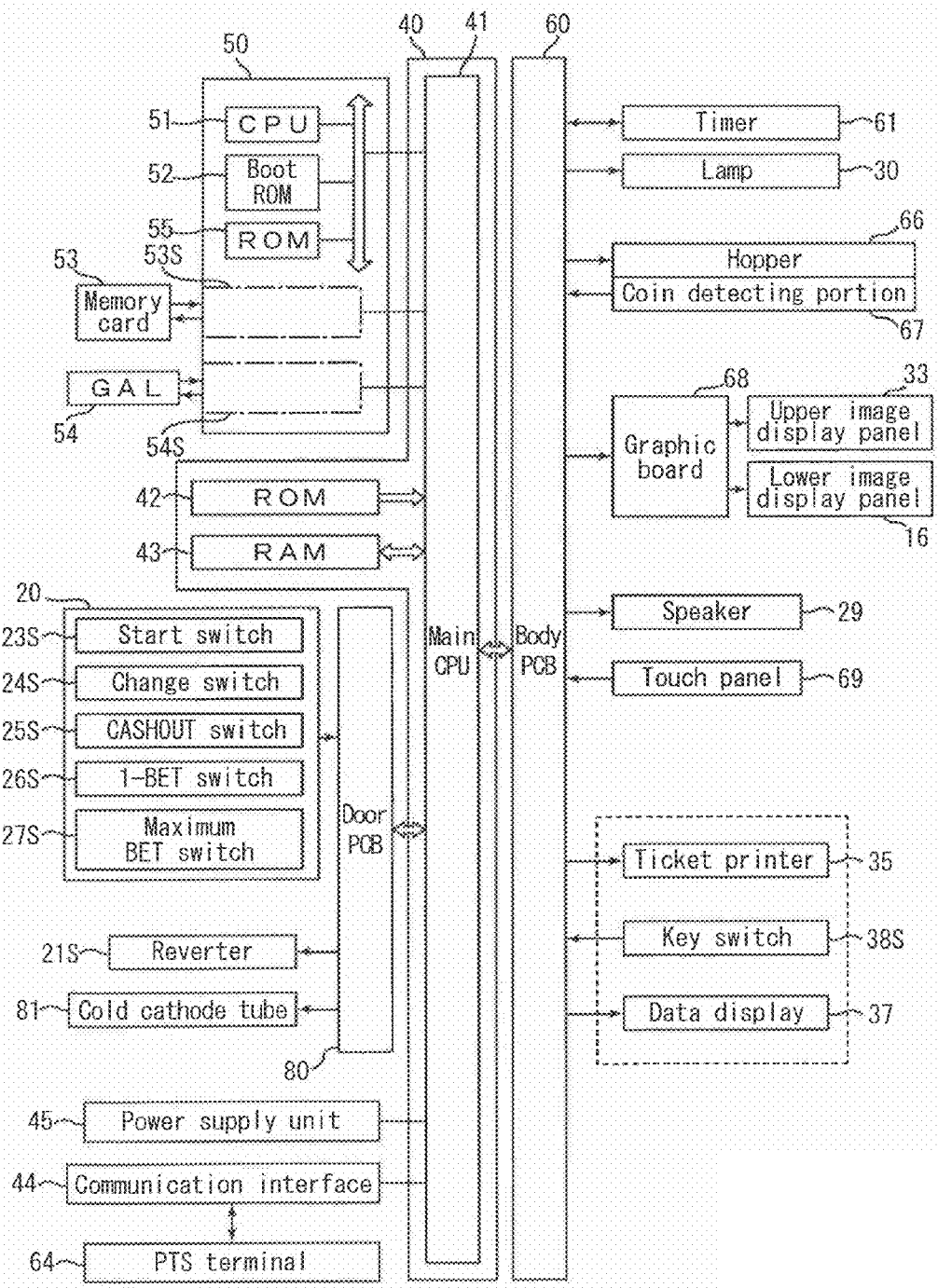
FIG. 5 is a block diagram illustrating an internal configuration of the slot machine shown in FIG. 4.

FIG. 5 is a block diagram showing an internal configuration of the slot machine shown in FIG. 4.

A gaming board 50 is provided with a CPU (Central Processing Unit) 51, a ROM 55, and a boot ROM 52 which are interconnected to one another by an internal bus, a card slot 53S corresponding to a memory card 53, and an IC socket 54S corresponding to a GAL (Generic Array Logic) 54.

The memory card 53 includes a nonvolatile memory such as CompactFlash (registered trade mark), and stores a game program. The game program includes a symbol determination program. The symbol determination program is a program for determining symbols to be rearranged in the display blocks 28.

The symbols to be determined by the symbol determination program include 14 types of symbols including "3bar", "2bar", "1bar", "blue7", "red7", "white7", "RIBBON", "HEART", "STAR", "NMOON", "SUN", "JEWEL", "CROWN", and "SMILE".

Further, the card slot 53S is configured so as to allow the memory card 53 to be inserted thereinto or removed therefrom, and is connected to the mother board 40 by an IDE bus. Therefore, the type and contents of a game played on the slot machine 10 can be changed by removing the memory card 53 from the card slot 53S, writing another game program into the memory card 53, and inserting the memory card 53 into the card slot 53S. The game program includes a program according to progress of the game. Further, the game program includes image data and sound data to be outputted during the game.

The CPU 51, the ROM 55 and the boot ROM 52 interconnected to one another by an internal bus are connected to the mother board 40 through a PCI bus. The PCI bus not only conducts signal transmission between the mother board 40 and the gaming board 50, but also supplies power from the mother board 40 to the gaming board 50.

The mother board 40 is configured using a commercially available general-purpose mother board (a print wiring board on which fundamental components of a personal computer are mounted), and provided with a main CPU 41, a ROM (Read Only Memory) 42, a RAM (Random Access Memory) 43, and a communication interface 44. The mother board 40 corresponds to the controller of the present invention.

The ROM 42 comprises a memory device such as a flash memory, and stores a program such as a BIOS (Basic Input/Output System) executed by the main CPU 41 and permanent data. When the BIOS is executed by the main CPU 41, processing for initializing a predetermined peripheral device is conducted, concurrently with start of processing for loading the game program stored in the memory card 53 via the gaming board 50. It is to be noted that, in the present invention, the ROM 42 may or may not be data rewritable one.

The ROM 42 includes: data indicative of a predetermined time T; odds data indicative of correspondence relationships (see FIGS. 14A to 14C) between combinations of symbols rearranged along the winning line and the numbers of payouts; data indicative of a first constant number; data indicative of a second constant number; and the like.

The RAM 43 stores data and a program to be used at the time of operation of the main CPU 41. Further, the RAM 43 is capable of storing a game program.

Moreover, the RAM 43 stores data of the number of credits, the numbers of coin-ins and coin-outs in one game, and the like.

Moreover, the mother board 40 is connected with a later-described body PCB (Printed Circuit Board) 60 and a door PCB 80 through respective USBs. Further, the mother board 40 is connected with a power supply unit 45 and the communication interface 44. The communication interface 44 is connected with a communication interface 245 of the PTS terminal 64 through a communication line.

The body PCB 60 and the door PCB 80 are connected with an instrument and a device that generate an input signal to be inputted into the main CPU 41 and an instrument and a device operations of which are controlled by a control signal outputted from the main CPU 41. The main CPU 41 executes the game program stored in the RAM 43 based on the input signal inputted into the main CPU 41, and thereby executes the predetermined arithmetic processing, stores the result thereof into the RAM 43, or transmits a control signal to each instrument and device as processing for controlling each instrument and device.

The body PCB 60 is connected with a lamp 30, a hopper 66, a coin detecting portion 67, a graphic board 68, the speaker 29, the touch panel 69, the ticket printer 35, a key switch 38S, the data display 37, and a timer 61.

The hopper 66 is installed inside the cabinet 11, and pays out a predetermined number of coins based on the control signal outputted from the main CPU 41, from a coin payout exit 19 to the coin tray 18. The coin detecting portion 67 is provided inside the coin payout exit 19, and outputs an input signal to the main CPU 41 in the case of detecting payout of the predetermined number of coins from the coin payout exit 19.

The timer 37 is used for measuring the time.

The graphic board 68 controls image display to the upper image display panel 33 and the lower image display panel 16 based on the control signal outputted from the main CPU 41. In the respective display blocks 28 on the lower image display panel 16, symbols are displayed in a scrolling manner or in a stopped state. The number of credits stored in the RAM 43 is displayed to the number-of-credits display portion 31 of the lower image display panel 16. Further, the number of coin-outs is displayed to the number-of-payouts display portion 32 of the lower image display panel 16.

The graphic board 68 comprises a VDP (Video Display Processor) for generating image data based on the control signal outputted from the main CPU 41, a video RAM for temporarily storing image data generated by the VDP, and the like. It is to be noted that image data used in generation of the image data by the VDP is included in the game program read from the memory card 53 and stored into the RAM 43.

Based on the control signal outputted from the main CPU 41, the ticket printer 35 prints on a ticket a barcode as coded data of the number of credits stored in the RAM 43, a date, and an identification number of the slot machine 10, and the like, and outputs the ticket as the ticket 39 with a barcode. The key switch 38S is provided on the key pad 38, and outputs a predetermined input signal to the main CPU 41 when the key pad 38 is operated by the player. The data display 37 displays data inputted by the player via the key pad 38, and the like, based on the control signal outputted from the main CPU 41.

The door PCB 80 is connected with the control panel 20, a reverter 21S, and a cold cathode tube 81. The control panel 20 is provided with a start switch 23S corresponding to the start button 23, a change switch 24S corresponding to the change button 24, a CASHOUT switch 25S corresponding to the CASHOUT button 25, a 1-BET switch 26S corresponding to the 1-BET button 26, and a maximum BET switch 27S corresponding to the maximum BET button 27. Each of the switches 23S to 27S outputs an input signal to the main CPU 41 when each of the buttons 23 to 27 corresponding thereto is operated by the player.

The reverter 21S operates based on the control signal outputted from the main CPU 41, and distributes a coin into a cash box (not shown) or the hopper 66, which are disposed in the slot machine 10. Namely, when the hopper 66 is filled with coins, a regular coin is distributed into the cash box by the reverter 21S. On the other hand, when the hopper 66 is not filled with coins, the regular coin is distributed into the hopper 66. The cold cathode tube 81 functions as a back light installed on the rear face side of the lower image display panel 16 and the upper image display panel 33, and lighted up based on the control signal outputted from the main CPU 41.

FIG. 6 is a block diagram illustrating an internal configuration of a PTS terminal forming the gaming system according to one embodiment of the present invention.

The PTS terminal 64 includes a CPU 241, a ROM 242, a RAM 243, a connecting portion 244, and the communication interface 245. The communication interface 245 is connected to the communication interface 44 of a single slot machine 10 that is in a correspondence relationship with this PTS terminal 64, through a communication line, and is also connected to the management server block 220 through a communication line. The ROM 242 stores: a system program for controlling operations of the PTS terminal 64; exchange-fee calculated value data; permanent data; and the like. The exchange-fee calculated value data is data indicating the exchange-fee calculated value P/1−P (where P is an exchange fee ratio). Further, the RAM 243 temporarily stores exchange rate data indicating an exchange rate in which a correspondence relationship between the amount of the basic currency (U.S. currency) and the amount of another type of currency other than the basic currency is set for each type of currency other than the basic currency, and the like.

The connecting portion 244 is connected through communication lines the bill validator 22, the to-be-exchanged bill validator 65, a coin counter 21C, a camera module 254, a Radio Frequency Identification reader (PRID-R) 255, and the IC card reader/writer (IC card R/W) 253.

The bill validator 22 not only discriminates a regular bill (basic currency) from a false bill, but also accepts the regular bill. When having accepted a regular bill, the bill validator 22 outputs an input signal to the CPU 241, based on the face amount of the bill. That is, an input signal includes information about the amount of the accepted bill.

The to-be-exchanged bill validator 65 identifies the types of bills of a plurality of countries which are currencies other than the basic currency and discriminates a regular bill from a false bill, and accepts the regular bill. When having accepted the regular bill, the to-be-exchanged bill validator 65 outputs an input signal to the CPU 241, based on the type and the amount of the bill. An input signal includes type-of-currency data indicating the identified type of the currency and amount-of-currency data indicating the amount of this currency. That is, an input signal includes information about the type and the amount of the accepted bill.

The coin counter 21C is provided inside the coin receiving slot 21, and discriminates a regular coin from a false coin inserted into the coin receiving slot 21 by the player. Coins other than the regular coin are discharged from the coin payout exit 19. Further, the coin counter 21C outputs an input signal to the CPU 241 in detection of the regular coin.

The camera module 254 (not illustrated) is provided at the front face of the slot machine 10, and captures a facial image of the player. The camera module 254 outputs the captured image data to the CPU 241. The CPU 241 then transmits the image data to the image server 267.

The RFID-R 255 receives radio waves emitted by RFID tags carried by the staff members of the casino. The RFID-R 255 outputs a reception signal to the CPU 241, based on the received radio waves. A reception signal includes information for identifying the RFID tag from which the received radio waves have been emitted. The CPU 241 then transmits the reception signal to the staff management server 263. The staff management server 263, having received the reception signal transmitted from the CPU 241, recognizes the current location of each staff member within the casino, based on the reception signal.

The IC card R/W 253 reads data from an IC card and transmits the data to the CPU 241, or writes data into the IC card based on a control signal from the CPU 241.

Figure 7:
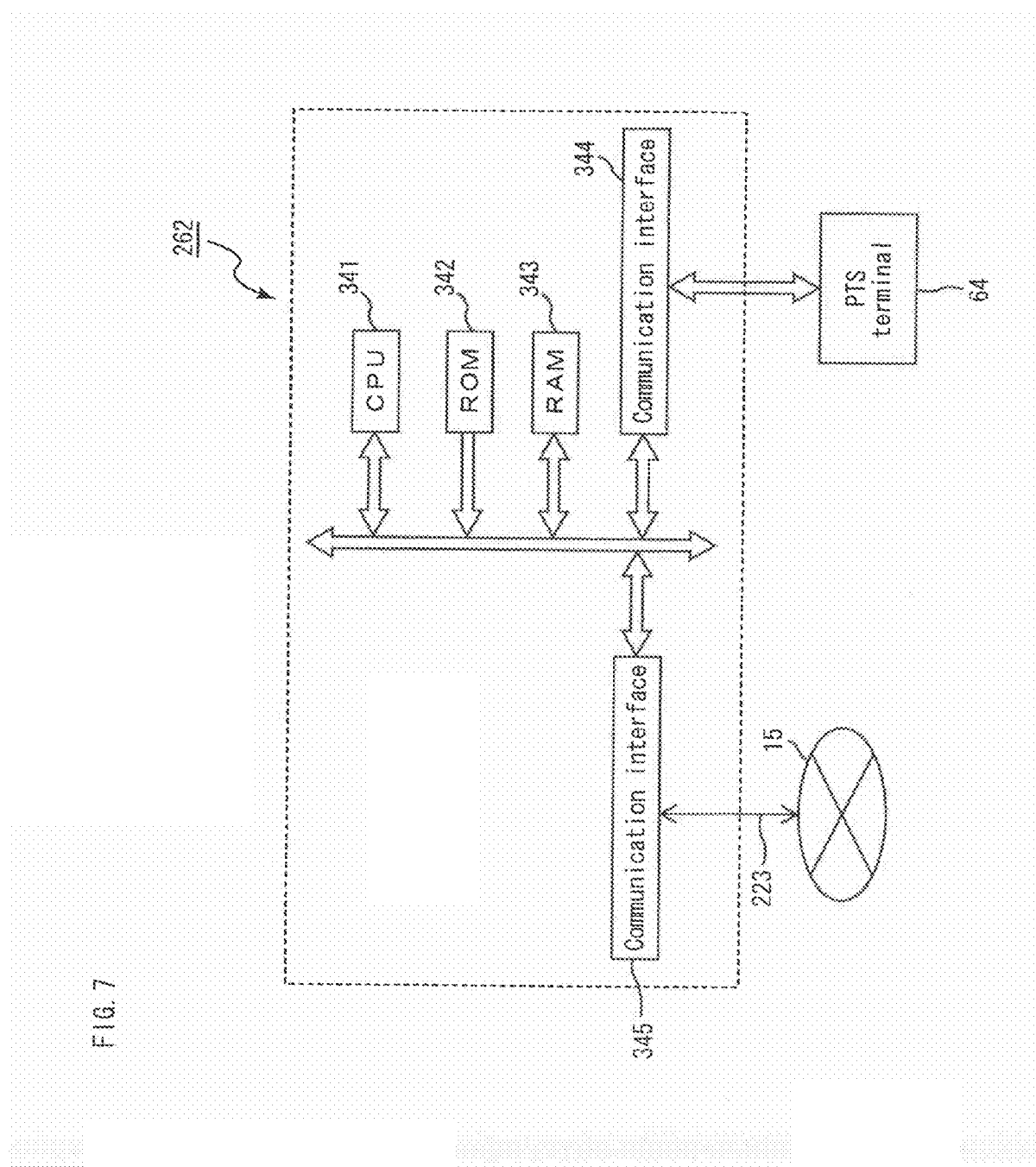
FIG. 7 is a block diagram illustrating an internal configuration of an exchange server forming the gaming system according to one embodiment of the present invention.

FIG. 7 is a block diagram illustrating an internal configuration of an exchange server forming the gaming system according to one embodiment of the present invention.

The exchange server 262 includes a CPU 341, a ROM 342, a RAM 343, a communication interface 344, and a communication interface 345. The communication interface 344 is connected to the communication interface 245 of the PTS terminal 64 through a communication line. The communication interface 345 is connected to the Internet 15 through the communication line 223. The ROM 342 stores; a system program for controlling operations of the exchange server 262; an exchange information acquisition program for acquiring the latest exchange information via the Internet 15; permanent data; fee data indicating the exchange fee ratio P; and the like. Further, the RAM 343 temporarily stores exchange information, exchange information of post-fee-subtraction, and the like.

Figure 8:
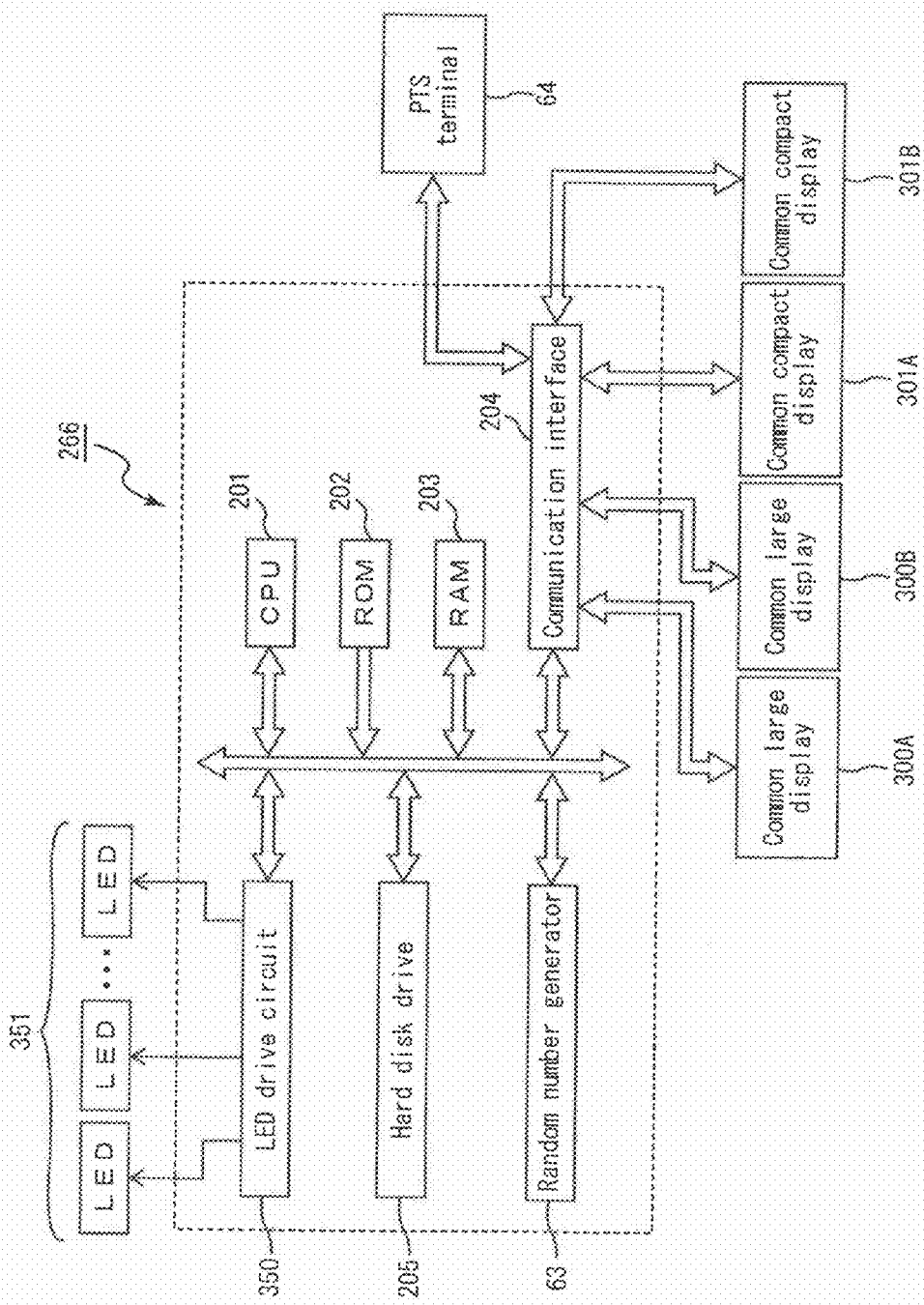
FIG. 8 is a block diagram illustrating an internal configuration of a progressive-jackpot server forming the gaming system according to one embodiment of the present invention.

FIG. 8 is a block diagram illustrating an internal configuration of a progressive-jackpot server forming the gaming system according to one embodiment of the present invention.

The progressive-jackpot server 266 includes a CPU 201, a ROM 202, a RAM 203, a communication interface 204, a LED drive circuit 350, a random number generator 63, and a hard disk drive 205 as a memory. The random number generator 63 generates a random number at a predetermined timing. The communication interface 204 is connected through communication lines to the communication interfaces 245 of the PTS terminals 64, and also is connected to the common large display 300A, the common large display 300B, the common compact display 301A, and the common compact displays 301B through communication lines. The ROM 202 stores a system program for controlling the operation of the progressive-jackpot server 266, permanent data, and the like. Further, the RAM 203 temporarily stores cumulative-value data for EVENT TIME indicative of the cumulative value for EVENT TIME, cumulative-value data for bonus indicative of the cumulative value for bonus, number-of-lights data indicative of the number of the LEDs 351 having been lighted among the LEDs 351 included in the coupling illumination line 310 provided for each of the slot machines 10, data received from each of the slot machines 10, and the like.

The CPU 201 corresponds to the control portion of the present invention.

In the hard disk drive 205, number-of-lighting determination table data indicative of a plurality of types of number-of-lighting determination tables (a number-of-lighting determination table for bent portions and a number-of-lighting determination table for straight portions) is stored.

Further, in the hard disk drive 205, number-of-points determination table data to be referred to in determining the number of points in the common game is stored.

Furthermore, in the hard disk drive 205, data indicative of the predetermined value and data indicative of the specific value are stored.

The plurality of LEDs 351 are connected to the LED drive circuit 350. The LEDs 351 are associated with respective identification numbers, and the LED drive circuit 350 turns on and turns off the LEDs 351 based on a signal received from the CPU 201.

Figure 9:
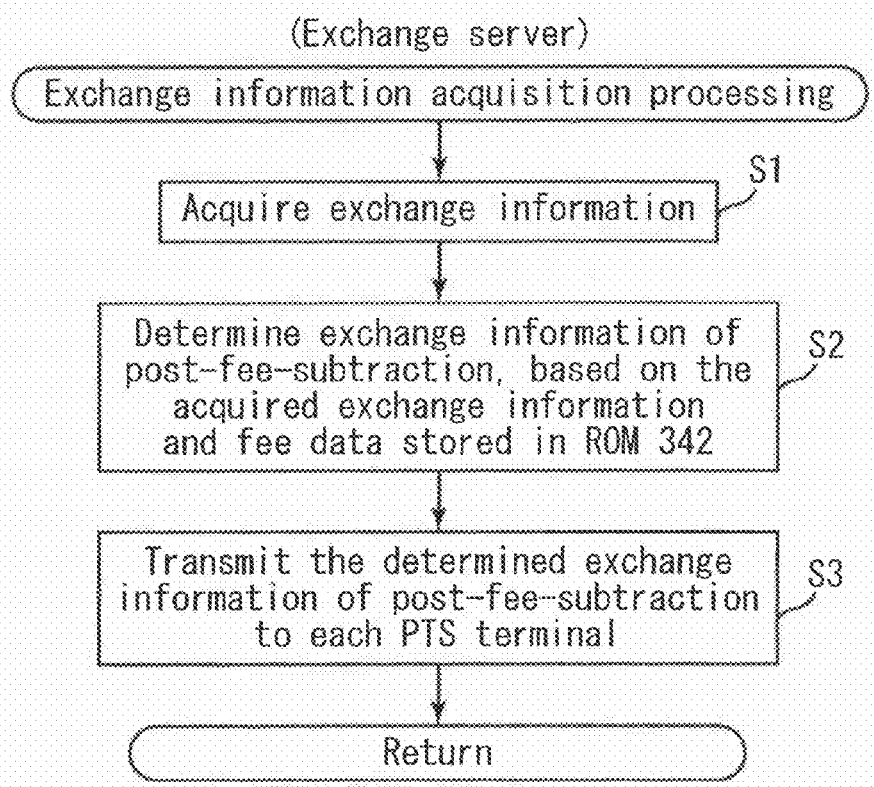
FIG. 9 is a flowchart illustrating exchange-information acquisition processing conducted in the exchange server.

FIG. 9 is a flowchart illustrating exchange information acquisition processing conducted in the exchange server.

The exchange information acquisition processing is processing executed at a predetermined timing.

First, the CPU 341 executes the exchange information acquisition program stored in the ROM 342 so as to acquire the latest exchange information via the Internet 15 (step S1). In the processing, the CPU 341 acquires, for example, information indicating a correspondence relationship between the amount of U.S. currency and the amount of Japanese currency (e.g. 1 dollar=100 yen) at a certain timing. The CPU 341 also acquires, for example, information indicating a correspondence relationship between the amount of U.S. currency and the amount of Chinese currency (e.g. 1 dollar=6.85 yuan) at another timing. It is to be noted that the association between the amount M of U.S. currency and the amount N of currency of another country is described as M=N, in the present specification.

The CPU 341 then determines exchange information of post-fee-subtraction, based on the exchange information acquired in step S1 and the fee data stored in the ROM 342 (step S2). In the processing, in the correspondence relationships indicated by the exchange information, the CPU 341 determines exchange information of post-fee-subtraction by multiplying the amount of currency of a country other than the U.S. by a value obtained by subtracting the exchange fee ratio (0.02 in the present embodiment) indicated by the fee data from 1. For example, when the acquired exchange information indicates that 1 dollar is equivalent to 100 yen, the CPU 341 determines information indicating that 0.98 dollar, obtained by multiplying 1 dollar by (1−0.02), is equivalent to 100 yen, as the exchange information of post-fee-subtraction.

The CPU 341 transmits the exchange information of post-fee-subtraction determined in step S2 to each PTS terminal 64 (step S3). After executing the processing of step S3, the CPU 341 completes the exchange information acquisition processing.

Figure 10:
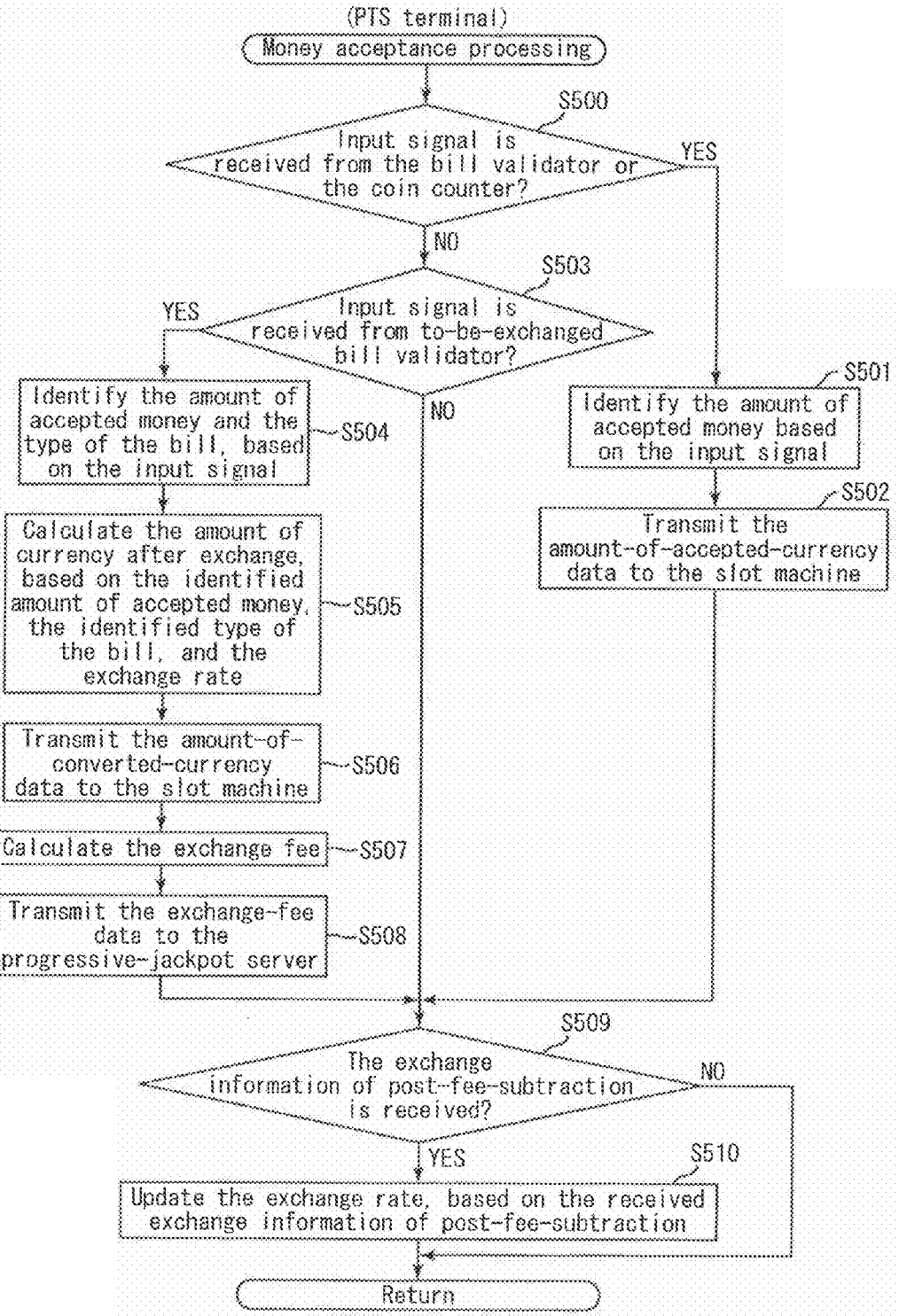
FIG. 10 is a flowchart illustrating money acceptance processing conducted in the PTS terminal illustrated in FIG. 6.

FIG. 10 is a flowchart illustrating money acceptance processing conducted in the PTS terminal illustrated in FIG. 6.

First, the CPU 241 determines whether or not it has received an input signal from the bill validator 22 or the coin counter 21C at a predetermined timing (step S500).

When determining in step S500 that the CPU 241 has received an input signal, the CPU 241 identifies the amount of accepted money based on the received input signal (step S501). The CPU 241 then transmits the amount-of-accepted-currency data indicating the identified amount of accepted money to the correspondingly related slot machine 10 (step S502).

On the other hand, when determining in step S500 that the CPU 241 has not received an input signal, the CPU 241 determines whether or not it has received an input signal from the to-be-exchanged bill validator 65 (step S503).

When determining in step S503 that the CPU 241 has received an input signal, the CPU 241 identifies the amount of accepted money and the type of the bill accepted by the to-be-exchanged bill validator 65, based on the type-of-currency data and the amount-of-currency data included in the received input signal (step S504).

The CPU 241 calculates the amount of currency (e.g. 98 dollars) after exchange into the U.S. currency, which is the basic currency, based on the amount of accepted money (e.g. 10,000 yen) and the type of the bill which have been identified in step S504, and the exchange rate (e.g. 0.98 dollar=100 yen) indicated by the exchange rate data stored in the RAM 243 (step S505). The CPU 241 then transmits the amount-of-converted-currency data indicating the amount of exchanged currency (hereinafter, also referred to as the amount of converted currency) to the correspondingly related slot machine 10 (step S506). It is to be noted that the amount-of-accepted-currency data combined with the amount-of-converted-currency data is described as the amount-of-currency data.

The CPU 241 calculates the exchange fee, based on the amount-of-converted-currency data indicating the amount of converted currency calculated in step S505 and on exchange-fee calculated value data indicating the exchange-fee calculated value stored in the ROM 242 (step S507). The exchange fee corresponds to an amount (e.g. 2 dollars) obtained by multiplying the amount of converted currency (e.g. 98 dollars) calculated in step S505 by the exchange-fee calculated value P/1−P (where P is the exchange fee ratio (0.02 dollar in the present embodiment)) (the exchange-fee calculated value is 2/98 in the present embodiment). The CPU 241 then transmits exchange-fee data indicating the exchange fee to the progressive-jackpot server 266 (step S508).

When executing the processing of step S502 or step S508, or when determining in step S503 that the CPU 241 has not received an input signal, the CPU 241 determines whether or not it has received the exchange information of post-fee-subtraction from the exchange server 262 (step S509).

When determining in step S509 that the CPU 241 has received the exchange information of post-fee-subtraction, the CPU 241 updates the exchange rate data stored in the RAM 243 based on the received exchange information of post-fee-subtraction (step S510). For example, when the CPU 241 has received the exchange information of post-fee-subtraction, which indicates a correspondence relationship of 1 dollar=110 yen, in a case where the correspondence relationships among the respective currencies in the exchange rates indicated by the exchange rate data stored in the RAM 243 are 1 dollar=100 yen=0.68 euro=6.85 yuan, the CPU 241 stores into the RAM 243 the exchange rate data indicating a new exchange rate of 1 dollar=110 yen=0.68 euro=6.85 yuan.

In the present embodiment, a case is described where the exchange server 262 having received the exchange information determines the exchange information of post-fee-subtraction, based on the received exchange information, and transmits the determined exchange information of post-fee-subtraction to the PTS terminals 64. That is, the exchange server 262 conducts the processing related to collection of exchange fees. However, in the present invention, the PTS terminal may conduct the processing related to collection of exchange fees.

In this case, for example, a configuration as described below can be adopted.

Namely, the ROM in the PTS terminal stores the fee data indicating the exchange fee ratio P. The CPU in the PTS terminal receives the exchange information form the exchange server. Next, the CPU in the PTS terminal determines the exchange information of post-fee-subtraction, based on the fee data stored in the ROM. The CPU in the PTS terminal then updates the exchange rate data based on the determined exchange information of post-fee-subtraction.

Further, in the present invention, the exchange rate data may be stored in the RAM in the exchange server, and the CPU in the exchange server may update the exchange rate data based on the exchange information of post-fee-subtraction and transmits the updated exchange rate data to the PTS terminal.

Alternatively, the exchange server may receive the exchange rate data from an external source.

When executing the processing of step S510 or when determining in step S509 that the CPU 241 has not received the exchange information of post-fee-subtraction, the CPU 241 completes the money acceptance processing.

Figure 11:
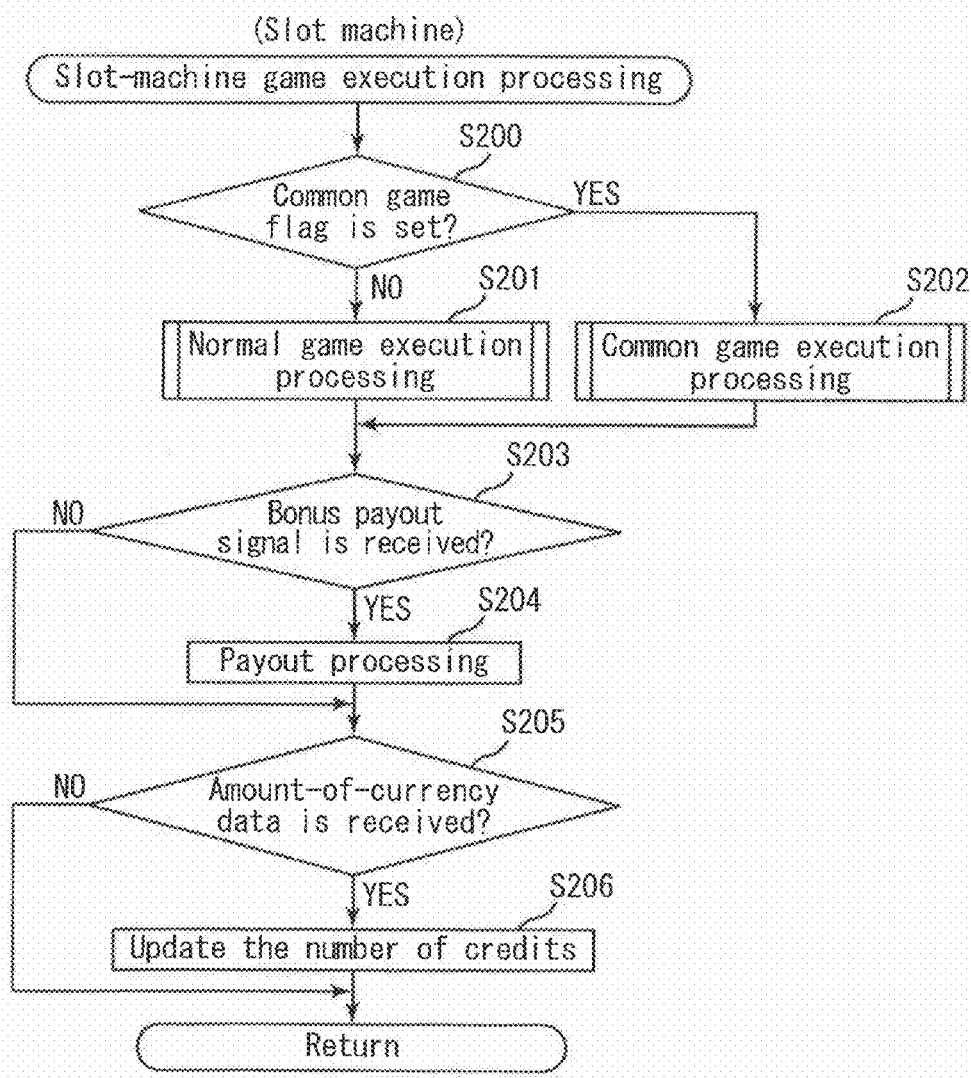
FIG. 11 is a flowchart illustrating slot-machine game execution processing executed in a slot machine.

FIG. 11 is a flowchart illustrating slot-machine game execution processing executed in the slot machines.

First, the main CPU 41 determines whether or not a common-game flag is set (step S200).

Figure 12:
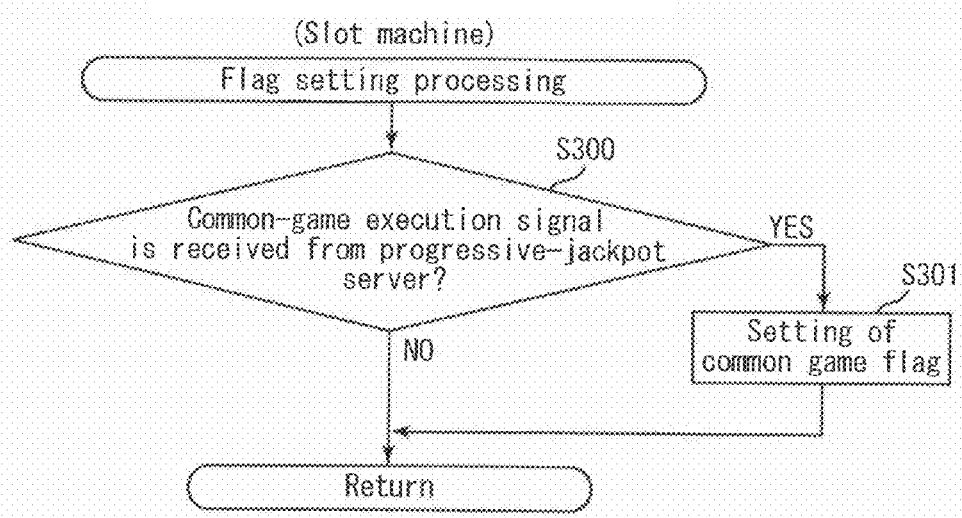
FIG. 12 is a flowchart illustrating a subroutine of flag setting processing.

With reference to FIG. 12, the common-game flag is described.

FIG. 12 is a flowchart illustrating a subroutine of flag setting processing.

First, the main CPU 41 determines at a predetermined timing whether or not it has received a common-game execution signal (see FIG. 18) from the progressive-jackpot server through the PTS terminal 64 (step S300).

When determining that the main CPU 41 has not received the common-game execution signal, the main CPU 41 completes the present subroutine.

On the other hand, when determining that the main CPU 41 has received the common-game execution signal, the main CPU 41 sets a common-game flag (step S301) and completes the present subroutine.

As described above, the common-game flag is a flag indicative of a satisfaction of a condition for executing the common game.

When determining in step S200 in FIG. 11 that the common-game flag is not set, the main CPU 41 executes normal game execution processing (step S201). The normal game execution processing will be described in more detail later with reference to the drawing.

On the other hand, when determining that a common-game flag is set, the main CPU 41 conducts common game execution processing (step S202). The common game execution processing will be described in more detail later with reference to the drawing.

Next, the main CPU 41 determines whether or not it has received a bonus payout signal (see FIG. 18) from the progressive-jackpot server 266 through the PTS terminal 64 (step S203).

When determining that the main CPU 41 has received the bonus payout signal, the main CPU 41 pays out the coins (step S204). In the case of receiving the bonus payout signal including information indicating that this slot machine 10 is a first winning slot machine 10, the main CPU 41 pays out a first fixed number of coins. On the other hand, in the case of receiving the bonus payout signal including information indicating that this slot machine 10 is a second winning slot machine 10, the main CPU 41 pays out a second fixed number of coins. The value of the first fixed number is larger than the value of the second fixed number. Namely, the number of coins paid out to the first winning slot machine 10 is larger than the number of coins paid out to the second winning slot machine 10.

After executing the processing of step S204 or when determining in step S203 that the main CPU 41 has not received the bonus payout signal, the main CPU 41 determines whether or not it has received the amount-of-currency data (the amount-of-accepted-currency data, the amount-of-converted-currency data) from the PTS terminal 64 (step S205). Namely, the main CPU 41 determines whether or not it has received either the amount-of-accepted-currency data transmitted in step S502 or the amount-of-converted-currency data transmitted in step S506.

When determining in step S205 that the main CPU 41 has received the amount-of-currency data, the main CPU 41 updates the number of credits based on the received amount-of-currency data (step S206). Namely, the main CPU 41 conducts the processing of adding the number of credits equivalent to the amount of currency indicated by the received amount-of-currency data to the number of credits stored in the RAM 43.

The number of credits equivalent to the amount of currency indicated by the received amount-of-currency data corresponds to the BET value of the present invention.

After executing the processing of step S206 or when determining in step S205 that the main CPU 41 has not received the amount-of-currency data, the main CPU 41 completes the present subroutine.

Figure 13:
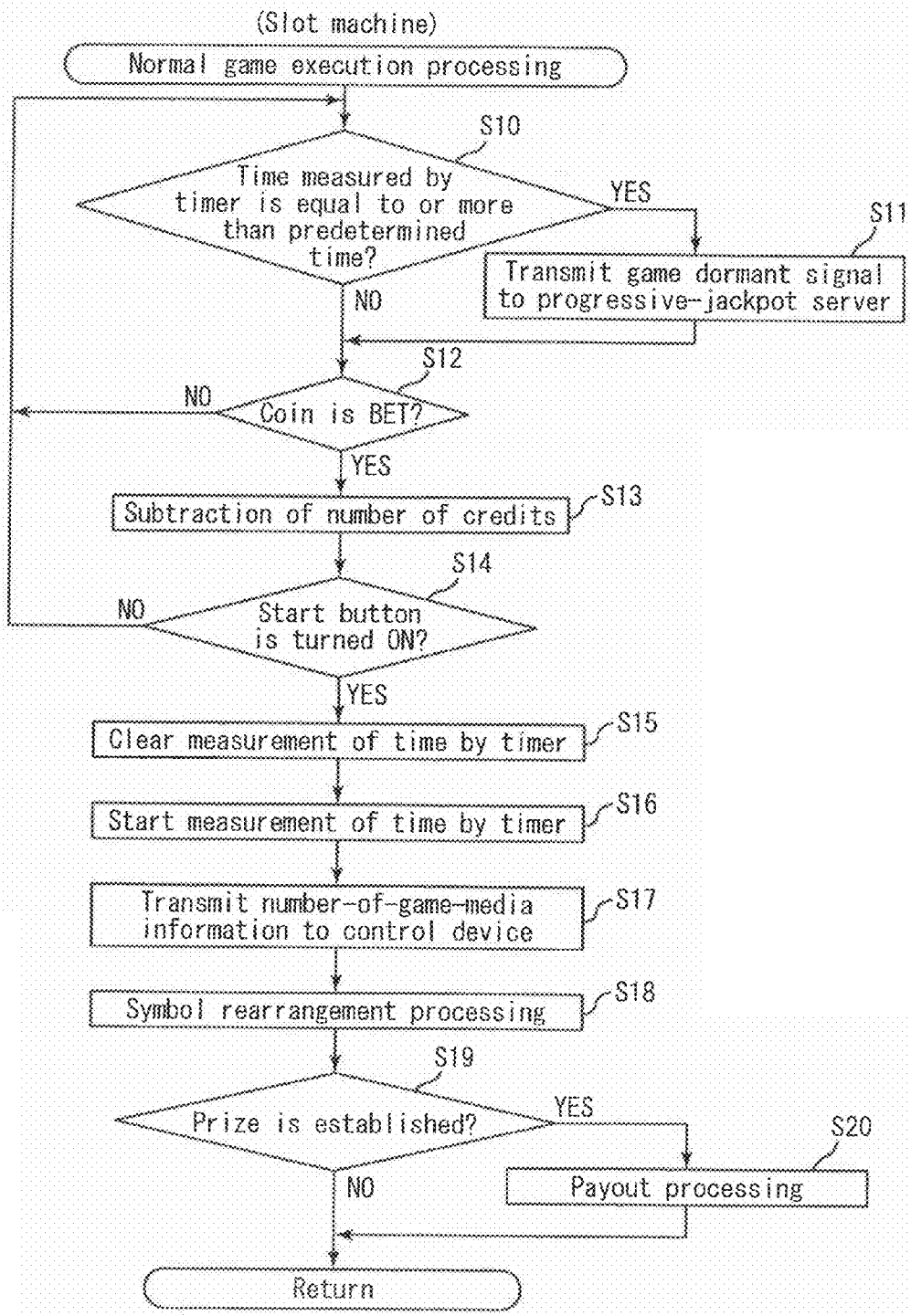
FIG. 13 is a flowchart illustrating a subroutine of normal game execution processing.

FIG. 13 is a flowchart illustrating a subroutine of normal game execution processing.

FIG. 14A to FIG. 14C are views illustrating correspondence relationships between the combinations of symbols rearranged along a winning line and the number of payouts.

Figure 15:
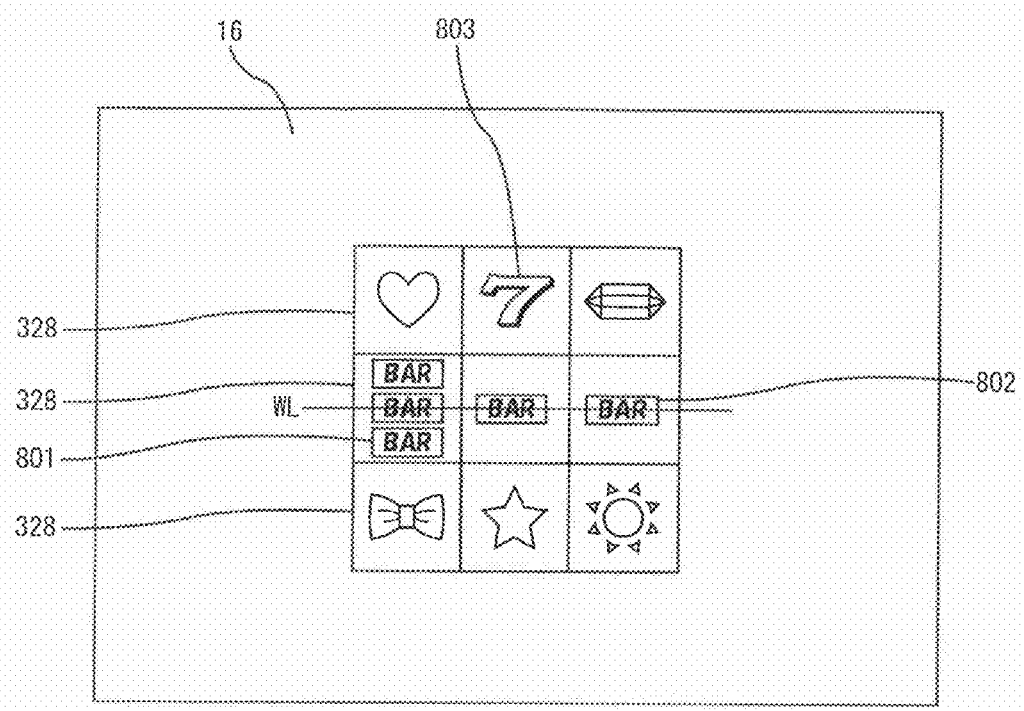
FIG. 15 is a view illustrating exemplary symbols rearranged to a display block.

FIG. 15 is a view illustrating exemplary symbols rearranged in the display blocks.

First, the main CPU 41 determines whether or not the time measured by the timer 37 is equal to or more than the predetermined time T (step S10).

When determining in step S10 that the measured time is not equal to or more than the predetermined time T, the main CPU 41 shifts the processing to step S12. On the other hand, when determining in step S10 that the measured time is equal to or more than the predetermined time T, the main CPU 41 transmits a game dormant signal to the progressive-jackpot server 266 through the PTS terminal 64 (step S11). The game dormant signal includes the identification number of the slot machine 10.

The main CPU 41 determines whether or not a coin has been betted (step S12). In this processing, the main CPU 41 determines whether or not it has received an input signal that is outputted from the 1-BET switch 26S when the 1-BET button 26 is operated, or an input signal that is outputted from the maximum BET switch 27S when the maximum BET button 27 is operated. When the main CPU 41 determines that the coin has not been betted, the main CPU 41 returns the processing to step S10.

On the other hand, when determining in step S12 that the coin has been betted, the main CPU 41 conducts processing for making a subtraction from the number of credits stored in the RAM 43 according to the number of betted coins (step S13). It is to be noted that, when the number of coins to be betted is larger than the number of credits stored in the RAM 43, the main CPU 41 does not conduct the processing for making a subtraction from the number of credits stored in the RAM 43, and returns the processing to step S10. Further, when the number of coins to be betted exceeds the upper limit of the number of coins that can be betted in one game (three coins in the present embodiment), the main CPU 41 does not conduct the processing for making a subtraction from the number of credits stored in the RAM 43, and advances the processing to step S14.

Next, the main CPU 41 determines whether or not the start button 23 has been turned ON (step S14). In this processing, the main CPU 41 determines whether or not it has received an input signal that is outputted from the start switch 23S when the start button 23 is pressed.

When the main CPU 41 determines that the start button 23 has not been turned ON, the processing is returned to step S10.

It is to be noted that, when the start button 23 is not turned ON (e.g. when the start button 23 is not turned ON and a command to end the game is inputted), the main CPU 41 cancels a subtraction result in step S13.

On the other hand, when determining in step S14 that the start button 23 has been turned ON, the main CPU 41 clears the time measured by the timer 37 (step S15) and starts measurement of the time by the timer 37 (step S16).

The main CPU 41 transmits the number-of-game-media information indicative of the number of betted coins to the progressive-jackpot server 266 through the PTS terminal 64 (step S17). The number-of-game-media information includes the identification number of the slot machine 10.

Next, the main CPU 41 executes symbol rearrangement processing (step S18).

In this processing, first, the main CPU 41 starts scroll-display of symbols in the display blocks 28. Then, the main CPU 41 executes the aforementioned symbol determination program so as to determine the symbols to be rearranged, and then rearranges the symbols in the display blocks 28.

Next, the main CPU 41 determines whether or not a prize has been established (step S19).

As shown in FIG. 15, in display blocks 328 according to the present embodiment, nine symbols in total can be rearranged in three rows and three columns. Along the center row, a winning line WL is set. When symbols rearranged along the winning WL form a predetermined combination, it is determined that a prize has been established and coins are paid out.

As shown in FIG. 14A to FIG. 14C, in the present embodiment, it is configured such that the relationships between the combinations of symbols and the numbers of coin-outs vary in a case where the number of betted coins is one, a case where the number of betted coins is two, and a case where the number of betted coins is three. In the drawing, "3bar" is a symbol 801 shown in FIG. 15, and "1bar" is a symbol 802 shown in FIG. 15. Also, "anybar" is any of the symbols out of "3bar", "2bar", and "1bar".

Here, when the number of bets is equal to or less than two, an establishment of a prize refers to an establishment of at least one combination of symbols out of the combinations of symbols of "3bar×3", "2bar×3", "1bar×3" and "anybar×3", along the winning WL (see FIGS. 14A and 14B). When the number of bets is three, an establishment of a prize refers to an establishment of at least one combination of symbols out of the combinations of symbols of "blue7×3", "red7×3", and "white7×3", along the winning line WL (see FIG. 14C).

When determining that a prize has been established, the main CPU 41 executes processing relating to the payout of coins (step S20). In the processing, the main CPU 41 pays out coins of the number that is determined based on the data indicating the relationships between the combinations of symbols and the numbers of coin-outs (see FIGS. 14A to 14C).

For example, when a combination of symbols of "3bar-1bar-1bar" is rearranged along the winning line WL in a game in which one coin has been betted, this combination corresponds to a combination "anybar-anybar-anybar", and thus ten coins will be paid out.

In the case of accumulating coins, the main CPU 41 conducts processing for adding the number of credits corresponding to the determined amount of payout to the number of credits stored in the RAM 43. On the other hand, in the case of paying out coins, the main CPU 41 transmits a control signal to the hopper 66 in order to pay out coins in an amount corresponding to the determined amount of payout.

When determining in step S19 that no prize has been established or after executing the processing of step S20, the main CPU 41 completes the present subroutine.

Subsequently, the common game execution processing is described with reference to FIG. 16.

Figure 16:
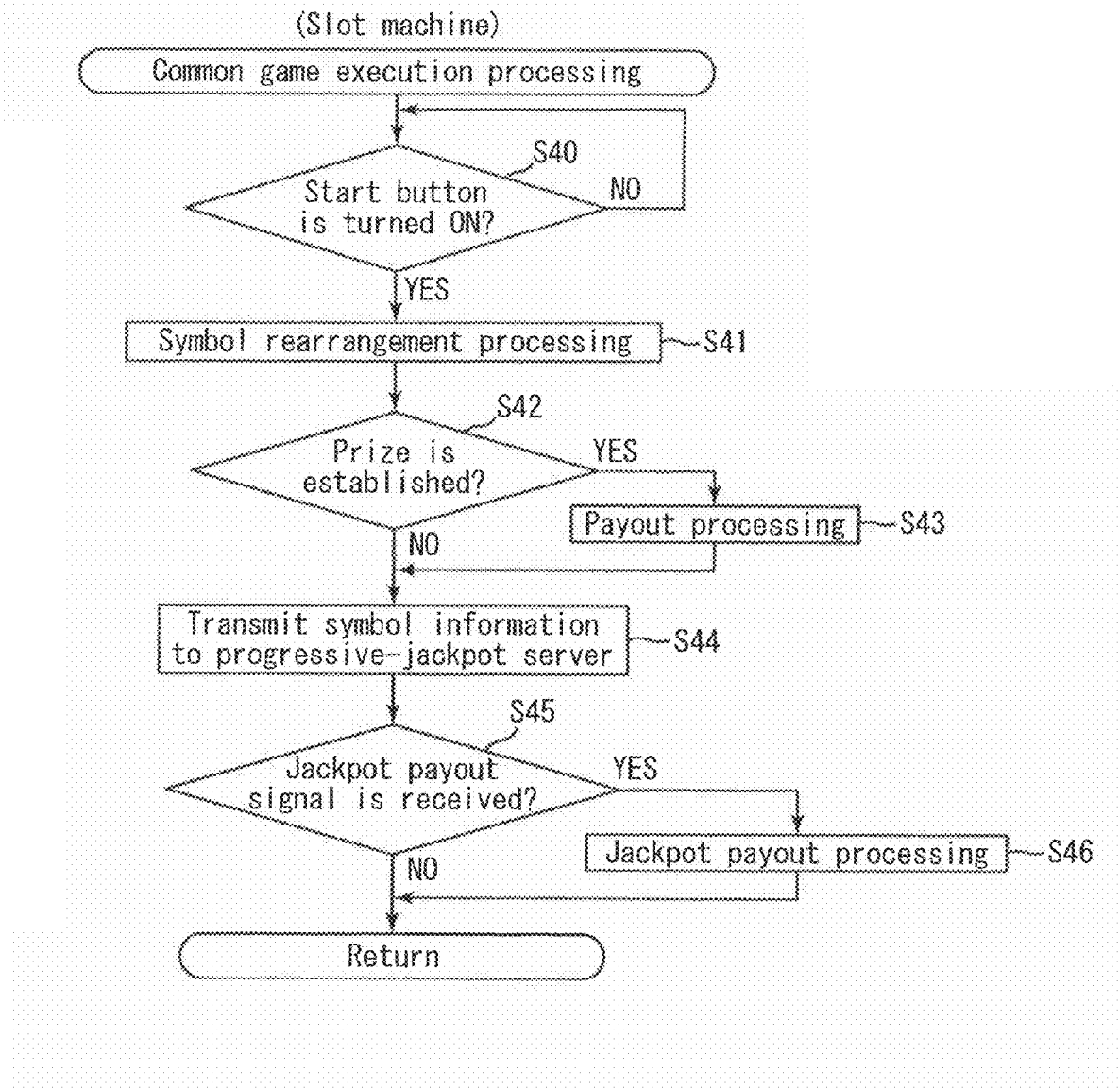
FIG. 16 is a flowchart illustrating a subroutine of common-game execution processing.

FIG. 16 is a flowchart illustrating a subroutine of the common game execution processing.

First, the main CPU 41 executes processing of steps S40 to S43, and the processing is substantially the same as the processing of step S14 and steps S18 to S20 in FIG. 13. Here, only the parts different from step S14 and steps S18 to S20 in FIG. 13 will be described.

When determining in step S42 that no prize has been established or after executing the processing of step S43, the main CPU 41 transmits symbol information to the progressive-jackpot server 266 through the PTS terminal 64 (step S44). The symbol information is information indicative of the symbols rearranged in step S41.

Next, the main CPU 41 determines whether or not it has received a jackpot payout signal from the progressive-jackpot server 266 through the PTS terminal 64 (step S45). The jackpot payout signal is a signal transmitted from the progressive-jackpot server 266 to any of the slot machines 10, through the PTS terminal 64, when all the LEDs 351 included in the coupling illumination line 310 provided for this slot machine 10 have been lighted (see FIG. 20). The jackpot payout signal includes information indicative of the cumulative value for EVENT TIME.

When determining that the main CPU 41 has received a jackpot payout signal, the main CPU 41 executes jackpot payout processing (step S46). In this processing, the main CPU 41 pays out coins in number corresponding to the cumulative value for EVENT TIME, based on the information indicative of the cumulative value for EVENT TIME which is included in the jackpot payout signal. Examples of the processing executed by the main CPU 41 in step S46 include outputting an annunciation sound from the speaker 29, lighting the lamp 30, and printing the ticket 39 with a barcode, which has a barcode indicative of the number of coins to be paid out printed thereon.

When determining in step S45 that the main CPU 41 has not received a jackpot payout signal or after executing the processing of step S46, the main CPU 41 completes the present subroutine.

Next, there is described processing performed in the progressive-jackpot server 266.

Figure 17:
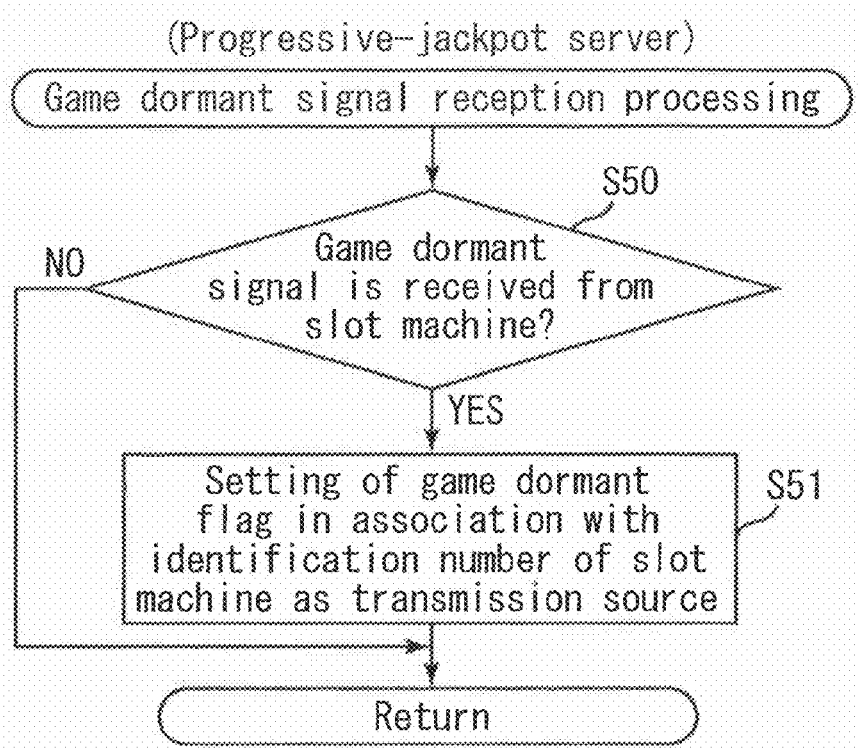
FIG. 17 is a flowchart illustrating a subroutine of game dormant signal reception processing.

FIG. 17 is a flowchart illustrating a subroutine of game dormant signal reception processing.

First, the CPU 201 determines whether or not it has received a game dormant signal (see FIG. 13) at a predetermined timing from the slot machine 10 through the PTS terminal 64 (step S50).

When determining that the CPU 201 has not received the game dormant signal, the CPU 201 completes the present subroutine. On the other hand, when determining that the CPU 201 has received a game dormant signal, the CPU 201 sets a dormant flag in association with the identification number of the slot machine 10 included in the received game dormant signal (step S51).

Figure 18:
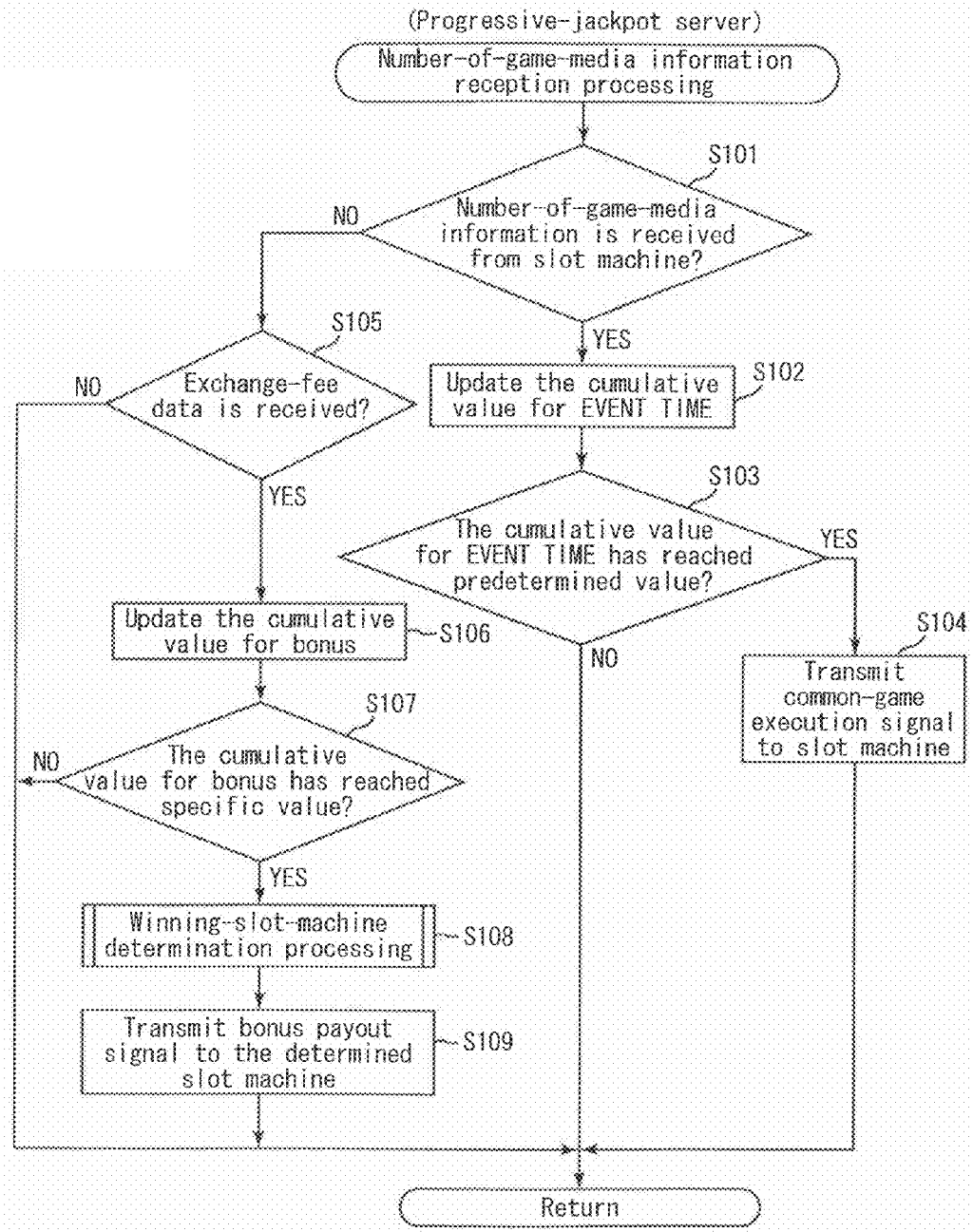
FIG. 18 is a flowchart illustrating a subroutine of number-of-game-media information reception processing.

FIG. 18 is a flowchart illustrating a subroutine of number-of-game-media information reception processing.

First, the CPU 201 determines whether or not it has received the number-of-game-media information from the slot machine 10 through the PTS terminal 64 at a predetermined timing (step S101).

When determining that the CPU 201 has received the number-of-game-media information, the CPU 201 adds a part (the number obtained by subtracting 1 from the number of coins indicated by the number-of-game-media information, in the present embodiment) of the number of coins indicated by the received number-of-game-media information to the cumulative value for EVENT TIME indicated by the cumulative-value data for EVENT TIME stored in the RAM 203, and stores the numerical value obtained by the addition as the updated cumulative value for EVENT TIME in the cumulative-value data for EVENT TIME (step S102). It is to be noted that the processing of step S102 is canceled when the number obtained by subtracting 1 from the number of coins indicated by the number-of-game-media information becomes equal to or less than 0.

Next, the CPU 201 determines whether or not the cumulative value for EVENT TIME has reached the predetermined value, based on the cumulative-value data for EVENT TIME stored in the RAM 203 (step S103).

When determining that the cumulative value for EVENT TIME has reached the predetermined value, the CPU 201 transmits a common-game execution signal to the slot machines 10 through the PTS terminals 64 (step S104).

On the other hand, when determining that the CPU 201 has not received the number-of-game-media information, the CPU 201 determines whether or not it has received the exchange-fee data (step S105). When determining that the CPU 201 has received the exchange-fee data, the CPU 201 adds the number of coins corresponding to the amount of currency indicated by the received exchange-fee data to the cumulative value for bonus indicated by the cumulative-value data for bonus stored in the RAM 203, sets the numerical value obtained by the addition as the updated cumulative value for bonus, and stores the cumulative-value data for bonus into the RAM 203 (step S106).

The amount of currency indicated by the received exchange-fee data corresponds to the amount of basic currency corresponding to the predetermined fee of the present invention.

Next, the CPU 201 determines whether or not the cumulative value for bonus has reached the specific value, based on the cumulative-value data for bonus stored in the RAM 203 (step S107).

The cumulative-value for bonus reaching the specific value corresponds to the predetermined progressive-jackpot payout condition of the present invention.

When determining that the cumulative value for bonus has reached the specific value, the CPU 201 executes winning-slot-machine determination processing (step S108). In the winning-slot-machine determination processing, the first winning slot machine 10 and the second winning slot machine 10, to each of which a bonus is offered, is determined. The winning-slot-machine determination processing is described later by using the drawing.

The CPU 201 transmits, through the PTS terminals 64, the bonus payout signals to the first winning slot machine 10 and the second winning slot machine 10 determined in step S108 (step S109). The bonus payout signal to be transmitted to the first winning slot machine 10 includes information indicating that this slot machine 10 is the first winning slot machine 10. The bonus payout signal to be transmitted to the second winning slot machine 10 includes information indicating that this slot machine 10 is the second winning slot machine 10.

The CPU 201 completes the present subroutine, when the CPU 201 has determined in step S103 that the cumulative value for EVENT TIME has not reached the predetermined value, or after the CPU 201 has executed the processing of step S104, or when the CPU 201 has determined in step S105 that it has not received the exchange-fee data, or when the CPU 201 has determined in step S107 that the cumulative value for bonus has not reached the specific value, or when the CPU 201 has executed the processing of step S109.

Figure 19:
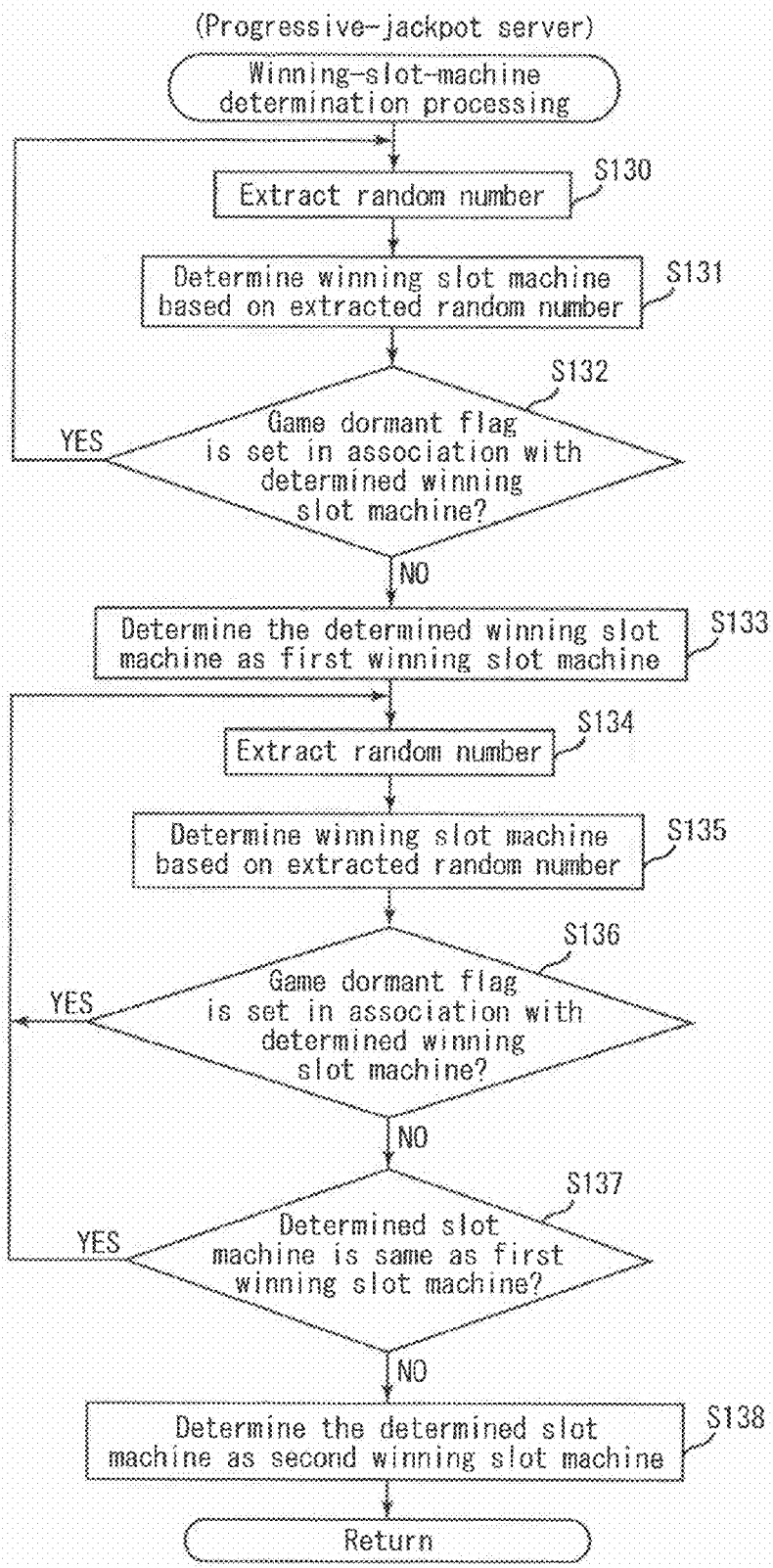
FIG. 19 is a flowchart illustrating a subroutine of winning-slot-machine determination processing.

FIG. 19 is a flowchart illustrating a subroutine of winning-slot-machine determination processing.

First, the CPU 201 extracts the random number generated by the random number generator 63 (step S130).

The CPU 201 determines a single slot machine 10 out of ten slot machines 10, based on the random number extracted in step S130. Then, the CPU 201 determines the determined slot machine 10 as a winning slot machine 10 (step S131).

The CPU 201 determines whether or not the game dormant flag is set in association with the identification number of the winning slot machine 10 determined in step S131 (step S132). When determining that the game dormant flag is set, the CPU 201 returns the processing to step S130.

When determining in step S132 that the game dormant flag is not set, the CPU 201 determines the winning slot machine 10 determined in step S131 as the first winning slot machine 10 (step S133).

The CPU 201 extracts the random number generated by the random number generator 63 (step S134).

The CPU 201 determines a single slot machine 10 out of ten slot machines 10, based on the random number extracted in step S134. Then, the CPU 201 determines the determined slot machine 10 as a winning slot machine 10 (step S135).

The CPU 201 determines whether or not the game dormant flag is set in association with the identification number of the winning slot machine 10 determined in step S135 (step S136). When determining that the game dormant flag is set, the CPU 201 returns the processing to step S134.

When determining in step S136 that the game dormant flag is not set, the CPU 201 determines whether or not the winning slot machine 10 determined in step S135 is the same slot machine 10 as the first winning slot machine 10 determined in step S133 (step S137). When determining that they are the same slot machine 10, the CPU 201 returns the processing to step S134.

When determining in step S137 that they are not the same slot machine 10, the CPU 201 determines the winning slot machine 10 determined in step S135 as the second winning slot machine 10 (step S138).

Figure 20:
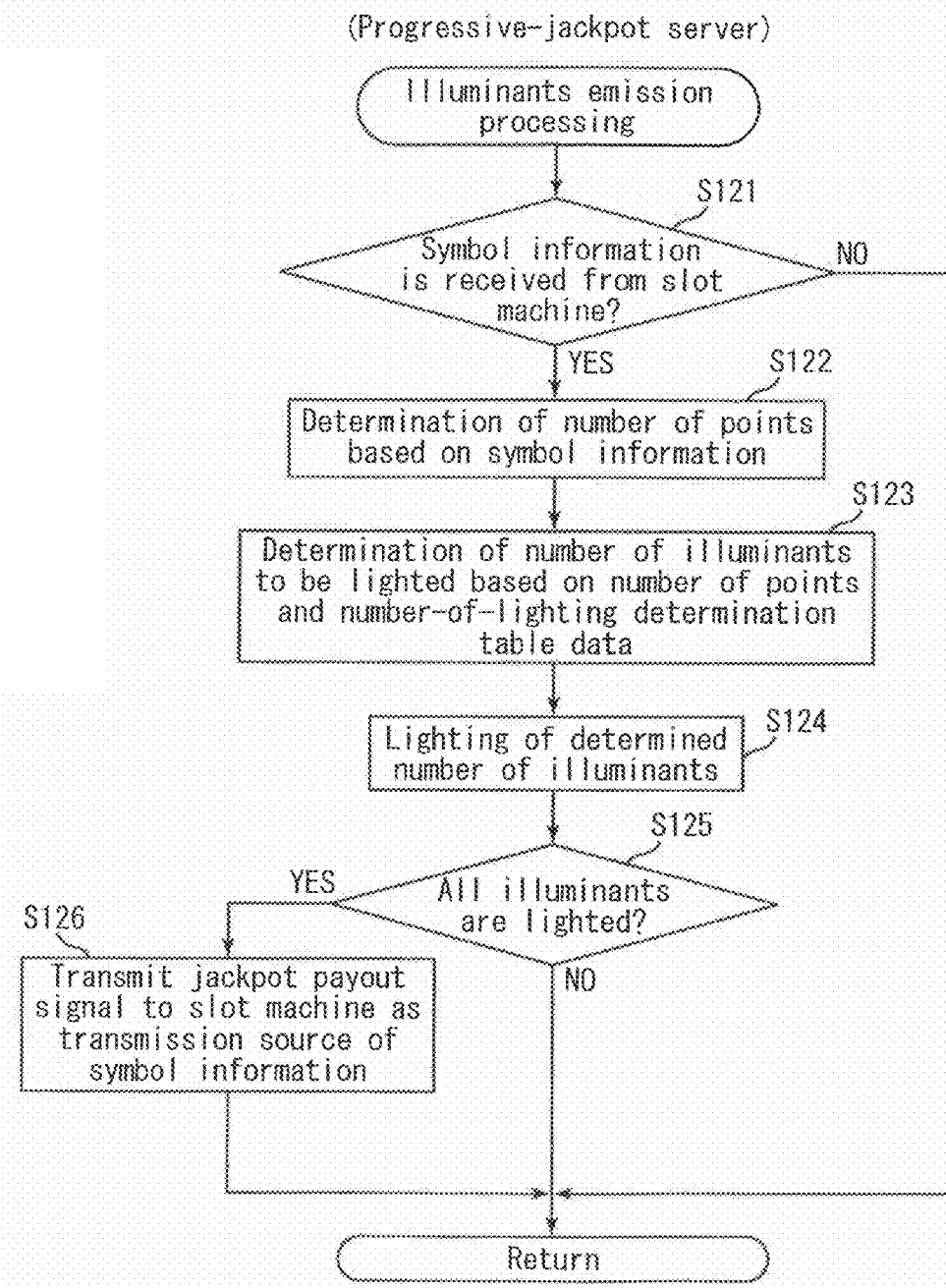
FIG. 20 is a flowchart illustrating a subroutine of illuminants emission processing.

FIG. 20 is a flowchart illustrating a subroutine of illuminants emission processing.

First, the CPU 201 determines whether or not it has received the symbol information (see FIG. 16) from the slot machine 10 through the PTS terminal 64 at a predetermined timing (step S121).

When determining that it has not received the symbol information, the CPU 201 completes the present subroutine.

On the other hand, when determining that the CPU 201 has received the symbol information, the CPU 201 determines the number of points, based on the symbol information and the number-of-points determination table data stored in the hard disk drive 205 (step S122).

FIG. 21 is a view illustrating the number-of-points determination table.

As illustrated in FIG. 21, in the number-of-points determination table, a symbol or a combination of symbols rearranged along the winning line WL and the number of points are set in association with each other. For example, when one "1bar" has been rearranged along the winning line WL, the CPU 201 determines that the number of points is ten.

Next, the CPU 201 determines the number of LEDs 351 (illuminants) to be lighted (emit light) based on the determined number of points and the number-of-lighting determination table data (step S123).

FIGS. 22A to 22B are views each illustrating the number-of-lighting determination table.

The number-of-lighting determination table is a table in which the possible range of the number of points and the number of LEDs 351 to be lighted are associated with each other. Further, the correspondence relationship between the number of points and the number of LEDs 351 to be lighted is associated with each slot machine 10.

The number-of-lighting determination table includes the number-of-lighting determination table for bent portions (see FIG. 22A) and the number-of-lighting determination table for straight portions (see FIG. 22B).

In the number-of-lighting determination table for bent portions, the correspondence relationship between the number of points and the number of LEDs 351 to be lighted may be different in accordance with the slot machines 10.

In the number-of-lighting determination table for straight portions, the correspondence relationships between the number of points and the number of LEDs 351 to be lighted are the same with respect to all the slot machines 10.

In the processing of step S123, the CPU 201 first determines whether or not the number of lights, indicated by the number-of-lights data stored in the RAM 203 in association with the identification number of the slot machine 10 as a transmission source of the symbol information received in step S121, is equal to or more than a predetermined number (the number of LEDs 351 included in the bent portion of the coupling illumination line 310).

When determining that the number of lights is equal to or more than the predetermined number, the CPU 201 determines the number of LEDs 351 to be lighted based on the number-of-lighting determination table for straight portions.

On the other hand, when determining that the number of lights is less than the predetermined number, the CPU 201 determines the number of LEDs 351 to be lighted based on the number-of-lighting determination table for bent portions.

Next, the CPU 201 makes the determined number of LEDs 351 (illuminants) be lighted (emit light) in the coupling illumination line 310 provided for the slot machine 10 as a transmission source of the symbol information received in step S121 (step S124).

In this processing, the CPU 201 identifies the identification numbers of the LEDs 351 to be lighted, based on the number determined in step S123 and the number of lights indicated by the number-of-lights data stored in the RAM 203 in association with the identification number of the slot machine 10. Further, the CPU 201 transmits to the LED drive circuit 350 a signal including information indicative of the identified identification numbers. On receiving this signal, the LED drive circuit 350 lights the LEDs 351 associated with the identification numbers included in the signal.

Further, after transmitting the signal, the CPU 201 adds the number determined in step S123 to the number of lights indicated by the number-of-lights data stored in association with the identification number of the slot machine 10, and stores the obtained number in the RAM 203.

Next, the CPU 201 determines whether or not all the LEDs 351 (illuminants), included in the coupling illumination line 310 provided for the slot machine 10 as a transmission source of the symbol information received in step S121, have been lighted (emit light) (step S125). In the processing, the CPU 201 determines whether or not the number of lights after the addition of the number determined in step S123 has reached the number of LEDs 351 included in the coupling illumination line 310, based on the number-of-lights data stored in the RAM 203.

When determining that all the LEDs 351, included in the coupling illumination line 310 provided for the slot machine 10 as a transmission source of the symbol information received in step S121, have been lighted, the CPU 201 transmits the jackpot payout signal to the slot machine 10 through the PTS terminal 64 (step S126).

When determining in step S125 that not all the LEDs 351 have been lighted or after executing the processing of step S126, the CPU 201 completes the present subroutine.

As described above, according to the gaming system 1 and the control method thereof relating to the present embodiment, when a bill is accepted into the to-be-exchanged bill validator 65, the PTS terminal 64 transmits the amount-of-converted-currency data indicating the amount of basic currency (e.g. 1 dollar) identified based on the type of this currency (e.g. Japanese currency), the amount of the currency (e.g. 100 yen), and the exchange rate, to the mother board 40 included in the slot machine 10. Based on the transmitted amount-of-converted-currency data, a game is conducted in the slot machine 10.

Accordingly, the player can play the game using several currencies different from each other, such as U.S. currency and Japanese currency. Hence, even in a case of having exhausted the basic currency (e.g. U.S. currency) in hand, the player can continue the game using a currency owned separately (e.g. Japanese currency). Therefore, it is possible to make it less likely for the player to feel inconvenienced. Further, it is possible to reduce the possibility of the player's quitting the game in a case of having exhausted the basic currency in hand, and to create a better environment where the player enjoys playing the game for a long time.

According to the gaming system 1 and the control method thereof relating to the present embodiment, when a bill is accepted into the to-be-exchanged bill validator 65, the amount of the currency (e.g. 100 yen) is converted into the amount of basic currency (e.g. 1 dollar) by the PTS terminal 64, based on the type of the currency (e.g. Japanese currency), the amount of the currency, and the exchange rate.

Accordingly, even in a case of building a gaming system capable of conducting a payout according to the progressive jackpot, the amount can be pooled based on the amount of basic currency converted in the above way; thus, any serious harmful effect will not be generated.

Further, according to the gaming system 1 and the control method thereof relating to the present embodiment, when a bill is accepted into the to-be-exchanged bill validator 65, the game is executed with the amount of BET being the amount of currency obtained by subtracting the amount of basic currency corresponding to the predetermined fee from the amount of basic currency indicated by the amount-of-converted-currency data. Furthermore, the CPU 201 included in the progressive-jackpot server 266 cumulatively counts, as the cumulative value for bonus, the amount of basic currency corresponding to the predetermined fee. When the predetermined progressive-jackpot payout condition has been established, game media are paid out to any of the slot machines 10 out of the plurality of slot machines 10, based on the cumulative value for bonus.

That is, according to the gaming system 1, the use of currencies of the types other than the basic currency causes the amount of basic currency corresponding to the predetermined fee to be pooled as the cumulative value for bonus. When the predetermined progressive-jackpot payout condition has been established, a bonus with its source of money being the predetermined fee for using various currencies other than the basic currency is offered. Since a bonus with a source of money different from the conventional one exists, it is possible to improve interesting aspects of the game.

In the present embodiment, although a case has been described where the basic currency is the U.S. currency, the basic currency in the present invention is not particularly limited; for example, the currency of the country in which the gaming system according to the present invention is installed may be adopted as the basic currency.

In the present embodiment, although a case has been described where the progressive-jackpot server 266 cumulatively counts the cumulative value for bonus, the slot machine may cumulatively count the cumulative value for bonus in the present invention.

More specifically, in the money acceptance processing, the CPU 241 included in the PTS terminal 64 transmits the exchange-fee data to the correspondingly related slot machine 10. In a case of having received the exchange-fee data, the main CPU 41 included in the slot machine 10 adds the number of coins corresponding to the amount of currency indicated by the received exchange-fee data to the cumulative value for bonus indicated by the cumulative-value data for bonus stored in the RAM 43, sets the numerical value obtained by the addition as the updated cumulative-value data for bonus, and stores the updated cumulative-value data for bonus into the RAM 43. The main CPU 41 then pays out coins when determining that the cumulative value for bonus, indicated by the cumulative-value data for bonus stored in the RAM 43, has reaches the specific value.

When such a configuration is adopted, it is possible to prevent generation of a sense of unfairness among the players since the players can receive by themselves a bonus based on the cumulative value for bonus accumulated by themselves. Further, since more use of the currencies other than the U.S. currency makes the cumulative value for bonus larger, it becomes easier to make the player actively use the currencies other than the U.S. currency.

In the present embodiment, although a case where the exchange rate is the same for any player has been described, the exchange rate may be different for each player in the present invention. When, for example, the data for identifying the player which is stored in the IC card inserted into the IC card R/W 253 matches the good-customer data stored in the member management server 264, a preferable exchange rate may be used.

Alternatively, when for example it has been determined that, by the data about the history of games played by the player which is stored in the IC card inserted into the IC card R/W 253, the amount of lost money of the player is equal to or more than a certain amount, a preferable exchange rate may be used.

In the present embodiment, a case has been described where the entire amount of the exchange fee is counted as the cumulative value for bonus. However, in the present invention, a part of the exchange fee may be counted as the cumulative value for bonus. In this case, for example, a configuration will be adopted where, provided that the exchange fee does not become a natural-number multiple of the predetermined unit-amount of basic currency, a fractional amount obtained by dividing the exchange fee by the unit-amount of basic currency is cumulatively counted as the cumulative value for bonus.

When such a configuration is adopted, for example, when the exchange fee is 2.75 dollars, 0.75 dollar (a fractional amount) obtained by dividing 2.75 dollars by 1 dollar (the unit-amount of basic currency) is cumulatively counted as the cumulative value for bonus. When the exchange fee is 2.0 dollars, counting of the cumulative value for bonus is not conducted.

In the present embodiment, a case has been described where the predetermined progressive-jackpot payout condition is that the cumulative value for bonus reaches the specific value. However, in the present invention, the predetermined progressive-jackpot payout condition is not particularly limited. For example, the predetermined progressive-jackpot payout condition may be that a predetermined time elapses since previous establishment of the progressive-jackpot payout condition.

In the present embodiment, a case has been described where the symbols to be rearranged in the display blocks 28 are the symbols with which winning is determined based on the symbols rearranged along the winning line WL. However, symbols in the present invention may be scatter symbols. Further, for example, the symbols with which winning is determined based on the symbols rearranged along the winning line WL may be combined with the scatter symbols.

Further, in the present embodiment, there has been described a case where the number of points is determined in the progressive-jackpot server 266. However, in the present invention, the number of points may be determined in the slot machine 10 and information indicative of the determined number of points may be transmitted to the progressive-jackpot server 266.

Further, in the present embodiment, there has been described a case where a single slot machine 10 is determined out of ten slot machines 10. However, in the present invention, the method for determining the winning gaming machine is not particularly limited so long as it is a method for determining the winning gaming machine based on the random number. For example, a single gaming machine may be determined out of the gaming machines on which the game is played.

Further, in the present embodiment, there has been described a case where the first winning slot machine 10 and the second winning slot machine 10 are different from each other. However, in the present invention, the first winning slot machine 10 and the second winning slot machine 10 may be the same slot machine 10.

Further, in the present embodiment, there has been described a case where the number of the winning slot machines 10 is two. However, in the present invention, the number of the winning slot machines 10 is not particularly limited, and it may be one.

Further, in the present embodiment, there has been described a case where the number of LEDs 351 to be lighted is determined based on the number-of-lighting determination table data for bent portions when the current number of lights of the LEDs 351 is less than the predetermined number (the number of LEDs 351 included in the bent portion of the coupling illumination line 310), while the number of LEDs 351 to be lighted is determined based on the number-of-lighting determination table data for straight portions when the current number of lights of the LEDs 351 is equal to or more than the predetermined number (the number of LEDs 351 included in the bent portion of the coupling illumination line 310). In this case, it is desirable that the number of LEDs to be lighted in the bent portion for the number of points of "1" is set to be greater than the number of LEDs to be lighted in the straight portion for the number of points of "1". This is because such a configuration can cause the player to have a sense of expectation for the acquisition of the greater number of points just before the number of LEDs having been lighted reaches the predetermined number.

Further, in the present embodiment, there has been described a case where the common game is a game in which a game result is determined based on rearranged symbols (normal slot machine game). However, in the present invention, the common game is not limited to the case, and a game different from the slot machine game may be played. For example, a card game such as poker, and a game such as a shooting game and a fighting game may be played. In this case, it is desirable to adopt a configuration that allows players to play the game against one another. This is because such a configuration can enhance player's senses of competition, thereby further having the players become absorbed in the common game.

For example, the following configuration can be adopted.

Namely, each gaming machine is capable of storing a program for executing such a common game. Each gaming machine reads and executes the program when it has received a common-game execution signal. Then, the gaming machine transmits information indicative of the result of the common game to the progressive-jackpot server 266. Based on the information, the progressive-jackpot server 266 compares the results of the common game in respective gaming machines, so as to determine the number of LEDs to be lighted in the coupling illumination line provided for each gaming machine.

Further, in the present embodiment, there has been described the case where the number of the slot machines 10 is ten. However, the number of the gaming machines is not particularly limited, and it may be 50, for example.

Furthermore, in the present embodiment, there has been described a case where the number of the common compact displays 301 is two. However, the number of the common compact displays is not particularly limited, and it may be three, for example.

Moreover, in the present embodiment, there has been described a case where the gaming machine is the slot machine 10. However, in the present invention, the type of the gaming machine is not particularly limited, and it may be a card game machine, for example.

Second Embodiment

In the first embodiment, a case has been described in which the bonus with its source of money being the exchange fee can also be offered to the player who is not using a currency other than the U.S. currency which is the basic currency. However, in a second embodiment, a bonus with its source of money being the exchange fee can be offered only to the player who uses a currency other than the U.S. currency which is the basic currency.

It is to be noted that, in the following description, the constituent elements as same as those of the gaming system 1 according to the aforementioned embodiment will be provided with the same signs.

Further, the description will be omitted with respect to parts in the following embodiment to which the descriptions of the aforementioned embodiment are applicable.

Figure 23:
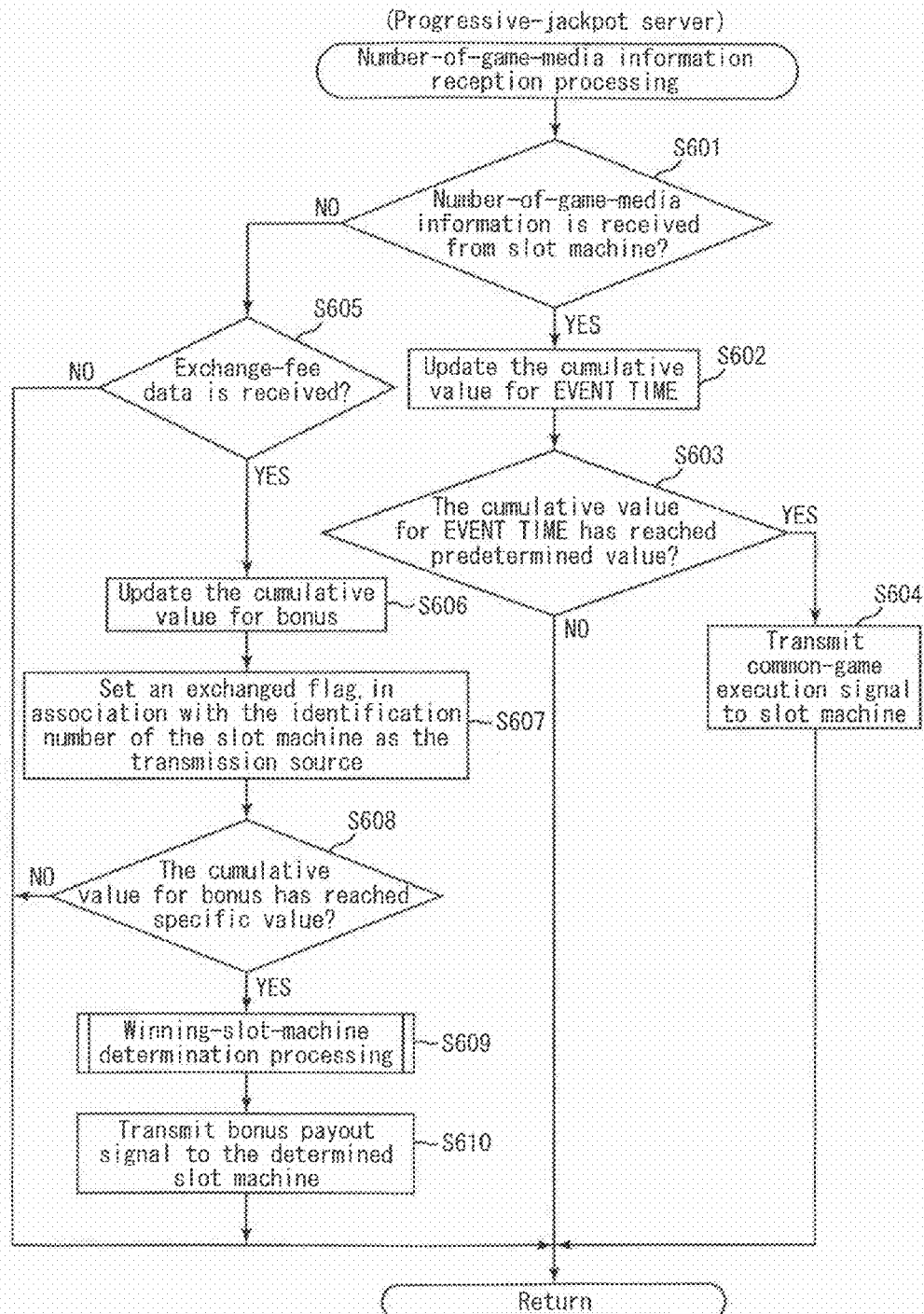
FIG. 23 is a flowchart illustrating a subroutine of number-of-game-media information reception processing according to a second embodiment.

First, with reference to FIG. 23, number-of-game-media reception processing according to the second embodiment is described.

FIG. 23 is a flowchart indicating a subroutine of number-of-game-media information according to the second embodiment.

The CPU 201 first executes the processing of step S601 to step S606, and the processing thereof is substantially the same as the processing of step S101 to step S106 in FIG. 18. Here, only the parts different from step S101 to step S106 in FIG. 18 are described.

The CPU 201 sets an exchanged flag, in association with the identification number of the slot machine 10 in a correspondence relationship with the PTS terminal 64 having transmitted the exchange-fee data determined in step S605 that the CPU 201 has received (step S607).

Next, the CPU 201 determines whether or not the cumulative value for bonus has reached the specific value, based on the cumulative-value data for bonus stored in the RAM 203 (step S608).

When determining that the cumulative value for bonus has reached the specific value, the CPU 201 executes the winning-slot-machine determination processing (step S609). In the winning-slot-machine determination processing, the winning slot machine 10 to which a bonus will be offered is determined from among the slot machines 10 on which a currency other than the U.S. currency, which is the basic currency, has been used. The winning-slot-machine determination processing will be described in detail later with reference to the drawing.

The CPU 201 transmits through the PTS terminal 64 a bonus payout signal to the winning slot machine 10 determined in step S609 (step S610). The slot machine 10 that has received the bonus payout signal pays out coins in total number of the first constant number and the second constant number.

Figure 24:
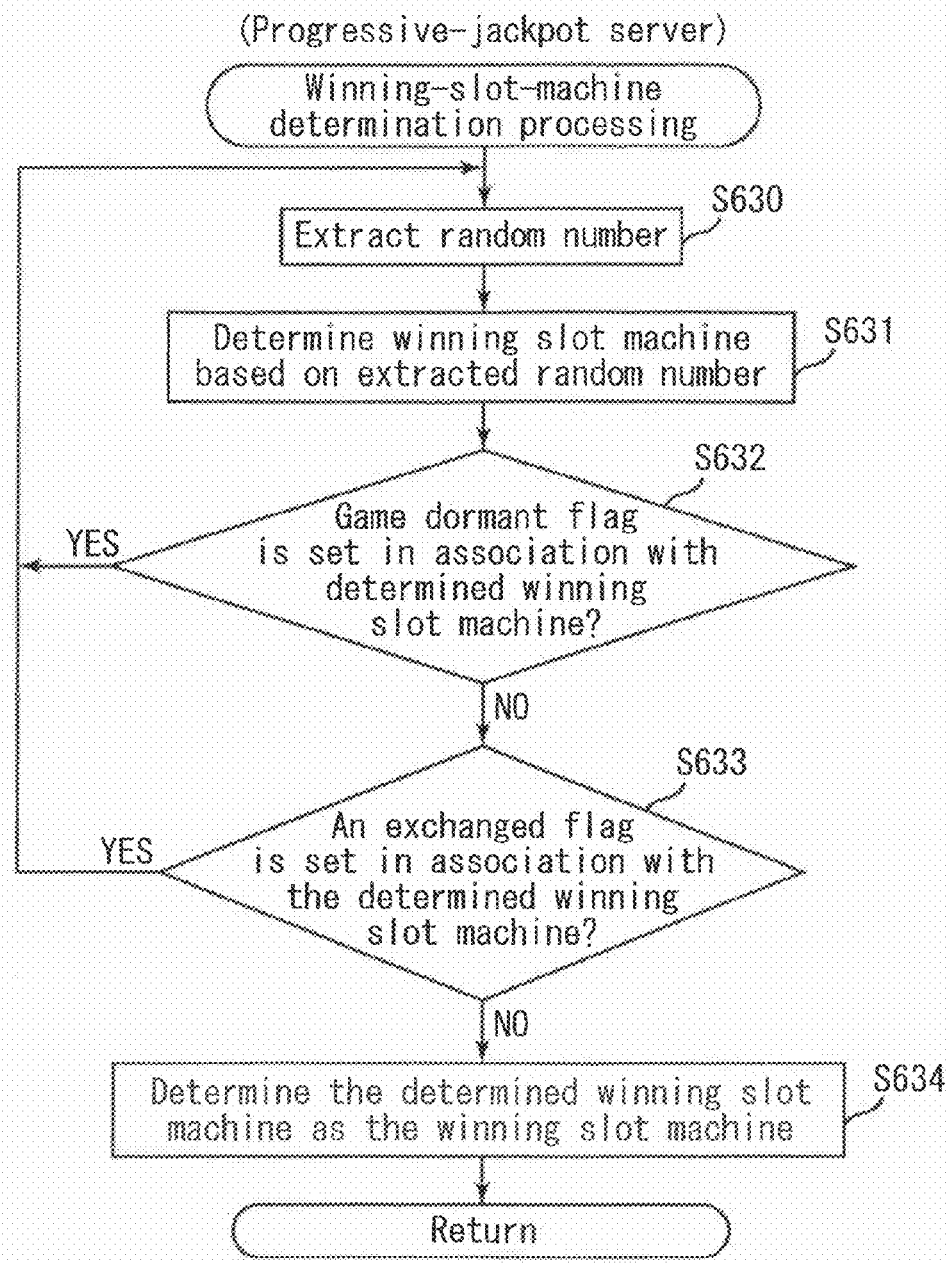
FIG. 24 is a flowchart illustrating a subroutine of winning-slot-machine determination processing according to the second embodiment.

Next, with reference to FIG. 24, the winning-slot-machine determination processing according to the second embodiment is described.

FIG. 24 is a flowchart illustrating a subroutine of the winning-slot-machine determination processing according to the second embodiment.

First, the CPU 201 executes the processing of step S630 to step S632, and the processing thereof is substantially the same as the processing of step S130 to step S132 in FIG. 19. Here, only the parts different from step S130 to step S132 in FIG. 19 are described.

When determining in step S632 that a game dormant flag has not been set, the CPU 201 determines whether or not an exchanged flag is set in association with the identification number of the winning slot machine 10 determined in step S631 (step S633). When determining that an exchanged flag has not been set, the CPU 201 returns the processing to step S630.

When determining in step S633 that an exchanged flag has been set, the CPU 201 determines the winning slot machine 10 determined in step S631 as the winning slot machine 10 (step S634). After executing the processing of step S634, the CPU 201 completes the present subroutine.

As described above, according to the gaming system 1 and the control method thereof relating to the second embodiment, a bonus with its source of money being the exchange fee can be offered to only the player who has used a currency other than the U.S. currency which is the basic currency. Namely, a bonus with its source of money being the exchange fee will not be offered to a player who uses only the U.S. currency and is not contributing to accumulation of the bonus at all. Therefore, it is possible to prevent generation of a sense of unfairness among the players.

Third Embodiment

In the first embodiment, a case has been described in which the bill validator 22 and the to-be-exchanged bill validator 65 are connected to the PTS terminal 64. However, in a third embodiment, only a to-be-exchanged bill validator 65A is connected to the PTS terminal 64.

The to-be-exchanged bill validator 65A according to the third embodiment is different from the to-be-exchanged bill validator 65 according to the first embodiment, and capable of accepting not only bills other than the U.S. currency but also the U.S. bills. Namely, the to-be-exchanged bill validator 65A accepts bills of a plurality of countries including the U.S. bills which are the basic currency, and is capable of verifying the adequacy of the accepted bill and reading the type and the number of the bills.

It is to be noted that, in the following description, the constituent elements as same as those of the gaming system 1 according to the aforementioned embodiments will be provided with the same signs.

Further, the description will be omitted for parts in the following embodiment to which the descriptions of the aforementioned embodiments are applicable.

Figure 25:
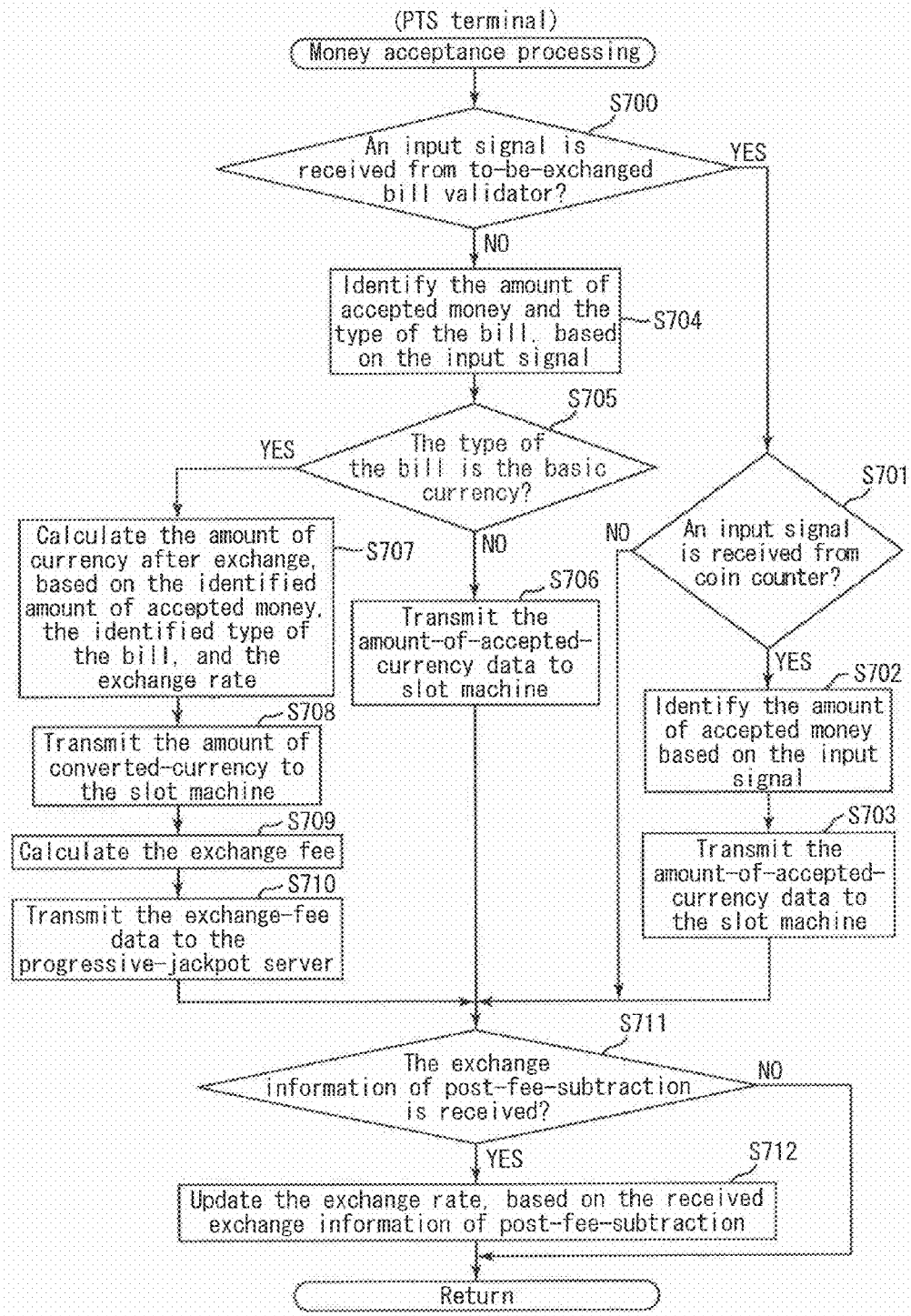
FIG. 25 is a flowchart illustrating money acceptance processing conducted in a PTS terminal according to a third embodiment.

First, with reference to FIG. 25, money acceptance processing conducted in a PTS terminal according to the third embodiment is described.

FIG. 25 is a flowchart illustrating money acceptance processing conducted in the PTS terminal according to the third embodiment.

The CPU 241 first determines whether or not it has received an input signal from the to-be-exchanged bill validator 65A at a predetermined timing (step S700).

When determining in step S700 that the CPU 241 has not received an input signal, the CPU 241 determines whether or not it has received an input signal from the coin counter 21C (step S701). When determining in step S701 that the CPU 241 has not received an input signal, the CPU 241 shifts the processing to step S711.

On the other hand, when determining in step S701 that the CPU 241 has received an input signal, the CPU 241 identifies the amount of accepted money based on the received input signal (step S702). The CPU 241 then transmits the amount-of-accepted-currency data indicating the identified amount of accepted money to the correspondingly related slot machine 10 (step S703).

When determining in step S700 that the CPU 241 has received an input signal, the CPU 241 identifies the amount of accepted money and the type of the bill accepted into the to-be-exchanged bill validator 65A, based on the type-of-currency data and the amount-of-currency data which are included in the received input signal (step S704).

The CPU 241 determines whether or not the type of bill identified in step S704 is the basic currency (step S705). When the CPU 241 determines that the identified type of bill is the basic currency, the CPU 241 transmits the amount-of-accepted-money data indicative of the amount of the accepted bill identified in step S704 to the correspondingly related slot machine 10 (step S706).

The CPU 241 calculates the amount of currency (e.g. 98 dollars) after exchange into the U.S. currency, which is the basic currency, based on the amount of accepted money (e.g. 10,000 yen) and the type of the bill which have been identified in step S704, the exchange rate (e.g. 0.98 dollar=100 yen) indicated by the exchange rate data stored in the RAM 243 (step S707). The CPU 241 then transmits the amount-of-converted-currency data indicating the amount of exchanged currency to the correspondingly related slot machine 10 (step S708).

The CPU 241 calculates the exchange fee, based on the amount-of-converted-currency data indicating the amount of converted currency calculated in step S707 and on exchange-fee calculated value data indicating the exchange-fee calculated value stored in the ROM 242 (step S709). The exchange fee corresponds to an amount (e.g. 2 dollars) obtained by multiplying the amount of converted currency (e.g. 98 dollars) calculated in step S707 by the exchange-fee calculated value $P/1-P$ (where P is the exchange fee ratio (0.02 dollar in the present embodiment)) (the exchange-fee calculated value is 2/98 in the present embodiment). The CPU 241 then transmits exchange-fee data indicating the exchange fee to the progressive-jackpot server 266 (step S710).

When executing the processing of step S703, step S706 or step S710, or determining in step S701 that the CPU 241 has not received an input signal, the CPU 241 determines whether or not it has received the exchange information of post-fee-subtraction from the exchange server 262 (step S711).

When determining in step S711 that the CPU 241 has received the exchange information of post-fee-subtraction, the CPU 241 updates the exchange rate data stored in the RAM 243 based on the received exchange information of post-fee-subtraction (step S712). For example, when the CPU 241 has received the exchange information of post-fee-subtraction, which indicates a correspondence relationship of 1 dollar=110 yen, in a case where the corresponding relationships among the respective currencies in the exchange rates indicated by the exchange data stored in the RAM 243 are 1 dollar=100 yen=0.68 euro=6.85 yuan, the CPU 241 stores into the RAM 243 the exchange rate data indicating a new exchange rate of 1 dollar=110 yen=0.68 euro=6.85 yuan.

When executing the processing of step S712 or when determining in step S711 that the CPU 241 has not received the exchange information of post-fee-subtraction, the CPU 241 completes the money acceptance processing.

As described above, according to the gaming system 1 relating to the third embodiment, there is no necessity for connecting the bill validator 22 and the to-be-exchanged bill validator 65 to the PTS terminal 64, and only the to-be-exchanged bill validator 65A should be connected to the PTS terminal 64. Therefore, it is possible to cut capital spending.

Fourth Embodiment

The following description will discuss an embodiment of the present invention based on the drawings.

Figure 26:
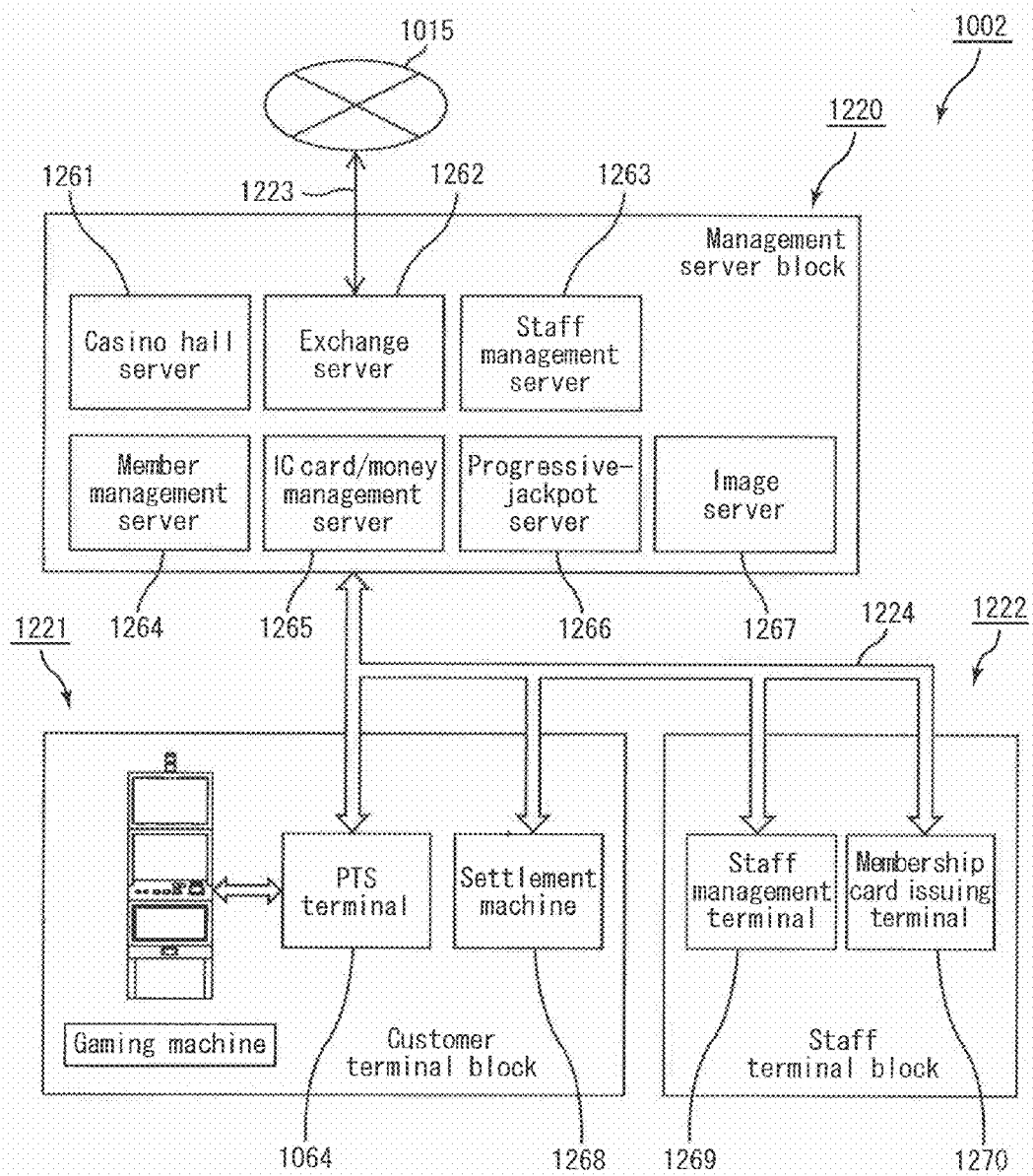
FIG. 26 is a diagrammatic view schematically illustrating an overall picture of a casino system according an embodiment of the present invention.

FIG. 26 is a diagrammatic view schematically illustrating an overall picture of a casino system according to an embodiment of the present invention.

A casino system 1002 includes a management server block 1220, a customer terminal block 1221, and a staff terminal block 1222.

The management server block 1220 includes a casino hall server 1261, an exchange server 1262, a staff management server 1263, a member management server 1264, an IC card/money management server 1265, a progressive-jackpot server 1266, and an image server 1267.

The casino hall server 1261 collects money flow inside a casino and makes a balance sheet and the like, and is a server for managing each server within the management server block 1220. The exchange server 1262 is a server for acquiring exchange information from an external source (Internet 1015) through a communication line 1223. The staff management server 1263 is a server for managing attendance of staff members who work at the casino, recognizing the current locations of the staff members within the casino, and the like. The member management server 1264 is a server for managing member information, such as members' personal information and their past game results. The IC card/money management server 1265 is a server for collecting cashless sales with IC cards. The progressive-jackpot server 1266 is a server for conducting management of a cumulative value for a progressive-jackpot offer, and determination of the progressive-jackpot offer. The image server 1267 is a server for storing images of the faces of staff members and players, which are captured by a camera installed inside the casino, and managing those images. The staff management server 1263 corresponds to the server in the present invention.

The customer terminal block 1221 includes player tracking system (PTS) terminals 1064, gaming machines, and a settlement machine 1268. The gaming machines are connected to the management server block 1220 through the respective PTS terminals 1064, by network. In the present embodiment, a single PTS terminal 1064 is provided for a single gaming machine.

The staff terminal block 1222 includes a staff management terminal 1269 and a membership card issuing terminal 1270. The staff management terminal 1269 is controlled by the staff management server 1263. The staff management terminal 1269 transmits information to Personal Digital Assistant (PDA) (not illustrated) carried by the staff members, and the like, based on a signal received from the staff management server 1263 or starts communications with mobile phones carried by the staff members.

The membership card issuing terminal 1270 includes a camera which, when a membership card (IC card) is issued, captures a face image of the player to whom the IC card is issued. The captured image is stored into the image server 1267, in association with a customer ID. Further, member's personal information inputted at the time of IC card issuance is stored into the member management server 1264, in association with the customer ID.

Figure 35:
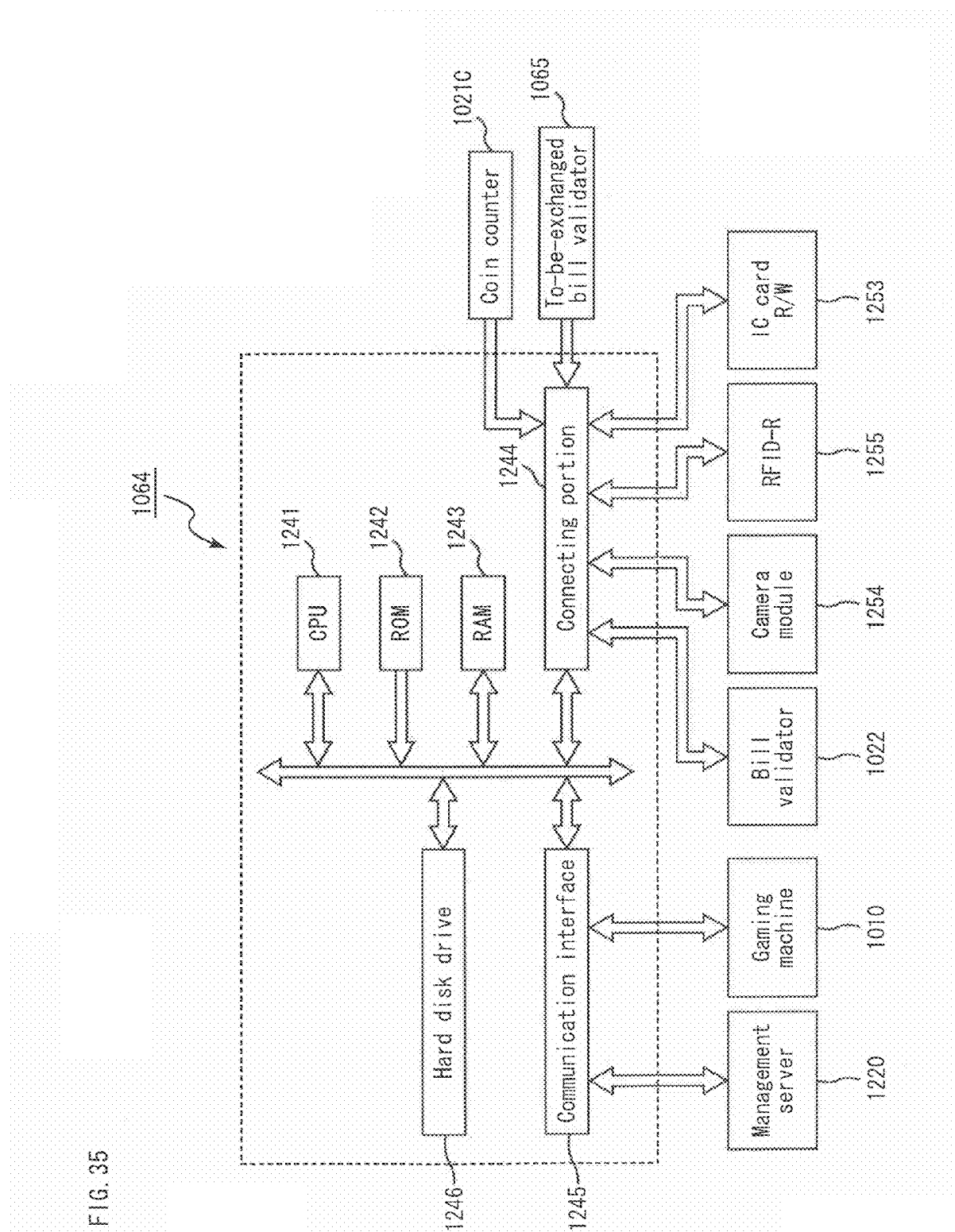
FIG. 35 is a block diagram illustrating an internal configuration of a PTS terminal forming the gaming system according to an embodiment of the present invention.

In the present embodiment, the PTS terminal 1064 is connected to a to-be-exchanged bill validator 1065 through a communication line (see FIG. 35).

The to-be-exchanged bill validator 1065 is capable of accepting bills of a plurality of countries. For example, when a Japanese bill is inserted into the to-be-exchanged bill validator 1065, the PTS terminal 1064 converts (exchanges) the bill into U.S. currency, based on the exchange rate. Amount-of-converted-currency data, indicating the amount of currency after the conversion (exchange), is then transmitted from the PTS terminal 1064 to the gaming machine. Thus, the player can play the game on the gaming machine using currencies other than the U.S. currency. It is to be noted that the amount of currency after the conversion (exchange) is equivalent to the amount of currency obtained by subtracting the amount of currency corresponding to a predetermined fee (hereinafter, also referred to as "exchange fee") from the amount of currency before the conversion (exchange).

Also, exchange-fee data indicating the amount of currency corresponding to the exchange fee is transmitted from the PTS terminal 1064 to the progressive-jackpot server 1266. The progressive-jackpot server 1266 updates the cumulative value for bonus, based on the amount of currency indicated by the received exchange-fee data. When the cumulative value for bonus has reached a specific value, coins are paid out as a jackpot to any of the gaming machines. As thus described, in the present embodiment, a bonus with its source of money being the exchange fee is offered.

Next, the following description will discuss an individual tracking system for managing staff members of a casino to which the aforementioned casino system 1002 is introduced. In the following, a case where the gaming machine of the present invention is a slot machine is described.

Figure 27:
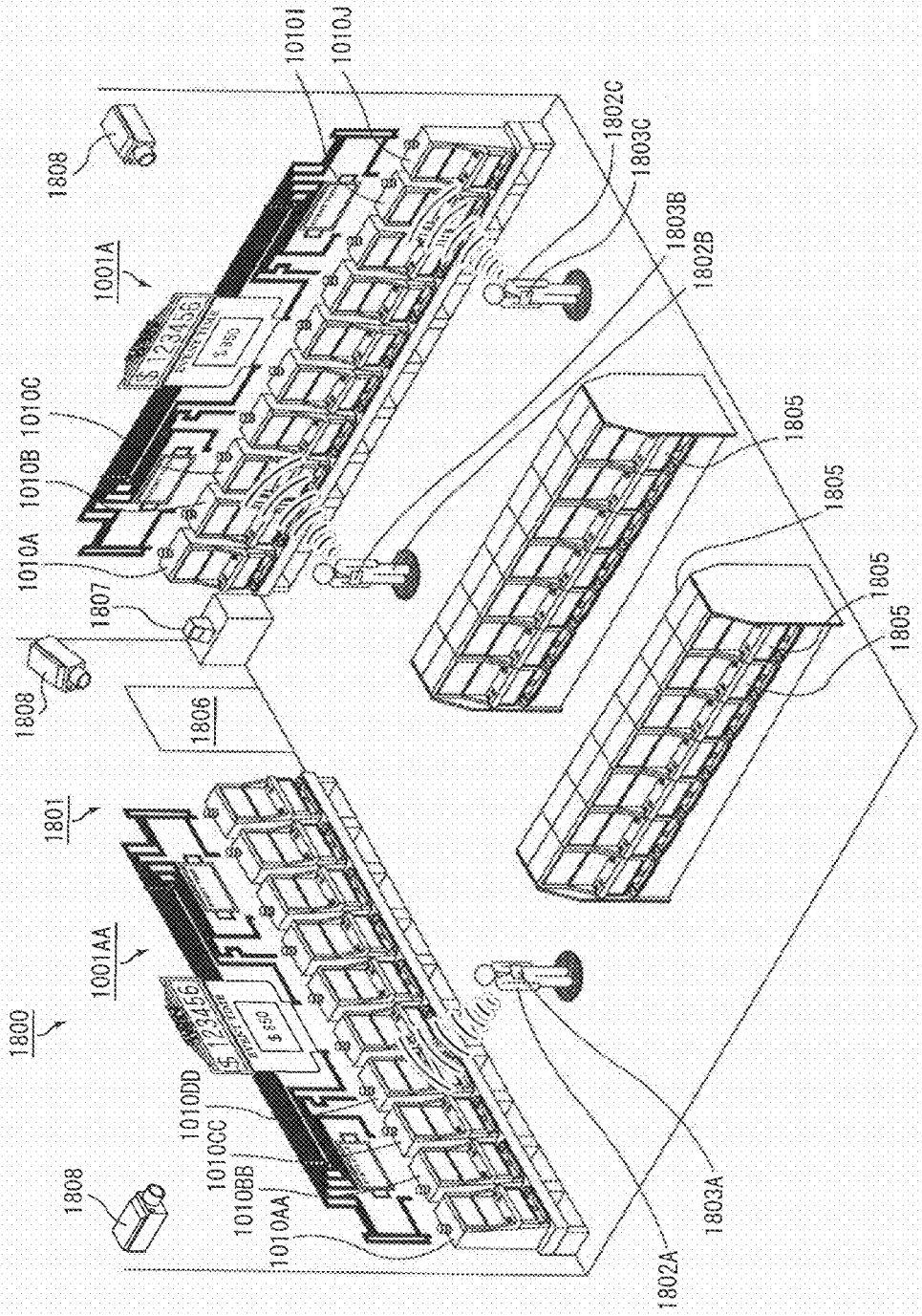
FIG. 27 is an overhead view schematically illustrating an individual tracking system included in the casino system shown in FIG. 26.

FIG. 27 is an overhead view schematically illustrating an individual tracking system included in the casino system shown in FIG. 26.

The individual tracking system 1800 according to the embodiment of the present invention is a system for managing staff members 1802 (staff member 1802A, staff member 1802B, staff member 1802C in FIG. 27) in a casino 1801. In the casino 1801 shown in FIG. 27, there are the staff members 1802 and clients 1804.

The casino 1801 corresponds to the facility according to the present invention.

The individual tracking system 1800 includes a plurality of the PTS terminals 1064, the staff management server 1263, and a plurality of the RFID (Radio Frequency Identification) reader 1255 (hereinafter, referred to as RFID-R 1255) (see FIG. 35). The PTS terminals 1064 are respectively installed in the cabinets 11 of the slot machines 1010 disposed in the casino 1801. The RFID-R 1255s are respectively installed in the cabinets 11 of the slot machines 1010 disposed in the casino 1801.

The RFID-R 1255 installed in each of the slot machines 1010 reads the staff ID by radio waves from a staff ID card 1803 possessed by the staff member 1802. Reading out of the staff ID is performed only when the staff ID card 1803 exists within reach of the radio waves of each of the RFID-R 1255. In the present embodiment, as an RFID tag included in the staff ID card 1803, an active type RFID tag which enables communications within an area of around 10 meters is used.

The staff ID read out of each of the RFID-R 1255 is added with information to identify the RFID-R 1255 and a receiving signal intensity and then transmitted to the staff management server 1263. In the staff management server 1263, location of each of the RFID tags (staff members) is detected based on the transmitted staff ID. It is to be noted that the detection of the RFID tag is performed based on the receiving signal intensity of the radio wave transmitted by the RFID tag installed in the staff ID card 1803 at the RFID-R 1255. As the method for detecting the location of an RFID tag using a receiving signal intensity, at a reader, of radio wave transmitted by a RFID tag, a conventionally known method such as trilateration can be applied. Therefore, an explanation thereof is omitted in the specification.

On the other hand, upon detection of an abnormality in the slot machines 1010, an abnormal signal is transmitted to the management server 200. The management server 200 specifies a staff member who is closest to the slot machine transmitting the abnormal signal, and then starts communications with the staff member using a mobile terminal. As a result, it becomes possible to order the staff member 1802 closest to the slot machines 1010 in which an abnormality is detected to go to the slot machines 1010 as soon as possible.

Moreover, as shown in FIG. 27, an entrance card reader 1807 is set at an entrance gate 1806 of the casino 1801, and when the staff member 1802 enters into the casino, the staff ID is read from the staff ID card 1803 by the entrance card reader 1807. Here, the staff ID read out upon entering is stored in the RAM of the staff management server 1263, and the staff ID read out upon leaving is removed from the RAM of the staff management parlor 1263. As a result, it becomes possible to manage the number of staff members 1802 in the casino 1801, or which staff members 1802 should be in the casino 1801, or the like. The staff management server 1263 corresponds to the server of the present invention.

Further, as shown in FIG. 27, surveillance cameras 1808 are disposed in the casino 1801 so as to capture the scene inside the casino 1801. The image data of images captured by the surveillance cameras 1808 are transmitted to the staff management server 1263. The staff management server 1263 previously stores the staff IDs of all the staff members. Moreover, the staff management server 1263 stores face image data showing the faces of the staff members provided with the staff IDs in association with the respective staff IDs. The staff management server 1263 regularly compares each of the image data transmitted from the surveillance camera 1808 with each of the face image data preliminary stored in the staff management server 1263, and then determines satisfaction or dissatisfaction of the criteria for determining whether or not a person shown by the face image data is identical to the person shown by the image data. When determining that the criteria have been satisfied, the staff management server 1263 counts one in the count number of the staff members. Accordingly, it becomes possible to count the number of the staff members in the casino 1801. Moreover, by comparing the number of the staff IDs read out by the entrance card reader 1807 with the number of staff members counted based on the image data, it becomes possible to grasp the number of the staff members 1802 who have failed to possess the staff ID card 802. Further, in the case where the surveillance camera 1808 captures image data showing a staff member determined to be identical to a staff member shown by the face image data preliminary stored in the staff management server 1263, but the staff ID card corresponding to the staff member has not been read out by the entrance card reader 1807, it is possible to specify that the staff member of the face image data forgets to possess the staff ID card 802. The surveillance camera 1808 corresponds to the camera of the present invention disposed so as to be able to capture images of inside the staff ID.

Furthermore, gaming machines 1805 which provide another kind of game different from the gaming system 1001 are installed in the casino 1801.

Figure 28:
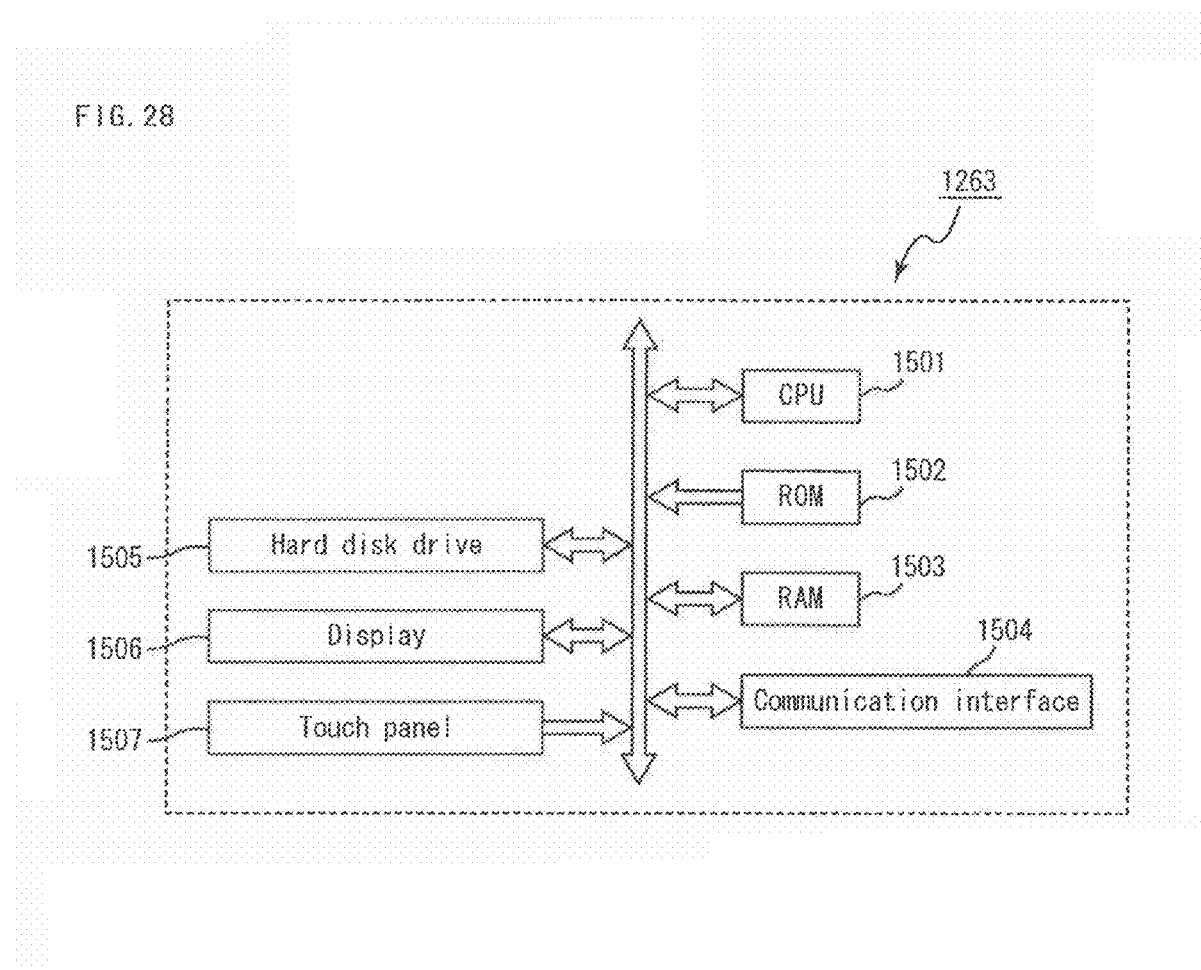
FIG. 28 is a block diagram illustrating an internal configuration of a staff management server included the individual tracking system.

FIG. 28 is a block diagram illustrating an internal configuration of a staff management server included the individual tracking system.

The staff management server 1263 includes a CPU 1501 as a processor, a ROM 1502, a RAM 1503, a communication interface 1504, a hard disk drive 1505 as a memory, a display 506 as an output device, and a touch panel 1507 provided at the front surface of the display 506. The communication interface 1504 is connected to the communication interface 1245 of the PTS terminal 1064 through a communication line. The ROM 1502 stores a system program to control the operation of the staff control server 263, permanent data, or the like. The RAM 1503 stores data or program used to activate the CPU 1501.

FIG. 29 is a view illustrating a staff control table stored in the staff management server illustrated in FIG. 28.

As shown in FIG. 29, the hard disk drive 1505 stores the staff control table in which the staff IDs, face images and telephone numbers to the mobile terminals correspond with each other. The staff members are respectively provided with staff IDs in advance and also their face images are captured by the camera. The face image data showing the captured face images are corresponded to the staff IDs and stored in the hard disk drive 1505. The staff members are respectively provided with mobile terminals corresponding to the staff IDs rent from the manager. For example, the staff member 1802A (see FIG. 27) is provided with the staff ID "001" and the staff ID "001" which is related to the face image data A is stored. Further, the staff ID "001" which is related to the telephone number A is stored. The staff member 1802B (see FIG. 27) is provided with the staff ID "002" and the staff ID "002" which is related to the face image data B is stored. Further, the staff ID "002" which is related to the telephone number B is stored.

Figure 30:
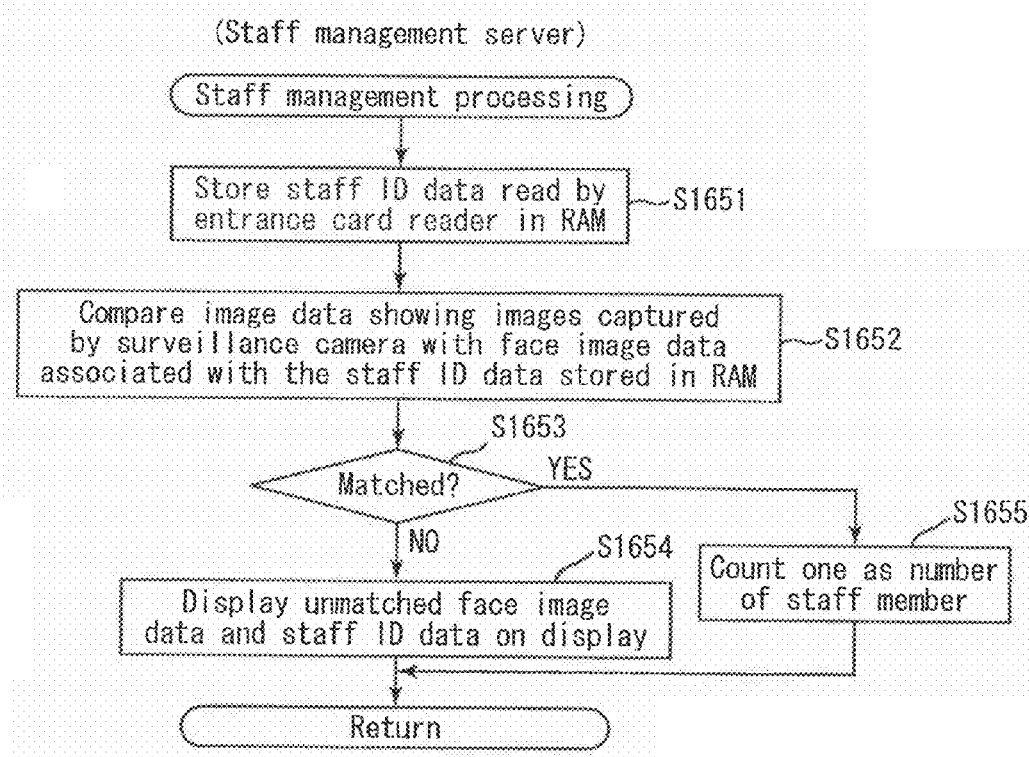
FIG. 30 is a flowchart illustrating staff management processing executed in the staff management server according to an embodiment of the present invention.

FIG. 30 is a flowchart illustrating staff management processing executed in the staff management server according to the embodiment of the present invention.

First, the CPU 1501 included in the staff management server 1263 stores in the RAM 1503 the staff ID data read out by the entrance card reader 1807 from the staff ID card 1803 (step S1651).

Next, the CPU 1501 compares the image data transmitted from the surveillance camera 1808 with the face image data associated with the staff ID data stored in the RAM 1503 in step S1651, and then determines satisfaction or dissatisfaction of the criteria for determining whether or not a person shown by the face image data corresponds to the person in the image data (step S1652).

When it is determined that the criteria for determining that the person shown by the face image data is identical to the person shown by the image data is satisfied (step S1653: YES), the CPU 1501 counts one in the count number of the staff members. It is to be noted that the face image data which became the object of the counting of the staff number is excluded from the target of comparison in step S1652. This arrangement can prevent the situation in which the number of staff members is counted twice based on the same face image data.

On the other hand, When it is determined that criteria for determining that the person shown by the face image data is identical to the person shown by the image data is not satisfied (step S1653: NO), the CPU displays an image based on the face image data determined not to be identical and the staff ID associated with the face image data to the display 506 (step S1654). After executing step S1654 or step S1655, the present subroutine is completed.

Figure 31:
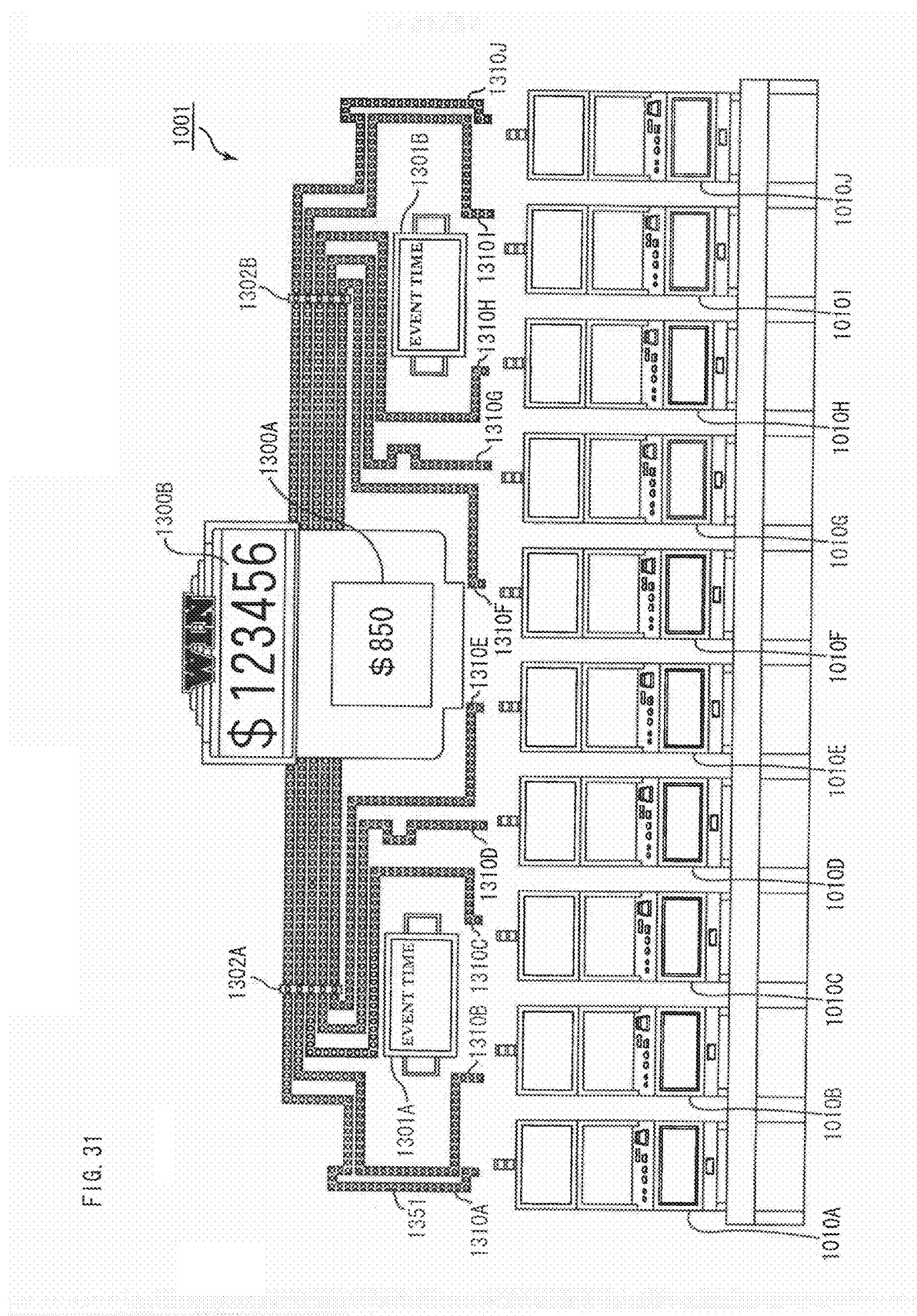
FIG. 31 is a front view schematically illustrating a gaming system according to an embodiment of the present invention.

FIG. 31 is a front view schematically illustrating a gaming system according to an embodiment of the present invention.

Figure 32A:
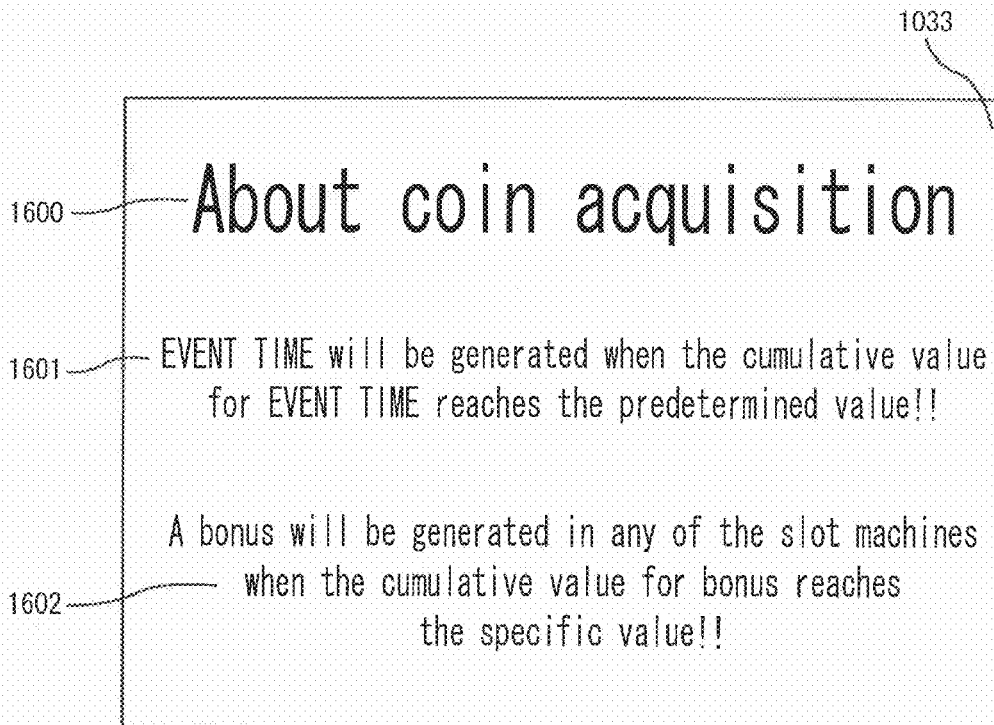
FIG. 32A is a view illustrating an exemplary image displayed to an upper image display panel included in a slot machine forming a gaming system according to an embodiment of the present invention.
Figure 32B:
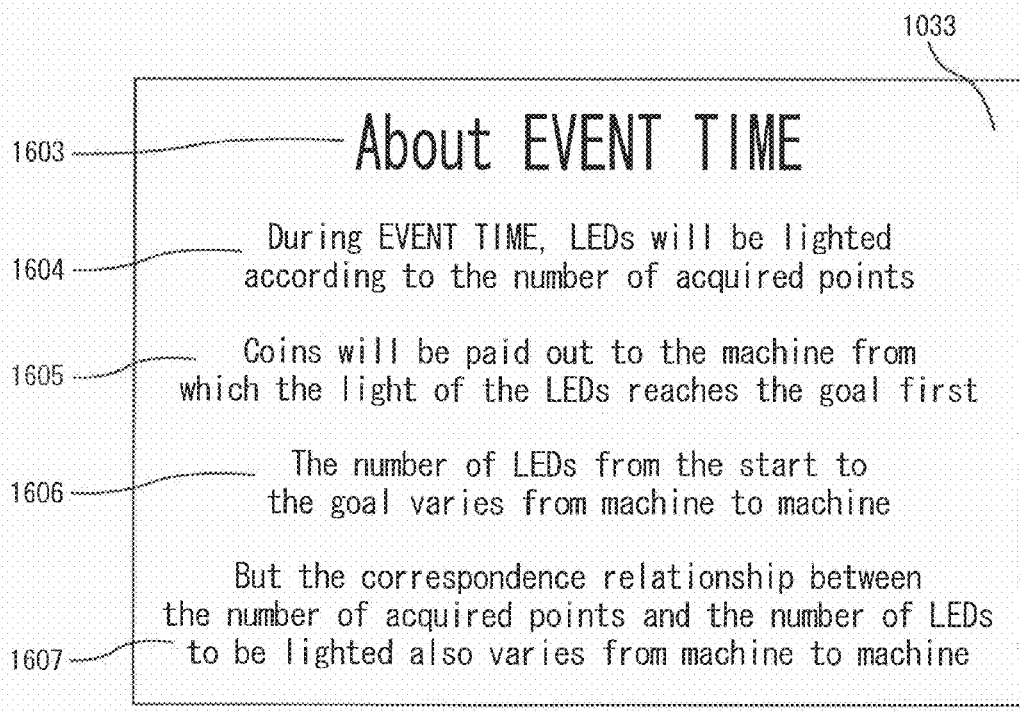
FIG. 32B is a view illustrating another exemplary image displayed to the upper image display panel included in the slot machine forming the gaming system according to an embodiment of the present invention.

FIGS. 32A and 32B are views each illustrating an exemplary image displayed to an upper image display panel included in a slot machine forming a gaming system according to an embodiment of the present invention.

As illustrated in FIG. 31, a gaming system 1001 includes a plurality of (ten, in the present embodiment) slot machines 1010 (a slot machines 1010A, a slot machines 1010B, a slot machines 1010C, a slot machines 1010D, a slot machines 1010E, a slot machines 1010F, a slot machines 1010G, a slot machines 1010H, a slot machines 1010I, and a slot machines 1010J), the PTS terminal 1064, the exchange server 1262, the progressive-jackpot server 1266, a plurality of common large displays 1300 (a common large display 1300A and a common large display 1300B), and a plurality of common compact displays 1301 (a common compact display 1301A and a common compact display 1301B), which are interconnected through network. Further, for the respective slot machines 1010, there are provided coupling illumination lines 1310 (a coupling illumination line 1310A, a coupling illumination line 1310B, a coupling illumination line 1310C, a coupling illumination line 1310D, a coupling illumination line 1310E, a coupling illumination line 1310F, a coupling illumination line 1310G, a coupling illumination line 1310H, a coupling illumination line 1310I, and a coupling illumination line 1310J) which include a plurality of LEDs 1351 arranged from the common large displays 1300 to the respective slot machines 1010. The coupling illumination lines 1310 are each formed by a straight portion extending from the common large displays 1300 to one of boundary plates 1302 (a boundary plate 1302A and a boundary plate 1302B), and a bent portion extending from one of the boundary plates 1302 to one of the slot machines 1010.

The slot machines 1010 correspond to the gaming machines of the present invention.

In the gaming system 1001 according to the present embodiment, a part of coins betted in each slot machine 1010 are cumulatively counted as a cumulative value for EVENT TIME. Further, an image indicative of the counted cumulative value for EVENT TIME is displayed to the common large display 1300B. In FIG. 31, "123456" is displayed to the common large display 1300B, indicating that the cumulative value for EVENT TIME is 123456. When the cumulative value for EVENT TIME reaches a predetermined value, EVENT TIME (common game) is conducted.

Further, in the gaming system 1001 according to the present embodiment, when a bill of a currency other than the basic currency is inserted into the to-be-exchanged bill validator 1065, the exchange fee related to exchange of this bill is cumulatively counted as the cumulative value for bonus. Then, an image indicative of the counted cumulative value for bonus is displayed to the common large display 1300A. In FIG. 31, "850" is displayed to the common large display 1300A, indicating that the cumulative value for bonus is 850. When the cumulative value for bonus reaches a specific value, coins are paid out as a jackpot to any of the slot machines 1010.

With reference to FIG. 32A and FIG. 32B, the coin acquisition according to the jackpot will be described.

As illustrated in FIG. 32A, text images indicative of precautions for the acquisition of the jackpot are displayed to an upper image display panel 1033.

A text image 1601 indicates that EVENT TIME (common game) is generated to any of the slot machines 1010 when the cumulative value for EVENT TIME has reached the predetermined value.

A text image 1602 indicates that a bonus is generated when the cumulative value for bonus has reached the specific value.

In FIG. 32B, EVENT TIME (common game) is further described.

In the present embodiment, a configuration is adopted where the displayed text image is switched from the text image illustrated in FIG. 32A to the text image illustrated in FIG. 32B, when there has been a touch on a predetermined place in a touch panel (not shown) provided on the upper image display panel.

A text image 1604 indicates that the LEDs 1351 will be lighted according to the number of points acquired in each slot machine 1010 during EVENT TIME (common game).

During EVENT TIME (common game), the number of points is determined based on the type and the number of the rearranged game symbols.

A text image 1605 indicates that coins in number corresponding to the cumulative value for EVENT TIME will be paid out as the jackpot to the slot machine 1010 provided with the coupling illumination line 1310 with all the LEDs 1351 having been lighted.

In the present embodiment, the LEDs 1351 are lighted according to the number of acquired points, in an order starting from the LED 1351 closest to the slot machines 1010. Accordingly, the lines of the lighted LEDs 1351 appear to gradually extend toward the common large displays 1300.

A text image 1606 indicates that the number of LEDs 1351 included in the coupling illumination line 1310 may be different among the coupling illumination lines 1310.

In the present embodiment, the same number of LEDs 1351 are included in two coupling illumination lines 1310 listed in each of the following groups (I) to (V):

(I) the coupling illumination line 1310A and the coupling illumination line 1310J;

(II) the coupling illumination line 1310B and the coupling illumination line 1310I;

(III) the coupling illumination line 1310C and the coupling illumination line 1310H;

(IV) the coupling illumination line 1310D and the coupling illumination line 1310G; and (V) the coupling illumination line 1310E and the coupling illumination line 1310F.

However, the numbers of LEDs 1351 for the respective groups (I) to (V) are different from each other.

This difference is caused by the difference in the numbers of LEDs 1351 in the bent portions.

The numbers of LEDs 1351 in the straight portions are same in all the coupling illumination lines 1310.

It is to be noted that FIG. 31 is a view schematically illustrating the gaming system 1001 according to the present embodiment, and the number of LEDs 1351 illustrated in FIG. 31 is not related to the number of LEDs 1351 according to the present embodiment.

A text image 1607 indicates that the correspondence relationship between the number of acquired points and the number of LEDs 1351 to be lighted may be different among the coupling illumination lines 1310. More specifically, the correspondence relationships between the number of acquired points and the number of LEDs 1351 to be lighted are different among the respective groups (I) to (V) (see FIG. 53A).

As above, there has been given the general description of the present embodiment.

Hereinafter, the present embodiment is described in more detail.

Next, a configuration of the slot machine 1010 is described.

Figure 33:
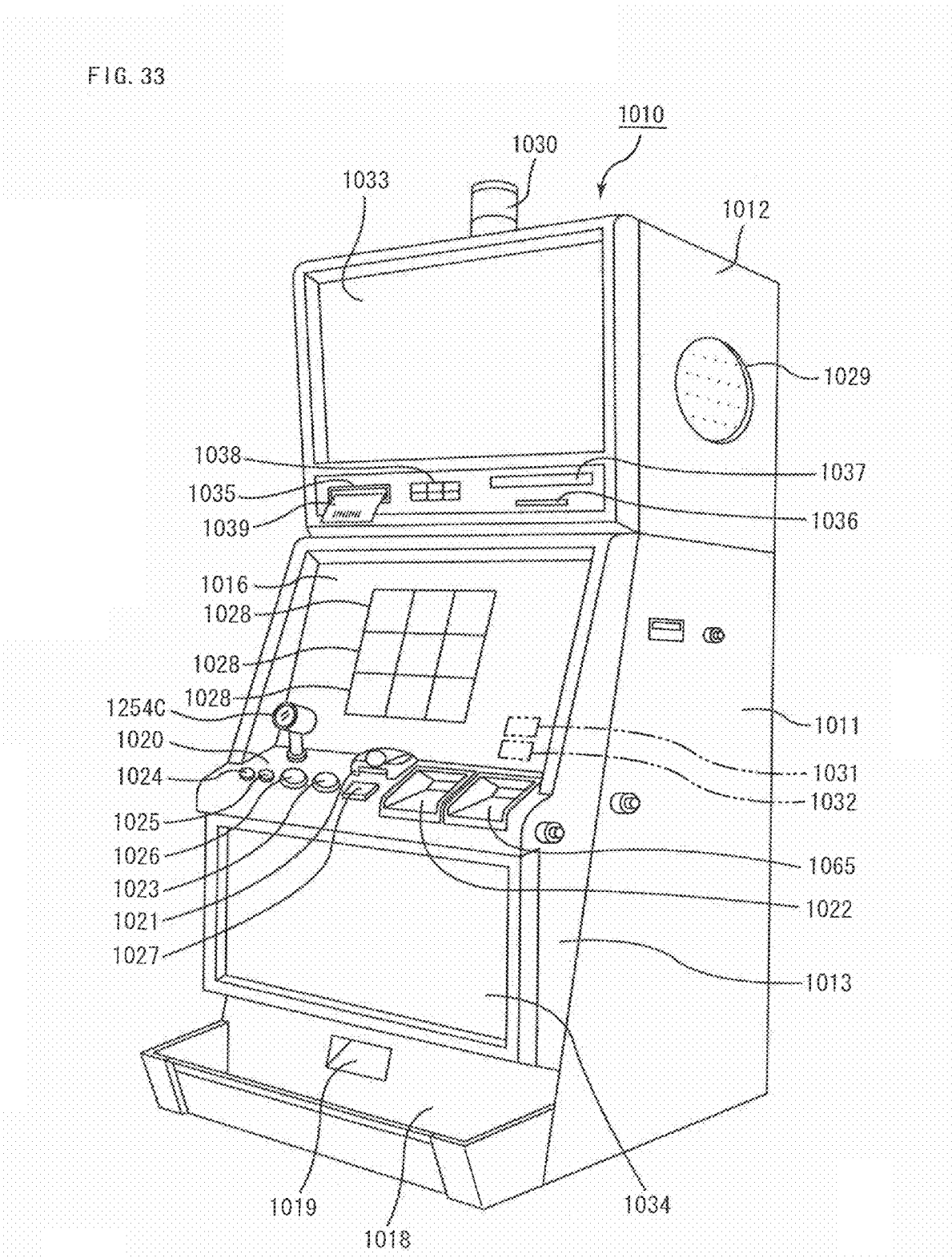
FIG. 33 is a perspective view illustrating an external view of a slot machine forming the gaming system according to an embodiment.

FIG. 33 is a perspective view illustrating an external view of a slot machine forming a gaming system according to an embodiment of the present invention.

In the slot machines 1010, a coin, a bill (basic currency and currencies other than the basic currency), or electronic valuable information corresponding to those is used as a game medium. However, in the present invention, the game medium is not particularly limited. Examples of the game medium may include a medal, a token, electronic money and a ticket. It is to be noted that the ticket is not particularly limited, and examples thereof may include a ticket with a barcode as described later, and the like.

The slot machine 1010 comprises a cabinet 1011, a top box 1012 installed on the upper side of the cabinet 1011, and a main door 1013 provided at the front face of the cabinet 1011.

On the main door 1013, there is provided a lower image display panel 1016. The lower image display panel 1016 includes a transparent liquid crystal panel which displays nine display blocks 1028 along three columns and three rows. A single symbol is displayed in each of the display blocks 1028.

Further, although not illustrated, various types of images relating to an effect, as well as the aforementioned images, are displayed to the lower image display panel 1016.

Further, a number-of-credits display portion 1031 and a number-of-payouts display portion 1032 are provided on the lower image display panel 1016. The number-of-credits display portion 1031 displays an image indicative of the number of credited coins. The number-of-payouts display portion 1032 displays an image indicative of the number of coins to be paid out.

Moreover, although not shown, a touch panel 1069 is provided at the front face of the lower image display panel 1016. The player can operate the touch panel 1069 to input a variety of commands.

Below the lower image display panel 1016, there are provided a control panel 1020 including a plurality of buttons 1023 to 1027 with each of which a command according to game progress is inputted by the player, a coin receiving slot 1021 through which a coin is accepted into the cabinet 1011, a bill validator 1022, the to-be-exchanged bill validator 1065, and a camera 1254C.

The control panel 1020 is provided with a start button 1023, a change button 1024, a CASHOUT button 1025, a 1-BET button 1026 and a maximum BET button 27. The start button 1023 is used for inputting a command to start scrolling of symbols. The change button 1024 is used for making a request of staff member in the recreation facility for exchange. The CASHOUT button 1025 is used for inputting a command to pay out credited coins to a coin tray 1018.

The 1-BET button 1026 is used for inputting a command to bet one coin on a game out of credited coins. The maximum BET button 27 is used for inputting a command to bet the maximum number of coins that can be bet on one game (three coins in the present embodiment) out of credited coins.

The bill validator 1022 not only discriminates a regular bill (basic currency) from a false bill, but also accepts the regular bill into the cabinet 1011. It is to be noted that the bill validator 1022 may be configured so as to be capable of reading a later-described ticket 1039 with a barcode. At the lower front of the main door 1013, namely, below the control panel 1020, there is provided a belly glass 1034 on which a character or the like of the slot machine 1010 is drawn.

The to-be-exchanged bill validator 1065 accepts bills of a plurality of countries which are currencies other than the basic currency, and is capable of verifying the adequacy of the accepted bill and reading the type and the number of the bills.

The camera 1254C functions to capture an image of the face of the player. The camera 1254C corresponds to the camera disposed so as to be able to capture an image of the face of a player in the present invention. It is to be noted that the camera disposed so as to be able to capture an image of the face of a player is not particularly limited, and examples thereof include a CCD camera, a CMOS censor camera and the like.

On the front surface of the top box 1012, there is provided the upper image display panel 1033. The upper image display panel 1033 includes a liquid crystal panel, which displays, for example, images indicative of introductions of the contents of games and explanations about the rules of games as illustrated in FIG. 32A.

Further, a speaker 1029 is provided in the top box 1012. Under the upper image display panel 1033, there are provided a ticket printer 1035, an IC card reader/writer 253 (hereinafter, also referred to as IC card R/W 1253), a data display 1037, and a key pad 1038. The ticket printer 1035 prints on a ticket a barcode as coded data of the number of credits, a date, an identification number of the slot machine 1010, and the like, and outputs the ticket as the ticket 1039 with a barcode. The player can make another slot machine read the ticket 1039 with a barcode to play a game thereon, or exchange the ticket 1039 with a barcode with a bill or the like at a predetermined place in the recreation facility (e.g. a cashier in a casino).

The IC card R/W 1253 reads data from an IC card and writes data into the IC card. The IC card is a card owned by the player, and for example, data for identifying the player and data concerning a history of games played by the player are stored therein. Data corresponding to a coin, a bill or a credit may be stored in the IC card. The data display 1037 includes a fluorescent display and the like, and displays, for example, data read by the IC card R/W 1253 or data inputted by the player via the key pad 1038. The key pad 1038 is used for inputting a command and data concerning issuing of a ticket, and the like.

Figure 34:
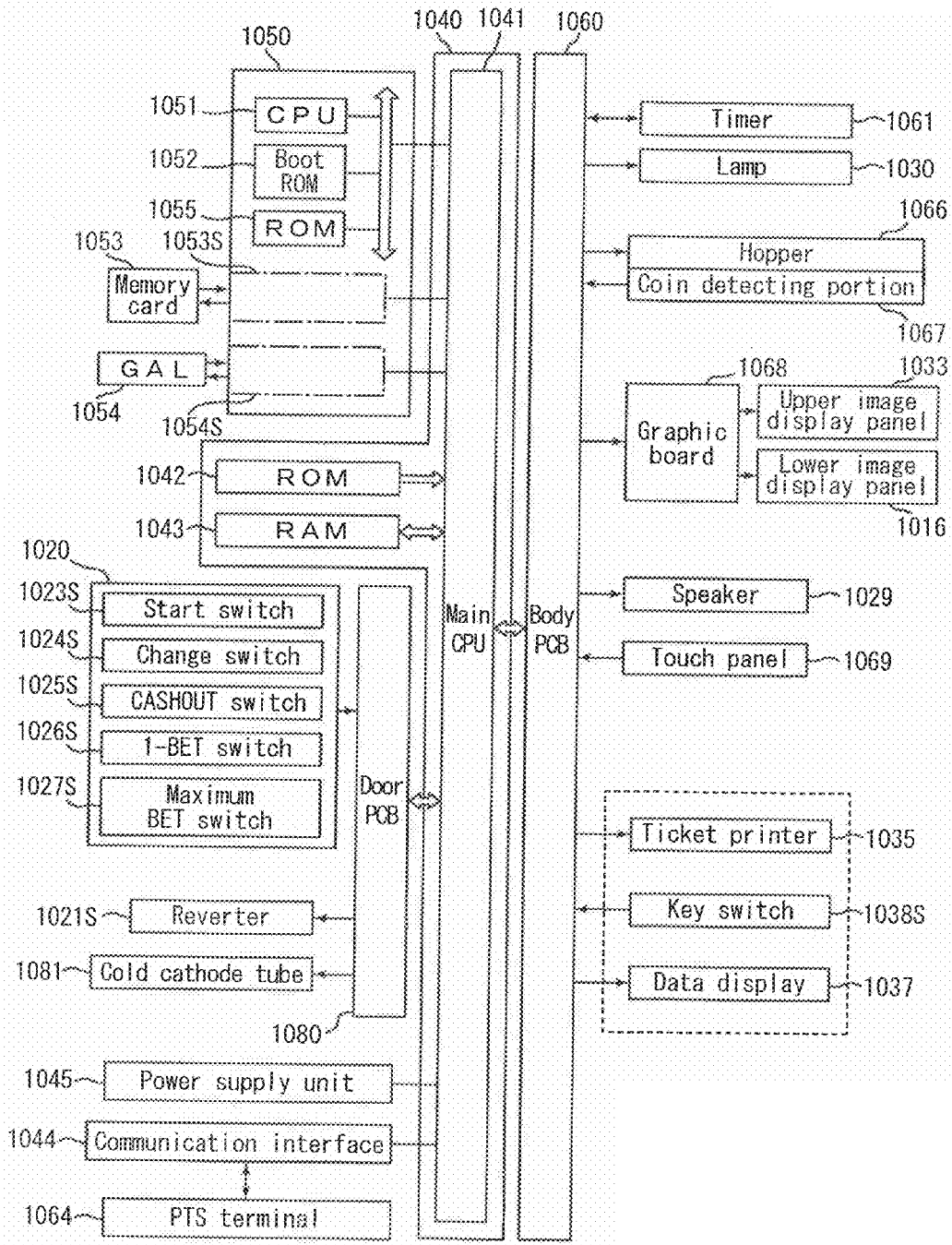
FIG. 34 is a block diagram illustrating an internal configuration of the slot machine shown in FIG. 33.

FIG. 34 is a block diagram showing an internal configuration of the slot machine shown in FIG. 33.

A gaming board 1050 is provided with a CPU (Central Processing Unit) 1051, a ROM 1055, and a boot ROM 1052 which are interconnected to one another by an internal bus, a card slot 1053S corresponding to a memory card 1053, and an IC socket 1054S corresponding to a GAL (Generic Array Logic) 1054.

The memory card 1053 includes a nonvolatile memory such as CompactFlash (registered trade mark), and stores a game program. The game program includes a symbol determination program. The symbol determination program is a program for determining symbols to be rearranged in the display blocks 1028.

The symbols to be determined by the symbol determination program include 14 types of symbols including "3bar", "2bar", "1bar", "blue7", "red7", "white7", "RIBBON", "HEART", "STAR", "MOON", "SUN", "JEWEL", "CROWN", and "SMILE".

Further, the card slot 1053S is configured so as to allow the memory card 1053 to be inserted thereinto or removed therefrom, and is connected to the mother board 1040 by an IDE bus. Therefore, the type and contents of a game played on the slot machine 1010 can be changed by removing the memory card 1053 from the card slot 1053S, writing another game program into the memory card 1053, and inserting the memory card 1053 into the card slot 1053S. The game program includes a program on the progress of the game. Further, the game program includes image data and sound data to be outputted during the game.

The CPU 1051, the ROM 1055 and the boot ROM 1052 interconnected to one another by an internal bus are connected to the mother board 1040 through a PCI bus. The PCI bus not only conducts signal transmission between the mother board 1040 and the gaming board 1050, but also supplies power from the mother board 1040 to the gaming board 1050.

The mother board 1040 is configured using a commercially available general-purpose mother board (a print wiring board on which fundamental components of a personal computer are mounted), and provided with a main CPU 1041, a ROM (Read Only Memory) 1042, a RAM (Random Access Memory) 1043, and a communication interface 1044.

The ROM 1042 stores a program such as a BIOS (Basic Input/Output System) which comprises a memory device such as a flash memory and is executed by the main CPU 1041, and permanent data. When the BIOS is executed by the main CPU 1041, processing for initializing a predetermined peripheral device is conducted, concurrently with start of processing for loading the game program stored in the memory card 1053 via the gaming board 1050. It is to be noted that, in the present invention, the ROM 1042 may or may not be data rewritable one.

The ROM 1042 includes: data indicative of a predetermined time T; odds data indicative of correspondence relationships (see FIGS. 45A to 45C) between combinations of symbols rearranged along the winning line and the numbers of payouts; data indicative of a first constant number; data indicative of a second constant number; and the like.

The RAM 1043 stores data and a program to be used at the time of operation of the main CPU 1041. Further, the RAM 1043 is capable of storing a game program.

Moreover, the RAM 1043 stores data of the number of credits, the numbers of coin-ins and coin-outs in one game, and the like.

Moreover, the mother board 1040 is connected with a later-described body PCB (Printed Circuit Board) 1060 and a door PCB 1080 through respective USBs. Further, the mother board 1040 is connected with a power supply unit 1045 and the communication interface 1044. The communication interface 1044 is connected with a communication interface 1245 of the PTS terminal 1064 through a communication line.

The body PCB 1060 and the door PCB 1080 are connected with an instrument and a device that generate an input signal to be inputted into the main CPU 1041 and an instrument and a device, operations of which are controlled by a control signal outputted from the main CPU 1041. The main CPU 1041 executes the game program stored in the RAM 1043 based on the input signal inputted into the main CPU 1041, and thereby executes the predetermined arithmetic processing, stores the result thereof into the RAM 1043, or transmits a control signal to each instrument and device as processing for controlling each instrument and device.

The body PCB 1060 is connected with a lamp 1030, a hopper 1066, a coin detecting portion 1067, a graphic board 1068, the speaker 1029, the touch panel 1069, the ticket printer 1035, a key switch 1038S, the data display 1037, and a timer 1061.

The hopper 1066 is installed inside the cabinet 1011, and pays out a predetermined number of coins based on the control signal outputted from the main CPU 1041, from a coin payout exit 1019 to the coin tray 1018. The coin detecting portion 1067 is provided inside the coin payout exit 1019, and outputs an input signal to the main CPU 1041 in the case of detecting payout of the predetermined number of coins from the coin payout exit 1019.

The timer 37 is used for measuring the time.

The graphic board 1068 controls image display to the upper image display panel 1033 and the lower image display panel 1016 based on the control signal outputted from the main CPU 1041. In the respective display blocks 1028 on the lower image display panel 1016, symbols are displayed in a scrolling manner or in a stopped state. The number of credits stored in the RAM 1043 is displayed to the number-of-credits display portion 1031 of the lower image display panel 1016. Further, the number of coin-outs is displayed to the number-of-payouts display portion 1032 of the lower image display panel 1016.

The graphic board 1068 comprises a VDP (Video Display Processor) for generating image data based on the control signal outputted from the main CPU 1041, a video RAM for temporarily storing image data generated by the VDP, and the like. It is to be noted that image data used in generation of the image data by the VDP is included in the game program read from the memory card 1053 and stored into the RAM 1043.

Based on the control signal outputted from the main CPU 1041, the ticket printer 1035 prints on a ticket a barcode as coded data of the number of credits stored in the RAM 1043, a date, and an identification number of the slot machine 1010, and the like, and outputs the ticket as the ticket 1039 with a barcode. The key switch 1038S is provided on the keypad 1038, and outputs a predetermined input signal to the main CPU 1041 when the key pad 1038 is operated by the player. The data display 1037 displays data inputted by the player via the key pad 1038, and the like, based on the control signal outputted from the main CPU 1041.

The door PCB 1080 is connected with the control panel 1020, a reverter 1021S, and a cold cathode tube 1081. The control panel 1020 is provided with a start switch 1023S corresponding to the start button 1023, a change switch 1024S corresponding to the change button 1024, a CASHOUT switch 1025S corresponding to the CASHOUT button 1025, a 1-BET switch 1026S corresponding to the 1-BET button 1026, and a maximum BET switch 1027S corresponding to the maximum BET button 27. Each of the switches 1023S to 1027S outputs an input signal to the main CPU 1041 when each of the buttons 1023 to 1027 corresponding thereto is operated by the player.

The reverter 1021S operates based on the control signal outputted from the main CPU 1041, and distributes a coin into a cash box (not shown) or the hopper 1066, which are disposed in the slot machine 1010. Namely, when the hopper 1066 is filled with coins, a regular coin is distributed into the cash box by the reverter 1021S. On the other hand, when the hopper 1066 is not filled with coins, the regular coin is distributed into the hopper 1066. The cold cathode tube 1081 functions as a back light installed on the rear face side of the lower image display panel 1016 and the upper image display panel 1033, and lighted up based on the control signal outputted from the main CPU 1041.

FIG. 35 is a block diagram illustrating an internal configuration of a PTS terminal forming the gaming system according to an embodiment of the present invention.

The PTS terminal 1064 includes a CPU 1241, a ROM 1242, a RAM 1243, a connecting portion 1244, the communication interface 1245, and a hard disk drive 1246. The controller including the CPU 1241, the ROM 1242, and the RAM 1243 corresponds to the controller in the present invention. The communication interface 1245 is connected to the communication interface 1044 of a single slot machine 1010 that is in a correspondence relationship with this PTS terminal 1064, through a communication line, and is also connected to the management server block 1220 through a communication line. The ROM 1242 stores: a system program for controlling operations of the PTS terminal 1064; exchange-fee calculated value data; permanent data; and the like. The exchange-fee calculated value data is data indicating the exchange-fee calculated value P/(1−P) (where P is an exchange fee ratio). Further, the RAM 1243 temporarily stores exchange rate data indicating an exchange rate in which a correspondence relationship between the amount of the basic currency (U.S. currency) and the amount of another type of currency other than the basic currency is set for each type of currency other than the basic currency, and the like.

The hard disk drive 1246 functions to store an image data of an image captured by the camera 1254C. The CPU 1241 stores, after power is supplied thereto and a predetermined activation processing is performed thereto, the image data obtained upon image-capturing by the camera 1254C, in the hard disk drive 1246. The storage of the image data is performed at a predetermined time interval (for example, 0.5 second interval). Each of the image data is marked with a time (time stamp) at which the image data is stored in the hard disk drive 1246. The PTS terminal 1064 has a clock function and conducts time correction each time a predetermined time period elapses. The time correction is conducted by obtaining time data from a clock installed in the management server 200 or from outside via the Internet.

When the storable domain of the hard disk drive 1246 becomes less than a predetermined amount (for example, 100 MB), the CPU 1241 deletes the image data from those marked with an older time stamp. It is to be noted that the image data that are not set to the deletable state are not deleted.

The connecting portion 1244 is connected to the bill validator 1022, the to-be-exchanged bill validator 1065, a coin counter 1021C, a camera module 1254, an RFID-R 1255, and the IC card R/W 1253 through respective communication lines.

The bill validator 1022 not only discriminates a regular bill (basic currency) from a false bill, but also accepts the regular bill. When having accepted a regular bill, the bill validator 1022 outputs an input signal to the CPU 1241, based on the face amount of the bill. That is, an input signal includes information about the amount of the accepted bill.

The to-be-exchanged bill validator 1065 identifies the types of bills of a plurality of countries which are currencies other than the basic currency and discriminates a regular bill from a false bill, and accepts the regular bill. When having accepted the regular bill, the to-be-exchanged bill validator 1065 outputs an input signal to the CPU 1241, based on the type and the amount of the bill. An input signal includes type-of-currency data indicating the identified type of the currency and amount-of-currency data indicating the amount of this currency. That is, an input signal includes information about the type and the amount of the accepted bill.

The coin counter 1021C is provided inside the coin receiving slot 1021, and discriminates a regular coin from a false coin inserted into the coin receiving slot 1021 by the player. Coins other than the regular coin are discharged from the coin payout exit 1019. Further, the coin counter 1021C outputs an input signal to the CPU 1241 in detection of the regular coin.

The camera module 1254 controls operations of the camera 1254C connected to the camera module 1254. The image data obtained by image-capturing is stored in the hard disk drive 1246 in the PTS terminal 1064.

An RFID-R 1255 receives radio waves emitted by RFID tags carried by the staff members of the casino. The RFID-R 1255 outputs a reception signal to the CPU 1241, based on the received radio waves. A reception signal includes information (staff ID) for identifying the RFID tag from which the received radio waves have been emitted. The CPU 1241 then transmits the reception signal to the staff management server 1263. The staff management server 1263, having received the reception signal transmitted from the CPU 1241, recognizes the current location of each staff member within the casino, based on the reception signal.

The IC card R/W 1253 reads data from an IC card and transmits the data to the CPU 1241, or writes data into the IC card based on a control signal from the CPU 1241.

Figure 36:
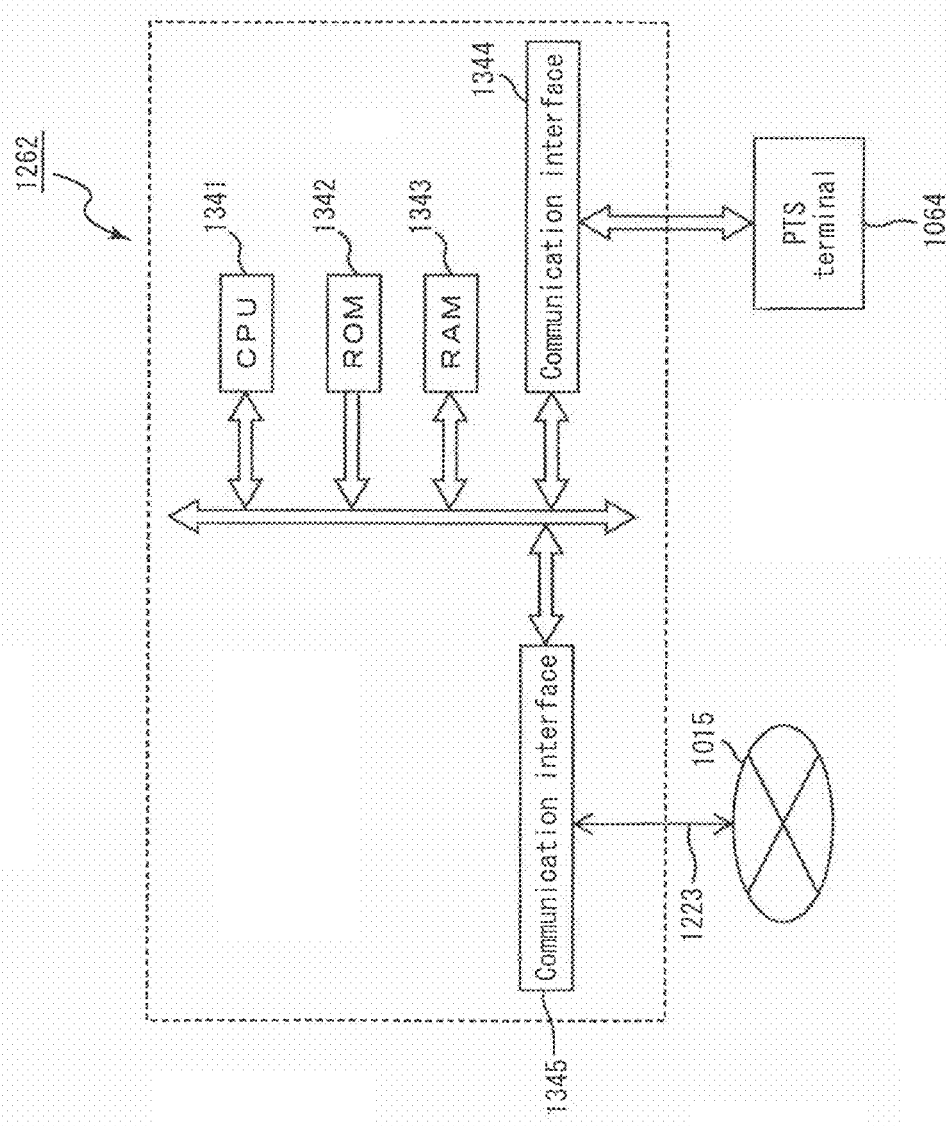
FIG. 36 is a block diagram illustrating an internal configuration of an exchange server forming the gaming system according to an embodiment of the present invention.

FIG. 36 is a block diagram illustrating an internal configuration of an exchange server forming the gaming system according to an embodiment of the present invention.

The exchange server 1262 includes a CPU 1341, a ROM 1342, a RAM 1343, a communication interface 1344, and a communication interface 1345. The communication interface 1344 is connected to the communication interface 1245 of the PTS terminal 1064 through a communication line. The communication interface 1345 is connected to the Internet 1015 through the communication line 1223. The ROM 1342 stores; a system program for controlling operations of the exchange server 1262; an exchange information acquisition program for acquiring the latest exchange information via the Internet 1015; permanent data; fee data indicating the exchange fee ratio P; and the like. Further, the RAM 1343 temporarily stores exchange information, exchange information of post-fee-subtraction, and the like.

Figure 37:
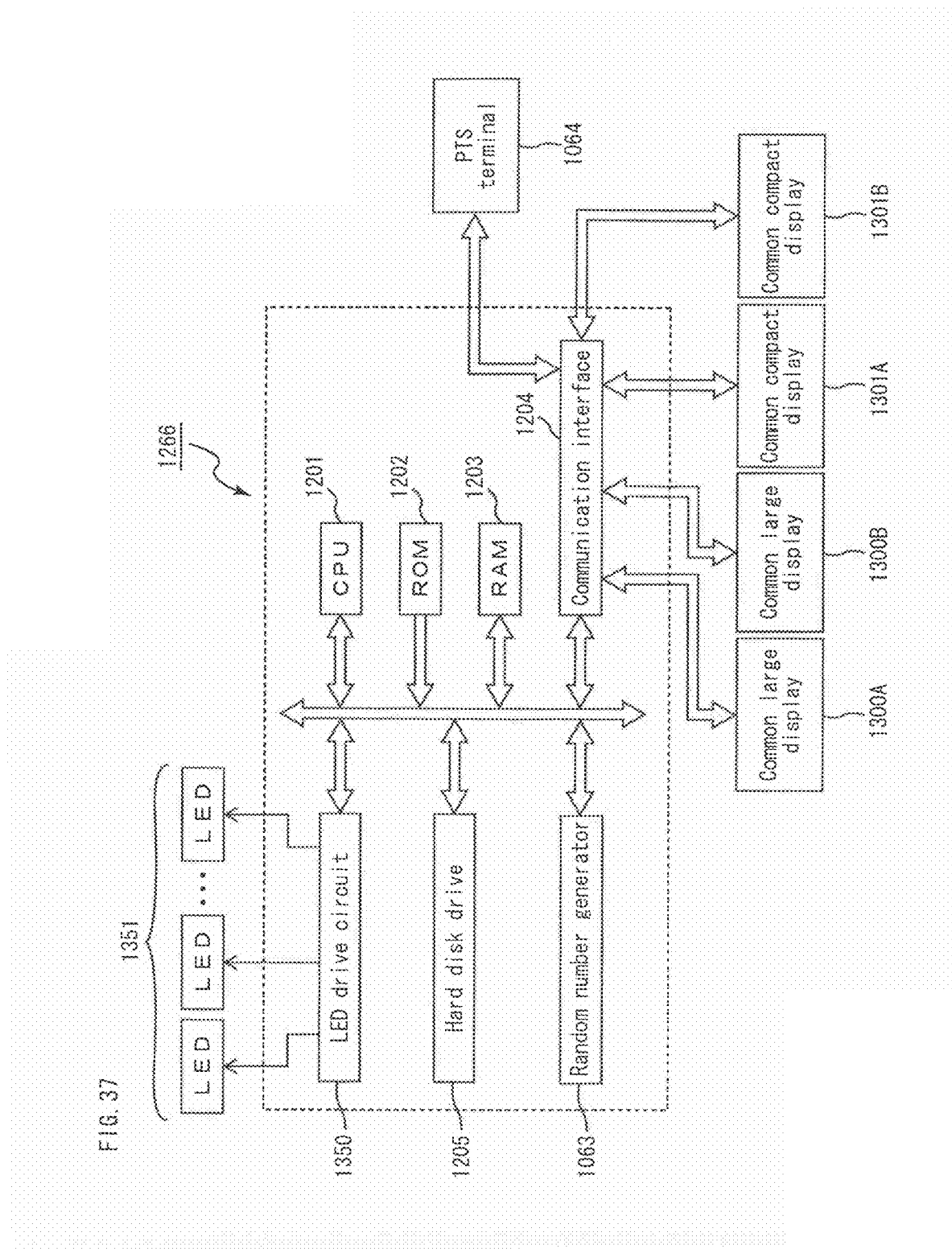
FIG. 37 is a block diagram illustrating an internal configuration of a progressive-jackpot server forming the gaming system according to an embodiment of the present invention.

FIG. 37 is a block diagram illustrating an internal configuration of a progressive-jackpot server forming the gaming system according to an embodiment of the present invention.

The progressive-jackpot server 1266 includes a CPU 1201, a ROM 1202, a RAM 1203, a communication interface 1204, a LED drive circuit 1350, a random number generator 1063, and a hard disk drive 1205 as a memory. The random number generator 1063 generates a random number at a predetermined timing. The communication interface 1204 is connected through communication lines to the communication interfaces 245 of the PTS terminals 1064, and also is connected to the common large display 1300A, the common large display 1300B, the common compact display 1301A, and the common compact displays 1301B through communication lines. The ROM 1202 stores a system program for controlling the operation of the progressive-jackpot server 1266, permanent data, and the like. Further, the RAM 1203 temporarily stores cumulative-value data for EVENT TIME indicative of the cumulative value for EVENT TIME, cumulative-value data for bonus indicative of the cumulative value for bonus, number-of-lights data indicative of the number of the LEDs 1351 having been lighted among the LEDs 1351 included in the coupling illumination line 1310 provided for each of the slot machines 1010, data received from each of the slot machines 1010, and the like.

In the hard disk drive 1205, number-of-lighting determination table data indicative of a plurality of types of number-of-lighting determination tables (a number-of-lighting determination table for bent portions and a number-of-lighting determination table for straight portions) is stored.

Further, in the hard disk drive 1205, number-of-points determination table data to be referred to in determining the number of points in the common game is stored.

Furthermore, in the hard disk drive 1205, data indicative of the predetermined value and data indicative of the specific value are stored.

The plurality of LEDs 1351 are connected to the LED drive circuit 1350. The LEDs 1351 are associated with respective identification numbers, and the LED drive circuit 1350 turns on and turns off the LEDs 1351 based on a signal received from the CPU 1201.

Figure 38:
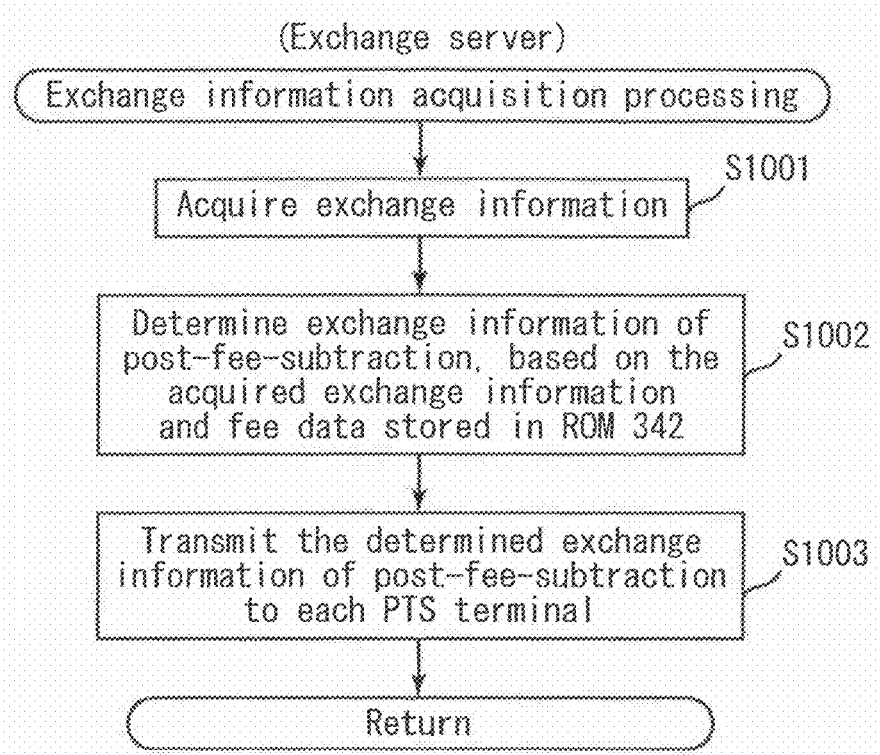
FIG. 38 is a flowchart illustrating exchange-information acquisition processing executed in the exchange server.

FIG. 38 is a flowchart illustrating exchange information acquisition processing conducted in the exchange server.

The exchange information acquisition processing is processing executed at a predetermined timing.

First, the CPU 1341 executes the exchange information acquisition program stored in the ROM 1342 so as to acquire the latest exchange information via the Internet 1015 (step S1001). In the processing, the CPU 1341 acquires, for example, information indicating a correspondence relationship between the amount of U.S. currency and the amount of Japanese currency (e.g. 1 dollar=100 yen) at a certain timing. The CPU 1341 also acquires, for example, information indicating a correspondence relationship between the amount of U.S. currency and the amount of Chinese currency (e.g. 1 dollar=6.85 yuan) at another timing. It is to be noted that the association between the amount M of U.S. currency and the amount N of currency of another country is described as M=N, in the present specification.

The CPU 1341 then determines exchange information of post-fee-subtraction, based on the exchange information acquired in step S1001 and the fee data stored in the ROM 1342 (step S1002). In the processing, in the correspondence relationships indicated by the exchange information, the CPU 1341 determines exchange information of post-fee-subtraction by multiplying the amount of currency of a country other than the U.S. by a value obtained by subtracting the exchange fee ratio (0.02 in the present embodiment) indicated by the fee data from 1. For example, when the acquired exchange information indicates that 1 dollar is equivalent to 100 yen, the CPU 1341 determines information indicating that 0.98 dollar, obtained by multiplying 1 dollar by (1−0.02), is equivalent to 100 yen, as the exchange information of post-fee-subtraction.

The CPU 1341 transmits the exchange information of post-fee-subtraction determined in step S1002 to each PTS terminal 1064 (step S1003). After executing the processing of step S1003, the CPU 1341 completes the exchange information acquisition processing.

Figure 39:
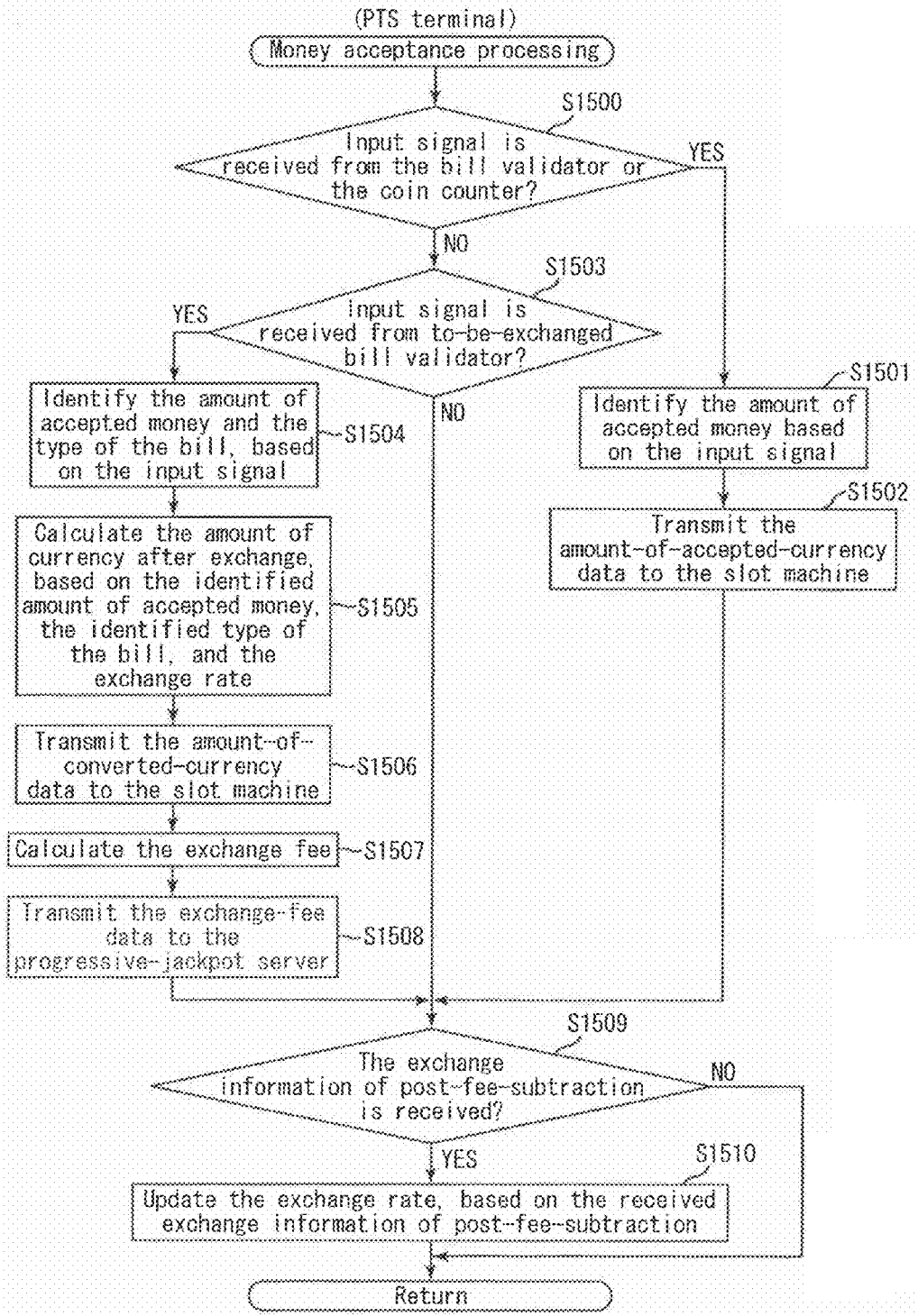
FIG. 39 is a flowchart illustrating money acceptance processing executed in the PTS terminal illustrated in FIG. 35.

FIG. 39 is a flowchart illustrating money acceptance processing conducted in the PTS terminal illustrated in FIG. 35.

First, the CPU 1241 determines whether or not it has received an input signal from the bill validator 1022 or the coin counter 1021C at a predetermined timing (step S1500).

When determining in step S1500 that the CPU 1241 has received an input signal, the CPU 1241 identifies the amount of accepted money based on the received input signal (step S1501). The CPU 1241 then transmits the amount-of-accepted-currency data indicating the identified amount of accepted money to the correspondingly related slot machine 1010 (step S1502).

On the other hand, when determining in step S1500 that the CPU 1241 has not received an input signal, the CPU 1241 determines whether or not it has received an input signal from the to-be-exchanged bill validator 1065 (step S1503).

When determining in step S1503 that the CPU 1241 has received an input signal, the CPU 1241 identifies the amount of accepted money and the type of the bill accepted by the to-be-exchanged bill validator 1065, based on the type-of-currency data and the amount-of-currency data included in the received input signal (step S1504).

The CPU 1241 calculates the amount of currency (e.g. 98 dollars) after exchanged into the U.S. currency, which is the basic currency, based on the amount of accepted money (e.g. 10,000 yen) and the type of the bill which have been identified in step S1504, and the exchange rate (e.g. 0.98 dollar=100 yen) indicated by the exchange rate data stored in the RAM 1243 (step S1505). The CPU 1241 then transmits the amount-of-converted-currency data indicating the amount of exchanged currency (hereinafter, also referred to as the amount of converted currency) to the correspondingly related slot machine 1010 (step S1506). It is to be noted that the amount-of-accepted-currency data combined with the amount-of-converted-currency data is described as the amount-of-currency data.

The CPU 1241 calculates the exchange fee, based on the amount-of-converted-currency data indicating the amount of converted currency calculated in step S1505 and on exchange-fee calculated value data indicating the exchange-fee calculated value stored in the ROM 1242 (step S1507). The exchange fee corresponds to an amount (e.g. 2 dollars) obtained by multiplying the amount of converted currency (e.g. 98 dollars) calculated in step S1505 by the exchange-fee calculated value P/1−P (where P is the exchange fee ratio (0.02 in the present embodiment)) (the exchange-fee calculated value is 2/98 in the present embodiment). The CPU 1241 then transmits exchange-fee data indicating the exchange fee to the progressive-jackpot server 1266 (step S1508).

When executing the processing of step S1502 or step S1508, or when determining in step S1503 that the CPU 1241 has not received an input signal, the CPU 1241 determines whether or not it has received the exchange information of post-fee-subtraction from the exchange server 1262 (step S1509).

When determining in step S1509 that the CPU 1241 has received the exchange information of post-fee-subtraction, the CPU 1241 updates the exchange rate data stored in the RAM 1243 based on the received exchange information of post-fee-subtraction (step S1510). For example, when the CPU 1241 has received the exchange information of post-fee-subtraction, which indicates a correspondence relationship of 1 dollar=110 yen, in a case where the correspondence relationships among the respective currencies in the exchange rates indicated by the exchange rate data stored in the RAM 1243 are 1 dollar=100 yen=0.68 euro=6.85 yuan, the CPU 1241 stores into the RAM 1243 the exchange rate data indicating a new exchange rate of 1 dollar=110 yen=0.68 euro=6.85 yuan.

In the present embodiment, a case is described where the exchange server 1262 having received the exchange information determines the exchange information of post-fee-subtraction, based on the received exchange information, and transmits the determined exchange information of post-fee-subtraction to the PTS terminals 1064. That is, the exchange server 1262 conducts the processing related to collection of exchange fees. However, in the present invention, the PTS terminal may conduct the processing related to collection of exchange fees.

In this case, for example, a configuration as described below can be adopted.

Namely, the ROM in the PTS terminal stores the fee data indicating the exchange fee ratio P. The CPU in the PTS terminal receives the exchange information form the exchange server. Next, the CPU in the PTS terminal determines the exchange information of post-fee-subtraction, based on the fee data stored in the ROM. The CPU in the PTS terminal then updates the exchange rate data based on the determined exchange information of post-fee-subtraction.

Further, in the present invention, the exchange rate data may be stored in the RAM in the exchange server, and the CPU in the exchange server may update the exchange rate data based on the exchange information of post-fee-subtraction and transmits the updated exchange rate data to the PTS terminal.

Alternatively, the exchange server may receive the exchange rate data from an external source.

When executing the processing of step S1510 or when determining in step S1509 that the CPU 1241 has not received the exchange information of post-fee-subtraction, the CPU 1241 completes the money acceptance processing.

Figure 40:
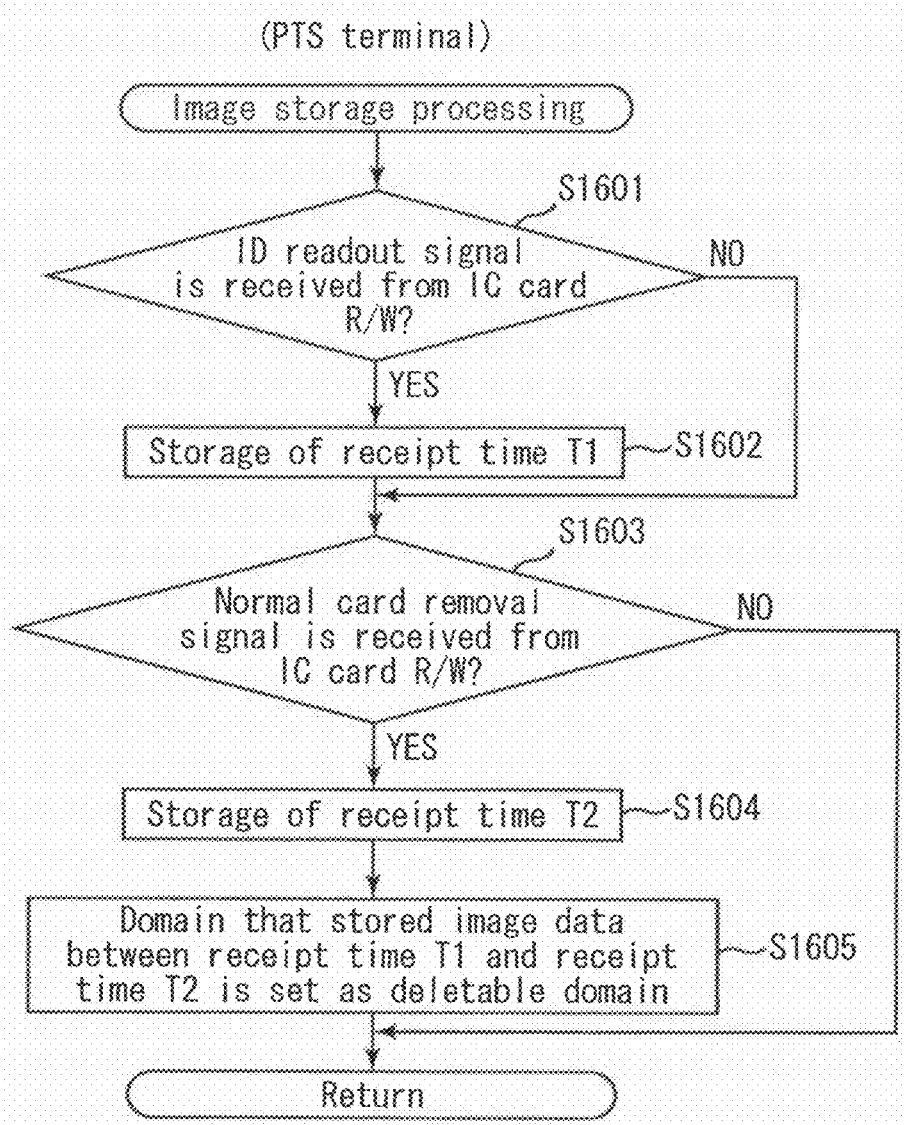
FIG. 40 is a flowchart illustrating a subroutine of image storage processing execute in the PTS terminal illustrated in FIG. 35.

FIG. 40 is a flowchart illustrating a subroutine of the image storage processing performed in the PTS terminal shown in FIG. 35.

In the PTS terminal 1064, the image data obtained by image-capturing by the camera 243C is continuously stored in the hard disk drive 1246 at a 0.5 second interval as explained above using FIG. 35.

First, in step S1601, the CPU 1241 in the PTS terminal 1064 determines whether or not an ID readout signal has been received from the IC card R/W 1253. When determined that the ID readout signal has been received, the CPU 1241 stores a receipt time T1 in a predetermined domain in the RAM 1243 (step S1602).

In step S1601, when determined that the ID readout signal is not received or when processing of step S1602 is completed, the CPU 1241 determined whether or not a normal card removal signal has been received from the IC card R/W 1253 (step S1603). When determined that the CPU 1241 has received the normal card removal signal from the IC card R/W 1253, the CPU 1241 stores a receipt time T2 in a predetermined domain in the RAM 1243 (step S1604).

Next, in step S1605, the CPU 1241 sets the domain in the hard disk drive 1246 that has stored the image data between the receipt time T1 and the receipt time T2 to a deletable domain. In this processing, the CPU 1241 sets the image data with a time stamp from the receipt time T1 to the receipt time T2 to the deletable state. When determined in step S1603 that the normal card removal signal is not received, or when the processing of step S1605 is completed, the CPU 1241 completes the present subroutine.

It is to be noted that the image data stored in the domain set to the deletable domain is deleted at the occasion when the storable domain becomes less than 100 MB.

Figure 41:
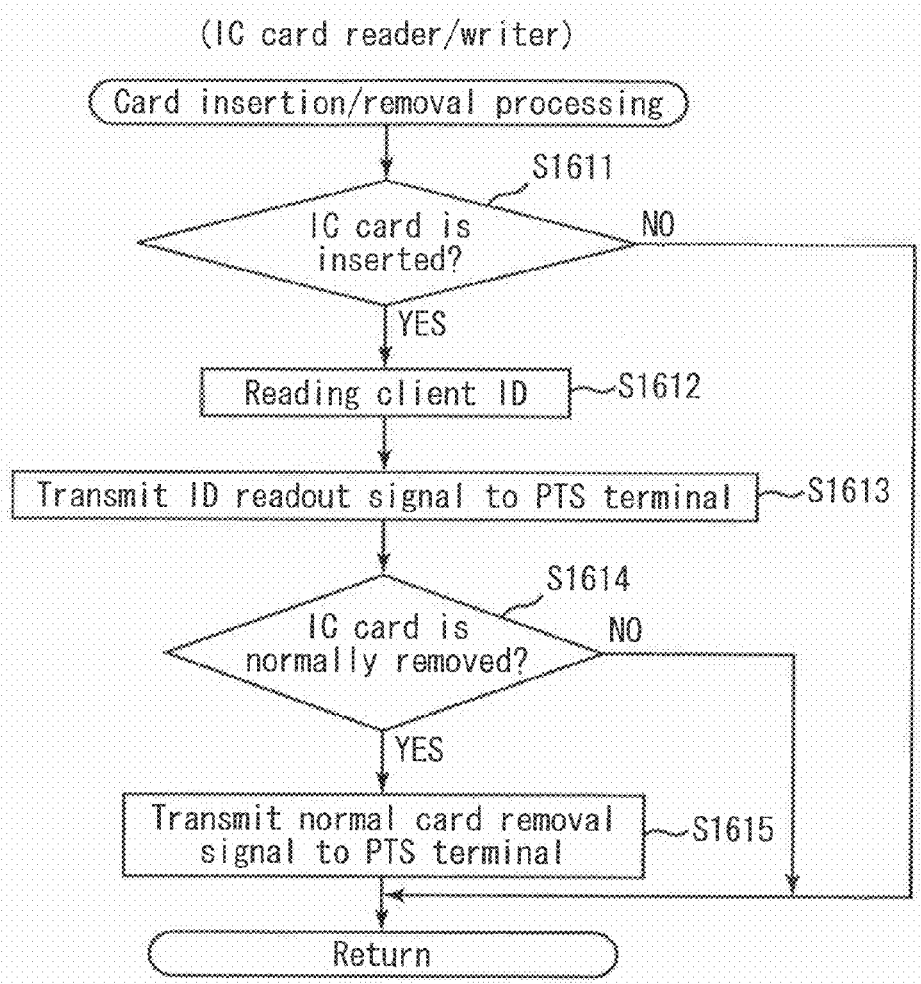
FIG. 41 is a flowchart illustrating a subroutine of card insertion/removal processing executed in the IC card reader/writer.

FIG. 41 is a flowchart illustrating a subroutine of card insertion/removal processing executed in the IC card reader/writer.

First, the IC card R/W 1253 determines whether or not the IC card is inserted (step S1611). When determined that the IC card is inserted, the IC card R/W 1253 read a client ID from the IC card. Then, in step S1613, the IC card R/W 1253 transmits an ID readout signal indicating that the client ID has been read to the PTS terminal 1064. When it is determined that the IC card is inserted in step S1611, while the client ID has been already read, the processing shifts to step S1614 without conducting processing of step S1612 and step S1613.

The client ID corresponds to the identification data in the present invention. Also, the ID readout signal corresponds to the present invention.

In step S1614, the IC card R/W 1253 determines whether or not the IC card is normally removed. When determined that the IC card is normally removed, the IC card R/W 1253 transmits the normal card removal signal to the PTS terminal 1064 (step S1615). This subroutine is completed when it is determined in step S1614 that the IC card is normally removed, or when the processing of step S1615 is completed.

The normal card removal signal corresponds to the non-detection signal in the present invention.

Figure 42:
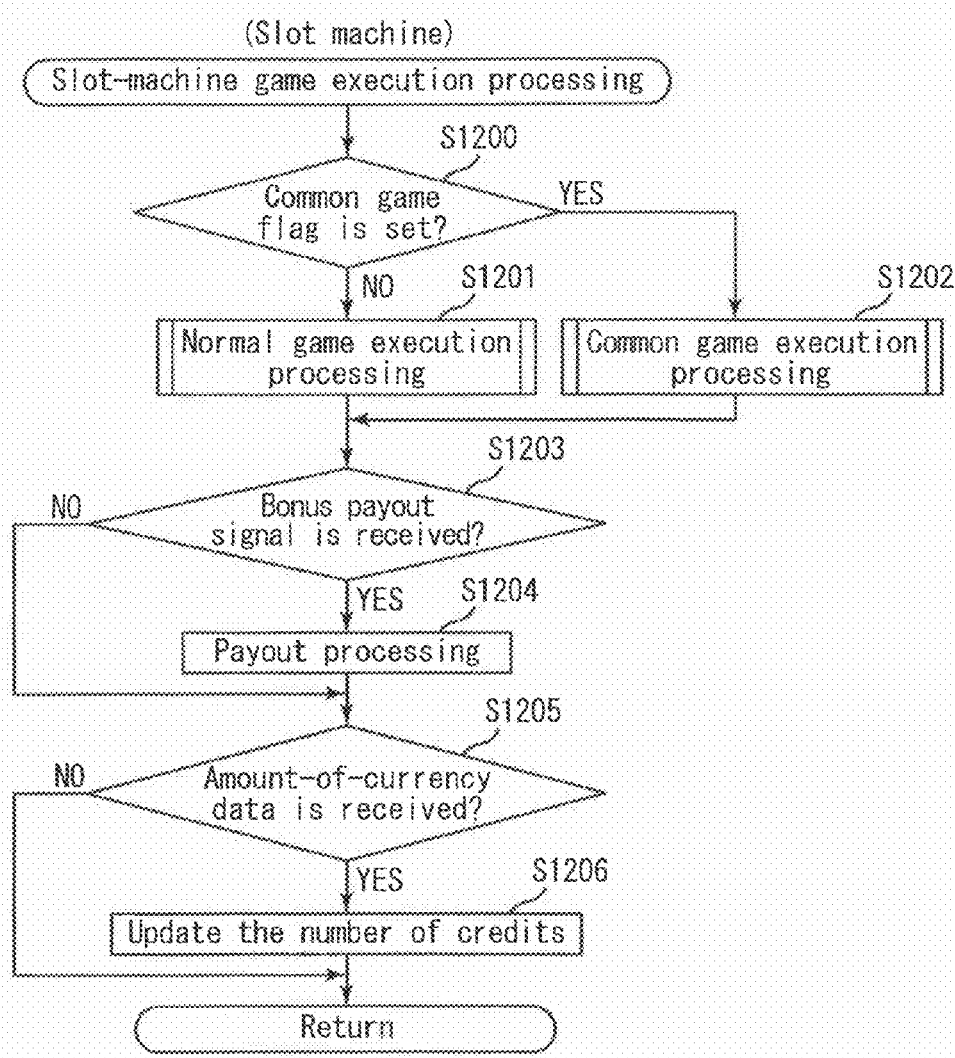
FIG. 42 is a flowchart illustrating slot-machine game execution processing conducted in a slot machine.

FIG. 42 is a flowchart illustrating slot-machine game execution processing conducted in a slot machine.

Transmission of data and the like between the slot machine 1010 and the progressive-jackpot server 1266 is conducted via the PTS terminal 1064. However, in order to make the description simpler in the following, the transmission will be described as if it is conducted between the slot machine 1010 and the progressive-jackpot server 1266.

First, the main CPU 1041 determines whether or not the common game flag has been set or not (step S1200).

Figure 43:
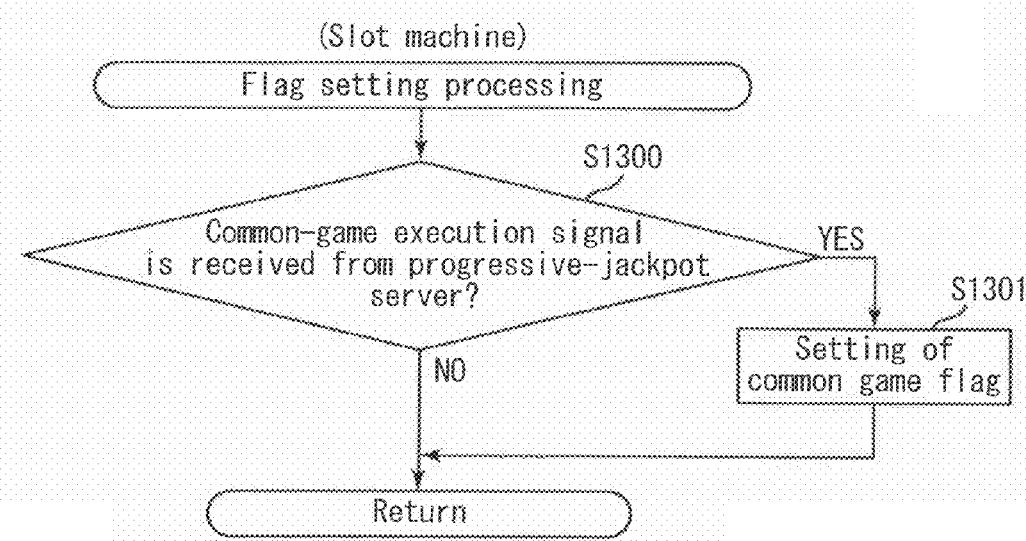
FIG. 43 is a flowchart illustrating a subroutine of flag setting processing.

With reference to FIG. 43, the common-game flag is described.

FIG. 43 is a flowchart illustrating a subroutine of flag setting processing.

First, the main CPU 1041 determines at a predetermined timing whether or not it has received a common-game execution signal (see FIG. 49) from the progressive-jackpot server through the PTS terminal 1064 (step S1300).

When determining that the main CPU 1041 has not received the common-game execution signal, the main CPU 1041 completes the present subroutine.

On the other hand, when determining that the main CPU 1041 has received the common-game execution signal, the main CPU 1041 sets a common-game flag (step S1301) and completes the present subroutine.

As described above, the common-game flag is a flag indicative of a satisfaction of a condition for executing the common game.

When determining in step S1200 in FIG. 42 that the common-game flag is not set, the main CPU 1041 executes normal game execution processing (step S1201). The normal game execution processing will be described in more detail later with reference to the drawing.

On the other hand, when determining that a common-game flag is set, the main CPU 1041 conducts common game execution processing (step S1202). The common game execution processing will be described in more detail later with reference to the drawing.

Next, the main CPU 1041 determines whether or not it has received a bonus payout signal (see FIG. 49) from the progressive-jackpot server 1266 through the PTS terminal 1064 (step S1203).

When determining that the main CPU 1041 has received the bonus payout signal, the main CPU 1041 pays out the coins (step S1204). In the case of receiving the bonus payout signal including information indicating that this slot machine 1010 is a first winning slot machine 1010, the main CPU 1041 pays out a first fixed number of coins. On the other hand, in the case of receiving the bonus payout signal including information indicating that this slot machine 1010 is a second winning slot machine 1010, the main CPU 1041 pays out a second fixed number of coins. The value of the first fixed number is larger than the value of the second fixed number. Namely, the number of coins paid out to the first winning slot machine 1010 is larger than the number of coins paid out to the second winning slot machine 1010.

After executing the processing of step S1204 or when determining in step S1203 that the main CPU 1041 has not received the bonus payout signal, the main CPU 1041 determines whether or not it has received the amount-of-currency data (the amount-of-accepted-currency data, the amount-of-converted-currency data) from the PTS terminal 1064 (step S1205). Namely, the main CPU 1041 determines whether or not it has received either the amount-of-accepted-currency data transmitted in step S1502 or the amount-of-converted-currency data transmitted in step S1506.

When determining in step S1205 that the main CPU 1041 has received the amount-of-currency data, the main CPU 1041 updates the number of credits based on the received amount-of-currency data (step S1206). Namely, the main CPU 1041 conducts the processing of adding the number of credits equivalent to the amount of currency indicated by the received amount-of-currency data to the number of credits stored in the RAM 1043.

The number of credits equivalent to the amount of currency indicated by the received amount-of-currency data corresponds to the BET value of the present invention.

After executing the processing of step S1206 or when determining in step S1205 that the main CPU 1041 has not received the amount-of-currency data, the main CPU 1041 completes the present subroutine.

Figure 44:
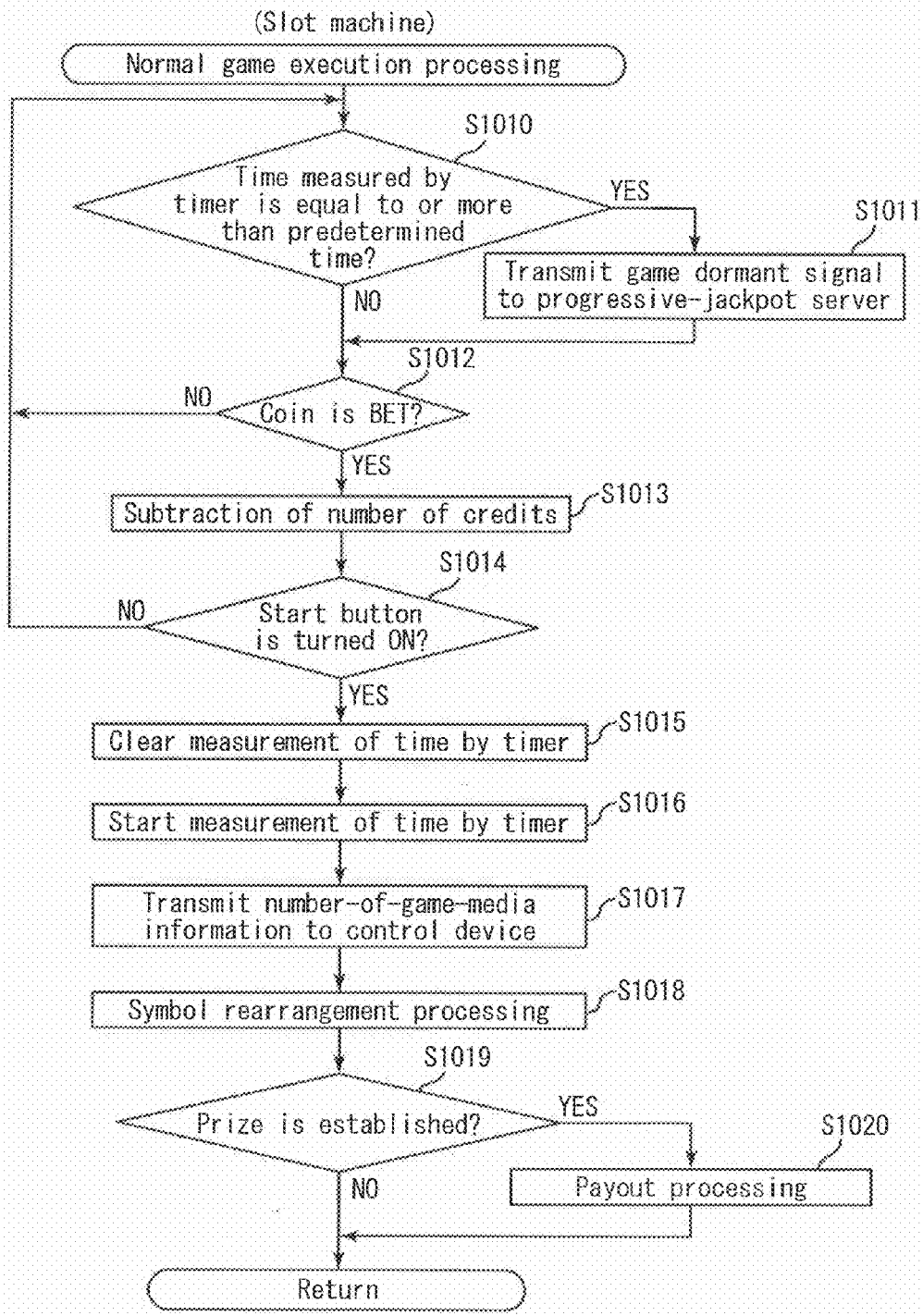
FIG. 44 is a flowchart illustrating a subroutine of normal game execution processing.

FIG. 44 is a flowchart illustrating a subroutine of normal game execution processing.

FIG. 45A to FIG. 45C are views illustrating correspondence relationships between the combinations of symbols rearranged along a winning line and the number of payouts.

Figure 46:
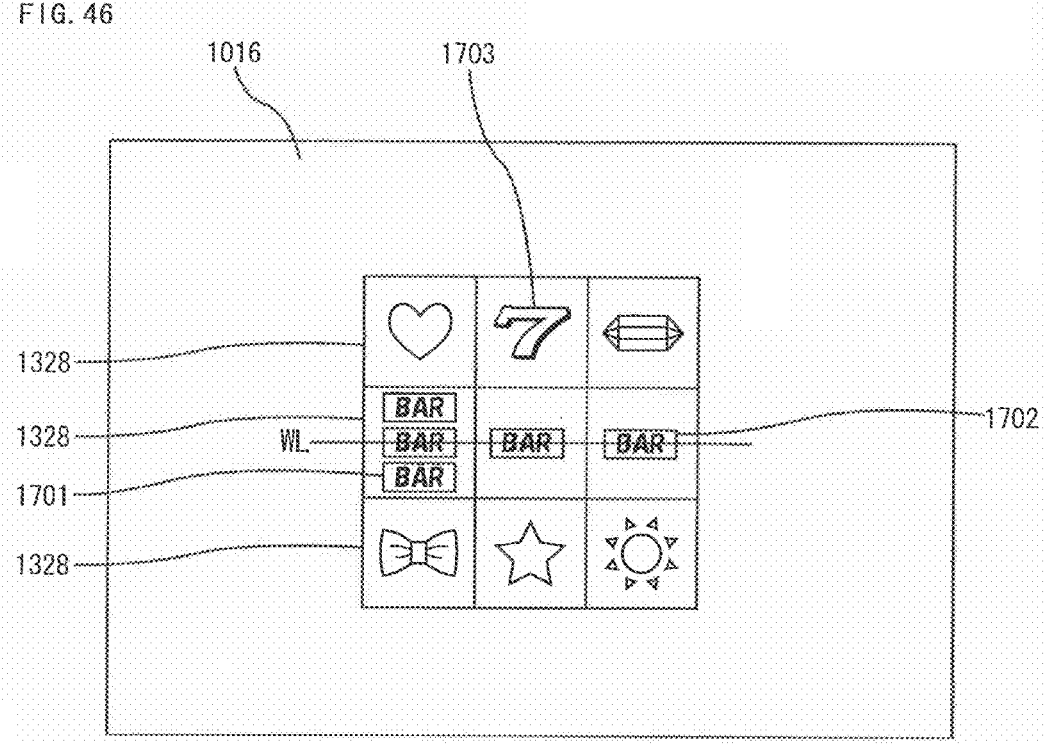
FIG. 46 is a view illustrating exemplary symbols rearranged to a display block.

FIG. 46 is a view illustrating exemplary symbols rearranged in the display blocks.

First, the main CPU 1041 determines whether or not the time measured by the timer 37 is equal to or more than the predetermined time T (step S1010).

When determining in step S1010 that the measured time is not equal to or more than the predetermined time T, the main CPU 1041 shifts the processing to step S1012. On the other hand, when determining in step S1010 that the measured time is equal to or more than the predetermined time T, the main CPU 1041 transmits a game dormant signal to the progressive-jackpot server 1266 through the PTS terminal 1064 (step S1011). The game dormant signal includes the identification number of the slot machine 1010.

The main CPU 1041 determines whether or not a coin has been betted (step S1012). In this processing, the main CPU 1041 determines whether or not it has received an input signal that is outputted from the 1-BET switch 1026S when the 1-BET button 1026 is operated, or an input signal that is outputted from the maximum BET switch 1027S when the maximum BET button 27 is operated. When the main CPU 1041 determines that the coin has not been betted, the main CPU 1041 returns the processing to step S1010.

On the other hand, when determining in step S1012 that the coin has been betted, the main CPU 1041 conducts processing for making a subtraction from the number of credits stored in the RAM 1043 according to the number of betted coins (step S1013) It is to be noted that, when the number of coins to be betted is larger than the number of credits stored in the RAM 1043, the main CPU 1041 does not conduct the processing for making a subtraction from the number of credits stored in the RAM 1043, and returns the processing to step S1010. Further, when the number of coins to be betted exceeds the upper limit of the number of coins that can be betted in one game (three coins in the present embodiment), the main CPU 1041 does not conduct the processing for making a subtraction from the number of credits stored in the RAM 1043, and advances the processing to step S1014.

Next, the main CPU 1041 determines whether or not the start button 1023 has been turned ON (step S1014). In this processing, the main CPU 1041 determines whether or not it has received an input signal that is outputted from the start switch 1023S when the start button 1023 is pressed.

When the main CPU 1041 determines that the start button 1023 has not been turned ON, the processing is returned to step S1010.

It is to be noted that, when the start button 1023 is not turned ON (e.g. when the start button 1023 is not turned ON and a command to end the game is inputted), the main CPU 1041 cancels a subtraction result in step S1013.

On the other hand, when determining in step S1014 that the start button 1023 has been turned ON, the main CPU 1041 clears the time measured by the timer 37 (step S1015) and starts measurement of the time by the timer 37 (step S1016).

The main CPU 1041 transmits the number-of-game-media information indicative of the number of betted coins to the progressive-jackpot server 1266 through the PTS terminal 1064 (step S1017). The number-of-game-media information includes the identification number of the slot machine 1010.

Next, the main CPU 1041 executes symbol rearrangement processing (step S1018).

In this processing, first, the main CPU 1041 starts scroll-display of symbols in the display blocks 1028. Then, the main CPU 1041 executes the aforementioned symbol determination program so as to determine the symbols to be rearranged, and then rearranges the symbols in the display blocks 1028.

Next, the main CPU 1041 determines whether or not a prize has been established (step S1019).

As shown in FIG. 46, in display blocks 1328 according to the present embodiment, nine symbols in total can be rearranged in three rows and three columns. Along the center row, a winning line WL is set. When symbols rearranged along the winning WL form a predetermined combination, it is determined that a prize has been established and coins are paid out.

As shown in FIG. 45A to FIG. 45C, in the present embodiment, it is configured such that the relationships between the combinations of symbols and the numbers of coin-outs vary among a case where the number of betted coins is one, a case where the number of betted coins is two and a case where the number of betted coins is three. In the drawing, "3bar" is a symbol 1701 shown in FIG. 46, and "1bar" is a symbol 1702 shown in FIG. 46. Also, "anybar" is any of the symbols out of "3bar", "2bar", and "1bar".

Here, when the number of bets is equal to or less than two, an establishment of a prize refers to an establishment of at least one combination of symbols out of the combinations of symbols of "3bar×3", "2bar×3", "1bar×3" and "anybar×3", along the winning WL (see FIGS. 45A and 45B). When the number of bets is three, an establishment of a prize refers to an establishment of at least one combination of symbols out of the combinations of symbols of "blue7×3", "red7×3", and "white7×3", along the winning line WL (see FIG. 45C).

When determining that a prize has been established, the main CPU 1041 executes processing relating to the payout of coins (step S1020). In the processing, the main CPU 1041 pays out coins of the number that is determined based on the data indicating the relationships between the combinations of symbols and the numbers of coin-outs (see FIGS. 45A to 45C).

For example, when a combination of symbols of "3bar-1bar-1bar" is rearranged along the winning line WL as shown in FIG. 46 in a game in which one coin has been betted, this combination corresponds to a combination "any-bar-anybar-anybar", and thus ten coins will be paid out.

In the case of accumulating coins, the main CPU 1041 conducts processing for adding the number of credits corresponding to the determined amount of payout to the number of credits stored in the RAM 1043. On the other hand, in the case of paying out coins, the main CPU 1041 transmits a control signal to the hopper 1066 in order to pay out coins in an amount corresponding to the determined amount of payout.

When determining in step S1019 that no prize has been established or after executing the processing of step S1020, the main CPU 1041 completes the present subroutine.

Subsequently, the common game execution processing is described with reference to FIG. 47.

Figure 47:
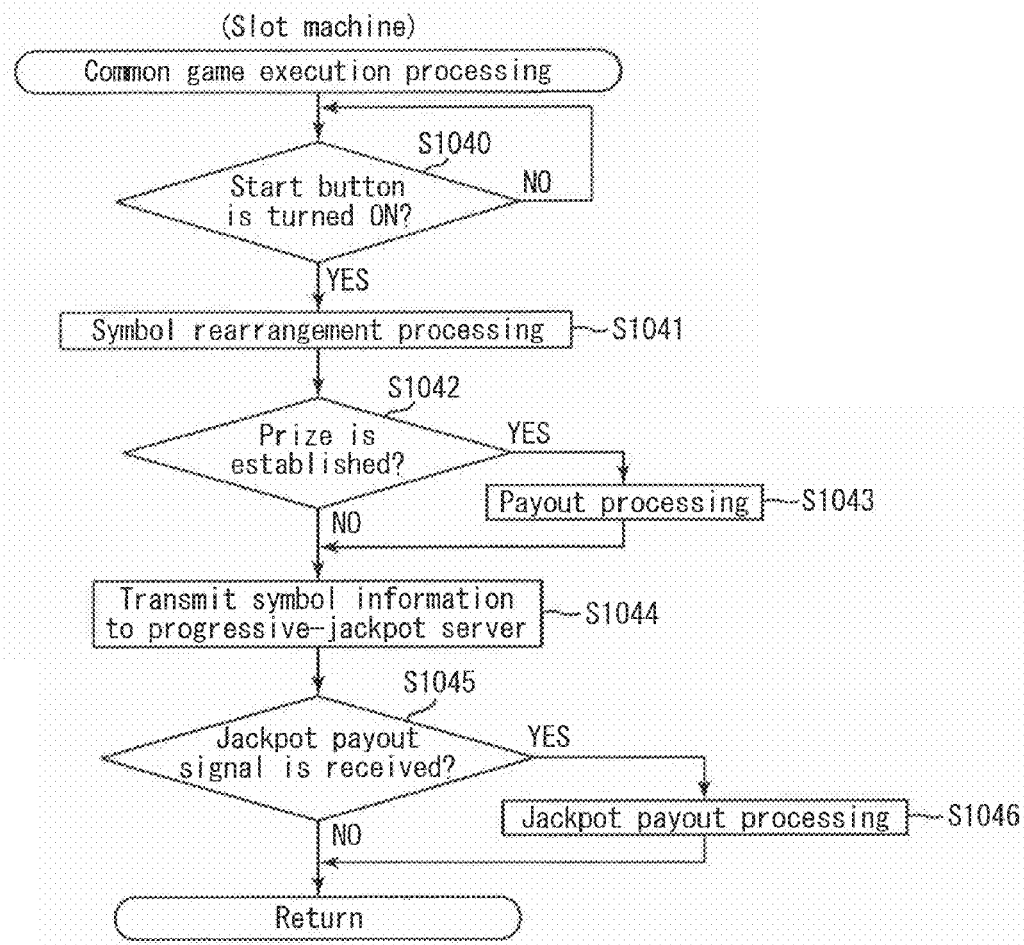
FIG. 47 is a flowchart illustrating a subroutine of common-game execution processing.

FIG. 47 is a flowchart illustrating a subroutine of the common game execution processing.

First, the main CPU 1041 executes processing of steps S1040 to S1043, and the processing is substantially the same as the processing of step S1014 and steps S1018 to S1020 in FIG. 44. Here, only the parts different from step S1014 and steps S1018 to S1020 in FIG. 44 will be described.

When determining in step S1042 that no prize has been established or after executing the processing of step S1043, the main CPU 1041 transmits symbol information to the progressive-jackpot server 1266 through the PTS terminal 1064 (step S1044). The symbol information is information indicative of the symbols rearranged in step S1041.

Next, the main CPU 1041 determines whether or not it has received a jackpot payout signal from the progressive-jackpot server 1266 through the PTS terminal 1064 (step S1045). The jackpot payout signal is a signal transmitted from the progressive-jackpot server 1266 to any of the slot machines 1010, through the PTS terminal 1064, when all the LEDs 1351 included in the coupling illumination line 1310 provided for this slot machine 1010 have been lighted (see FIG. 51). The jackpot payout signal includes information indicative of the cumulative value for EVENT TIME.

When determining that the main CPU 1041 has received a jackpot payout signal, the main CPU 1041 executes jackpot payout processing (step S1046). In this processing, the main CPU 1041 pays out coins in number corresponding to the cumulative value for EVENT TIME, based on the information indicative of the cumulative value for EVENT TIME which is included in the jackpot payout signal. Examples of the processing executed by the main CPU 1041 in step S1046 include outputting an annunciation sound from the speaker 1029, lighting the lamp 1030, and printing the ticket 1039 with a barcode, which has a barcode indicative of the number of coins to be paid out printed thereon.

When determining in step S1045 that the main CPU 1041 has not received a jackpot payout signal or after executing the processing of step S1046, the main CPU 1041 completes the present subroutine.

Next, there is described processing performed in the progressive-jackpot server 1266.

Figure 48:
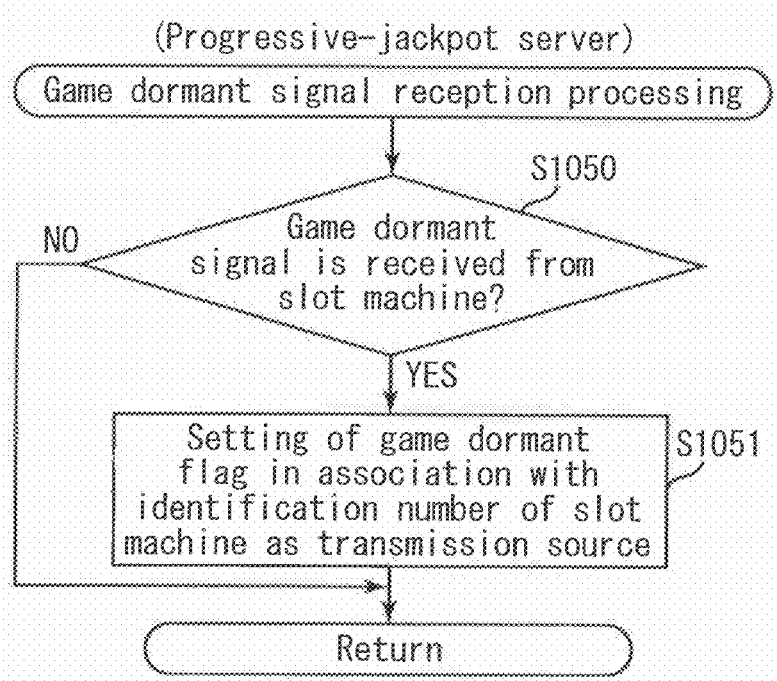
FIG. 48 is a flowchart illustrating a subroutine of game dormant signal reception processing.

FIG. 48 is a flowchart illustrating a subroutine of game dormant signal reception processing.

First, the CPU 1201 determines whether or not it has received a game dormant signal (see FIG. 44) at a predetermined timing from the slot machine 1010 through the PTS terminal 1064 (step S1050).

When determining that the CPU 1201 has not received the game dormant signal, the CPU 1201 completes the present subroutine. On the other hand, when determining that the CPU 1201 has received a game dormant signal, the CPU 1201 sets a dormant flag in association with the identification number of the slot machine 1010 included in the received game dormant signal (step S1051).

Figure 49:
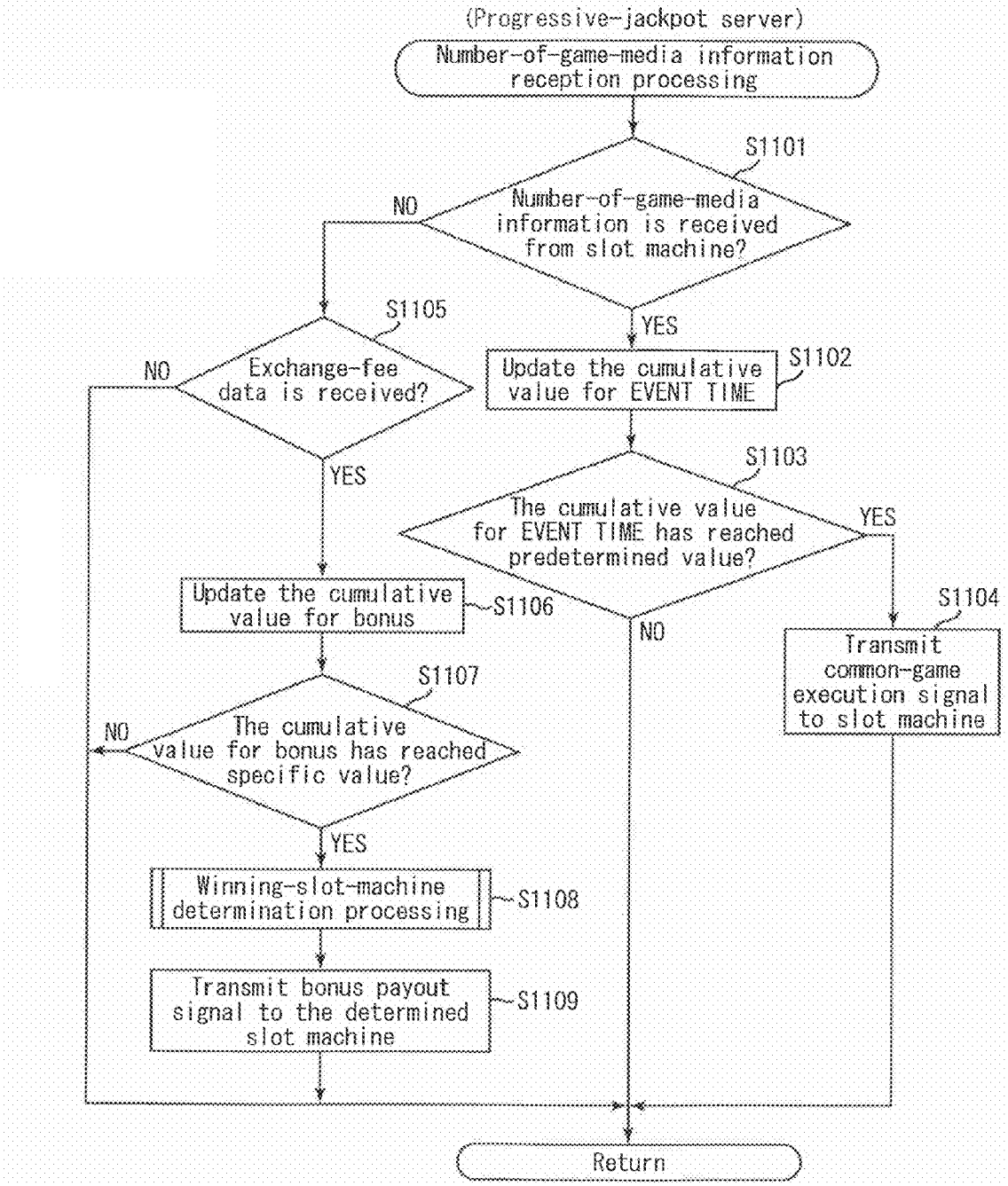
FIG. 49 is a flowchart illustrating a subroutine of number-of-game-media information reception processing.

FIG. 49 is a flowchart illustrating a subroutine of number-of-game-media information reception processing.

First, the CPU 1201 determines whether or not it has received the number-of-game-media information from the slot machine 1010 through the PTS terminal 1064 at a predetermined timing (step S1101).

When determining that the CPU 1201 has received the number-of-game-media information, the CPU 1201 adds a part (the number obtained by subtracting 1 from the number of coins indicated by the number-of-game-media information, in the present embodiment) of the number of coins indicated by the received number-of-game-media information to the cumulative value for EVENT TIME indicated by the cumulative-value data for EVENT TIME stored in the RAM 1203, and stores the numerical value obtained by the addition as the updated cumulative value for EVENT TIME in the cumulative-value data for EVENT TIME (step S1102). It is to be noted that the processing of step S1102 is canceled when the number obtained by subtracting 1 from the number of coins indicated by the number-of-game-media information becomes equal to or less than 0.

Next, the CPU 1201 determines whether or not the cumulative value for EVENT TIME has reached the predetermined value, based on the cumulative-value data for EVENT TIME stored in the RAM 1203 (step S1103).

When determining that the cumulative value for EVENT TIME has reached the predetermined value, the CPU 1201 transmits a common-game execution signal to the slot machines 1010 through the PTS terminals 1064 (step S1104).

On the other hand, when determining that the CPU 1201 has not received the number-of-game-media information, the CPU 1201 determines whether or not it has received the exchange-fee data (step S1105). When determining that the CPU 1201 has received the exchange-fee data, the CPU 1201 adds the number of coins corresponding to the amount of currency indicated by the received exchange-fee data to the cumulative value for bonus indicated by the cumulative-value data for bonus stored in the RAM 1203, sets the numerical value obtained by the addition as the updated cumulative value for bonus, and stores the cumulative-value data for bonus into the RAM 1203 (step S1106).

The amount of currency indicated by the received exchange-fee data corresponds to the amount of basic currency corresponding to the predetermined fee of the present invention.

Next, the CPU 1201 determines whether or not the cumulative value for bonus has reached the specific value, based on the cumulative-value data for bonus stored in the RAM 1203 (step S1107).

The cumulative-value for bonus reaching the specific value corresponds to the predetermined progressive-jackpot payout condition of the present invention.

When determining that the cumulative value for bonus has reached the specific value, the CPU 1201 executes winning-slot-machine determination processing (step S1108). In the winning-slot-machine determination processing, the first winning slot machine 1010 and the second winning slot machine 1010, to each of which a bonus is offered, is determined. The winning-slot-machine determination processing is described later by using the drawing.

The CPU 1201 transmits, through the PTS terminals 1064, the bonus payout signals to the first winning slot machine 1010 and the second winning slot machine 1010 determined in step S1108 (step S1109). The bonus payout signal to be transmitted to the first winning slot machine 1010 includes information indicating that this slot machine 1010 is the first winning slot machine 1010. The bonus payout signal to be transmitted to the second winning slot machine 1010 includes information indicating that this slot machine 1010 is the second winning slot machine 1010.

The CPU 1201 completes the present subroutine, when the CPU 1201 has determined in step S1103 that the cumulative value for EVENT TIME has not reached the predetermined value, or after the CPU 1201 has executed the processing of step S1104, or when the CPU 1201 has determined in step S1105 that it has not received the exchange-fee data, or when the CPU 1201 has determined in step S1107 that the cumulative value for bonus has not reached the specific value, or when the CPU 1201 has executed the processing of step S1109.

Figure 50:
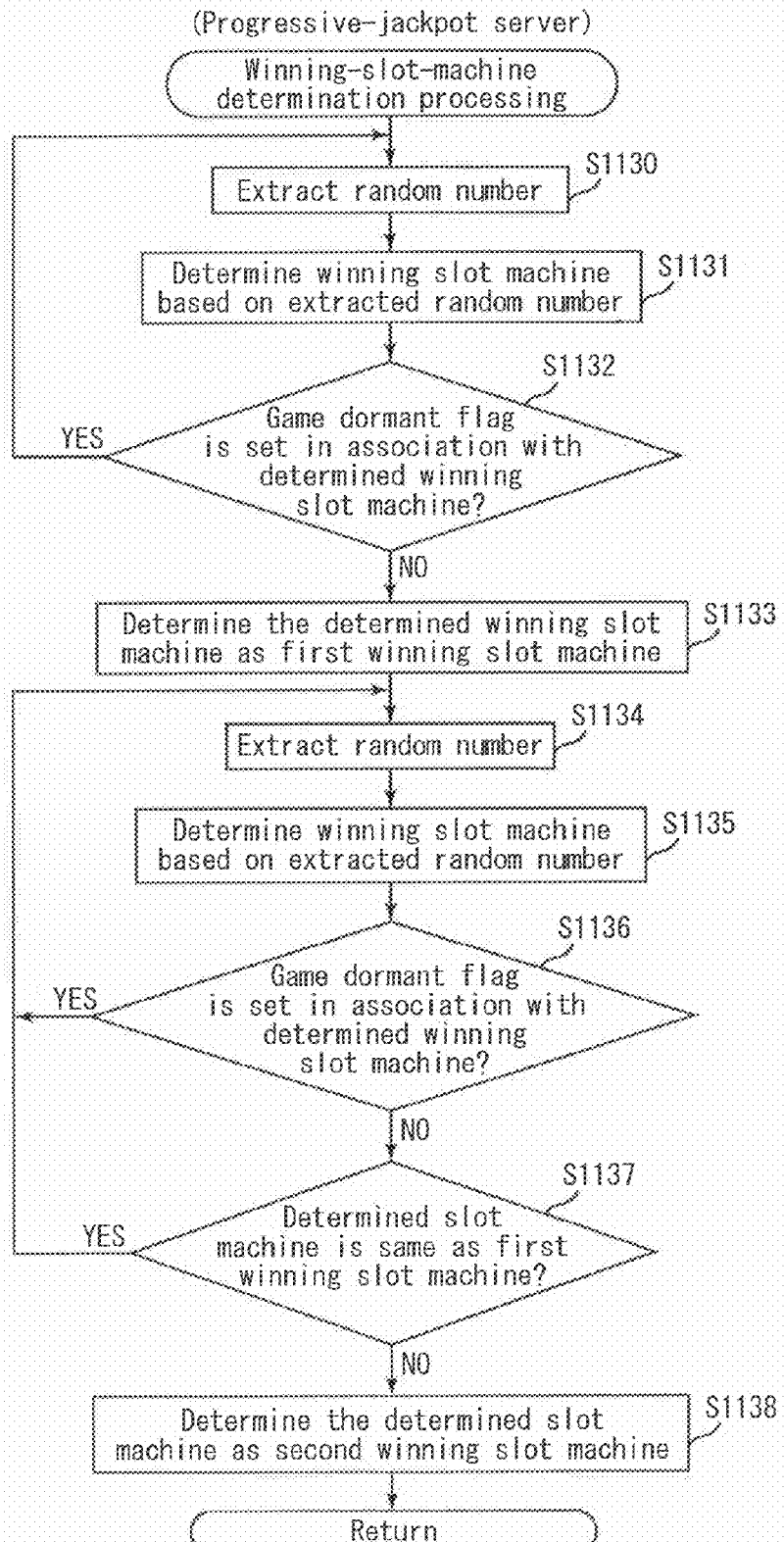
FIG. 50 is a flowchart illustrating a subroutine of winning-slot-machine determination processing.

FIG. 50 is a flowchart illustrating a subroutine of winning-slot-machine determination processing.

First, the CPU 1201 extracts the random number generated by the random number generator 1063 (step S1130).

The CPU 1201 determines a single slot machine 1010 out of ten slot machines 1010, based on the random number extracted in step S1130. Then, the CPU 1201 determines the determined slot machine 1010 as a winning slot machine 1010 (step S1131).

The CPU 1201 determines whether or not the game dormant flag is set in association with the identification number of the winning slot machine 1010 determined in step S1131 (step S1132). When determining that the game dormant flag is set, the CPU 1201 returns the processing to step S1130.

When determining in step S1132 that the game dormant flag is not set, the CPU 1201 determines the winning slot machine 1010 determined in step S1131 as the first winning slot machine 1010 (step S1133).

The CPU 1201 extracts the random number generated by the random number generator 1063 (step S1134).

The CPU 1201 determines a single slot machine 1010 out of ten slot machines 1010, based on the random number extracted in step S1134. Then, the CPU 1201 determines the determined slot machine 1010 as a winning slot machine 1010 (step S1135).

The CPU 1201 determines whether or not the game dormant flag is set in association with the identification number of the winning slot machine 1010 determined in step S1135 (step S1136). When determining that the game dormant flag is set, the CPU 1201 returns the processing to step S1134.

When determining in step S1136 that the game dormant flag is not set, the CPU 1201 determines whether or not the winning slot machine 1010 determined in step S1135 is the same slot machine 1010 as the first winning slot machine 1010 determined in step S1133 (step S1137). When determining that they are the same slot machine 1010, the CPU 1201 returns the processing to step S1134.

When determining in step S1137 that they are not the same slot machine 1010, the CPU 1201 determines the winning slot machine 1010 determined in step S1135 as the second winning slot machine 1010 (step S1138).

Figure 51:
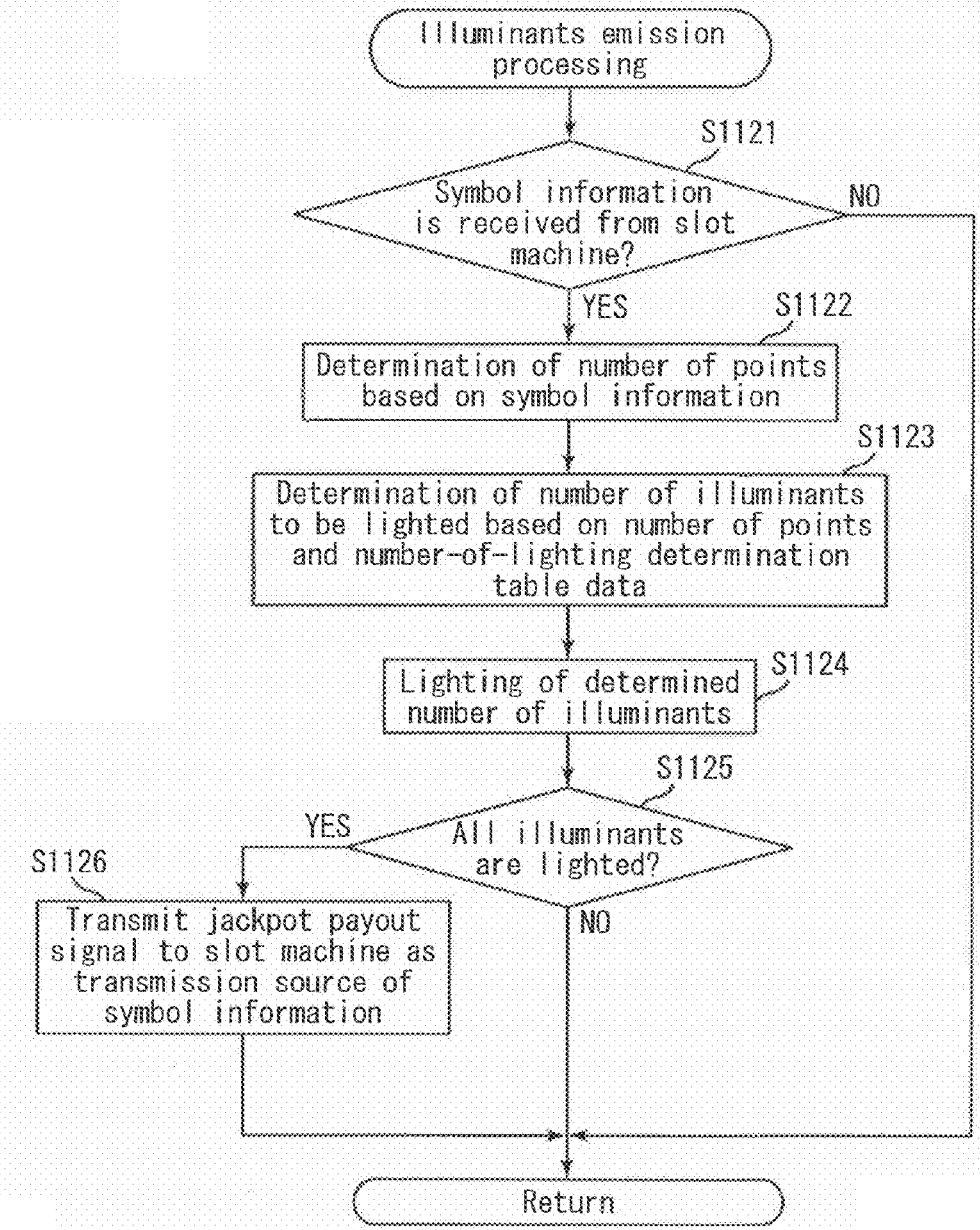
FIG. 51 is a flowchart illustrating a subroutine of illuminants emission processing.

FIG. 51 is a flowchart illustrating a subroutine of illuminants emission processing.

First, the CPU 1201 determines whether or not it has received the symbol information (see FIG. 47) from the slot machine 1010 through the PTS terminal 1064 at a predetermined timing (step S1121).

When determining that it has not received the symbol information, the CPU 1201 completes the present subroutine.

On the other hand, when determining that the CPU 1201 has received the symbol information, the CPU 1201 determines the number of points, based on the symbol information and the number-of-points determination table data stored in the hard disk drive 1205 (step S1122).

FIG. 52 is a view illustrating the number-of-points determination table.

As illustrated in FIG. 52, in the number-of-points determination table, a symbol or a combination of symbols rearranged along the winning line WL and the number of points are set in association with each other. For example, when one "1bar" has been rearranged along the winning line WL, the CPU 1201 determines that the number of points is ten.

Next, the CPU 1201 determines the number of LEDs 1351 (illuminants) to be lighted (emit light) based on the determined number of points and the number-of-lighting determination table data (step S1123).

FIGS. 53A to 53B are views each illustrating the number-of-lighting determination table.

The number-of-lighting determination table is a table in which the possible range of the number of points and the number of LEDs 1351 to be lighted are associated with each other. Further, the correspondence relationship between the number of points and the number of LEDs 1351 to be lighted is associated with each slot machine 1010.

The number-of-lighting determination table includes the number-of-lighting determination table for bent portions (see FIG. 53A) and the number-of-lighting determination table for straight portions (see FIG. 53B).

In the number-of-lighting determination table for bent portions, the correspondence relationship between the number of points and the number of LEDs 1351 to be lighted may be different in accordance with the slot machines 1010.

In the number-of-lighting determination table for straight portions, the correspondence relationships between the number of points and the number of LEDs 1351 to be lighted are the same with respect to all the slot machines 1010.

In the processing of step S1123, the CPU 1201 first determines whether or not the number of lights, indicated by the number-of-lights data stored in the RAM 1203 in association with the identification number of the slot machine 1010 as a transmission source of the symbol information received in step S1121, is equal to or more than a predetermined number (the number of LEDs 1351 included in the bent portion of the coupling illumination line 1310).

When determining that the number of lights is equal to or more than the predetermined number, the CPU 1201 determines the number of LEDs 1351 to be lighted based on the number-of-lighting determination table for straight portions.

On the other hand, when determining that the number of lights is less than the predetermined number, the CPU 1201 determines the number of LEDs 1351 to be lighted based on the number-of-lighting determination table for bent portions.

Next, the CPU 1201 makes the determined number of LEDs 1351 (illuminants) be lighted (emit light) in the coupling illumination line 1310 provided for the slot machine 1010 as a transmission source of the symbol information received in step S1121 (step S1124).

In this processing, the CPU 1201 identifies the identification numbers of the LEDs 1351 to be lighted, based on the number determined in step S1123 and the number of lights indicated by the number-of-lights data stored in the RAM 1203 in association with the identification number of the slot machine 1010. Further, the CPU 1201 transmits to the LED drive circuit 1350 a signal including information indicative of the identified identification numbers. On receiving this signal, the LED drive circuit 1350 lights the LEDs 1351 associated with the identification numbers included in the signal.

Further, after transmitting the signal, the CPU 1201 adds the number determined in step S1123 to the number of lights indicated by the number-of-lights data stored in association with the identification number of the slot machine 1010, and stores the obtained number in the RAM 1203.

Next, the CPU 1201 determines whether or not all the LEDs 1351 (illuminants), included in the coupling illumination line 1310 provided for the slot machine 1010 as a transmission source of the symbol information received in step S1121, have been lighted (emit light) (step S1125). In the processing, the CPU 1201 determines whether or not the number of lights after the addition of the number determined in step S1123 has reached the number of LEDs 1351 included in the coupling illumination line 1310, based on the number-of-lights data stored in the RAM 1203.

When determining that all the LEDs 1351, included in the coupling illumination line 1310 provided for the slot machine 1010 as a transmission source of the symbol information received in step S1121, have been lighted, the CPU 1201 transmits the jackpot payout signal to the slot machine 1010 through the PTS terminal 1064 (step S1126).

When determining in step S1125 that not all the LEDs 1351 have been lighted or after executing the processing of step S1126, the CPU 1201 completes the present subroutine.

As described above, according to the individual tracking system 1800 and the control method of the individual tracking system 1800 of the present invention, the face image data of the person who has not had the staff ID data read, namely, the person who does not possess the staff ID card 1803 storing the staff ID data, and the staff ID data of the person are displayed to the display 506. As a result, the person who has not had the staff ID data read (the person who does not possess the staff ID card) can be identified.

The aforementioned embodiment describes the case where only staff members are present in the casino.

Next, the following description will discuss the case where staff members and a guest are present.

It is to be noted that, since the configuration in this case includes almost the same configuration of the individual tracking system according to the aforementioned embodiment, except that the staff management processing is different, explanation of the portions in common with the individual tracking system of the above embodiment will be omitted in the following description. Moreover, the structural elements corresponding to those of the individual tracking system according to the aforementioned embodiment will be described by allotting them the same symbols.

Figure 54:
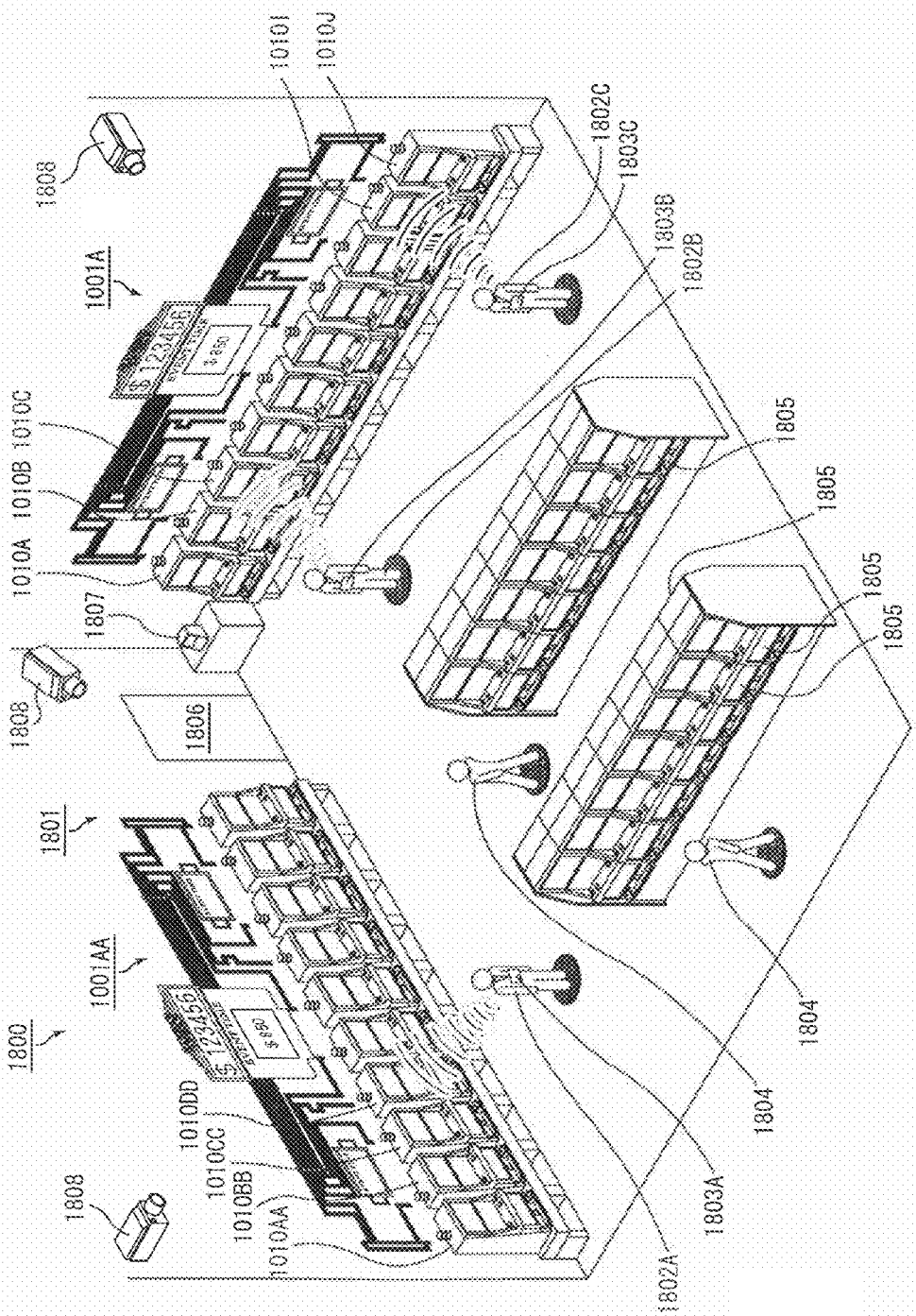
FIG. 54 is an overhead view schematically illustrating an individual tracking system according to another embodiment of the present invention.

FIG. 54 is an overhead view schematically illustrating an individual tracking system according to another embodiment of the present invention.

The staff members 1802 and the guests 1804 are present in the casino 1801 shown in FIG. 54.

Figure 55:
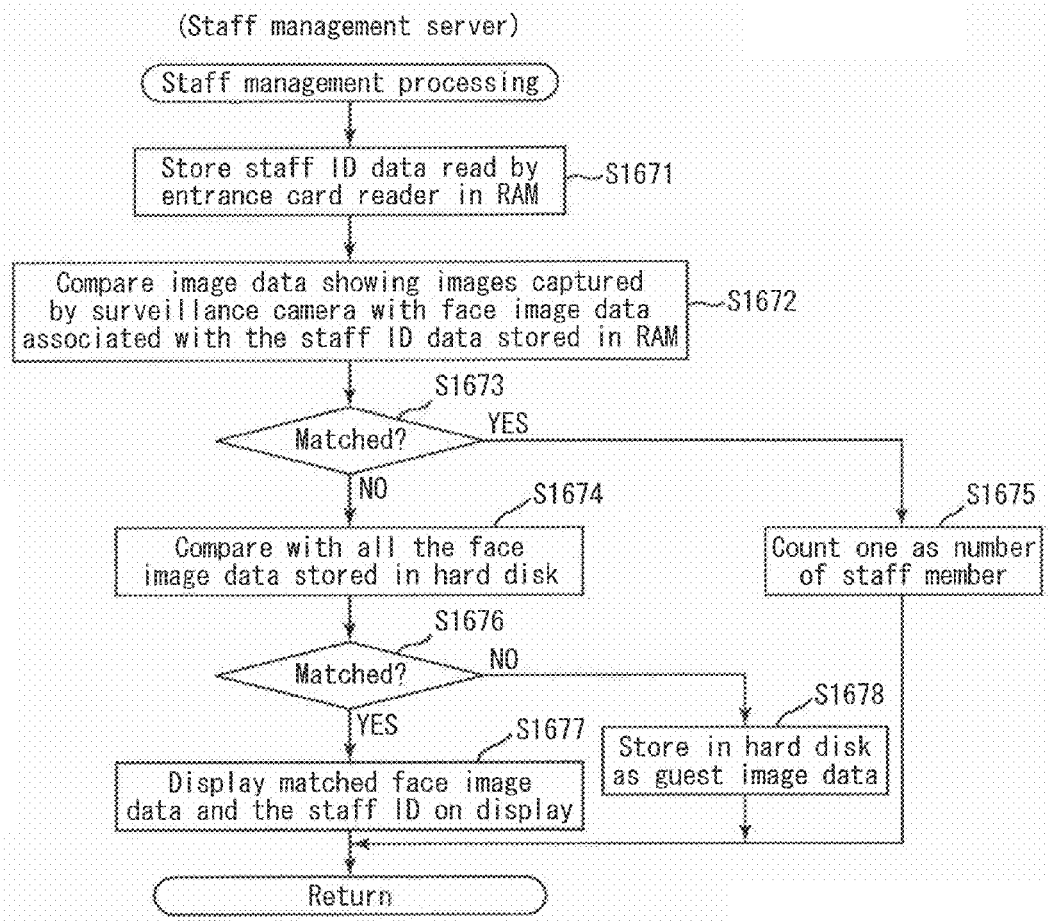
FIG. 55 is a flowchart illustrating staff management processing executed in a staff management server according to another embodiment of the present invention.

FIG. 55 is a flowchart illustrating staff management processing executed in a staff management server according to another embodiment of the present invention.

First, the CPU 1501 included in the staff management server 1263 stores in the RAM 1503 the staff ID data read from the staff ID card 1803 by the entrance card reader 1807 (step S1671).

Next, the CPU 1501 compares the image data transmitted from the surveillance camera 1808 with the face image data associated with the staff ID data stored in the RAM 1503 in step S1671, and then determines satisfaction or dissatisfaction of the criteria for determining whether or not a person shown by the face image data is identical to the person shown in the image data (step S1672).

When the CPU 1501 determines that the criteria for determining that the person shown by the face image data is identical to the person shown by the image data is satisfied (step S1673: YES), the CPU 1501 counts one in the count number of the staff members. It is to be noted that the face image data which caused the counting of the number of the staff members is excluded from the target of comparison in step S1672. This arrangement can prevent the situation in which the number of staff members is counted twice based on the same face image data.

On the other hand, when the CPU 1501 determines that the criteria for determining that the person shown by the face image data is identical to the person shown by the image data is not satisfied (step S1673: NO), the CPU compares the image data having been transmitted from the surveillance camera 1808 with all the face image data stored in the hard disk drive 1505, and then determines satisfaction or dissatisfaction of the criteria for determining that a person shown by the face image data is identical to the person shown by the image data (step S1674).

On the other hand, when the CPU 1501 determines that the criteria for determining that the person shown by the face image data is identical to the person shown by the image data is satisfied (step S1676: YES), the CPU displays an image based on the face image data determined to be identical and the staff ID associated with the face data to the display 506 (step S1677).

On the other hand, when the CPU 1501 determines that the criteria for determining that the person shown by the face image data is identical to the person shown by the image data is not satisfied (step S1676: NO), the CPU 1501 stores the image data (the image data transmitted from the surveillance camera 1808) as guest image data in the hard disk drive 1505. On this occasion, the CPU 1501 further transmits the guest image data to the image server 1267. As a result, the guest image data are also managed in the image server 1267. After completion of step S1675, step S1077 or step S1678, the present subroutine is terminated.

According to the individual tracking system 1800 and the control method of the individual tracking system 1800, the guest image data is stored in the hard disk drive 1246, and thus it is possible to check the guests present in the casino 1801. Moreover, the face image data of the person who has not had the staff ID data read out, namely, the person who does not possess the staff ID card 1803 storing the staff ID data, and the staff ID data of the person are displayed to the display 506. As a result, the person who has not had the staff ID data read out (the person who does not possess the staff ID card) can be identified.

In the present embodiment, the case has been described where the face image data of the person who does not possess the staff ID card 1803 storing the staff ID data and the staff ID data of the person are displayed to the display 506. However, the present invention is not limited to this example, and only the face image data may be displayed or only the staff ID data may be displayed.

In the present embodiment, the case has been described where the output device of the present invention is the display 506. However, the output device of the present invention is not limited to this example, and may be a printing device. In this case, the face image data and/or the staff ID may be printed and outputted (print out). Moreover, the output device may be a sound output device such as a speaker. In this case, a sound uttering the staff ID may be outputted.

In the present embodiment, the case has been described where the guest image data is stored in the hard disk drive 1246. However, the present invention is not limited to this example, and the guest image data may be deleted. This is because, the deletion of the guest image data makes it possible to secure the free space of the hard disk drive 1246.

In the foregoing embodiments, the case is described where the facility according to the present invention is the casino 1801. However, according to the present invention, the facility is not limited to this example, and examples of the facility include a sports facility such as baseball stadiums and soccer stadiums, an event facility for exhibition of cars, houses of the like, or a variety of facilities where staff members (employees) need to be deployed.

In the foregoing embodiments, the case is described where the gaming machine of the present invention is the slot machine 1010. However, according to the present invention, the gaming machine is not limited to this example, and examples thereof include gaming machines for playing games such as card games like poker, shooting games, fighting games and the like.

The following description will discuss embodiments of the present invention based on the drawings.

Fifth Embodiment

First, with reference to FIG. 56, there will be given a general description of a fifth embodiment of the present embodiment.

Figure 56:
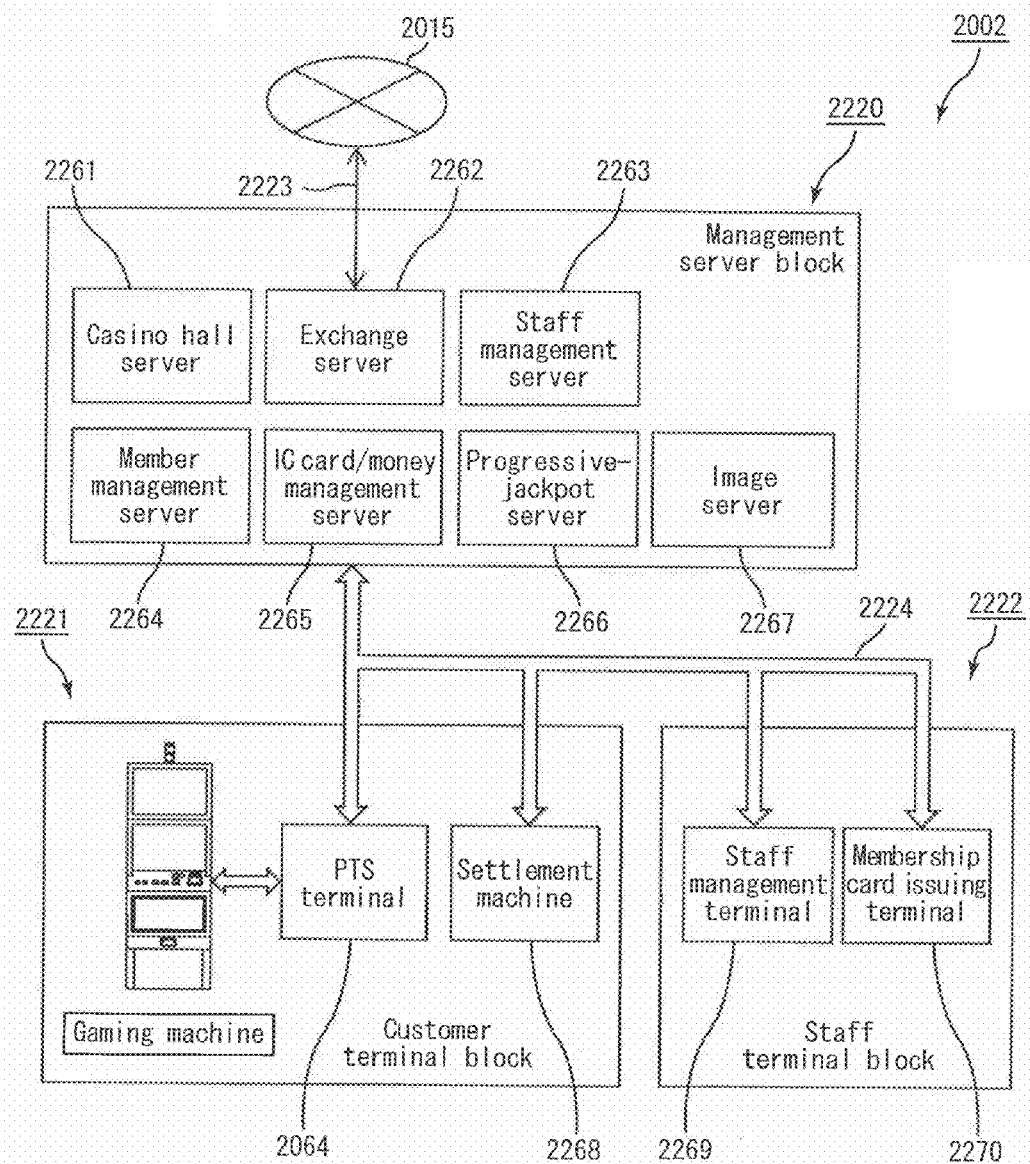
FIG. 56 is a diagrammatic view schematically illustrating an overall picture of a casino system according a first embodiment of the present invention.

FIG. 56 is a diagrammatic view schematically illustrating an overall picture of a casino system according to the fifth embodiment of the present invention.

A casino system 2002 includes a management server block 2220, a customer terminal block 2221, and a staff terminal block 2222.

The management server block 2220 includes a casino hall server 2261, an exchange server 2262, a staff management server 2263, a member management server 2264, an IC card/money management server 2265, a progressive-jackpot server 2266, and an image server 2267.

The casino hall server 2261 collects money flow inside a casino and makes a balance sheet and the like, and is a server for managing each server within the management server block 2220. The exchange server 2262 is a server for acquiring exchange information from an external source (Internet 2015) through a communication line 2223. The staff management server 2263 is a server for managing attendance of staff members who work at the casino, recognizing the current locations of the staff members within the casino, and the like. The member management server 2264 is a server for managing member information, such as members' personal information and their past game results. The IC card/money management server 2265 is a server for collecting cashless sales with IC cards. The progressive-jackpot server 2266 is a server for conducting management of a cumulative value for a progressive-jackpot offer, and determination of the progressive-jackpot offer. The image server 2267 is a server for storing images of the faces of staff members and players, which are captured by a camera installed inside the casino, and managing those images.

The customer terminal block 2221 includes player tracking system (PTS) terminals 2064, gaming machines, and a settlement machine 2268. The gaming machines are connected to the management server block 2220 through the respective PTS terminals 2064, by network. In the present embodiment, a single PTS terminal 2064 is provided for a single gaming machine.

The PTS terminal 2064 corresponds to the individual tracking apparatus in the present invention.

The staff terminal block 2222 includes a staff management terminal 2269 and a membership card issuing terminal 2270. The staff management terminal 2269 is controlled by the staff management server 2263. The staff management terminal 2269 transmits information to Personal Digital Assistant (PDA) (not illustrated) carried by the staff members, and the like, based on a signal received from the staff management server 2263 or starts communications with mobile phones carried by the staff members.

The membership card issuing terminal 2270 includes a camera which, when a membership card (IC card) is issued, captures a face image of the player to whom the IC card is issued. The captured image is stored into the image server 2267, in association with a customer ID. Further, member's personal information inputted at the time of IC card issuance is stored into the member management server 2264, in association with the customer ID.

Figure 61:
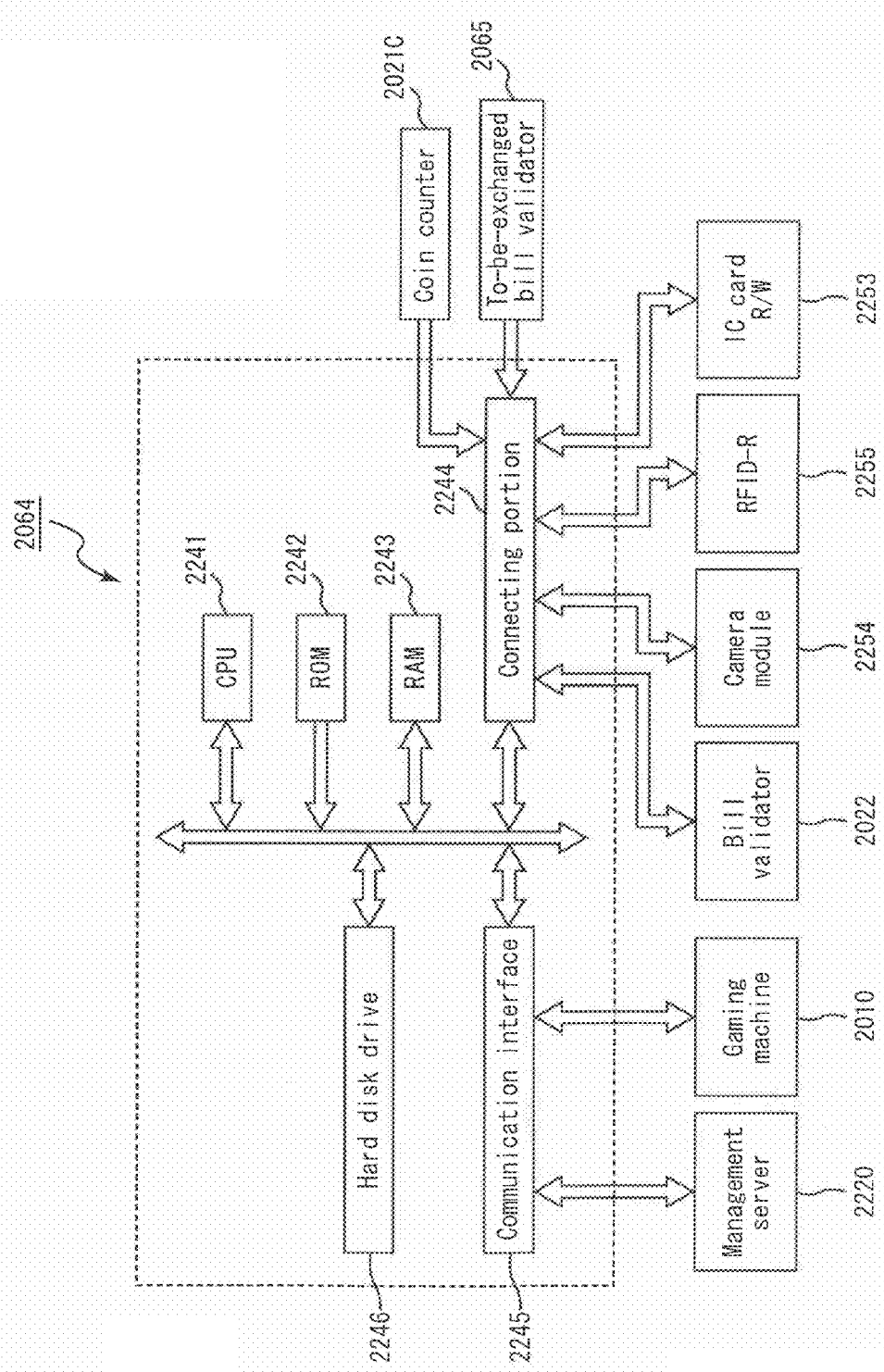
FIG. 61 is a block diagram illustrating an internal configuration of a PTS terminal forming the gaming system according to the first embodiment of the present invention.

In the present embodiment, the PTS terminal 2064 is connected to a to-be-exchanged bill validator 2065 through a communication line (see FIG. 61).

The to-be-exchanged bill validator 2065 is capable of accepting bills of a plurality of countries. For example, when a Japanese bill is inserted into the to-be-exchanged bill validator 2065, the PTS terminal 2064 converts (exchanges) the bill into U.S. currency, based on the exchange rate. Amount-of-converted-currency data, indicating the amount of currency after the conversion (exchange), is then transmitted from the PTS terminal 2064 to the gaming machine. Thus, the player can play the game on the gaming machine using currencies other than the U.S. currency. It is to be noted that the amount of currency after the conversion (exchange) is equivalent to the amount of currency obtained by subtracting the amount of currency corresponding to a predetermined fee (hereinafter, also referred to as "exchange fee") from the amount of currency before the conversion (exchange).

Also, exchange-fee data indicating the amount of currency corresponding to the exchange fee is transmitted from the PTS terminal 2064 to the progressive-jackpot server 2266. The progressive-jackpot server 2266 updates the cumulative value for bonus, based on the amount of currency indicated by the received exchange-fee data. When the cumulative value for bonus has reached a specific value, coins are paid out as a jackpot to any of the gaming machines. As thus described, in the present embodiment, a bonus with its source of money being the exchange fee is offered.

Hereinafter, a case will be described where the gaming machine is a slot machine 2010.

Figure 57:
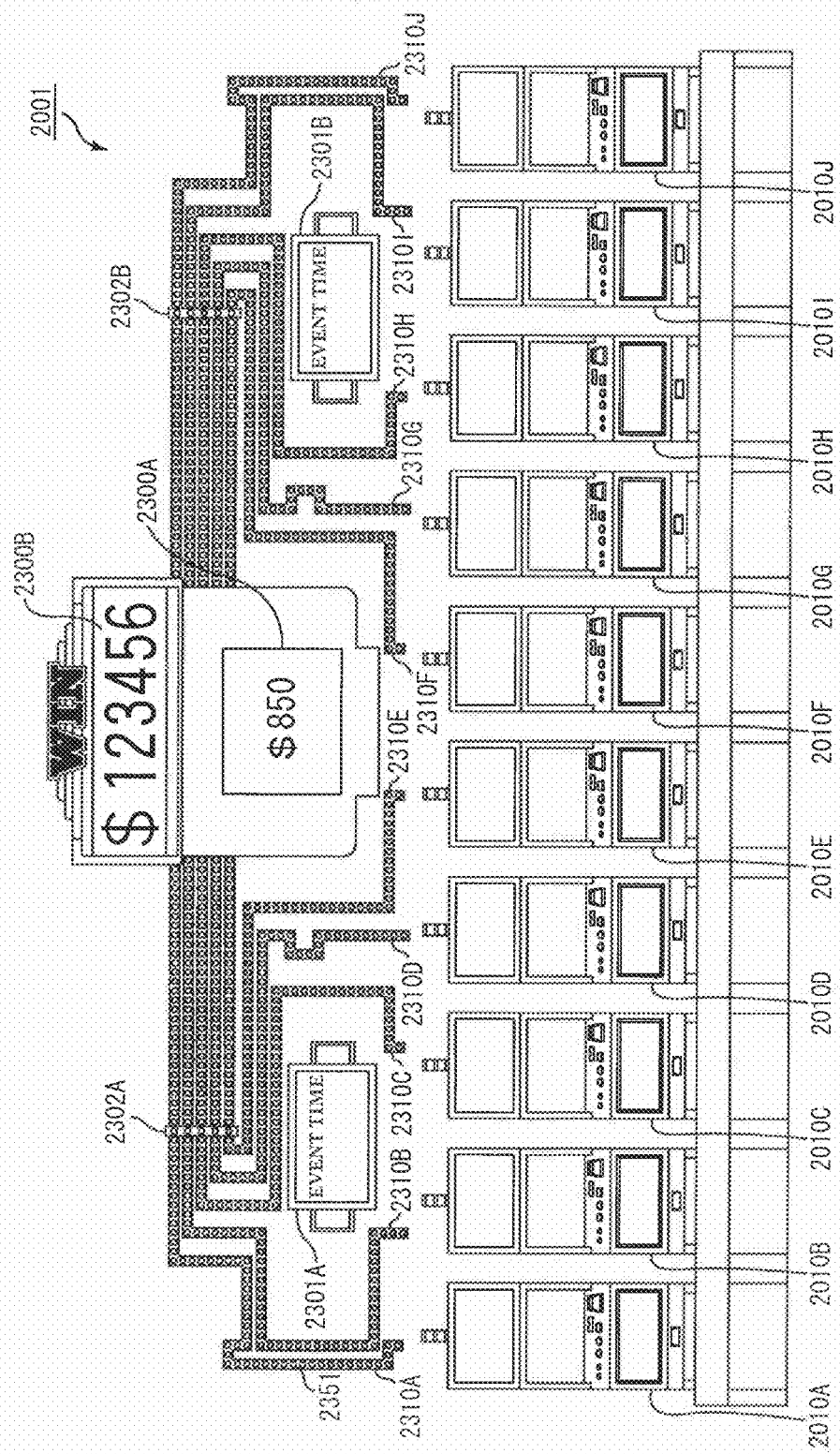
FIG. 57 is a front view schematically illustrating a gaming system according to the first embodiment of the present invention.

FIG. 57 is a front view schematically illustrating a gaming system according to the fifth embodiment of the present invention.

Figure 58A:
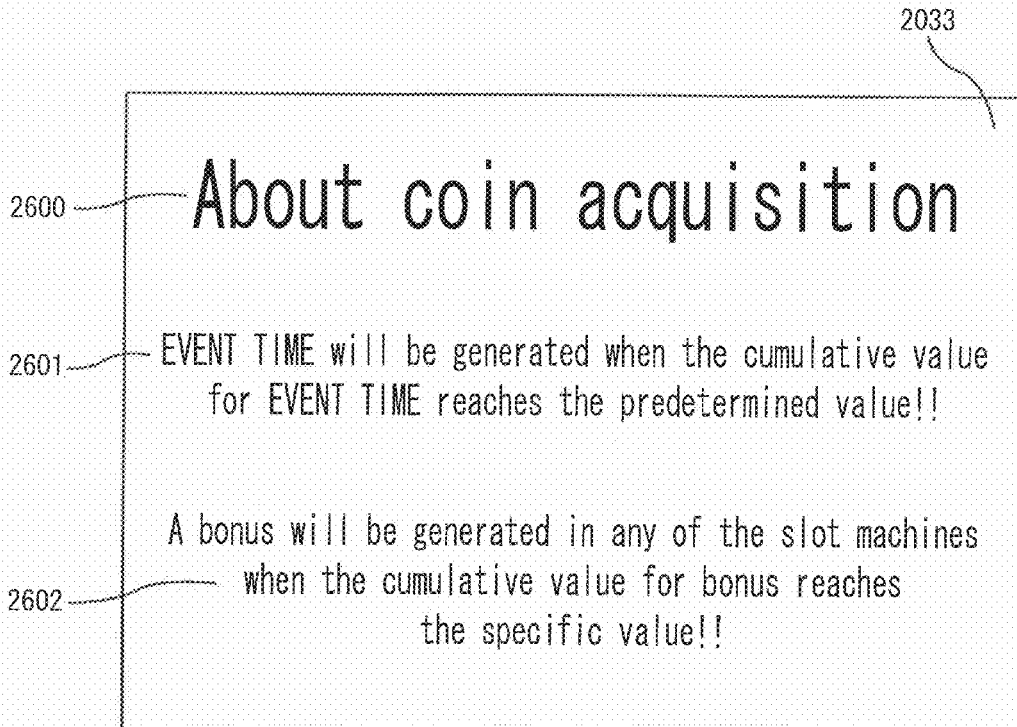
FIG. 58A is a view illustrating an exemplary image displayed to an upper image display panel included in a slot machine forming a gaming system according to the first embodiment of the present invention.
Figure 58B:
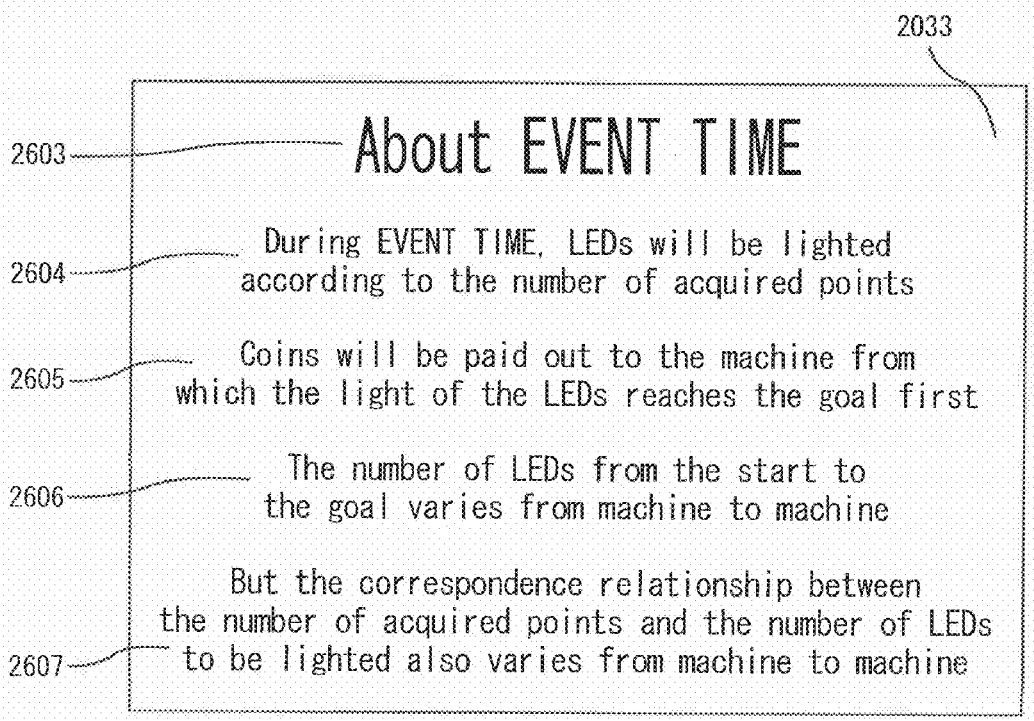
FIG. 58B is a view illustrating another exemplary image displayed to the upper image display panel included in the slot machine forming the gaming system according to the first embodiment of the present invention.

FIGS. 58A and 58B are views each illustrating an exemplary image displayed to an upper image display panel included in a slot machine forming a gaming system according to the fifth embodiment of the present invention.

As illustrated in FIG. 57, a gaming system 2001 includes a plurality of (ten, in the present embodiment) slot machines 2010 (a slot machine 2010A, a slot machine 2010B, a slot machine 2010C, a slot machine 2010D, a slot machine 2010E, a slot machine 2010F, a slot machine 2010G, a slot machine 2010H, a slot machine 2010I, and a slot machine 2010J), the PTS terminal 2064, the exchange server 2262, the progressive-jackpot server 2266, a plurality of common large displays 2300 (a common large display 2300A and a common large display 2300B), and a plurality of common compact displays 2301 (a common compact display 2301A and a common compact display 2301B), which are interconnected through network. Further, for the respective slot machines 2010, there are provided coupling illumination lines 2310 (a coupling illumination line 2310A, a coupling illumination line 2310B, a coupling illumination line 2310C, a coupling illumination line 2310D, a coupling illumination line 2310E, a coupling illumination line 2310F, a coupling illumination line 2310G, a coupling illumination line 2310H, a coupling illumination line 2310I, and a coupling illumination line 2310J) which include a plurality of LEDs 2351 arranged from the common large displays 2300 to the respective slot machines 2010. The coupling illumination lines 2310 are each formed by a straight portion extending from the common large displays 2300 to one of boundary plates 2302 (a boundary plate 2302A and a boundary plate 2302B), and a bent portion extending from one of the boundary plates 2302 to one of the slot machines 2010.

The slot machines 2010 correspond to the gaming machines of the present invention.

In the gaming system 2001 according to the present embodiment, a part of coins betted in each slot machine 2010 are cumulatively counted as a cumulative value for EVENT TIME. Further, an image indicative of the counted cumulative value for EVENT TIME is displayed to the common large display 2300B. In FIG. 57, "123456" is displayed to the common large display 2300B, indicating that the cumulative value for EVENT TIME is 123456. When the cumulative value for EVENT TIME reaches a predetermined value, EVENT TIME (common game) is conducted.

Further, in the gaming system 2001 according to the present embodiment, when a bill of a currency other than the basic currency is inserted into the to-be-exchanged bill validator 2065, the exchange fee related to exchange of this bill is cumulatively counted as the cumulative value for bonus. Then, an image indicative of the counted cumulative value for bonus is displayed to the common large display 2300A. In FIG. 57, "850" is displayed to the common large display 2300A, indicating that the cumulative value for bonus is 850. When the cumulative value for bonus reaches a specific value, coins are paid out as a jackpot to any of the slot machines 2010.

With reference to FIG. 58A and FIG. 58B, the coin acquisition according to the jackpot will be described.

As illustrated in FIG. 58A, text images indicative of precautions for the acquisition of the jackpot are displayed to an upper image display panel 2033.

A text image 2601 indicates that EVENT TIME (common game) is generated to any of the slot machines 2010 when the cumulative value for EVENT TIME has reached the predetermined value.

A text image 2602 indicates that a bonus is generated when the cumulative value for bonus has reached the specific value.

In FIG. 58B, EVENT TIME (common game) is further described.

In the present embodiment, a configuration is adopted where the displayed text image is switched from the text image illustrated in FIG. 58A to the text image illustrated in FIG. 58B, when there has been a touch on a predetermined place in a touch panel (not shown) provided on the upper image display panel.

A text image 2604 indicates that the LEDs 2351 will be lighted according to the number of points acquired in each slot machine 2010 during EVENT TIME (common game).

During EVENT TIME (common game), the number of points is determined based on the type and the number of the rearranged game symbols.

A text image 2605 indicates that coins in number corresponding to the cumulative value for EVENT TIME will be paid out as the jackpot to the slot machine 2010 provided with the coupling illumination line 2310 with all the LEDs 2351 having been lighted.

In the present embodiment, the LEDs 2351 are lighted according to the number of acquired points, in an order starting from the LED 351 closest to the slot machines 2010. Accordingly, the lines of the lighted LEDs 2351 appear to gradually extend toward the common large displays 2300.

A text image 2606 indicates that the number of LEDs 2351 included in the coupling illumination line 2310 may be different among the coupling illumination lines 2310.

In the present embodiment, the same number of LEDs 2351 are included in two coupling illumination lines 2310 listed in each of the following groups (I) to (V):

(I) the coupling illumination line 2310A and the coupling illumination line 2310J;

(II) the coupling illumination line 2310B and the coupling illumination line 2310I;

(III) the coupling illumination line 2310C and the coupling illumination line 2310H;

(IV) the coupling illumination line 2310D and the coupling illumination line 2310G; and (V) the coupling illumination line 2310E and the coupling illumination line 2310E.

However, the numbers of LEDs 2351 for the respective groups (I) to (V) are different from each other.

This difference is caused by the difference in the numbers of LEDs 2351 in the bent portions.

The numbers of LEDs 2351 in the straight portions are same in all the coupling illumination lines 2310.

It is to be noted that FIG. 57 is a view schematically illustrating the gaming system 2001 according to the present embodiment, and the number of LEDs 2351 illustrated in FIG. 57 is not related to the number of LEDs 2351 according to the present embodiment.

A text image 2607 indicates that the correspondence relationship between the number of acquired points and the number of LEDs 2351 to be lighted may be different among the coupling illumination lines 2310. More specifically, the correspondence relationships between the number of acquired points and the number of LEDs 2351 to be lighted are different among the respective groups (I) to (V) (see FIG. 79A).

As above, there has been given the general description of the present embodiment.

Hereinafter, the present embodiment is described in more detail.

Next, a configuration of the slot machine 2010 is described.

Figure 59:
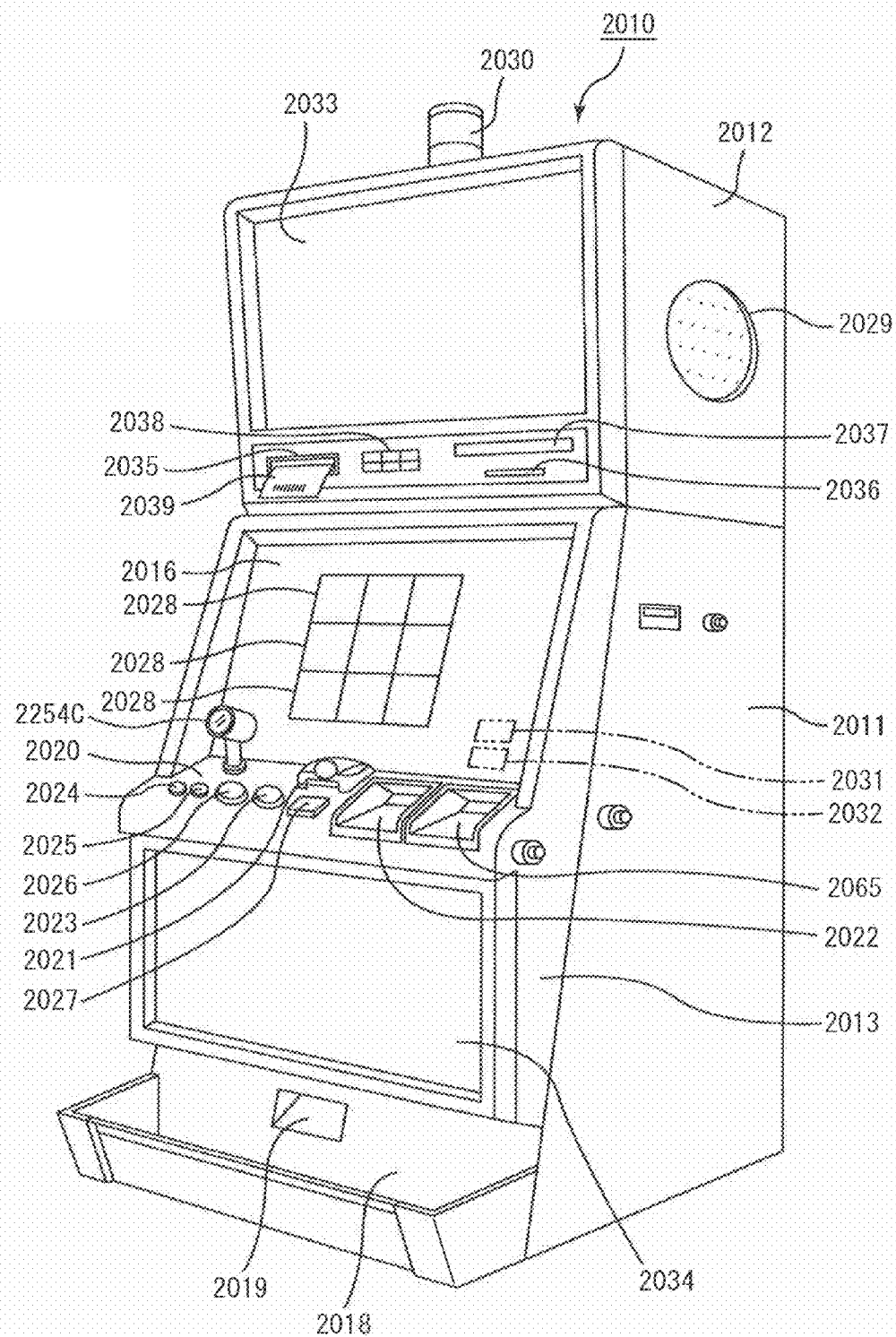
FIG. 59 is a perspective view illustrating an external view of a slot machine forming the gaming system according to the first embodiment.

FIG. 59 is a perspective view illustrating an external view of a slot machine forming a gaming system according to the fifth embodiment.

In the slot machine 2010, a coin, a bill (basic currency and currencies other than the basic currency), or electronic valuable information corresponding to those is used as a game medium. However, in the present invention, the game medium is not particularly limited. Examples of the game medium may include a medal, a token, electronic money and a ticket. It is to be noted that the ticket is not particularly limited, and examples thereof may include a ticket with a barcode as described later, and the like.

The slot machine 2010 comprises a cabinet 2011, a top box 2012 installed on the upper side of the cabinet 2011, and a main door 2013 provided at the front face of the cabinet 2011.

On the main door 2013, there is provided a lower image display panel 2016. The lower image display panel 2016 includes a transparent liquid crystal panel which displays nine display blocks 2028 along three columns and three rows. A single symbol is displayed in each of the display blocks 2028.

Further, although not illustrated, various types of images relating to an effect, as well as the aforementioned images, are displayed to the lower image display panel 2016.

Further, a number-of-credits display portion 2031 and a number-of-payouts display portion 2032 are provided on the lower image display panel 2016. The number-of-credits display portion 2031 displays an image indicative of the number of credited coins. The number-of-payouts display portion 2032 displays an image indicative of the number of coins to be paid out.

Moreover, although not shown, a touch panel 2069 is provided at the front face of the lower image display panel 2016. The player can operate the touch panel 2069 to input a variety of commands.

Below the lower image display panel 2016, there are provided a control panel 2020 including a plurality of buttons 2023 to 2027 with each of which a command according to game progress is inputted by the player, a coin receiving slot 2021 through which a coin is accepted into the cabinet 2011, a bill validator 2022, the to-be-exchanged bill validator 2065, and a camera 2254C.

The control panel 2020 is provided with a start button 2023, a change button 2024, a CASHOUT button 2025, a 1-BET button 2026 and a maximum BET button 2027. The start button 2023 is used for inputting a command to start scrolling of symbols. The change button 2024 is used for making a request of staff member in the recreation facility for exchange. The CASHOUT button 2025 is used for inputting a command to pay out credited coins to a coin tray 2018.

The 1-BET button 2026 is used for inputting a command to bet one coin on a game out of credited coins. The maximum BET button 2027 is used for inputting a command to bet the maximum number of coins that can be bet on one game (three coins in the present embodiment) out of credited coins.

The bill validator 2022 not only discriminates a regular bill (basic currency) from a false bill, but also accepts the regular bill into the cabinet 2011. It is to be noted that the bill validator 2022 may be configured so as to be capable of reading a later-described ticket 2039 with a barcode. At the lower front of the main door 2013, namely, below the control panel 2020, there is provided a belly glass 2034 on which a character or the like of the slot machine 2010 is drawn.

The to-be-exchanged bill validator 2065 accepts bills of a plurality of countries which are currencies other than the basic currency, and is capable of verifying the adequacy of the accepted bill and reading the type and the number of the bills.

The camera 2254C functions to capture an image of the face of the player. The camera 2254C corresponds to the camera disposed so as to be able to capture an image of the face of a player in the present invention. It is to be noted that the camera disposed so as to be able to capture an image of the face of a player is not particularly limited, and examples thereof include a CCD camera, a CMOS censor camera and the like.

On the front surface of the top box 2012, there is provided the upper image display panel 2033. The upper image display panel 2033 includes a liquid crystal panel, which displays, for example, images indicative of introductions of the contents of games and explanations about the rules of games as illustrated in FIG. 58A.

Further, a speaker 2029 is provided in the top box 2012. Under the upper image display panel 2033, there are provided a ticket printer 2035, an IC card reader/writer 253 (hereinafter, also referred to as IC card R/W 2253), a data display 2037, and a key pad 2038. The ticket printer 2035 prints on a ticket a barcode as coded data of the number of credits, a date, an identification number of the slot machine 2010, and the like, and outputs the ticket as the ticket 39 with a barcode. The player can make another slot machine read the ticket 39 with a barcode to play a game thereon, or exchange the ticket 39 with a barcode with a bill or the like at a predetermined place in the recreation facility (e.g. a cashier in a casino).

The IC card R/W 2253 reads data from an IC card and writes data into the IC card. The IC card is a card owned by the player, and for example, data for identifying the player and data concerning a history of games played by the player are stored therein. Data corresponding to a coin, a bill or a credit may be stored in the IC card. The data display 2037 includes a fluorescent display and the like, and displays, for example, data read by the IC card R/W 2253 or data inputted by the player via the key pad 2038. The key pad 2038 is used for inputting a command and data concerning issuing of a ticket, and the like.

Figure 60:
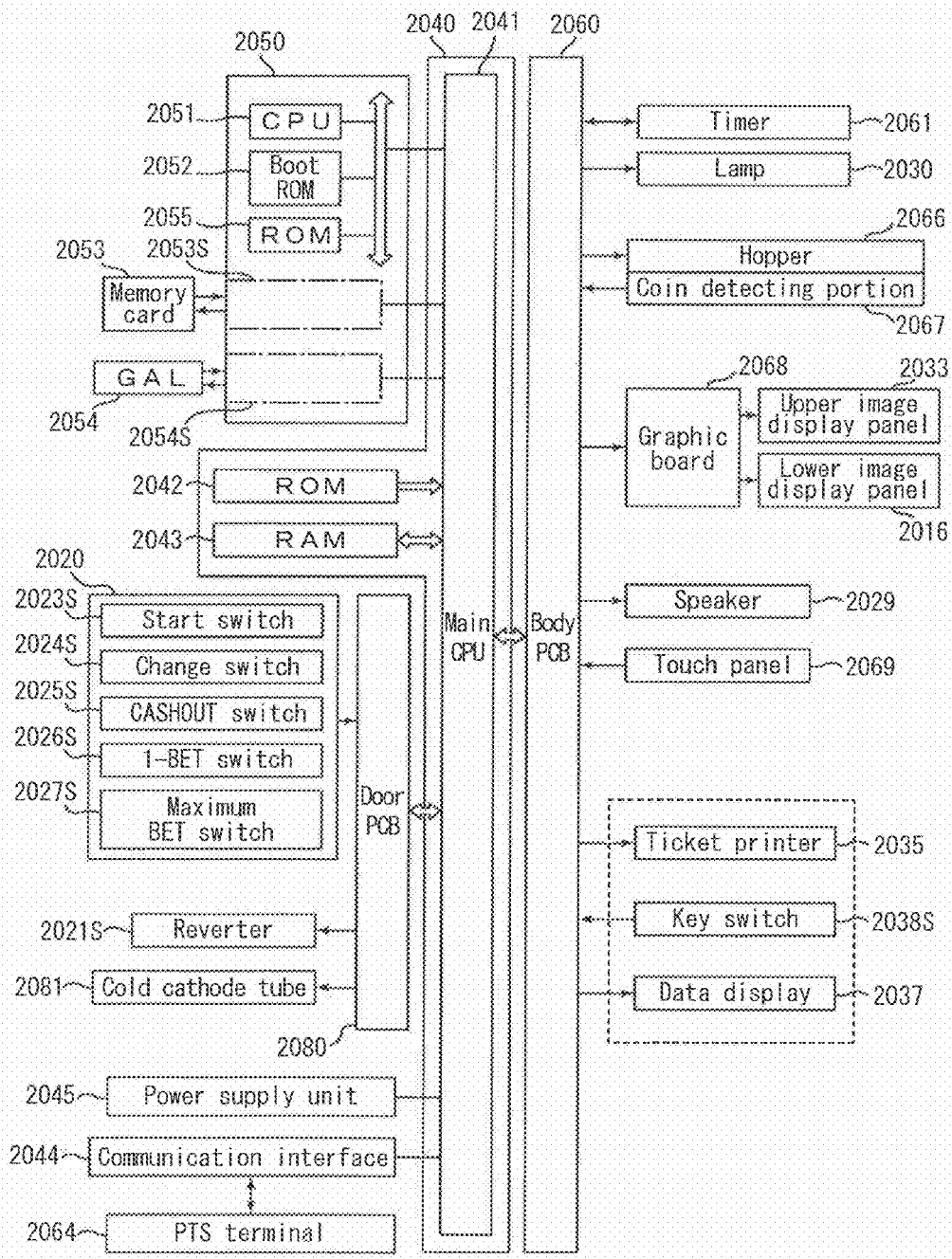
FIG. 60 is a block diagram illustrating an internal configuration of the slot machine shown in FIG. 59.

FIG. 60 is a block diagram showing an internal configuration of the slot machine shown in FIG. 59.

A gaming board 2050 is provided with a CPU (Central Processing Unit) 2051, a ROM 2055, and a boot ROM 2052 which are interconnected to one another by an internal bus, a card slot 2053S corresponding to a memory card 2053, and an IC socket 2054S corresponding to a GAL (Generic Array Logic) 2054.

The memory card 2053 includes a nonvolatile memory such as CompactFlash (registered trade mark), and stores a game program. The game program includes a symbol determination program. The symbol determination program is a program for determining symbols to be rearranged in the display blocks 2028.

The symbols to be determined by the symbol determination program include 14 types of symbols including "3bar", "2bar", "1bar", "blue7", "red7", "white7", "RIBBON", "HEART", "STAR", "MOON", "SUN", "JEWEL", "CROWN", and "SMILE".

Further, the card slot 2053S is configured so as to allow the memory card 2053 to be inserted thereinto or removed therefrom, and is connected to the mother board 2040 by an IDE bus. Therefore, the type and contents of a game played on the slot machine 2010 can be changed by removing the memory card 2053 from the card slot 2053S, writing another game program into the memory card 2053, and inserting the memory card 2053 into the card slot 2053S. The game program includes a program on the progress of the game. Further, the game program includes image data and sound data to be outputted during the game.

The CPU 2051, the ROM 2055 and the boot ROM 2052 interconnected to one another by an internal bus are connected to the mother board 2040 through a PCI bus. The PCI bus not only conducts signal transmission between the mother board 2040 and the gaming board 2050, but also supplies power from the mother board 2040 to the gaming board 2050.

The mother board 2040 is configured using a commercially available general-purpose mother board (a print wiring board on which fundamental components of a personal computer are mounted), and provided with a main CPU 2041, a ROM (Read Only Memory) 42, a RAM (Random Access Memory) 2043, and a communication interface 2044.

The ROM 2042 stores a program such as a BIOS (Basic Input/Output System) which comprises a memory device such as a flash memory and is executed by the main CPU 2041, and permanent data. When the BIOS is executed by the main CPU 2041, processing for initializing a predetermined peripheral device is conducted, concurrently with start of processing for loading the game program stored in the memory card 2053 via the gaming board 2050. It is to be noted that, in the present invention, the ROM 2042 may or may not be data rewritable one.

The ROM 2042 includes: data indicative of a predetermined time T; odds data indicative of correspondence relationships (see FIGS. 71A to 71C) between combinations of symbols rearranged along the winning line and the numbers of payouts; data indicative of a first constant number; data indicative of a second constant number; and the like.

The RAM 2043 stores data and a program to be used at the time of operation of the main CPU 2041. Further, the RAM 2043 is capable of storing a game program.

Moreover, the RAM 2043 stores data of the number of credits, the numbers of coin-ins and coin-outs in one game, and the like.

Moreover, the mother board 2040 is connected with a later-described body PCB (Printed Circuit Board) 2060 and a door PCB 2080 through respective USBs. Further, the mother board 2040 is connected with a power supply unit 2045 and the communication interface 2044. The communication interface 2044 is connected with a communication interface 2245 of the PTS terminal 2064 through a communication line.

The body PCB 2060 and the door PCB 2080 are connected with an instrument and a device that generate an input signal to be inputted into the main CPU 2041 and an instrument and a device, operations of which are controlled by a control signal outputted from the main CPU 2041. The main CPU 2041 executes the game program stored in the RAM 2043 based on the input signal inputted into the main CPU 2041, and thereby executes the predetermined arithmetic processing, stores the result thereof into the RAM 2043, or transmits a control signal to each instrument and device as processing for controlling each instrument and device.

The body PCB 2060 is connected with a lamp 2030, a hopper 2066, a coin detecting portion 2067, a graphic board 2068, the speaker 2029, the touch panel 2069, the ticket printer 2035, a key switch 2038S, the data display 2037, and a timer 2061.

The hopper 2066 is installed inside the cabinet 2011, and pays out a predetermined number of coins based on the control signal outputted from the main CPU 2041, from a coin payout exit 2019 to the coin tray 2018. The coin detecting portion 2067 is provided inside the coin payout exit 2019, and outputs an input signal to the main CPU 2041 in the case of detecting payout of the predetermined number of coins from the coin payout exit 2019.

The timer 37 is used for measuring the time.

The graphic board 2068 controls image display to the upper image display panel 2033 and the lower image display panel 2016 based on the control signal outputted from the main CPU 2041. In the respective display blocks 2028 on the lower image display panel 2016, symbols are displayed in a scrolling manner or in a stopped state. The number of credits stored in the RAM 2043 is displayed to the number-of-credits display portion 2031 of the lower image display panel 2016. Further, the number of coin-outs is displayed to the number-of-payouts display portion 2032 of the lower image display panel 2016.

The graphic board 2068 comprises a VDP (Video Display Processor) for generating image data based on the control signal outputted from the main CPU 2041, a video RAM for temporarily storing image data generated by the VDP, and the like. It is to be noted that image data used in generation of the image data by the VDP is included in the game program read from the memory card 2053 and stored into the RAM 2043.

Based on the control signal outputted from the main CPU 2041, the ticket printer 2035 prints on a ticket a barcode as coded data of the number of credits stored in the RAM 2043, a date, and an identification number of the slot machine 2010, and the like, and outputs the ticket as the ticket 39 with a barcode. The key switch 2038S is provided on the key pad 2038, and outputs a predetermined input signal to the main CPU 2041 when the key pad 2038 is operated by the player. The data display 2037 displays data inputted by the player via the key pad 2038, and the like, based on the control signal outputted from the main CPU 2041.

The door PCB 2080 is connected with the control panel 2020, a reverter 2021S, and a cold cathode tube 2081. The control panel 2020 is provided with a start switch 2023S corresponding to the start button 2023, a change switch 2024S corresponding to the change button 2024, a CASH-OUT switch 2025S corresponding to the CASHOUT button 2025, a 1-BET switch 2026S corresponding to the 1-BET button 2026, and a maximum BET switch 2027S corresponding to the maximum BET button 2027. Each of the switches 2023S to 2027S outputs an input signal to the main CPU 2041 when each of the buttons 2023 to 2027 corresponding thereto is operated by the player.

The reverter 2021S operates based on the control signal outputted from the main CPU 2041, and distributes a coin into a cash box (not shown) or the hopper 2066, which are disposed in the slot machine 2010. Namely, when the hopper 2066 is filled with coins, a regular coin is distributed into the cash box by the reverter 2021S. On the other hand, when the hopper 2066 is not filled with coins, the regular coin is distributed into the hopper 2066. The cold cathode tube 2081 functions as a back light installed on the rear face side of the lower image display panel 2016 and the upper image display panel 2033, and lighted up based on the control signal outputted from the main CPU 2041.

FIG. 61 is a block diagram illustrating an internal configuration of a PTS terminal forming the gaming system according to the fifth embodiment of the present invention.

The PTS terminal 2064 includes a CPU 2241, a ROM 2242, a RAM 2243, a connecting portion 2244, the communication interface 2245, and a hard disk drive 2246. The controller including the CPU 2241, the ROM 2242, and the RAM 2243 corresponds to the controller in the present invention. The communication interface 2245 is connected to the communication interface 2044 of a single slot machine 2010 that is in a correspondence relationship with this PTS terminal 2064, through a communication line, and is also connected to the management server block 2220 through a communication line. The ROM 2242 stores: a system program for controlling operations of the PTS terminal 2064; exchange-fee calculated value data; permanent data; and the like. The exchange-fee calculated value data is data indicating the exchange-fee calculated value P/(1−P) (where P is an exchange fee ratio). Further, the RAM 2243 temporarily stores exchange rate data indicating an exchange rate in which a correspondence relationship between the amount of the basic currency (U.S. currency) and the amount of another type of currency other than the basic currency is set for each type of currency other than the basic currency, and the like.

The hard disk drive 2246 functions to store an image data of an image captured by the camera 2254C. The hard disk drive 2246 corresponds to the memory in the present invention. The CPU 2241 stores, after power is supplied thereto and a predetermined activation processing is performed thereto, the image data obtained upon image-capturing by the camera 2254C, in the hard disk drive 2246. The storage of the image data is performed at a predetermined time interval (for example, 0.5 second interval). Each of the image data is marked with a time (time stamp) at which the image data is stored in the hard disk drive 2246. The PTS terminal 2064 has a clock function and conducts time correction each time a predetermined time period elapses. The time correction is conducted by obtaining time data from a clock installed in the management server 200 or from outside via the Internet.

When the storable domain of the hard disk drive 2246 becomes less than a predetermined amount (for example, 100 MB), the CPU 2241 deletes the image data from those marked with an older time stamp. It is to be noted that the image data that are not set to the deletable state are not deleted.

The connecting portion 2244 is connected to the bill validator 2022, the to-be-exchanged bill validator 2065, a coin counter 2021C, a camera module 2254, a Radio Frequency Identification reader 2255 (hereinafter also referred to as RFID-R 2255), and the IC card R/W 2253 through respective communication lines.

The bill validator 2022 not only discriminates a regular bill (basic currency) from a false bill, but also accepts the regular bill. When having accepted a regular bill, the bill validator 2022 outputs an input signal to the CPU 2241, based on the face amount of the bill. That is, an input signal includes information about the amount of the accepted bill.

The to-be-exchanged bill validator 2065 identifies the types of bills of a plurality of countries which are currencies other than the basic currency and discriminates a regular bill from a false bill, and accepts the regular bill. When having accepted the regular bill, the to-be-exchanged bill validator 2065 outputs an input signal to the CPU 2241, based on the type and the amount of the bill. An input signal includes type-of-currency data indicating the identified type of the currency and amount-of-currency data indicating the amount of this currency. That is, an input signal includes information about the type and the amount of the accepted bill.

The coin counter 2021C is provided inside the coin receiving slot 2021, and discriminates a regular coin from a false coin inserted into the coin receiving slot 2021 by the player. Coins other than the regular coin are discharged from the coin payout exit 2019. Further, the coin counter 2021C outputs an input signal to the CPU 2241 in detection of the regular coin.

The camera module 2254 controls operations of the camera 2254C connected to the camera module 2254. The image data obtained by image-capturing is stored in the hard disk drive 2246 in the PTS terminal 2064.

An RFID-R 255 receives radio waves emitted by RFID tags carried by the staff members of the casino. The RFID-R 255 outputs a reception signal to the CPU 2241, based on the received radio waves. A reception signal includes information (staff ID) for identifying the RFID tag from which the received radio waves have been emitted. The CPU 2241 then transmits the reception signal to the staff management server 2263. The staff management server 2263, having received the reception signal transmitted from the CPU 2241, recognizes the current location of each staff member within the casino, based on the reception signal.

The IC card R/W 2253 reads data from an IC card and transmits the data to the CPU 2241, or writes data into the IC card based on a control signal from the CPU 2241.

Figure 62:
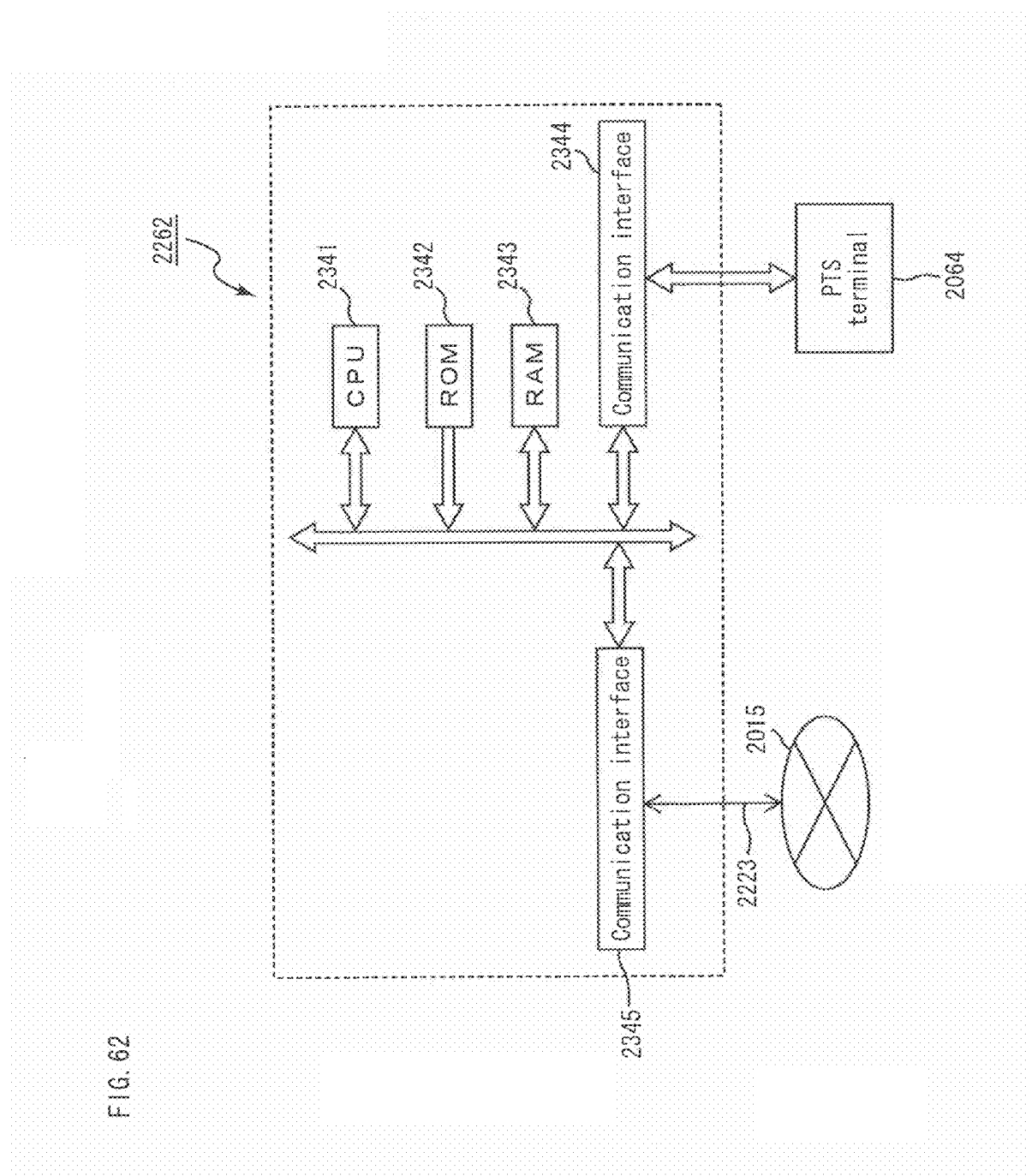
FIG. 62 is a block diagram illustrating an internal configuration of an exchange server forming the gaming system according to the first embodiment of the present invention.

FIG. 62 is a block diagram illustrating an internal configuration of an exchange server forming the gaming system according to the fifth embodiment of the present invention.

The exchange server 2262 includes a CPU 2341, a ROM 2342, a RAM 2343, a communication interface 2344, and a communication interface 2345. The communication interface 2344 is connected to the communication interface 2245 of the PTS terminal 2064 through a communication line. The communication interface 2345 is connected to the Internet 2015 through the communication line 2223. The ROM 2342 stores; a system program for controlling operations of the exchange server 2262; an exchange information acquisition program for acquiring the latest exchange information via the Internet 2015; permanent data; fee data indicating the exchange fee ratio P; and the like. Further, the RAM 2343 temporarily stores exchange information, exchange information of post-fee-subtraction, and the like.

Figure 63:
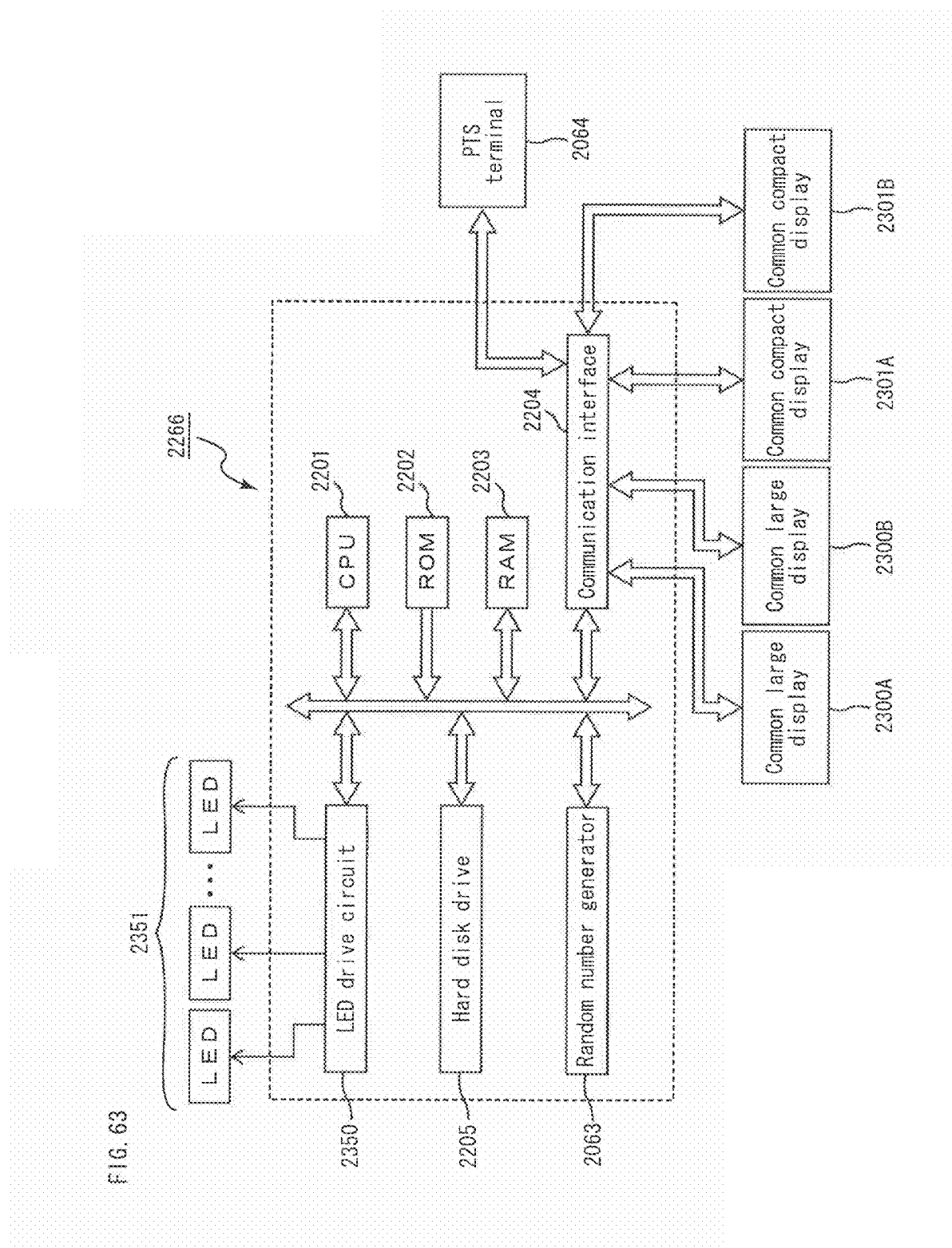
FIG. 63 is a block diagram illustrating an internal configuration of a progressive-jackpot server forming the gaming system according to the first embodiment of the present invention.

FIG. 63 is a block diagram illustrating an internal configuration of a progressive-jackpot server forming the gaming system according to the fifth embodiment of the present invention.

The progressive-jackpot server 2266 includes a CPU 2201, a ROM 2202, a RAM 2203, a communication interface 2204, a LED drive circuit 2350, a random number generator 2063, and a hard disk drive 2205 as a memory. The random number generator 2063 generates a random number at a predetermined timing. The communication interface 2204 is connected through communication lines to the communication interfaces 2245 of the PTS terminals 2064, and also is connected to the common large display 2300A, the common large display 2300B, the common compact display 2301A, and the common compact displays 2301B through communication lines. The ROM 2202 stores a system program for controlling the operation of the progressive-jackpot server 2266, permanent data, and the like. Further, the RAM 2203 temporarily stores cumulative-value data for EVENT TIME indicative of the cumulative value for EVENT TIME, cumulative-value data for bonus indicative of the cumulative value for bonus, number-of-lights data indicative of the number of the LEDs 2351 having been lighted among the LEDs 2351 included in the coupling illumination line 2310 provided for each of the slot machines 2010, data received from each of the slot machines 2010, and the like.

In the hard disk drive 2205, number-of-lighting determination table data indicative of a plurality of types of number-of-lighting determination tables (a number-of-lighting determination table for bent portions and a number-of-lighting determination table for straight portions) is stored.

Further, in the hard disk drive 2205, number-of-points determination table data to be referred to in determining the number of points in the common game is stored.

Furthermore, in the hard disk drive 2205, data indicative of the predetermined value and data indicative of the specific value are stored.

The plurality of LEDs 2351 are connected to the LED drive circuit 2350. The LEDs 2351 are associated with respective identification numbers, and the LED drive circuit 2350 turns on and turns off the LEDs 2351 based on a signal received from the CPU 2201.

Figure 64:
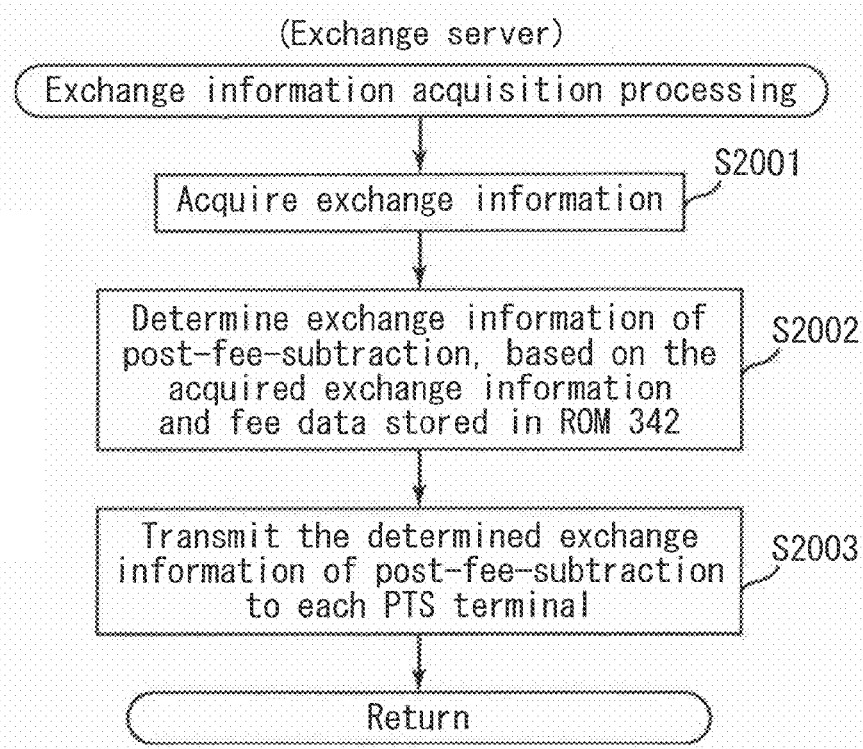
FIG. 64 is a flowchart illustrating exchange-information acquisition processing executed in the exchange server.

FIG. 64 is a flowchart illustrating exchange information acquisition processing conducted in the exchange server.

The exchange information acquisition processing is processing executed at a predetermined timing.

First, the CPU 2341 executes the exchange information acquisition program stored in the ROM 2342 so as to acquire the latest exchange information via the Internet 2015 (step S2001). In the processing, the CPU 2341 acquires, for example, information indicating a correspondence relationship between the amount of U.S. currency and the amount of Japanese currency (e.g. 1 dollar=100 yen) at a certain timing. The CPU 2341 also acquires, for example, information indicating a correspondence relationship between the amount of U.S. currency and the amount of Chinese currency (e.g. 1 dollar=6.85 yuan) at another timing. It is to be noted that the association between the amount M of U.S. currency and the amount N of currency of another country is described as M=N, in the present specification.

The CPU 2341 then determines exchange information of post-fee-subtraction, based on the exchange information acquired in step S2001 and the fee data stored in the ROM 2342 (step S2002). In the processing, in the correspondence relationships indicated by the exchange information, the CPU 2341 determines exchange information of post-fee-subtraction by multiplying the amount of currency of a country other than the U.S. by a value obtained by subtracting the exchange fee ratio (0.02 in the present embodiment) indicated by the fee data from 1. For example, when the acquired exchange information indicates that 1 dollar is equivalent to 100 yen, the CPU 2341 determines information indicating that 0.98 dollar, obtained by multiplying 1 dollar by (1−0.02), is equivalent to 100 yen, as the exchange information of post-fee-subtraction.

The CPU 2341 transmits the exchange information of post-fee-subtraction determined in step S2002 to each PTS terminal 2064 (step S2003). After executing the processing of step S2003, the CPU 2341 completes the exchange information acquisition processing.

Figure 65:
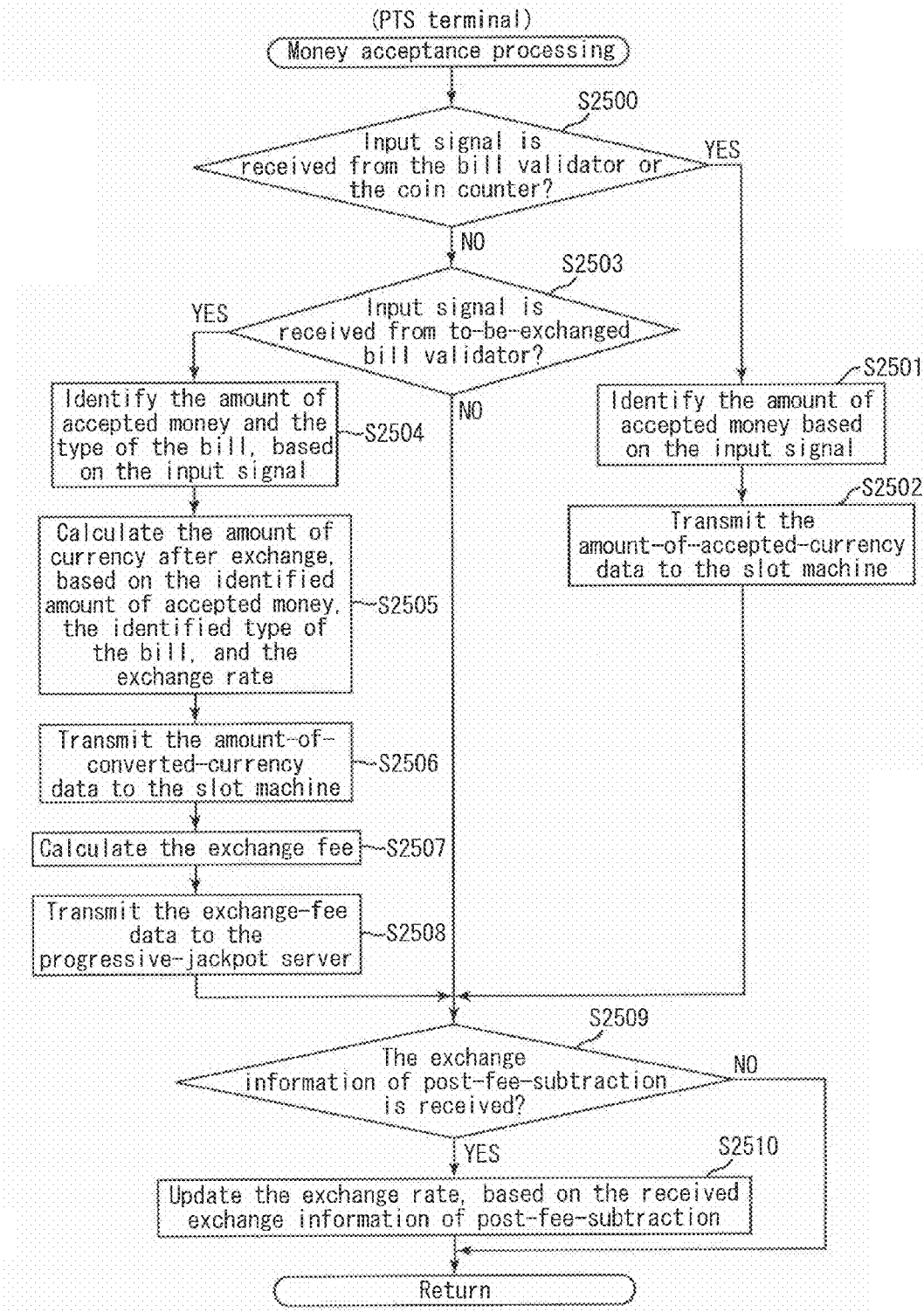
FIG. 65 is a flowchart illustrating money acceptance processing executed in the PTS terminal illustrated in FIG. 61.

FIG. 65 is a flowchart illustrating money acceptance processing conducted in the PTS terminal illustrated in FIG. 61.

First, the CPU 2241 determines whether or not it has received an input signal from the bill validator 2022 or the coin counter 2021C at a predetermined timing (step S2500).

When determining in step S2500 that the CPU 2241 has received an input signal, the CPU 2241 identifies the amount of accepted money based on the received input signal (step S2501). The CPU 2241 then transmits the amount-of-accepted-currency data indicating the identified amount of accepted money to the correspondingly related slot machine 2010 (step S2502).

On the other hand, when determining in step S2500 that the CPU 2241 has not received an input signal, the CPU 2241 determines whether or not it has received an input signal from the to-be-exchanged bill validator 2065 (step S2503).

When determining in step S2503 that the CPU 2241 has received an input signal, the CPU 2241 identifies the amount of accepted money and the type of the bill accepted by the to-be-exchanged bill validator 2065, based on the type-of-currency data and the amount-of-currency data included in the received input signal (step S2504).

The CPU 2241 calculates the amount of currency (e.g. 98 dollars) after exchanged into the U.S. currency, which is the basic currency, based on the amount of accepted money (e.g. 10,000 yen) and the type of the bill which have been identified in step S2504, and the exchange rate (e.g. 0.98 dollar=100 yen) indicated by the exchange rate data stored in the RAM 2243 (step S2505). The CPU 2241 then transmits the amount-of-converted-currency data indicating the amount of exchanged currency (hereinafter, also referred to as the amount of converted currency) to the correspondingly related slot machine 2010 (step S2506). It is to be noted that the amount-of-accepted-currency data combined with the amount-of-converted-currency data is described as the amount-of-currency data.

The CPU 2241 calculates the exchange fee, based on the amount-of-converted-currency data indicating the amount of converted currency calculated in step S2505 and on exchange-fee calculated value data indicating the exchange-fee calculated value stored in the ROM 2242 (step S2507). The exchange fee corresponds to an amount (e.g. 2 dollars) obtained by multiplying the amount of converted currency (e.g. 98 dollars) calculated in step S2505 by the exchange-fee calculated value P/1−P (where P is the exchange fee ratio (0.02 in the present embodiment)) (the exchange-fee calculated value is 2/98 in the present embodiment). The CPU 2241 then transmits exchange-fee data indicating the exchange fee to the progressive-jackpot server 2266 (step S2508).

When executing the processing of step S2502 or step S2508, or when determining in step S2503 that the CPU 2241 has not received an input signal, the CPU 2241 determines whether or not it has received the exchange information of post-fee-subtraction from the exchange server 2262 (step S2509).

When determining in step S2509 that the CPU 2241 has received the exchange information of post-fee-subtraction, the CPU 2241 updates the exchange rate data stored in the RAM 2243 based on the received exchange information of post-fee-subtraction (step S2510). For example, when the CPU 2241 has received the exchange information of post-fee-subtraction, which indicates a correspondence relationship of 1 dollar=110 yen, in a case where the correspondence relationships among the respective currencies in the exchange rates indicated by the exchange rate data stored in the RAM 2243 are 1 dollar=100 yen=0.68 euro=6.85 yuan, the CPU 2241 stores into the RAM 2243 the exchange rate data indicating a new exchange rate of 1 dollar=110 yen=0.68 euro=6.85 yuan.

In the present embodiment, a case is described where the exchange server 2262 having received the exchange information determines the exchange information of post-fee-subtraction, based on the received exchange information, and transmits the determined exchange information of post-fee-subtraction to the PTS terminals 2064. That is, the exchange server 2262 conducts the processing related to collection of exchange fees. However, in the present invention, the PTS terminal may conduct the processing related to collection of exchange fees.

In this case, for example, a configuration as described below can be adopted.

Namely, the ROM in the PTS terminal stores the fee data indicating the exchange fee ratio P. The CPU in the PTS terminal receives the exchange information form the exchange server. Next, the CPU in the PTS terminal determines the exchange information of post-fee-subtraction, based on the fee data stored in the ROM. The CPU in the PTS terminal then updates the exchange rate data based on the determined exchange information of post-fee-subtraction.

Further, in the present invention, the exchange rate data may be stored in the RAM in the exchange server, and the CPU in the exchange server may update the exchange rate data based on the exchange information of post-fee-subtraction and transmits the updated exchange rate data to the PTS terminal.

Alternatively, the exchange server may receive the exchange rate data from an external source.

When executing the processing of step S2510 or when determining in step S2509 that the CPU 2241 has not received the exchange information of post-fee-subtraction, the CPU 2241 completes the money acceptance processing.

Figure 66:
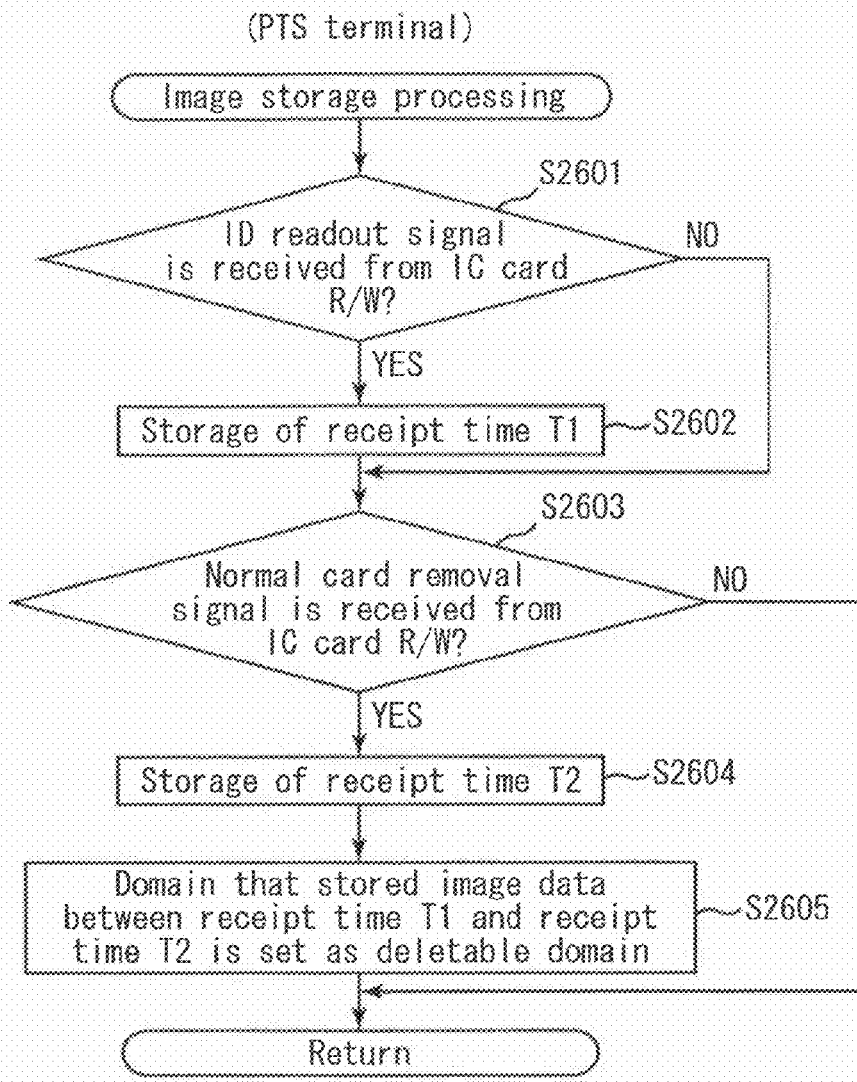
FIG. 66 is a flowchart illustrating a subroutine of image storage processing execute in the PTS terminal illustrated in FIG. 61.

FIG. 66 is a flowchart illustrating a subroutine of the image storage processing performed in the PTS terminal shown in FIG. 61.

In the PTS terminal 2064, the image data obtained by image-capturing by the camera 243C is continuously stored in the hard disk drive 2246 at a 0.5 second interval as explained above using FIG. 61.

First, in step S2601, the CPU 2241 in the PTS terminal 2064 determines whether or not an ID readout signal has been received from the IC card R/W 2253. When determined that the ID readout signal has been received, the CPU 2241 stores a receipt time T1 in a predetermined domain in the RAM 2243 (step S2602).

In step S2601, when determined that the ID readout signal is not received or when processing of step S2602 is finished, the CPU 2241 determined whether or not a normal card removal signal has been received from the IC card R/W 2253 (step S2603). When determined that the CPU 2241 has received the normal card removal signal from the IC card R/W 2253, the CPU 2241 stores a receipt time T2 in a predetermined domain in the RAM 2243 (step S2604).

Next, in step S2605, the CPU 2241 sets the domain in the hard disk drive 2246 that has stored the image data between the receipt time T1 and the receipt time T2 to a deletable domain. In this processing, the CPU 2241 sets the image data with a time stamp from the receipt time T1 to the receipt time T2 to the deletable state. When determined in step S2603 that the normal card removal signal is not received, or when the processing of step S2605 is finished, the CPU 2241 completes the present subroutine.

It is to be noted that the image data stored in the domain set to the deletable domain is deleted at the occasion when the storable domain becomes less than 100 MB.

Figure 67:
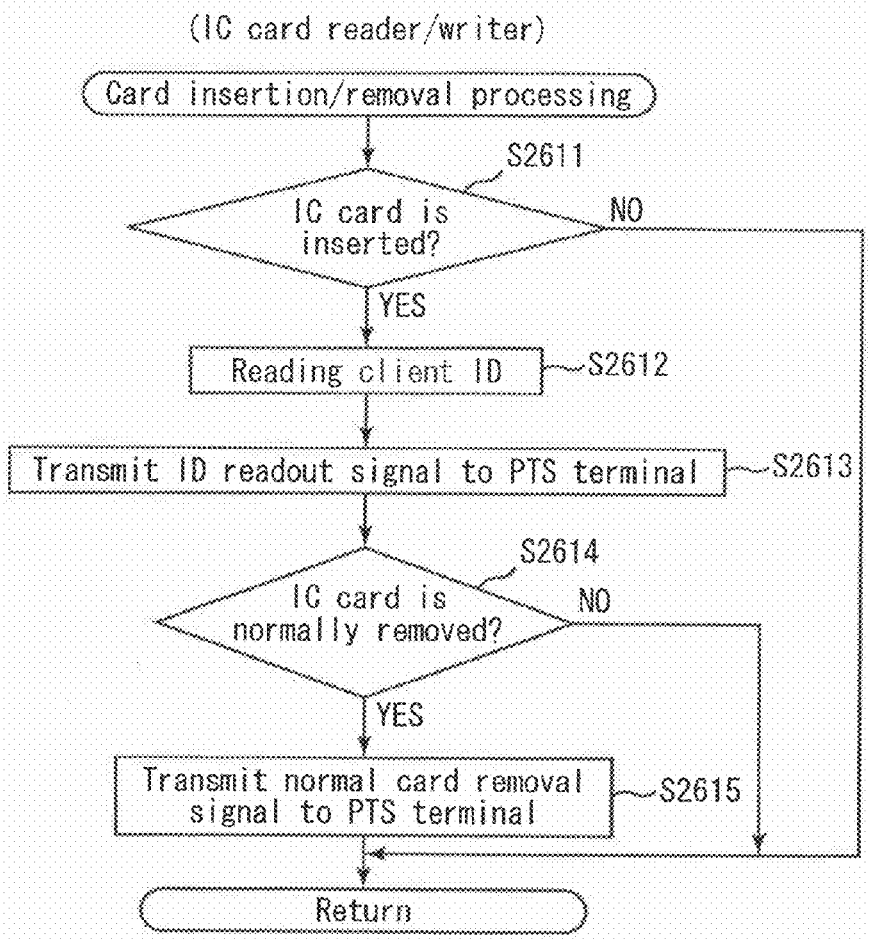
FIG. 67 is a flowchart illustrating a subroutine of card insertion/removal processing executed in the IC card reader/writer.

FIG. 67 is a flowchart illustrating a subroutine of card insertion/removal processing executed in the IC card reader/writer.

First, the IC card R/W 2253 determines whether or not the IC card is inserted (step S2611). When determined that the IC card is inserted, the IC card R/W 2253 read a client ID from the IC card. Then, in step S2613, the IC card R/W 2253 transmits an ID readout signal indicating that the client ID has been read to the PTS terminal 2064. When it is determined that the IC card is inserted in step S2611, while the client ID has been already read, the processing shifts to step S2614 without conducting processing of step S2612 and step S2613.

The client ID corresponds to the identification data in the present invention. Also, the ID readout signal corresponds to the present invention.

In step S2614, the IC card R/W 2253 determines whether or not the IC card is normally removed. When determined that the IC card is normally removed, the IC card R/W 2253 transmits the normal card removal signal to the PTS terminal 2064 (step S2615). This subroutine is completed when it is determined in step S2614 that the IC card is normally removed, or when the processing of step S2615 is finished.

The normal card removal signal corresponds to the non-detection signal in the present invention.

Figure 68:
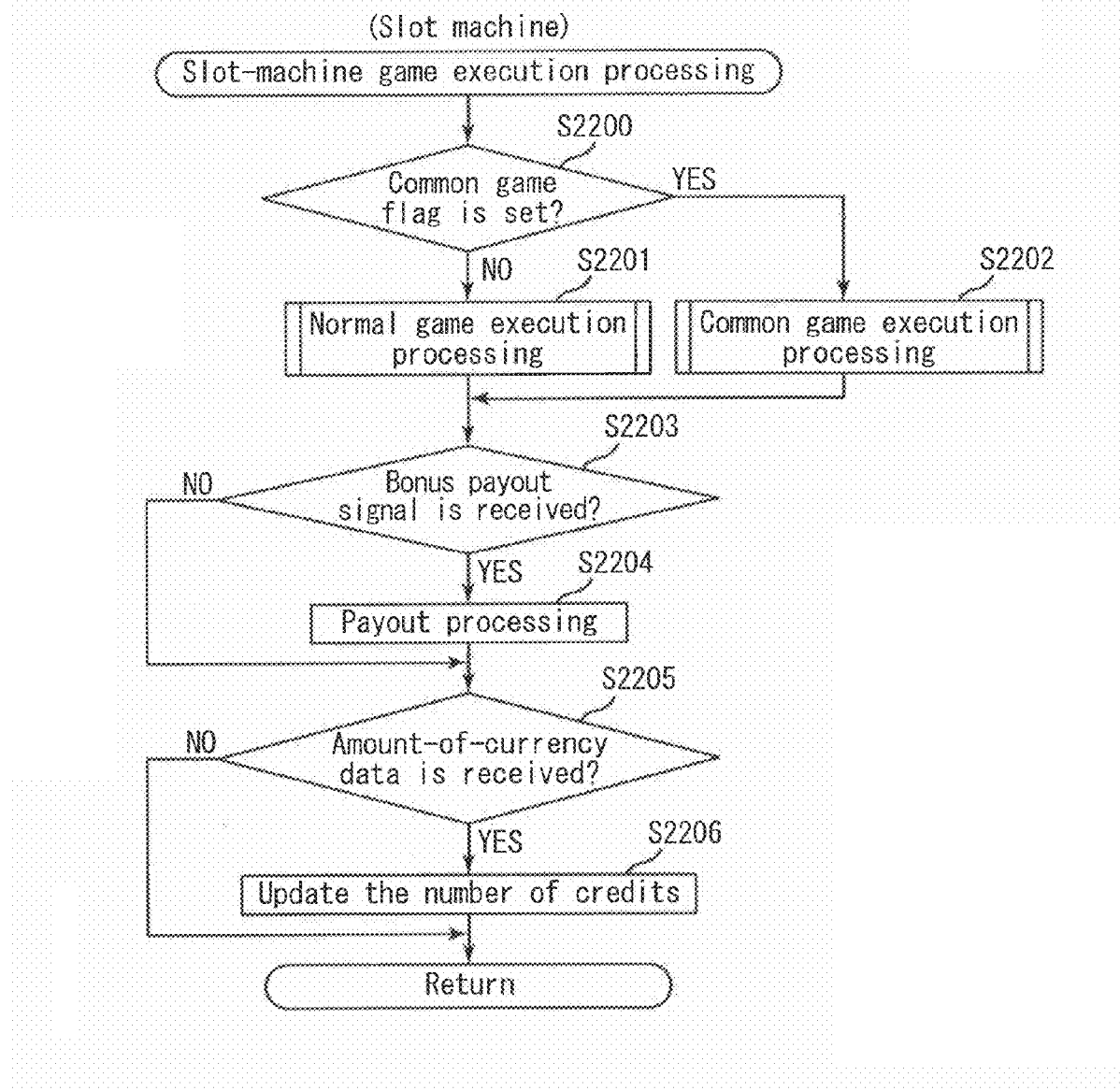
FIG. 68 is a flowchart illustrating slot-machine game execution processing conducted in a slot machine.

FIG. 68 is a flowchart illustrating slot-machine game execution processing conducted in a slot machine.

Transmission of data and the like between the slot machine 2010 and the progressive-jackpot server 2266 is conducted via the PTS terminal 2064. However, in order to make the description simpler in the following, the transmission will be described as if it is conducted between the slot machine 2010 and the progressive-jackpot server 2266.

First, the main CPU 2041 determines whether or not the common game flag has been set or not (step S2200).

Figure 69:
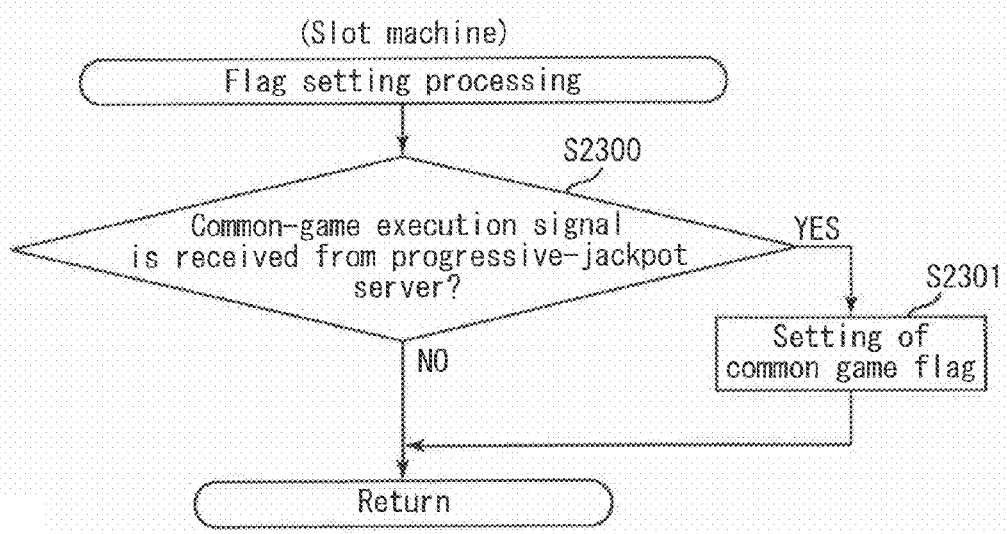
FIG. 69 is a flowchart illustrating a subroutine of flag setting processing.

With reference to FIG. 69, the common-game flag is described.

FIG. 69 is a flowchart illustrating a subroutine of flag setting processing.

First, the main CPU 2041 determines at a predetermined timing whether or not it has received a common-game execution signal (see FIG. 73) from the progressive-jackpot server through the PTS terminal 2064 (step S2300).

When determining that the main CPU 2041 has not received the common-game execution signal, the main CPU 2041 completes the present subroutine.

On the other hand, when determining that the main CPU 2041 has received the common-game execution signal, the main CPU 2041 sets a common-game flag (step S2301) and completes the present subroutine.

As described above, the common-game flag is a flag indicative of a satisfaction of a condition for executing the common game.

When determining in step S2200 in FIG. 68 that the common-game flag is not set, the main CPU 2041 executes normal game execution processing (step S2201). The normal game execution processing will be described in more detail later with reference to the drawing.

On the other hand, when determining that a common-game flag is set, the main CPU 2041 conducts common game execution processing (step S2202). The common game execution processing will be described in more detail later with reference to the drawing.

Next, the main CPU 2041 determines whether or not it has received a bonus payout signal (see FIG. 75) from the progressive-jackpot server 2266 through the PTS terminal 2064 (step S2203).

When determining that the main CPU 2041 has received the bonus payout signal, the main CPU 2041 pays out the coins (step S2204). In the case of receiving the bonus payout signal including information indicating that this slot machine 2010 is a first winning slot machine 2010, the main CPU 2041 pays out a first fixed number of coins. On the other hand, in the case of receiving the bonus payout signal including information indicating that this slot machine 2010 is a second winning slot machine 2010, the main CPU 2041 pays out a second fixed number of coins. The value of the first fixed number is larger than the value of the second fixed number. Namely, the number of coins paid out to the first winning slot machine 2010 is larger than the number of coins paid out to the second winning slot machine 2010.

After executing the processing of step S2204 or when determining in step S2203 that the main CPU 2041 has not received the bonus payout signal, the main CPU 2041 determines whether or not it has received the amount-of-currency data (the amount-of-accepted-currency data, the amount-of-converted-currency data) from the PTS terminal 2064 (step S2205). Namely, the main CPU 2041 determines whether or not it has received either the amount-of-accepted-currency data transmitted in step S2502 or the amount-of-converted-currency data transmitted in step S2506.

When determining in step S2205 that the main CPU 2041 has received the amount-of-currency data, the main CPU 2041 updates the number of credits based on the received amount-of-currency data (step S2206). Namely, the main CPU 2041 conducts the processing of adding the number of credits equivalent to the amount of currency indicated by the received amount-of-currency data to the number of credits stored in the RAM 2043.

The number of credits equivalent to the amount of currency indicated by the received amount-of-currency data corresponds to the BET value of the present invention.

After executing the processing of step S2206 or when determining in step S2205 that the main CPU 2041 has not received the amount-of-currency data, the main CPU 2041 completes the present subroutine.

FIG. 70 is a flowchart illustrating a subroutine of normal game execution processing.

FIG. 71A to FIG. 71C are views illustrating correspondence relationships between the combinations of symbols rearranged along a winning line and the number of payouts.

Figure 72:
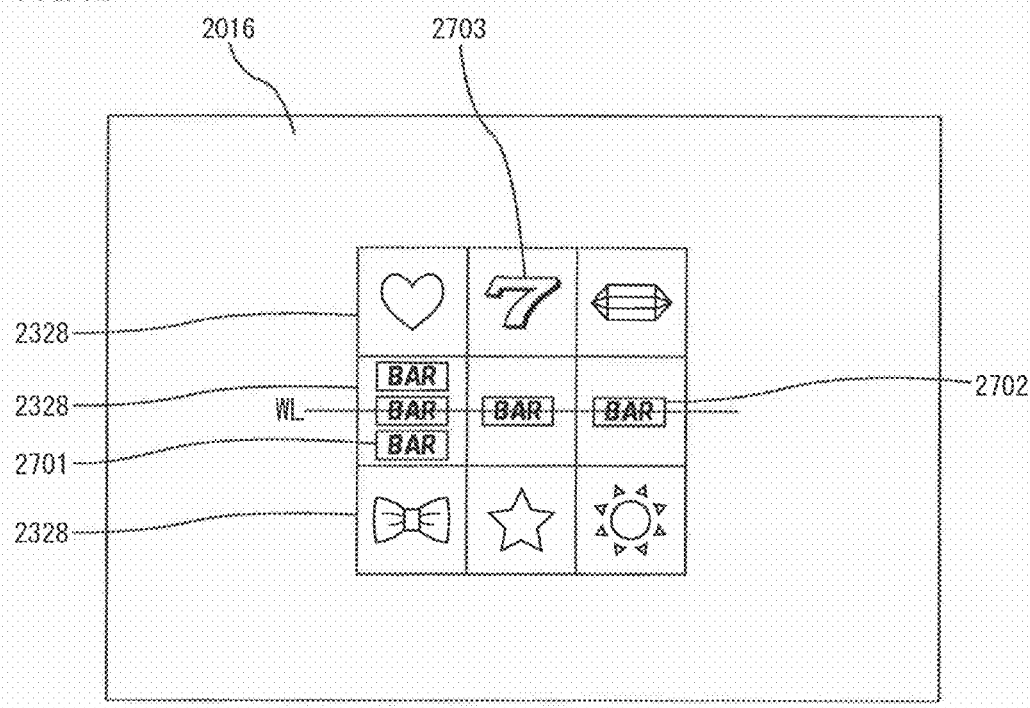
FIG. 72 is a view illustrating exemplary symbols rearranged to a display block.

FIG. 72 is a view illustrating exemplary symbols rearranged in the display blocks.

First, the main CPU 2041 determines whether or not the time measured by the timer 37 is equal to or more than the predetermined time T (step S2010).

When determining in step S2010 that the measured time is not equal to or more than the predetermined time T, the main CPU 2041 shifts the processing to step S2012. On the other hand, when determining in step S2010 that the measured time is equal to or more than the predetermined time T, the main CPU 2041 transmits a game dormant signal to the progressive-jackpot server 2266 through the PTS terminal 2064 (step S2011). The game dormant signal includes the identification number of the slot machine 2010.

The main CPU 2041 determines whether or not a coin has been betted (step S2012). In this processing, the main CPU 2041 determines whether or not it has received an input signal that is outputted from the 1-BET switch 2026S when the 1-BET button 2026 is operated, or an input signal that is outputted from the maximum BET switch 2027S when the maximum BET button 2027 is operated. When the main CPU 2041 determines that the coin has not been betted, the main CPU 2041 returns the processing to step S2010.

On the other hand, when determining in step S2012 that the coin has been betted, the main CPU 2041 conducts processing for making a subtraction from the number of credits stored in the RAM 2043 according to the number of betted coins (step S2013) It is to be noted that, when the number of coins to be betted is larger than the number of credits stored in the RAM 2043, the main CPU 2041 does not conduct the processing for making a subtraction from the number of credits stored in the RAM 2043, and returns the processing to step S2010. Further, when the number of coins to be betted exceeds the upper limit of the number of coins that can be betted in one game (three coins in the present embodiment), the main CPU 2041 does not conduct the processing for making a subtraction from the number of credits stored in the RAM 2043, and advances the processing to step S2014.

Next, the main CPU 2041 determines whether or not the start button 2023 has been turned ON (step S2014). In this processing, the main CPU 2041 determines whether or not it has received an input signal that is outputted from the start switch 2023S when the start button 2023 is pressed.

When the main CPU 2041 determines that the start button 2023 has not been turned ON, the processing is returned to step S2010.

It is to be noted that, when the start button 2023 is not turned ON (e.g. when the start button 2023 is not turned ON and a command to end the game is inputted), the main CPU 2041 cancels a subtraction result in step S2013.

On the other hand, when determining in step S2014 that the start button 2023 has been turned ON, the main CPU 2041 clears the time measured by the timer 37 (step S2015) and starts measurement of the time by the timer 37 (step S2016).

The main CPU 2041 transmits the number-of-game-media information indicative of the number of betted coins to the progressive-jackpot server 2266 through the PTS terminal 2064 (step S2017). The number-of-game-media information includes the identification number of the slot machine 2010.

Next, the main CPU 2041 executes symbol rearrangement processing (step S2018).

In this processing, first, the main CPU 2041 starts scroll-display of symbols in the display blocks 2028. Then, the main CPU 2041 executes the aforementioned symbol determination program so as to determine the symbols to be rearranged, and then rearranges the symbols in the display blocks 2028.

Next, the main CPU 2041 determines whether or not a prize has been established (step S2019).

As shown in FIG. 72, in display blocks 2328 according to the present embodiment, nine symbols in total can be rearranged in three rows and three columns. Along the center row, a winning line WL is set. When symbols rearranged along the winning WL form a predetermined combination, it is determined that a prize has been established and coins are paid out.

As shown in FIG. 71A to FIG. 71C, in the present embodiment, it is configured such that the relationships between the combinations of symbols and the numbers of coin-outs vary among a case where the number of betted coins is one, a case where the number of betted coins is two and a case where the number of betted coins is three. In the drawing, "3bar" is a symbol 2701 shown in FIG. 72, and "1bar" is a symbol 2702 shown in FIG. 72. Also, "anybar" is any of the symbols out of "3bar", "2bar", and "1bar".

Here, when the number of bets is equal to or less than two, an establishment of a prize refers to an establishment of at least one combination of symbols out of the combinations of symbols of "3bar×3", "2bar×3", "1bar×3" and "anybar×3", along the winning WL (see FIGS. 71A and 71B). When the number of bets is three, an establishment of a prize refers to an establishment of at least one combination of symbols out of the combinations of symbols of "blue7×3", "red7×3", and "white7×3", along the winning line WL (see FIG. 71C).

When determining that a prize has been established, the main CPU 2041 executes processing relating to the payout of coins (step S2020). In the processing, the main CPU 2041 pays out coins of the number that is determined based on the data indicating the relationships between the combinations of symbols and the numbers of coin-outs (see FIGS. 71A to 71C).

For example, when a combination of symbols of "3bar-1bar-1bar" is rearranged along the winning line WL as shown in FIG. 72 in a game in which one coin has been betted, this combination corresponds to a combination "anybar-anybar-anybar", and thus ten coins will be paid out.

In the case of accumulating coins, the main CPU 2041 conducts processing for adding the number of credits corresponding to the determined amount of payout to the number of credits stored in the RAM 2043. On the other hand, in the case of paying out coins, the main CPU 2041 transmits a control signal to the hopper 2066 in order to pay out coins in an amount corresponding to the determined amount of payout.

When determining in step S2019 that no prize has been established or after executing the processing of step S2020, the main CPU 2041 completes the present subroutine.

Subsequently, the common game execution processing is described with reference to FIG. 73.

Figure 73:
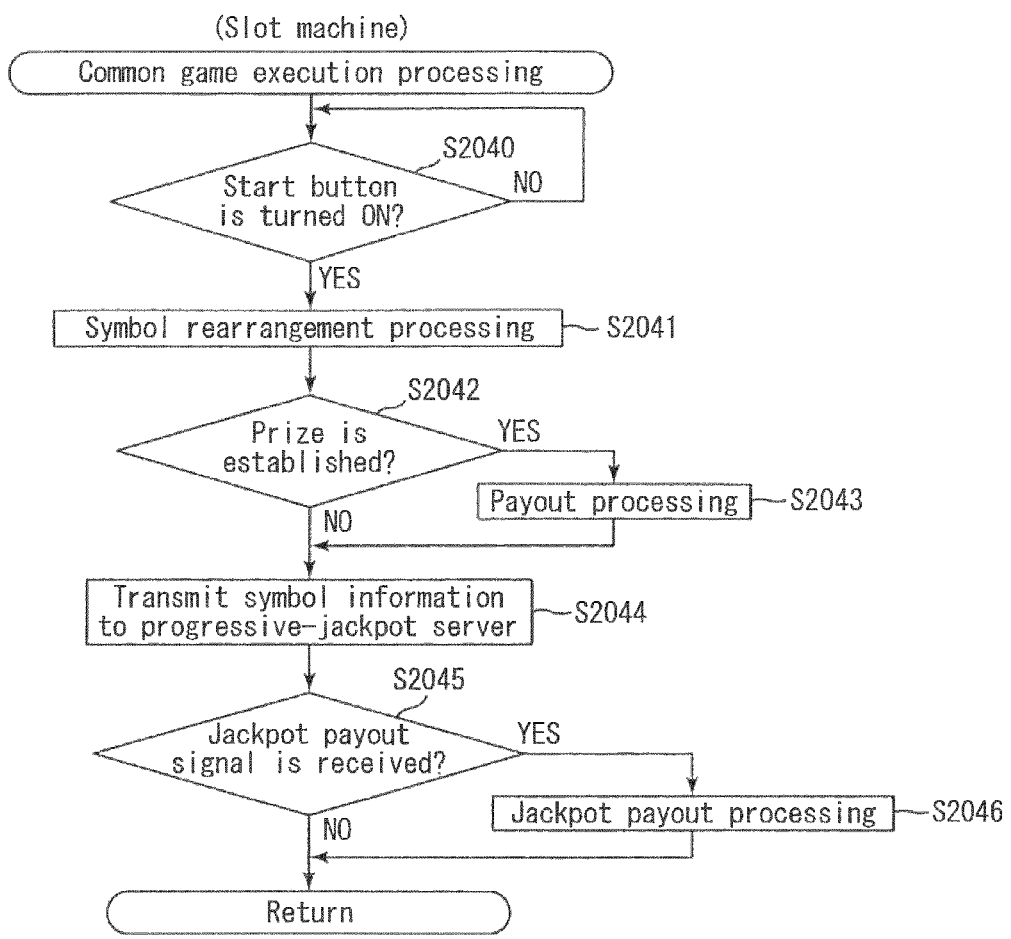
FIG. 73 is a flowchart illustrating a subroutine of common-game execution processing.

FIG. 73 is a flowchart illustrating a subroutine of the common game execution processing.

First, the main CPU 2041 executes processing of steps S2040 to S2043, and the processing is substantially the same as the processing of step S2014 and steps S2018 to S2020 in FIG. 70. Here, only the parts different from step S2014 and steps S2018 to S2020 in FIG. 70 will be described.

When determining in step S2042 that no prize has been established or after executing the processing of step S2043, the main CPU 2041 transmits symbol information to the progressive-jackpot server 2266 through the PTS terminal 2064 (step S2044). The symbol information is information indicative of the symbols rearranged in step S2041.

Next, the main CPU 2041 determines whether or not it has received a jackpot payout signal from the progressive-jackpot server 2266 through the PTS terminal 2064 (step S2045). The jackpot payout signal is a signal transmitted from the progressive-jackpot server 2266 to any of the slot machines 2010, through the PTS terminal 2064, when all the LEDs 2351 included in the coupling illumination line 2310 provided for this slot machine 2010 have been lighted (see FIG. 77). The jackpot payout signal includes information indicative of the cumulative value for EVENT TIME.

When determining that the main CPU 2041 has received a jackpot payout signal, the main CPU 2041 executes jackpot payout processing (step S2046). In this processing, the main CPU 2041 pays out coins in number corresponding to the cumulative value for EVENT TIME, based on the information indicative of the cumulative value for EVENT TIME which is included in the jackpot payout signal. Examples of the processing executed by the main CPU 2041 in step S2046 include outputting an annunciation sound from the speaker 2029, lighting the lamp 2030, and printing the ticket 39 with a barcode, which has a barcode indicative of the number of coins to be paid out printed thereon.

When determining in step S2045 that the main CPU 2041 has not received a jackpot payout signal or after executing the processing of step S2046, the main CPU 2041 completes the present subroutine.

Next, there is described processing performed in the progressive-jackpot server 2266.

Figure 74:
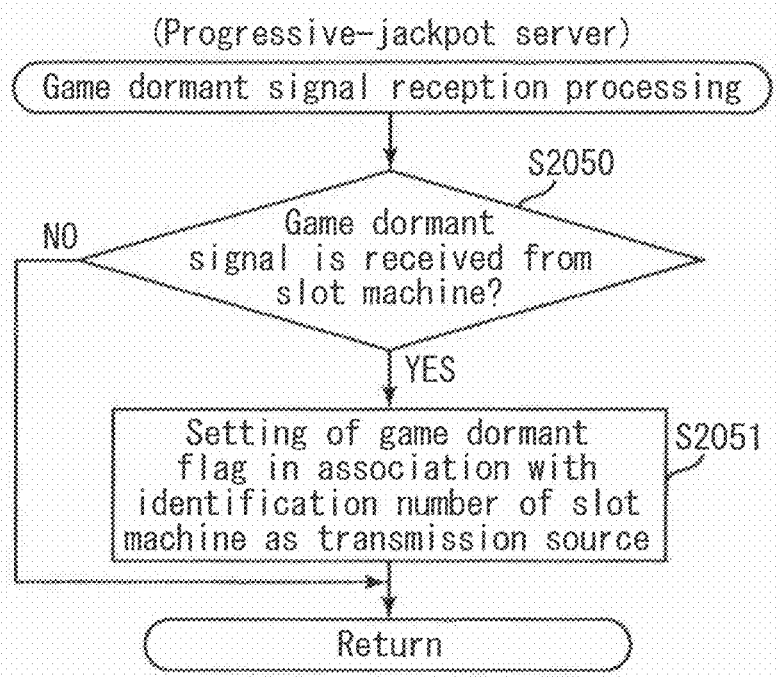
FIG. 74 is a flowchart illustrating a subroutine of game dormant signal reception processing.

FIG. 74 is a flowchart illustrating a subroutine of game dormant signal reception processing.

First, the CPU 2201 determines whether or not it has received a game dormant signal (see FIG. 70) at a predetermined timing from the slot machine 2010 through the PTS terminal 2064 (step S2050).

When determining that the CPU 2201 has not received the game dormant signal, the CPU 2201 completes the present subroutine. On the other hand, when determining that the CPU 2201 has received a game dormant signal, the CPU 2201 sets a dormant flag in association with the identification number of the slot machine 2010 included in the received game dormant signal (step S2051).

Figure 75:
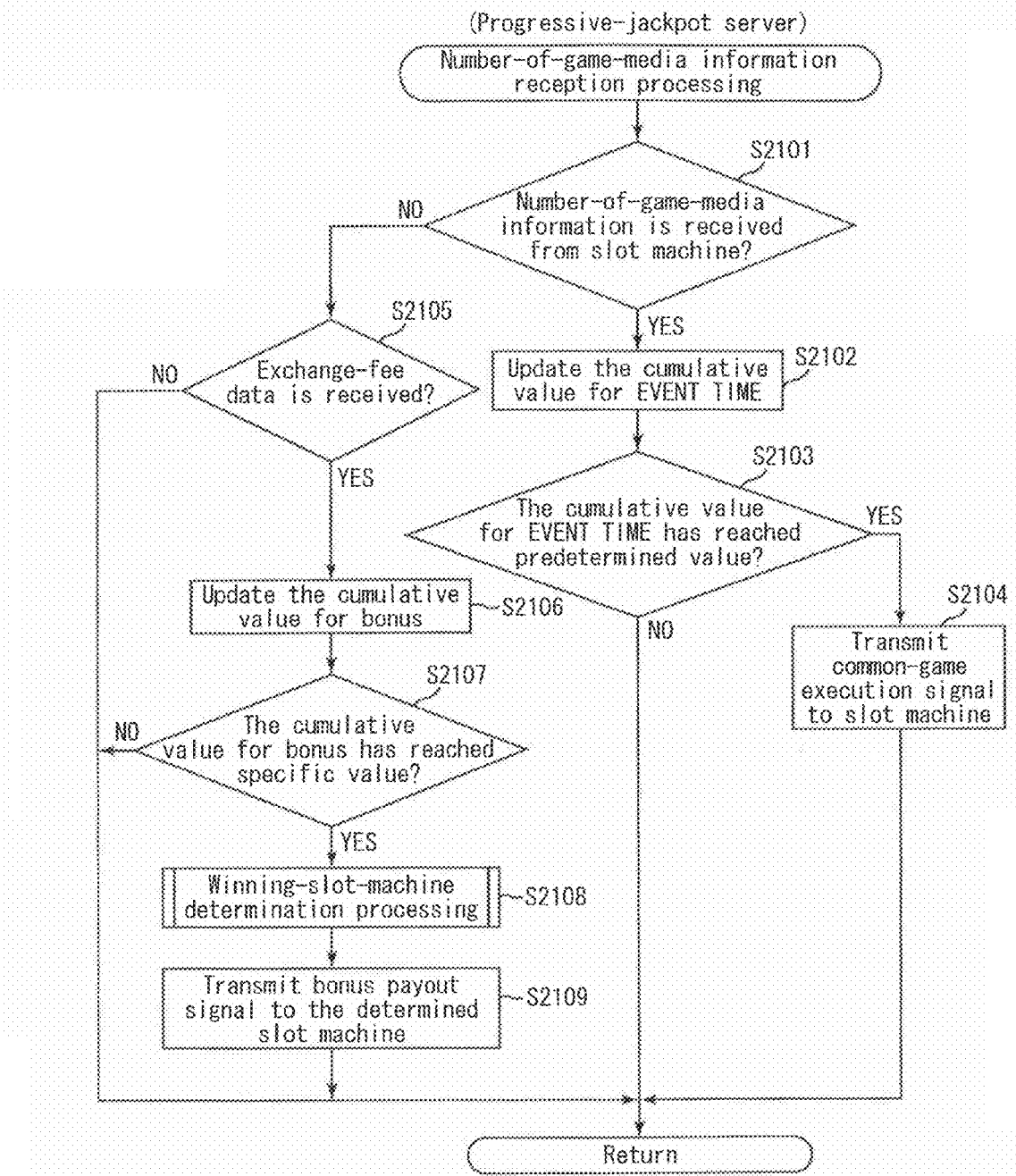
FIG. 75 is a flowchart illustrating a subroutine of number-of-game-media information reception processing.

FIG. 75 is a flowchart illustrating a subroutine of number-of-game-media information reception processing.

First, the CPU 2201 determines whether or not it has received the number-of-game-media information from the slot machine 2010 through the PTS terminal 2064 at a predetermined timing (step S2101).

When determining that the CPU 2201 has received the number-of-game-media information, the CPU 2201 adds a part (the number obtained by subtracting 1 from the number of coins indicated by the number-of-game-media information, in the present embodiment) of the number of coins indicated by the received number-of-game-media information to the cumulative value for EVENT TIME indicated by the cumulative-value data for EVENT TIME stored in the RAM 2203, and stores the numerical value obtained by the addition as the updated cumulative value for EVENT TIME in the cumulative-value data for EVENT TIME (step S2102). It is to be noted that the processing of step S2102 is canceled when the number obtained by subtracting 1 from the number of coins indicated by the number-of-game-media information becomes equal to or less than 0.

Next, the CPU 2201 determines whether or not the cumulative value for EVENT TIME has reached the predetermined value, based on the cumulative-value data for EVENT TIME stored in the RAM 2203 (step S2103).

When determining that the cumulative value for EVENT TIME has reached the predetermined value, the CPU 2201 transmits a common-game execution signal to the slot machines 2010 through the PTS terminals 2064 (step S2104).

On the other hand, when determining that the CPU 2201 has not received the number-of-game-media information, the CPU 2201 determines whether or not it has received the exchange-fee data (step S2105). When determining that the CPU 2201 has received the exchange-fee data, the CPU 2201 adds the number of coins corresponding to the amount of currency indicated by the received exchange-fee data to the cumulative value for bonus indicated by the cumulative-value data for bonus stored in the RAM 2203, sets the numerical value obtained by the addition as the updated cumulative value for bonus, and stores the cumulative-value data for bonus into the RAM 2203 (step S2106).

The amount of currency indicated by the received exchange-fee data corresponds to the amount of basic currency corresponding to the predetermined fee of the present invention.

Next, the CPU 2201 determines whether or not the cumulative value for bonus has reached the specific value, based on the cumulative-value data for bonus stored in the RAM 2203 (step S2107).

The cumulative-value for bonus reaching the specific value corresponds to the predetermined progressive-jackpot payout condition of the present invention.

When determining that the cumulative value for bonus has reached the specific value, the CPU 2201 executes winning-slot-machine determination processing (step S2108). In the winning-slot-machine determination processing, the first winning slot machine 2010 and the second winning slot machine 2010, to each of which a bonus is offered, is determined. The winning-slot-machine determination processing is described later by using the drawing.

The CPU 2201 transmits, through the PTS terminals 2064, the bonus payout signals to the first winning slot machine 2010 and the second winning slot machine 2010 determined in step S2108 (step S2109). The bonus payout signal to be transmitted to the first winning slot machine 2010 includes information indicating that this slot machine 2010 is the first winning slot machine 2010. The bonus payout signal to be transmitted to the second winning slot machine 2010 includes information indicating that this slot machine 2010 is the second winning slot machine 2010.

The CPU 2201 completes the present subroutine, when the CPU 2201 has determined in step S2103 that the cumulative value for EVENT TIME has not reached the predetermined value, or after the CPU 2201 has executed the processing of step S2104, or when the CPU 2201 has determined in step S2105 that it has not received the exchange-fee data, or when the CPU 2201 has determined in step S2107 that the cumulative value for bonus has not reached the specific value, or when the CPU 2201 has executed the processing of step S2109.

Figure 76:
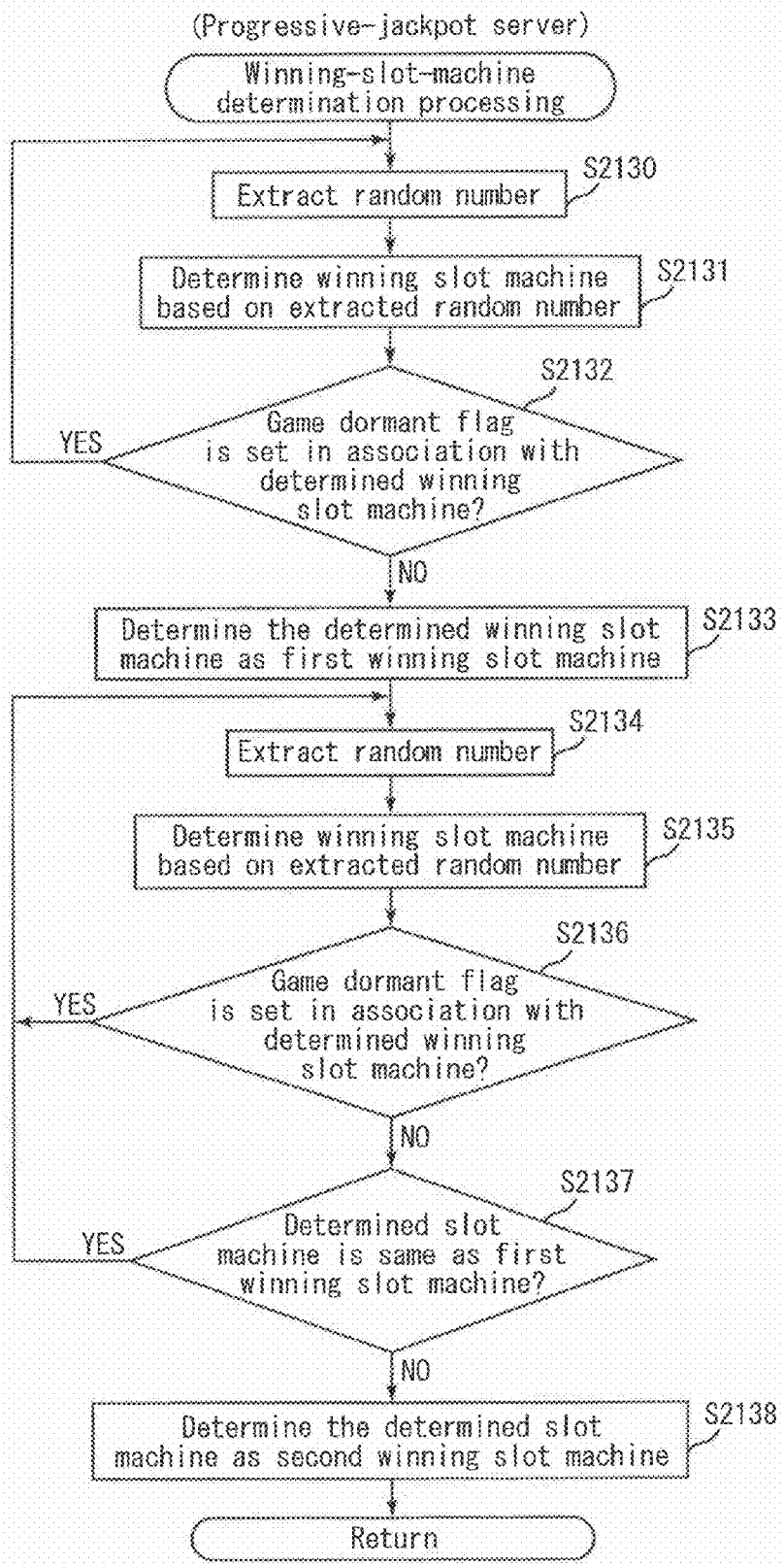
FIG. 76 is a flowchart illustrating a subroutine of winning-slot-machine determination processing.

FIG. 76 is a flowchart illustrating a subroutine of winning-slot-machine determination processing.

First, the CPU 2201 extracts the random number generated by the random number generator 2063 (step S2130).

The CPU 2201 determines a single slot machine 2010 out of ten slot machines 2010, based on the random number extracted in step S2130. Then, the CPU 2201 determines the determined slot machine 2010 as a winning slot machine 2010 (step S2131).

The CPU 2201 determines whether or not the game dormant flag is set in association with the identification number of the winning slot machine 2010 determined in step S2131 (step S2132). When determining that the game dormant flag is set, the CPU 2201 returns the processing to step S2130.

When determining in step S2132 that the game dormant flag is not set, the CPU 2201 determines the winning slot machine 2010 determined in step S2131 as the first winning slot machine 2010 (step S2133).

The CPU 2201 extracts the random number generated by the random number generator 2063 (step S2134).

The CPU 2201 determines a single slot machine 2010 out of ten slot machines 2010, based on the random number extracted in step S2134. Then, the CPU 2201 determines the determined slot machine 2010 as a winning slot machine 2010 (step S2135).

The CPU 2201 determines whether or not the game dormant flag is set in association with the identification number of the winning slot machine 2010 determined in step S2135 (step S2136). When determining that the game dormant flag is set, the CPU 2201 returns the processing to step S2134.

When determining in step S2136 that the game dormant flag is not set, the CPU 2201 determines whether or not the winning slot machine 2010 determined in step S2135 is the same slot machine 2010 as the first winning slot machine 2010 determined in step S2133 (step S2137). When determining that they are the same slot machine 2010, the CPU 2201 returns the processing to step S2134.

When determining in step S2137 that they are not the same slot machine 2010, the CPU 2201 determines the winning slot machine 2010 determined in step S2135 as the second winning slot machine 2010 (step S2138).

Figure 77:
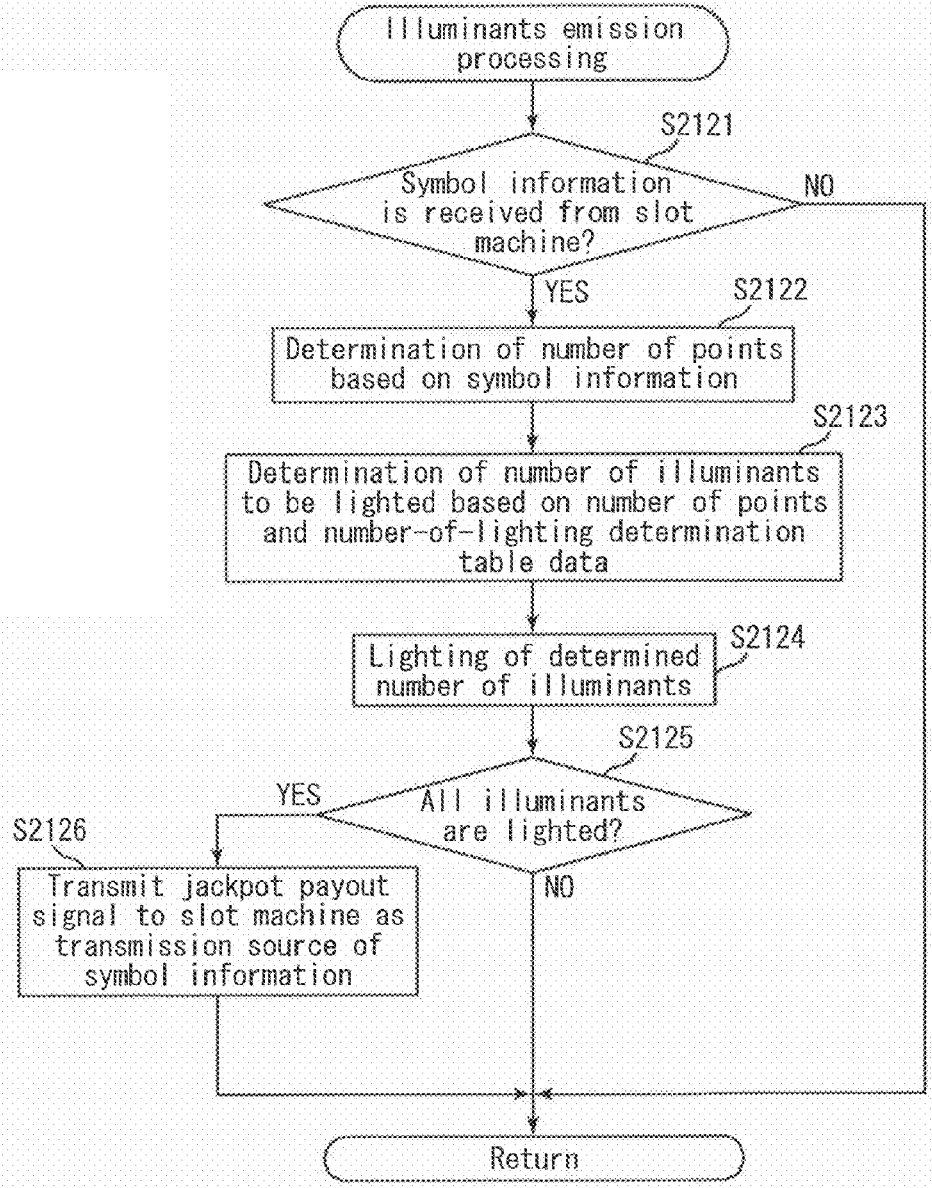
FIG. 77 is a flowchart illustrating a subroutine of illuminants emission processing.

FIG. 77 is a flowchart illustrating a subroutine of illuminants emission processing.

First, the CPU 2201 determines whether or not it has received the symbol information (see FIG. 73) from the slot machine 2010 through the PTS terminal 2064 at a predetermined timing (step S2121).

When determining that it has not received the symbol information, the CPU 2201 completes the present subroutine.

On the other hand, when determining that the CPU 2201 has received the symbol information, the CPU 2201 determines the number of points, based on the symbol information and the number-of-points determination table data stored in the hard disk drive 2205 (step S2122).

FIG. 78 is a view illustrating the number-of-points determination table.

As illustrated in FIG. 78, in the number-of-points determination table, a symbol or a combination of symbols rearranged along the winning line WL and the number of points are set in association with each other. For example, when one "1bar" has been rearranged along the winning line WL, the CPU 2201 determines that the number of points is ten.

Next, the CPU 2201 determines the number of LEDs 2351 (illuminants) to be lighted (emit light) based on the determined number of points and the number-of-lighting determination table data (step S2123).

FIGS. 79A to 79B are views each illustrating the number-of-lighting determination table.

The number-of-lighting determination table is a table in which the possible range of the number of points and the number of LEDs 2351 to be lighted are associated with each other. Further, the correspondence relationship between the number of points and the number of LEDs 2351 to be lighted is associated with each slot machine 2010.

The number-of-lighting determination table includes the number-of-lighting determination table for bent portions (see FIG. 79A) and the number-of-lighting determination table for straight portions (see FIG. 79B).

In the number-of-lighting determination table for bent portions, the correspondence relationship between the number of points and the number of LEDs 2351 to be lighted may be different in accordance with the slot machines 2010.

In the number-of-lighting determination table for straight portions, the correspondence relationships between the number of points and the number of LEDs 2351 to be lighted are the same with respect to all the slot machines 2010.

In the processing of step S2123, the CPU 2201 first determines whether or not the number of lights, indicated by the number-of-lights data stored in the RAM 2203 in association with the identification number of the slot machine 2010 as a transmission source of the symbol information received in step S2121, is equal to or more than a predetermined number (the number of LEDs 2351 included in the bent portion of the coupling illumination line 2310).

When determining that the number of lights is equal to or more than the predetermined number, the CPU 2201 determines the number of LEDs 2351 to be lighted based on the number-of-lighting determination table for straight portions.

On the other hand, when determining that the number of lights is less than the predetermined number, the CPU 2201 determines the number of LEDs 2351 to be lighted based on the number-of-lighting determination table for bent portions.

Next, the CPU 2201 makes the determined number of LEDs 2351 (illuminants) be lighted (emit light) in the coupling illumination line 2310 provided for the slot machine 2010 as a transmission source of the symbol information received in step S2121 (step S2124).

In this processing, the CPU 2201 identifies the identification numbers of the LEDs 2351 to be lighted, based on the number determined in step S2123 and the number of lights indicated by the number-of-lights data stored in the RAM 2203 in association with the identification number of the slot machine 2010. Further, the CPU 2201 transmits to the LED drive circuit 2350 a signal including information indicative of the identified identification numbers. On receiving this signal, the LED drive circuit 2350 lights the LEDs 2351 associated with the identification numbers included in the signal.

Further, after transmitting the signal, the CPU 2201 adds the number determined in step S2123 to the number of lights indicated by the number-of-lights data stored in association with the identification number of the slot machine 2010, and stores the obtained number in the RAM 2203.

Next, the CPU 2201 determines whether or not all the LEDs 2351 (illuminants), included in the coupling illumination line 2310 provided for the slot machine 2010 as a transmission source of the symbol information received in step S2121, have been lighted (emit light) (step S2125). In the processing, the CPU 2201 determines whether or not the number of lights after the addition of the number determined in step S2123 has reached the number of LEDs 2351 included in the coupling illumination line 2310, based on the number-of-lights data stored in the RAM 2203.

When determining that all the LEDs 2351, included in the coupling illumination line 2310 provided for the slot machine 2010 as a transmission source of the symbol information received in step S2121, have been lighted, the CPU 2201 transmits the jackpot payout signal to the slot machine 2010 through the PTS terminal 2064 (step S2126).

When determining in step S2125 that not all the LEDs 2 351 have been lighted or after executing the processing of step S2126, the CPU 2201 completes the present subroutine.

According to the PTS terminal 2064 and the method for controlling the PTS terminal 2064 of the fifth embodiment of the present invention, when the storable domain of the hard disk drive 2246 becomes less than the predetermined amount (100 MB), the image data set to the deletable state among the image data stored in the hard disk drive is deleted. As a result, the amount of the image data stored in the hard disk drive 2246 can be relatively reduced.

When the ID readout signal (detection signal) is received from the IC card R/W 2253, and then the normal card removal signal (non-detection signal) is received, which means that no IC card is left behind. Therefore, deletion of the image data stored during this period causes very little problem. On the other hand, when the ID readout signal is received but thereafter the normal card removal signal is not received, which means that there is an uncollected card left behind. In this case, however, the image data is not deleted. Accordingly, by using an image of the face shown by the image data, the player with the face can be specified. As mentioned above, the amount of the image data stored in the hard disk drive 2246 is reduced as much as possible so that need of maintenance is reduced to a minimum level. Moreover, it becomes possible to assuredly obtain the image data for tracking individuals. Therefore, the technology for tracking individuals by use of face images can be applied to the game field without reducing the convenience.

Sixth Embodiment

Next, the following description will discuss an individual tracking system according to the sixth embodiment of the present invention.

It is to be noted that explanation on those in common with the gaming system according to the fifth embodiment will be omitted. Further, the structural elements corresponding to those of the gaming system according to the fifth embodiment are explained with the same symbol applied thereto.

Figure 80:
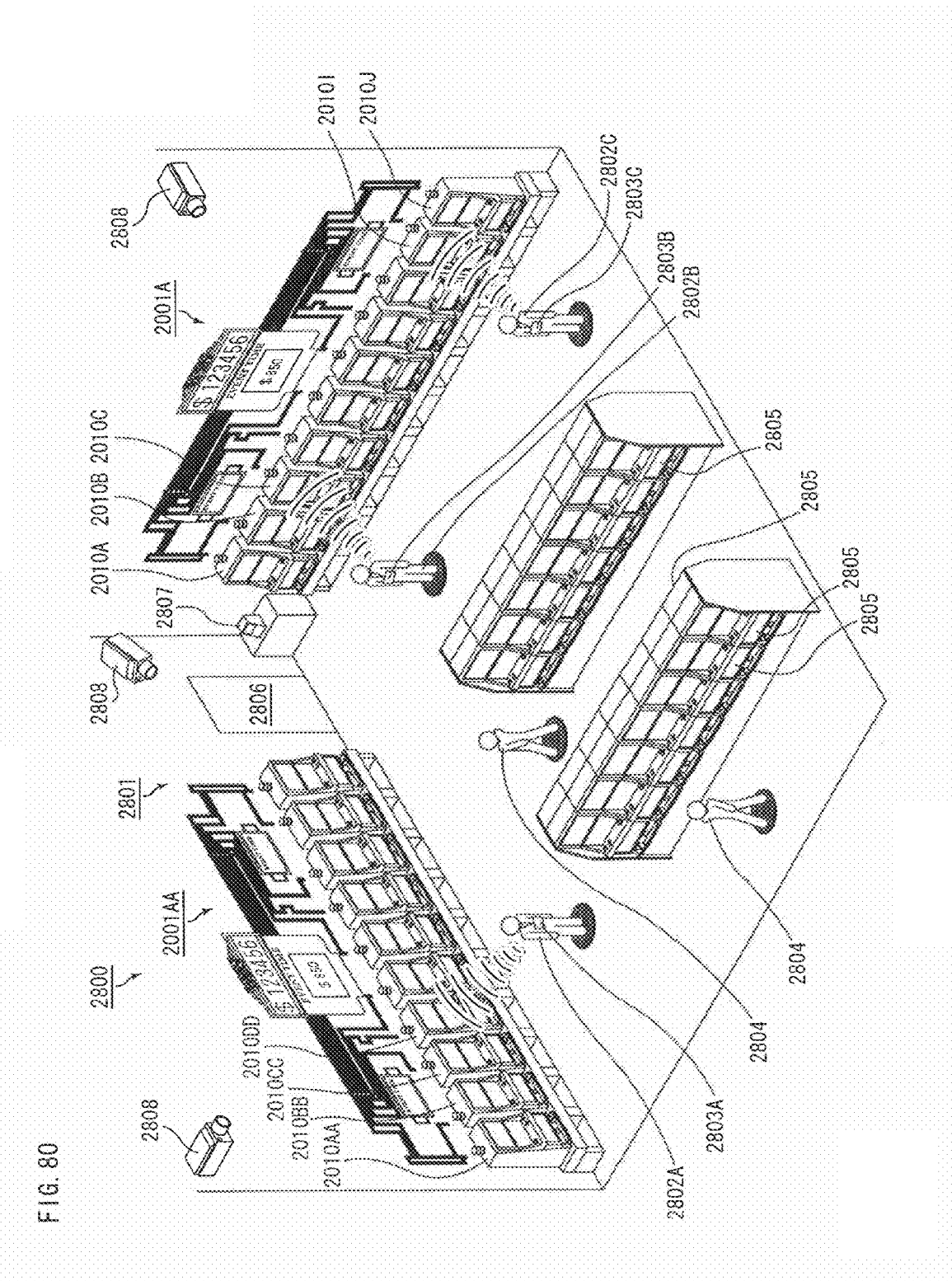
FIG. 80 is an overhead view schematically illustrating an individual tracking system according to a second embodiment of the present invention.

FIG. 80 is an overhead view schematically illustrating the individual tracking system according to the sixth embodiment of the present invention.

The individual tracking system 2800 according to the sixth embodiment of the present invention is a system for managing staff members 2802 (staff member 2802A, staff member 2802B, staff member 2802C in FIG. 80) in a casino 2801. In the casino 2801 shown in FIG. 80, there are the staff members 2802 and clients 2804.

The casino 2801 corresponds to the facility according to the present invention.

The individual tracking system 2800 according to the sixth embodiment includes a plurality of the PTS terminals 2064, the management server 200, and a plurality of the RFID-R255. The PTS terminals 2064 are respectively installed in the cabinets 11 of the slot machines 2010 disposed in the casino 2801. The RFID-R255s are respectively installed in the cabinets 11 of the slot machines 2010 disposed in the casino 2801. The RFID-R255 corresponds to the card reader of the present invention.

The RFID-R255 installed in each of the slot machines 2010 reads the staff ID by radio waves from a staff ID card 2803 possessed by the staff member 2802. Reading out of the staff ID is performed only when the staff ID card 2803 exists within reach of the radio waves of each of the RFID-R255. In the present embodiment, as an RFID tag included in the staff ID card 2803, an active type RFID tag which enables communications within an area of around 10 meters is used.

The staff ID read out of each of the RFID-R255 is added with information to identify the RFID-R255 and a receiving signal intensity and then transmitted to the management server 200. In the management server 200, location of each of the RFID tags (staff members) is detected based on the transmitted staff ID. It is to be noted that the detection of the RFID tag is performed based on the receiving signal intensity of the radio wave transmitted by the RFID tag installed in the staff ID card 2803 at the RFID-R255. As the method for detecting the location of an RFID tag using a receiving signal intensity, at a reader, of radio wave transmitted by a RFID tag, a conventionally known method such as trilateration can be applied. Therefore, an explanation thereof is omitted in the specification.

On the other hand, upon detection of an abnormality in the slot machine 2010, an abnormal signal is transmitted to the management server 200. The management server 200 specifies a staff member who is closest to the slot machine transmitting the abnormal signal, and then starts communications with the staff member using a mobile terminal. As a result, it becomes possible to order the staff member 2802 closest to the slot machine 2010 in which an abnormality is detected to go to the slot machine 2010 as soon as possible.

Moreover, as shown in FIG. 80, an entrance card reader 2807 is set at an entrance gate 2806 of the casino 2801, and when the staff member 2802 enters into the casino, the staff ID is read from the staff ID card 2803 by the entrance card reader 2807. Here, the staff ID read out upon entering is stored in the RAM of the staff management server 2263, and the staff ID read out upon leaving is removed from the RAM of the staff management parlor 2263. As a result, it becomes possible to manage the number of staff members 2802 in the casino 2801, or which staff members 2802 should be in the casino 2801, or the like. The staff management server 2263 corresponds to the server of the present invention.

Further, as shown in FIG. 80, surveillance cameras 2808 are disposed in the casino 2801 so as to capture the scene inside the casino 2801. Furthermore, gaming machines 2805 which provide another kind of game different from the gaming system 2001 are installed in the casino 2801.

Figure 81:
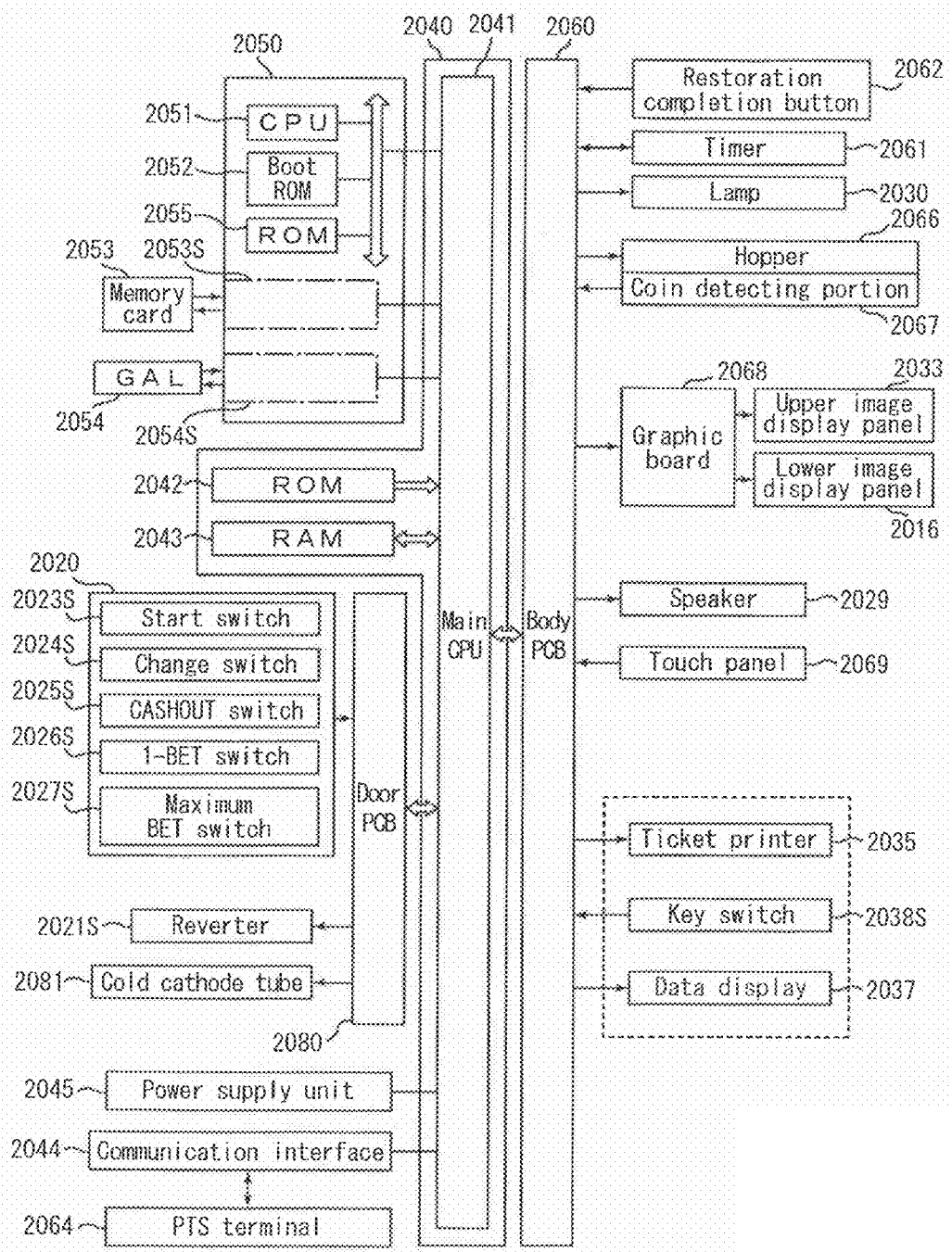
FIG. 81 is a block diagram illustrating an inner structure of the slot machine according to the second embodiment of the present invention.

FIG. 81 is a block diagram illustrating an inner structure of the slot machine according to the sixth embodiment of the present invention.

The PCB 60 is connected to a recovery-completion button 2062. The recovery-completion button 2062 is provided inside the cabinet 2011, and can be operated with the cabinet 2011 opened. The slot machine 2010 transmits the abnormality detection signal upon detection of an abnormality, and also disables functions of the game. Then, when the recovery-completion button 2062 is operated by the staff member, the disabled functions of the game are released and at the same time the recovery completion signal is transmitted to the PTS terminal 2064.

Other structures are the same as those in the slot machine according to the fifth embodiment, and thus explanations of those structures are omitted.

Figure 82:
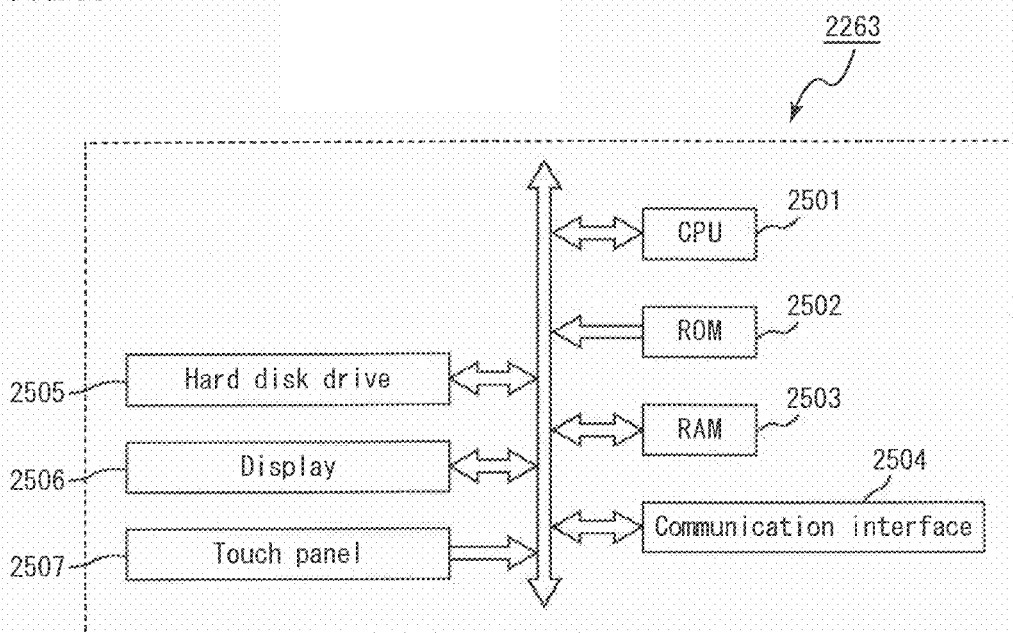
FIG. 82 is a block diagram illustrating an inner structure of a staff management server according to the second embodiment of the present invention.

FIG. 82 is a block diagram showing an inner structure of a staff management server according to the sixth embodiment of the present invention.

The staff management server 2263 includes a CPU 2501 as a processor, a ROM 2502, a RAM 2503, a communication interface 2504, a hard disk drive 2505, a display 2506, and a touch panel 2507 provided at the front surface of the display 2506. The communication interface 2504 is connected to the communication interface 2245 of the PTS terminal 2064 through a communication line. The ROM 2502 stores a system program to control the operation of the staff control server 263, permanent data, or the like. The RAM 2503 stores data or program used to activate the CPU 2501.

FIG. 83 is a view illustrating a staff control table stored in the staff management server illustrated in FIG. 82.

As shown in FIG. 83, the hard disk drive 2505 stores the staff control table in which the staff IDs, face images and telephone numbers to the mobile terminals correspond with each other. The staff members are respectively provided with staff IDs in advance and also their face images are captured by the camera. The face image data showing the captured face images are corresponded to the staff IDs and stored in the hard disk drive 2505. The staff members are respectively provided with mobile terminals corresponding to the staff IDs rent from the manager. For example, the staff member 2802A (see FIG. 80) is provided with the staff ID "001" and the staff ID "001" which is related to the face image data A is stored. Further, the staff ID "001" which is related to the telephone number A is stored. The staff member 2802B (see FIG. 80) is provided with the staff ID "002" and the staff ID "002" which is related to the face image data B is stored. Further, the staff ID "002" which is related to the telephone number B is stored.

Figure 84:
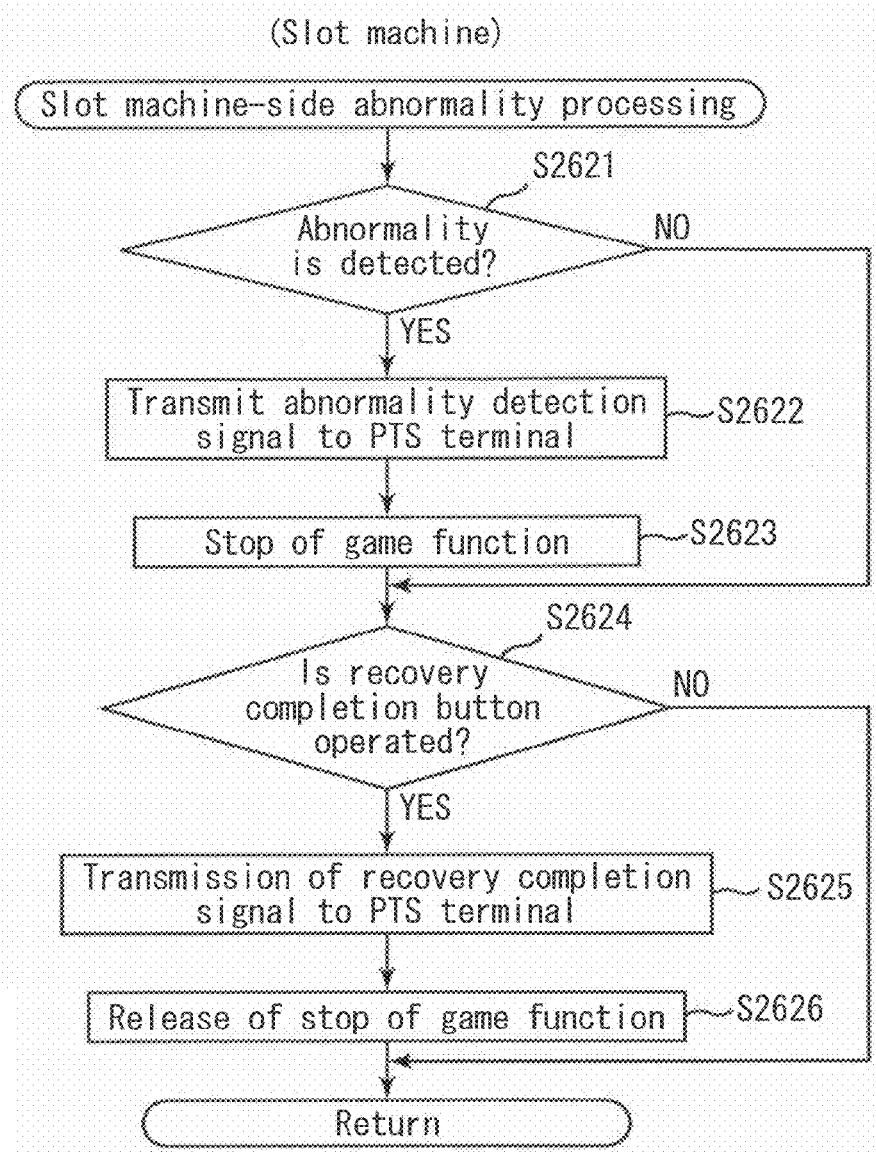
FIG. 84 is a flowchart illustrating a processing for slot machine-side abnormality carried out in the slot machine according to the second embodiment of the present invention.

FIG. 84 is a flowchart illustrating a processing for slot machine-side abnormality carried out in the slot machine according to the sixth embodiment of the present invention.

First, the main CPU 2041 included in the slot machine 2010 determines whether or not any abnormality is detected or not in step S2621. In this processing, the main CPU 2041 determines that abnormality is detected when a predetermined amount or more of shock is detected or a predetermined amount or more of voltage is applied. Although not shown in the Figures, the slot machine 2010 is provided with a censor which detects shocks and voltages.

In the case where the main CPU 2041 determines that an abnormality is detected, the main CPU 2041 transmits the abnormality detection signal to the PTS terminal 2064 (step S2622). Next, the main CPU 2041 stops the functions of the games (step S2633). Specifically, the main CPU 2041 performs a control to make a condition in which, if the input signal from the start switch 2023S is detected, the detection of the input signal is not recognized as occurred.

When it is determined that no abnormality was detected in step S2621, or after processing of step S2623, the main CPU 2041 determines whether or not the recovery-completion button 2062 has been operated (step S2624). When the main CPU 2041 determines that the recovery-completion button 2062 has been operated, the main CPU 2041 transmits a recovery-completion signal to the PTS terminal 2064 (step S2625). Then, the main CPU 2041 releases the cessation of the functions of the game (step S2626). When determined in step S2624 that the recovery-completion button was not manipulated, or after the process of step S2626, the main CPU completes the present routine.

Figure 85:
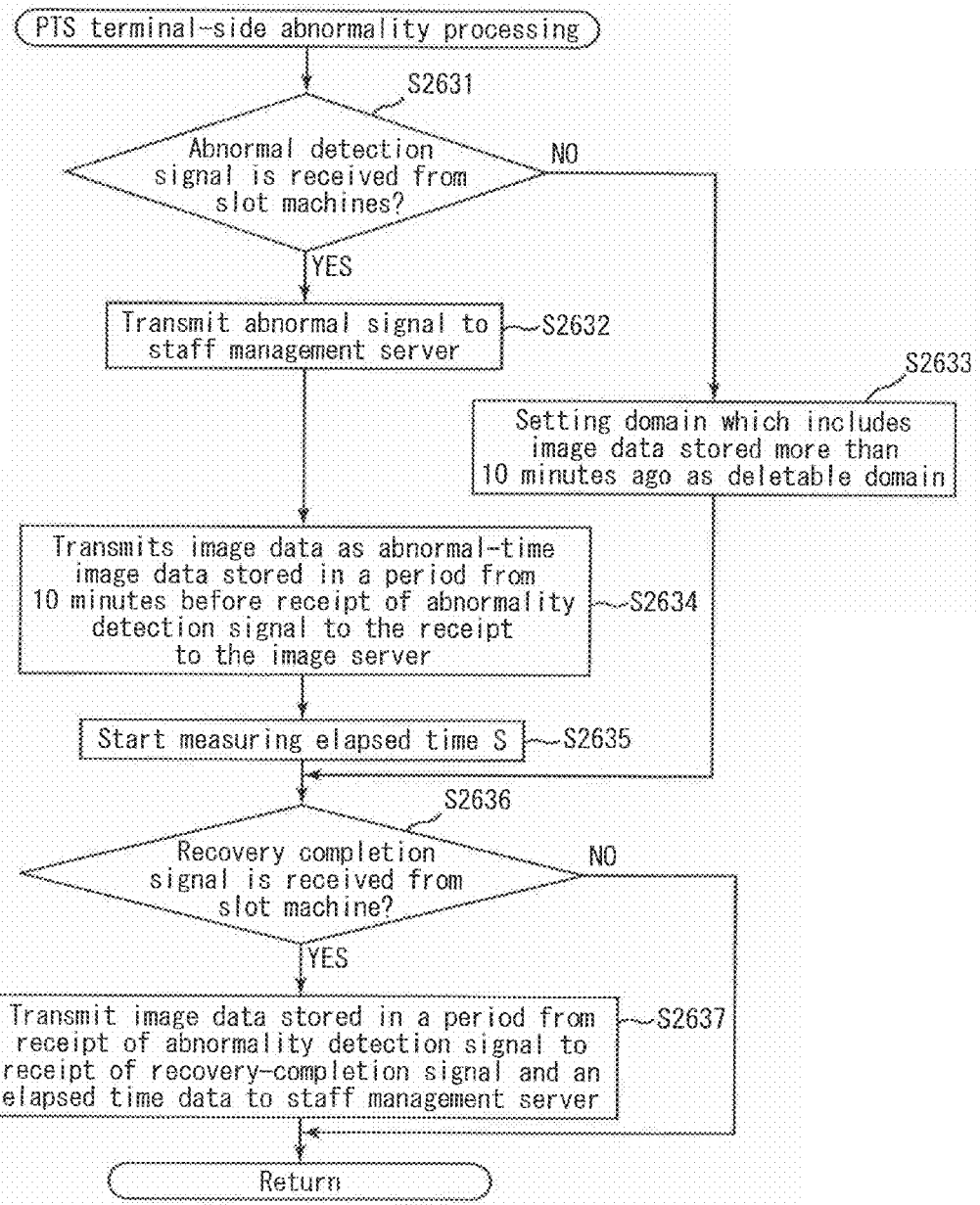
FIG. 85 is a flowchart illustrating a processing for PTS terminal abnormality conducted in the PTS terminal according to the second embodiment of the present invention.

FIG. 85 is a flowchart illustrating a processing for PTS terminal abnormality conducted in the PTS terminal according to the sixth embodiment of the present invention.

First, the CPU 2241 included in the PTS terminal 2064 determines whether or not the abnormality detection signal has been received from the slot machine 2010 (step S2631). When it is determined that the abnormality detection signal has been received from the slot machine 2010, the CPU 2241 transmits the abnormal signal to the staff management server 2263 (step S2632).

After processing of step S2632, the CPU 2241 transmits, as abnormal image data, the image data that has been stored in the hard disk drive 2246 in a period from 10 minutes before receipt of the abnormality detection signal to the receipt to the image server 2267 (step S2634). As a result, it becomes possible to identify the player who was playing with the slot machine at the time when the abnormality occurred.

After processing of step S2634, the CPU 2241 starts measuring elapsed time S. The elapsed time S is for measuring the period from receipt of the abnormality detection signal to receipt of the recovery-completion signal.

When determining in step S2631 that the abnormality detection signal is not received from the slot machine 2010, a domain of the hard disk drive 2246 which includes the image data stored more than 10 minutes before present is set as a deletable domain (step S2633).

After processing of step S2633 or S2635, the CPU 2241 determines whether or not the recovery-completion signal has been received from the slot machine 2010 (step S2636). When it is determined that the recovery-completion signal has been received from the slot machine 2010, the CPU 2241 transmits the image data stored in the hard disk drive 2246 in a period from receipt of the abnormality detection signal to receipt of the recovery-completion signal and an elapsed time data shown by the elapsed time S to the staff management server 2263 (step S2637). When it is determined in step S2636 that the recovery-completion signal is not received from the slot machine 2010, or after processing of step S2637, the present subroutine is completed.

Figure 86:
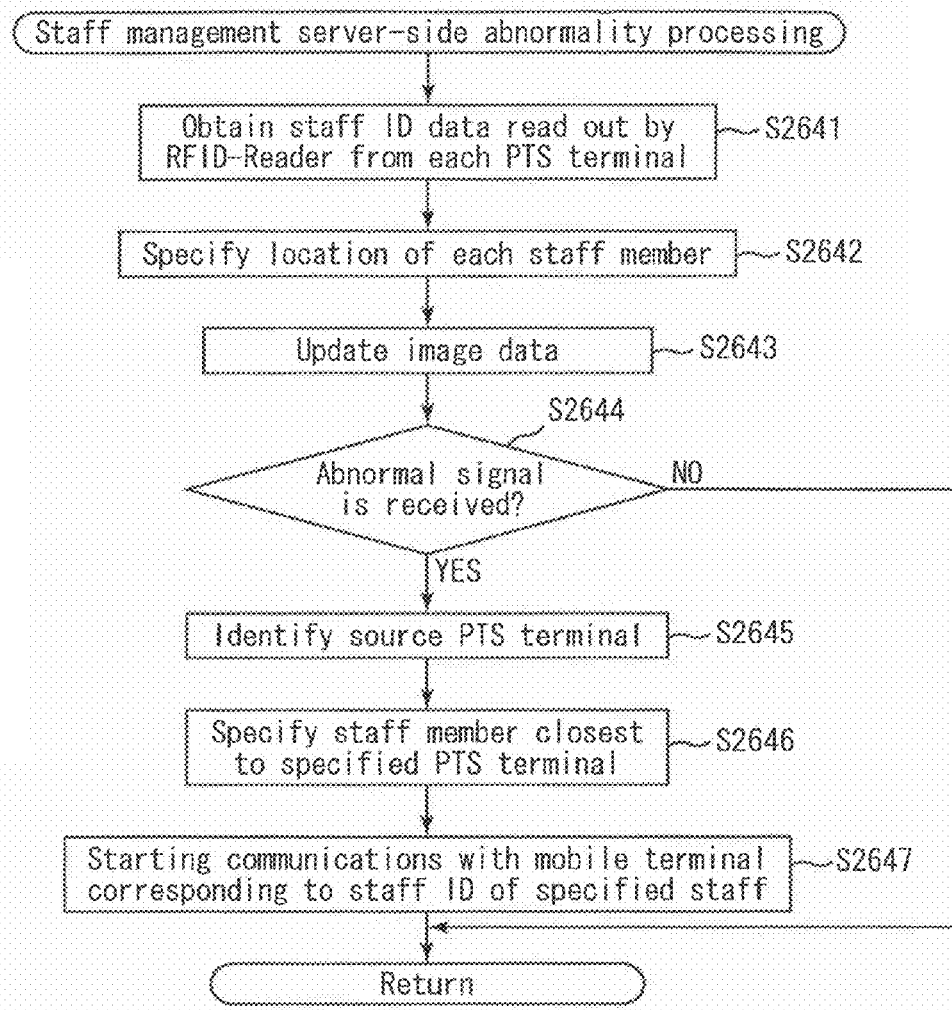
FIG. 86 is a flowchart illustrating a processing for staff management server abnormality executed in the staff management server according to the second embodiment of the present invention.

FIG. 86 is a flowchart illustrating a processing for staff management server abnormality executed in the staff management server according to the sixth embodiment of the present invention.

The CPU 2501 included in the staff management server 2263 obtains the staff ID data read out by the RFID-R255 connected to each of the PTS terminals 2064 (step S2641). It is to be noted that the obtained staff ID has been added with information to identify the RFID-R255 of which staff ID was read out and the receiving intensity.

Next, the CPU 2501 specifies the location of each of the staff ID cards 2803 (each of the staff members 2802) in the casino 2801 based on the obtained staff ID data (step S2642). In this processing, the CPU 2501 specifies the location of each of the staff ID cards 2803 by using a trilateration technique based on each of the staff IDs detected by the each of the RFID-R255 and the receiving intensity.

Next, the CPU 2501 updates the image of the display 2506 (step 643).

FIG. 87 is a view illustrating one example of images displayed on a display provided in the staff management server illustrated in FIG. 82.

As shown in FIG. 87, an image schematically illustrating an overhead view of the casino 2801 is displayed on the display 2506. On the upper side of the display 2506, images 2810A to 2810J respectively corresponding to the slot machines 2010A to 2010J (see FIG. 80) are displayed. On the left side of the display 2506, images 2810AA to 2810JJ respectively corresponding to the slot machines 2010AA to 2010 JJ (see FIG. 80) are displayed. Further, on the right center of the display 2506, images 2815 respectively corresponding to the gaming machines 2805 (see FIG. 80) are displayed.

The images 2813 of black circle are shown at the positions corresponding to the locations of the staff ID cards 2803 in the casino 2801. Specifically, the image 2813A is shown at the position corresponding to the location of the staff ID card 2803A owned by the staff member 2802A shown in FIG. 80. Also, the image 2813B is shown at the position corresponding to the location of the staff ID card 2803B owned by the staff member 2802B. Moreover, the image 2813B is shown at the position corresponding to the location of the staff ID card 2803C owned by the staff member 2802C.

In the processing of step S2643, the CPU 2501 displays the images 2813, while updating, at predetermined time intervals based on the position of the staff ID card 2803 specified in the processing of step S2642.

After processing of step S2643, the CPU 2501 determines whether or not the abnormal signal has been received from the PTS terminal 2064 (step S2644). When the CPU determines that the abnormal signal has been received from the PTS terminal 2064, the CPU 2501 specifies the transmission source of the abnormal signal based on a PTS terminal identification data for identifying the PTS terminal 2064, which was included in the abnormal signal and transmitted (step S2645).

Next, in step S2646, the CPU 2501 specifies the staff ID card 2803 (staff member 2802) that is closest to the specified PTS terminal 2064. For example, in the case where the abnormal signal has been transmitted from the PTS terminal 2064 connected to the slot machine 2010C, the CPU 2501 specifies the staff ID card 2803B (staff member 2802 B) as the staff ID card 2803 (staff member 2802) that is closest to the slot machine 2010C.

Next, in step S2647, the CPU 2501 starts communications with a mobile terminal corresponding to the staff ID of the specified staff ID card 2803. For example, when the staff ID card 2803B (staff member 2802B) has been specified, the CPU starts communications with the mobile terminal corresponding to the staff ID "002" stored in the staff ID card 2803B (see FIG. 83). When it is determined that no abnormal signal has been received in step S2644, or after processing of step S2647, the present subroutine is completed.

A touch panel 2507 is provided at the front side of the display 2506 shown in FIG. 87, and it is possible to start communications with the mobile terminal corresponding to the image 2813 by touching the image 2813 of black circle showing the location of the staff member.

As described above, according to the PTS terminal 2064 and the control method of the PTS terminal 2064, when the storable domain of the hard disk drive 2246 becomes less than a predetermined amount (100 MB), the image data set to the deletable state among the image data stored in the hard disk drive 2246 are deleted. As a result, it becomes possible to relatively reduce the amount of the image data stored in the hard disk drive 2246.

In the case where there is image data that has been stored in the hard disk drive 2246 for 10 minutes (predetermined period) or more, when the abnormality detection signal was received during the period, the image data are not deleted. In other words, the image data of the image captured in a period from a predetermined period time before the abnormality was detected to the detection of the abnormality are not deleted. In this period, it is highly likely that an image of a player conducting such acts as detected as abnormality has been captured. Since this kind of data are not deleted, by using the image of the face shown by the image data, it is possible to identify the player having the face, and thus possible to identify the player who behaved abnormally.

Accordingly, the amount of the image data stored in the hard disk drive 2246 is reduced as much as possible so that need of maintenance is reduced to a minimum level. Moreover, it becomes possible to assuredly obtain the image data for tracking individuals. Therefore, the technology for tracking individuals by use of face images can be applied to the game field without reducing the convenience.

According to the individual tracking system 2800 of the sixth embodiment and the control method for the individual tracking system 2800 of the sixth embodiment, the staff management server 2263 starts communication with the mobile terminal owned by the staff member closest to the slot machine 2010 that transmitted abnormality detection signal. Thus, it is possible for the server to give a command to the staff member closest to the slot machine 2010 that transmitted the abnormality detection signal to immediately head for the gaming machine.

Moreover, the period from detection of abnormality of the gaming machine to completion of recovery (period from receipt of the abnormality detection signal to receipt of recovery-completion signal) and the image data showing the image of the face of the staff member who performed operations during the period are transmitted to the staff management server 2263. As a result, it is possible to check if someone who disguised himself or herself as a staff member performed the operations. Furthermore, it is possible to evaluate which one of the staff members can restore the gaming machine faster.

In the foregoing fifth embodiment, the case has been described where the predetermined condition is not the image data of the image captured in the period from receipt of the ID readout signal to receipt of the normal card removal signal.

Moreover, in the foregoing sixth embodiment, the case has been described where the predetermined condition is not the image data which has been stored in the hard disk drive 2246 for a predetermined period (10 minutes in the sixth embodiment) or more without receiving the abnormality detection signal.

However, the predetermined condition of the present invention is not limited to those examples mentioned earlier.

The predetermined condition of the present invention may be that the image is not an image captured in the period including the timing where the prize to generate a predetermined amount is established.

In the sixth embodiment, the case is described where the RFID-R255 as a card reader is provided to each of the slot machines. However, the present invention is not limited to this example, and for example, the RFID-R255 may be provided on the wall or the floor of the facility.

In the foregoing embodiments, the case is described where each of the PTS terminals 2064 (individual tracking apparatus) is connected to each of the single slot machines 2010 (gaming machine). However, the present invention is not limited to this example, and a single individual tracking apparatus may be connected to a plurality of the gaming machines.

In the foregoing embodiments, the case is described where the facility according to the present invention is the casino 2801. However, according to the present invention, the facility is not limited to this example, and examples of the facility include a sports facility such as baseball stadiums and soccer stadiums, an event facility for exhibition of cars, houses of the like, or a variety of facilities where staff members (employees) need to be deployed.

In the foregoing embodiments, the case is described where the gaming machine of the present invention is the slot machine 2010. However, according to the present invention, the gaming machine is not limited to this example, and examples thereof include gaming machines for playing games such as card games like poker, shooting games, fighting games and the like.

Although the embodiments of the present invention were described above, they were just illustrations of specific examples, and hence do not particularly restrict the present invention. A specific configuration of each step and the like is appropriately changeable in terms of design. Further, the effects described in the embodiments of the present invention are just recitations of the most suitable effects generated from the present invention. The effects of the present invention are thus not limited to those described in the embodiments of the present invention.

Further, the foregoing detailed descriptions centered the characteristic parts of the present invention in order to facilitate understanding of the present invention. The present invention is not limited to the embodiments in the foregoing specific descriptions but applicable to other embodiments with a variety of application ranges. Further, terms and phrases in the present specification were used not for restricting interpretation of the present invention but for precisely describing the present invention. It is considered easy for the skilled in the art to conceive other configurations, systems, methods and the like included in the concept of the present invention from the concept of the invention described in the specification. Therefore, it should be considered that recitations of the claims include uniform configurations in a range not departing from the range of technical principles of the present invention. Moreover, an object of the abstract is to enable a patent office, a general public institution, an engineer belonging to the technical field who is unfamiliar with patent, technical jargon or legal jargon, and the like, to smoothly determine technical contents and an essence of the present application with simple investigation. Accordingly, the abstract is not intended to restrict the scope of the invention which should be evaluated by recitations of the claims. Furthermore, for thorough understanding of an object of the present invention and an effect specific to the present invention, it is desired to make interpretation in full consideration of documents already disclosed and the like.

The foregoing detailed descriptions include processing executed on a computer. Explanations and expressions above are described with the aim of being most efficiently understood by the skilled person in the art. In the specification, each step for use in deriving one result should be understood as the self-consistent processing. Further, in each step, transmission/reception, recording or the like of an electrical or magnetic signal is performed. While such a signal is expressed by using a bit, a value, a symbol, a letter, a term, a number or the like in processing of each step, it should be noted that those are used simply for the sake of convenience in description. While there are cases where processing in each step may be described using an expression in common with that of action of a human, processing described in the specification is essentially executed by a variety of devices. Further, other configurations requested for performing each step should become apparent from the above descriptions.

What is claimed as new and desired to be secured by Letters Patent of the United States is:

1. A gaming system comprising:
a gaming machine including a control panel capable of receiving a basic currency bill and an other than basic currency bill, and at least one of a coin, a token, or a card, and a payout device capable of outputting at least one of a basic currency bill, a coin, a token, or a card;
a currency-value converter, which is connected to a controller installed in the gaming machine;
a progressive-jackpot server;
a first currency validator capable of accepting and identifying a type and an amount of the basic currency through respective communication lines, and a second currency validator capable of accepting and identifying a type and an amount of the other than basic currency through respective communication lines,
said currency-value converter comprising:
a memory capable of receiving and storing exchange rate information indicating an exchange rate in which a correspondence relationship between an amount of basic currency and an amount of another type of currency other than said basic currency is set for each type of currency other than said basic currency; and,
a processor programmed to:
receive type-of-currency and amount-of-currency data indicating a type and amount of currency identified by said currency validator and accepted by one of said currency validator and said gaming machine;
determine whether a type of currency indicated by the type-of-currency data received from the currency validator is said basic currency; wherein,
when the type of currency indicated by type-of-currency data is determined to be the basic currency, execute a game at the gaming machine without accumulatively storing any portion of the amount of basic currency received to a memory of the progressive jackpot server; and wherein, when it is determined that the type of currency is not said basic currency, exchange a first amount of currency which is not said basic currency indicated by the amount of currency data into a second amount of basic currency and generate amount of converted currency data indicating the second amount of basic currency calculate a predetermined percentage of the second amount of basic currency, accumulatively store as a resource for a progressive jackpot payout, in the memory of the progressive jackpot server, a portion of the second amount of basic currency corresponding to the predetermined percentage calculated when the first amount of currency indicated by the amount of currency data is exchanged into the second amount of basic currency, and execute a game.

2. The gaming system according to claim 1, wherein said currency-value converter repeatedly acquires the exchange rate information indicating a correspondence relationship between an amount of basic currency and an amount of another type of currency other than said basic currency at a predetermined timing, through a communication line, and the processor is programmed to execute the processing of:
(B) receiving information based on the exchange rate information from an exchange server each time said exchange server acquires the exchange rate information; and
(C) updating the exchange rate information stored in said memory based on the information received.

3. The gaming system according to claim 1, wherein the predetermined percentage comprises a currency exchange fee.

4. The gaming system according to claim 1, wherein the predetermined percentage comprises a fractional amount obtained by dividing an amount of basic currency corresponding to a predetermined ratio by a predetermined unit amount of basic currency, provided that an amount of basic currency corresponding to the predetermined ratio, out of the amount of basic currency equivalent to the amount of currency indicated by the amount-of-currency data received does not become a natural-number multiple of said predetermined unit-amount of basic currency.

5. The gaming system according to claim 1 comprising a plurality of gaming machines, wherein
each of the plurality of gaming machines includes a currency validator and a controller; and
the progressive-jackpot server includes a control portion, said currency-value converter is connected to said control portion,
said controller executes the processing of:
(a) receiving the amount-of-converted-currency data; and
(b) executing the game based on a BET value, said BET value being an amount of basic currency obtained by subtracting an amount of basic currency corresponding to a predetermined fee from an amount of basic currency equivalent to the amount of currency indicated by the amount-of-currency data received by said processor in said processing (A), and
said control portion executes the processing of:
(I) cumulatively counting as a cumulative value the amount of basic currency corresponding to the predetermined fee, when the type of currency indicated by the type-of-currency data received by said processor in said processing (A) is not said basic currency; and
(II) paying out game media to any of the gaming machines out of said plurality of gaming machines, based on said cumulative value, when a predetermined progressive-jackpot payout condition has been established.

6. The gaming system according to claim 5, wherein said processing (II) is the processing of paying out game media, based on said cumulative value, to a gaming machine having the currency validator through which the type of currency other than said basic currency has been accepted, out of said plurality of gaming machines, when the predetermined progressive-jackpot payout condition has been established.

7. The gaming system of claim 1, further comprising a controller including an execution unit, which, when the first amount of currency indicated by the amount of currency data is exchanged into the second amount of basic currency, executes the game based on receipt of a BET amount obtained by subtracting a predetermined amount of basic currency from the second amount of basic currency indicated by the amount of currency data.

8. The gaming system of claim 1, wherein when the type of currency indicated by type-of-currency data is determined to be the basic currency and a BET is received so as to execute the game, no portion of the amount of the BET received is subtracted and stored in the progressive jackpot server.

9. The gaming system of claim 1, wherein the progressive jackpot payout amount is only awarded to a gaming machine having received a type of currency that is not said basic currency.

10. A gaming system comprising:
a gaming machine including a control panel capable of receiving a basic currency bill and an other than basic currency bill, and at least one of a coin, a token, or a card, and a payout device capable of outputting at least one of a basic currency bill, a coin, a token, or a card;
a currency-value converter, which is connected to a controller installed in the gaming machine;
a progressive-jackpot server;
a first currency validator capable of accepting and identifying a type and an amount of the basic currency through respective communication lines, and a second currency validator capable of accepting and identifying a type and an amount of the other than basic currency through respective communication lines,
said currency-value converter comprising:
a memory capable of receiving and storing exchange rate information indicating an exchange rate in which a correspondence relationship between an amount of basic currency and an amount of another type of currency other than said basic currency is set for each type of currency other than said basic currency; and,
a processor programmed to:
receive type-of-currency and amount-of-currency data indicating a type and amount of currency identified by said currency validator and accepted by one of said currency validator and said gaming machine;
determine whether a type of currency indicated by the type-of-currency data received from the currency validator is said basic currency; wherein,
when the type of currency indicated by type-of-currency data is determined to be the basic currency and upon receipt of a BET, execute a game at the gaming machine and accumulatively store a portion of the amount BET to a first memory storage area of the progressive jackpot server; and wherein, when it is determined that that the type of currency is not said basic currency, exchange a first amount of currency which is not said basic currency indicated by the amount of currency data into a second amount of basic currency and generate amount of converted currency data indicating the second amount of basic currency, calculate a predetermined percentage of the second amount of basic currency, accumulatively store as a resource for a progressive jackpot payout, in a second memory area of the progressive jackpot server, a portion of the second amount of basic currency corresponding to the predetermined percentage calculated when the first amount of currency indicated by the amount of currency data is exchanged into the second amount of basic currency, and execute a game.

11. The gaming system of claim 10, further comprising a controller including an execution unit, which, when the first amount of currency indicated by the amount of currency data is exchanged into the second amount of basic currency, executes the game based on receipt of a BET amount obtained by subtracting a predetermined amount of basic currency from the second amount of basic currency indicated by the amount of currency data.

12. The gaming system of claim 10, wherein when the type of currency indicated by type-of-currency data is determined to be the basic currency and a BET is received so as to execute the game, the amount of the BET stored to the first memory storage area of the progressive jackpot server does not comprise an exchange fee.

13. The gaming system of claim 10, wherein the progressive jackpot payout amount stored in the second memory area is only awarded to a gaming machine having received a type of currency that is not said basic currency.

14. A gaming system comprising:
a gaming machine including a control panel capable of receiving a basic currency bill and other than a basic currency bill, as well as at least one of a coin, a token, or a card, and further including a payout device capable of outputting at least one of a basic currency bill, a coin, a token, or a card;
a currency-value converter, which is connected to a controller installed in the gaming machine;
a progressive-jackpot server; and
a first currency validator capable of accepting and identifying a type and an amount of the basic currency through respective communication lines, and a second currency validator capable of accepting and identifying a type and an amount of the other than basic currency through respective communication lines,
said currency-value converter comprising:
a memory capable of receiving and storing exchange rate information indicating an exchange rate in which a correspondence relationship between an amount of basic currency and an amount of another type of currency other than said basic currency is set for each type of currency other than said basic currency;
a processor programmed to:
receive type-of-currency and amount-of-currency data indicating a type and amount of currency identified by said currency validator and accepted by one of said currency validator and said gaming machine;
determine whether a type of currency indicated by the type-of-currency data received from the currency validator is said basic currency; wherein,
when the type of currency indicated by type-of-currency data is determined to be the basic currency, execute a game at the gaming machine; and wherein,
when it is determined that the type of currency is not said basic currency, exchange a first amount of currency which is not said basic currency indicated by the amount of currency data into a second amount of basic currency and generate amount of converted currency data indicating the second amount of basic currency, calculate a predetermined percentage of the second amount of basic currency, accumulatively store as a resource for a progressive jackpot payout, in the memory of the progressive jackpot server, a portion of the second amount of basic currency corresponding to the predetermined percentage calculated when the first amount of currency indicated by the amount of currency data is exchanged into the second amount of basic currency, and execute a game.

15. The gaming system of claim 14, wherein when the type of currency indicated by type-of-currency data is determined to be the basic currency, execute the game at the gaming machine without accumulatively storing any portion of the amount of basic currency received to a memory of the progressive jackpot server.

16. The gaming system of claim 14, wherein the control panel and the currency validator each include a first insertion slot that receives the basic currency and a second insertion slot that receives the other than basic currency.

* * * * *